United States Patent
Demond et al.

(10) Patent No.: US 12,054,219 B2
(45) Date of Patent: Aug. 6, 2024

(54) FOLDING VEHICLE

(71) Applicant: NEWCYCLE INC., Redondo Beach, CA (US)

(72) Inventors: Andrew Demond, Kitchener (CA); Kain Galliver, Port Elliott (AU); Mark Sanders, Poole (GB)

(73) Assignee: NewCycle Inc., Redondo Beach, CA (US)

( * ) Notice: Subject to any disclaimer, the term of this patent is extended or adjusted under 35 U.S.C. 154(b) by 611 days.

(21) Appl. No.: 17/290,540

(22) PCT Filed: Oct. 31, 2019

(86) PCT No.: PCT/US2019/059097
§ 371 (c)(1),
(2) Date: Apr. 30, 2021

(87) PCT Pub. No.: WO2020/092724
PCT Pub. Date: May 7, 2020

(65) Prior Publication Data
US 2021/0380192 A1 Dec. 9, 2021

Related U.S. Application Data

(60) Provisional application No. 62/755,006, filed on Nov. 2, 2018.

(51) Int. Cl.
*B62K 15/00* (2006.01)
*B62M 6/60* (2010.01)
*B62M 6/90* (2010.01)

(52) U.S. Cl.
CPC ........... *B62K 15/008* (2013.01); *B62M 6/60* (2013.01); *B62M 6/90* (2013.01)

(58) Field of Classification Search
CPC .............................. B62K 15/008; B62M 6/60
(Continued)

(56) References Cited

U.S. PATENT DOCUMENTS

| 3,979,136 A | 9/1976 | Lassiere |
| 3,993,322 A | 11/1976 | Van Tijen |

(Continued)

FOREIGN PATENT DOCUMENTS

| CN | 1046499 | 10/1990 |
| CN | 1023986 | 3/1994 |

(Continued)

OTHER PUBLICATIONS

Copenheaver, Blaine R., "PCT International Search Report" and "PCT Written Opinion of the International Searching Authority", PCT International Application No. PCT/US2019/059097 filed on Oct. 31, 2019, mailed on Feb. 11, 2020, Alexandria, VA.

(Continued)

*Primary Examiner* — Minnah L Seoh
*Assistant Examiner* — Christopher B Wehrly
(74) *Attorney, Agent, or Firm* — Woods Oviatt Gilman LLP; Dennis B. Danella, Esq.

(57) ABSTRACT

A folding vehicle is adjustable between an unfolded position and a folded position. In the unfolded position, the wheels of the vehicle are in a leading and trailing relationship. In the folded position, the components of the folding vehicle have a minimal footprint allowing for compact storage. In the folded position, the wheels may be in a side-by-side relationship with the majority of the vehicle components positioned between the wheels.

17 Claims, 81 Drawing Sheets

(58) Field of Classification Search
USPC .................................................... 280/278
See application file for complete search history.

(56) References Cited

U.S. PATENT DOCUMENTS

| | | | |
|---|---|---|---|
| 4,182,522 A | 1/1980 | Ritchie |
| 4,202,461 A | 5/1980 | Sinoto |
| 4,296,940 A | 10/1981 | Herbert |
| 4,422,663 A | 12/1983 | Hon |
| 4,438,942 A | 3/1984 | Hon |
| 4,598,923 A | 7/1986 | Csizmadia |
| 5,398,955 A | 3/1995 | Yeh |
| 5,440,948 A | 8/1995 | Cheng |
| 5,492,350 A | 2/1996 | Pan |
| 5,791,671 A | 8/1998 | Tang et al. |
| 5,823,554 A | 10/1998 | Lau |
| 6,195,655 B1 | 2/2001 | Lawler |
| 6,267,401 B1 | 7/2001 | De Jong |
| 6,293,575 B1 | 9/2001 | Burrows et al. |
| 6,377,016 B1 | 4/2002 | Strong |
| 6,520,525 B1 | 2/2003 | Yoon |
| 6,641,159 B1 | 11/2003 | Fan |
| 6,702,312 B1 | 3/2004 | Miksik |
| 7,000,936 B2 | 2/2006 | Schmider |
| 7,114,737 B1 | 10/2006 | Rasmussen |
| 7,140,629 B2 | 11/2006 | Chen |
| 7,159,884 B2 | 1/2007 | Gu |
| 7,229,089 B2 | 6/2007 | Mihelic |
| 7,232,144 B2 | 6/2007 | Colman |
| 7,284,631 B2 | 10/2007 | Rizzetto |
| 7,300,066 B2 | 11/2007 | Kettler et al. |
| 7,306,249 B2 | 12/2007 | Kwok et al. |
| 7,314,226 B2 | 1/2008 | Hsu |
| 7,341,268 B2 | 3/2008 | Lin |
| 7,367,576 B2 | 5/2008 | Pan |
| 7,445,224 B2 | 11/2008 | Whyte |
| 7,490,842 B1 | 2/2009 | Ulrich et al. |
| 7,510,202 B1 | 3/2009 | Shiao |
| 7,591,473 B2 | 9/2009 | Tak-Wei Hon et al. |
| 7,614,632 B2 | 11/2009 | Tak-Wei Hon |
| 7,828,312 B1 | 11/2010 | Yeh |
| 8,047,956 B2 | 11/2011 | Frank |
| 8,152,189 B2 | 4/2012 | Dodman et al. |
| 8,205,902 B2 | 6/2012 | Jimonen et al. |
| 8,226,517 B2 | 7/2012 | Tsai et al. |
| 8,348,294 B1 | 1/2013 | Moldestad |
| 8,388,006 B2 | 3/2013 | Wu et al. |
| 8,469,381 B2 | 6/2013 | Dodman et al. |
| 8,473,130 B2 | 6/2013 | Brady et al. |
| 8,540,322 B2 | 9/2013 | Thorpe |
| 8,651,212 B2 | 2/2014 | Droux |
| 9,056,646 B1 | 6/2015 | D Aluisio et al. |
| 9,469,364 B2 | 10/2016 | Banasky et al. |
| 9,676,443 B2 | 6/2017 | Perkins et al. |
| D795,747 S | 8/2017 | Bailie |
| 9,764,790 B2 | 9/2017 | Granell Peniche et al. |
| D804,364 S | 12/2017 | Xianqiang |
| 9,834,275 B2 | 12/2017 | Montague |
| 10,045,723 B2 | 8/2018 | Boock et al. |
| 2001/0045723 A1 | 11/2001 | Niitsu et al. |
| 2004/0032110 A1 | 2/2004 | Bigot |
| 2004/0188978 A1 | 9/2004 | Schmider et al. |
| 2005/0029772 A1 | 2/2005 | Takeshi |
| 2007/0035106 A1 | 2/2007 | Thorpe |
| 2007/0205577 A1 | 9/2007 | Lau |
| 2007/0273126 A1 | 11/2007 | Pourias |
| 2007/0290479 A1 | 12/2007 | Tong |
| 2009/0317178 A1 | 12/2009 | Wang |
| 2010/0295264 A1* | 11/2010 | Denais ................ B62K 19/36 280/260 |
| 2011/0108373 A1 | 5/2011 | Toal |
| 2012/0049483 A1 | 3/2012 | Dodman et al. |
| 2012/0133195 A1 | 5/2012 | Yun et al. |
| 2012/0169029 A1 | 7/2012 | Marais et al. |
| 2014/0125036 A1 | 5/2014 | Wu et al. |
| 2015/0042065 A1 | 2/2015 | Wang |
| 2015/0060176 A1 | 3/2015 | Paick |
| 2016/0303961 A1* | 10/2016 | Hendey ................ B62J 1/08 |
| 2017/0197686 A1* | 7/2017 | Pong ................ B62M 11/02 |
| 2017/0327178 A1* | 11/2017 | Sotir ................ B62K 15/008 |
| 2019/0031270 A1* | 1/2019 | Thompson ............ B62K 13/08 |

FOREIGN PATENT DOCUMENTS

| | | | |
|---|---|---|---|
| CN | 1448310 | 10/2003 |
| CN | 1166526 | 9/2004 |
| CN | 1817729 | 8/2006 |
| CN | 1867481 | 11/2006 |
| CN | 101032990 | 9/2007 |
| CN | 201062077 | 5/2008 |
| CN | 100396544 | 6/2008 |
| CN | 201235888 | 5/2009 |
| CN | 201235903 | 5/2009 |
| CN | 201235904 | 5/2009 |
| CN | 101486318 | 7/2009 |
| CN | 101503106 | 8/2009 |
| CN | 201400283 | 2/2010 |
| CN | 101723027 | 6/2010 |
| CN | 201530432 | 7/2010 |
| CN | 201613984 | 10/2010 |
| CN | 201753097 | 3/2011 |
| CN | 201895749 | 7/2011 |
| CN | 201895755 | 7/2011 |
| CN | 102616316 | 8/2012 |
| CN | 102745283 | 10/2012 |
| CN | 102975806 | 3/2013 |
| CN | 103010371 | 4/2013 |
| CN | 103587622 | 2/2014 |
| CN | 203638027 | 6/2014 |
| CN | 105398526 | 3/2016 |
| CN | 106184557 | 12/2016 |
| CN | 105253233 | 10/2017 |
| CN | 102616317 | 12/2017 |
| CN | 104797491 | 2/2018 |
| CN | 107922030 | 4/2018 |
| CN | 108556994 | 9/2018 |
| DE | 19918180 | 2/2000 |
| DE | 19840576 | 3/2000 |
| DE | 202008012877 U1 * | 1/2009 | ............ B62M 6/65 |
| DE | 102011117977 | 12/2012 |
| EP | 0949141 | 10/1999 |
| EP | 0996565 | 5/2000 |
| EP | 1258421 | 11/2002 |
| EP | 1479601 | 11/2004 |
| EP | 2221205 | 8/2010 |
| GB | 1484143 | 8/1977 |
| GB | 2400086 | 10/2004 |
| GB | 2426962 | 12/2006 |
| GB | 2435863 | 9/2007 |
| JP | 2002154465 | 5/2002 |
| JP | 2008062769 | 3/2008 |
| JP | 2008062769 A * | 3/2008 | ............ B62K 13/00 |
| TW | M266229 | 6/2005 |
| WO | 199202402 | 2/1992 |
| WO | 2001038165 | 5/2001 |
| WO | 2003029072 | 4/2003 |
| WO | 2004087492 | 10/2004 |
| WO | 2009027683 | 3/2009 |
| WO | 2012023940 | 2/2012 |

OTHER PUBLICATIONS

Jiang, Li "English translation of First Office Action of the China National Intellectual Property Administration", Chinese Patent Application No. 201980087348X dated May 12, 2022, Beijing China (5 pages).

Jiang, Li "English translation of International Search Report of the China National Intellectual Property Administration", Chinese Patent Application No. 201980087348X dated May 12, 2022, Beijing China (3 pages).

Booij, Nico "Extended European Search Report of the European Patent Office", European Patent Application No. 19878738.4 dated

(56) References Cited

OTHER PUBLICATIONS

Jul. 11, 2022, Munich Germany (11 pages).
Jiang, Li "First Office Action of the China National Intellectual Property Administration", Chinese Patent Application No. 201980087348X dated May 12, 2022, Beijing China (10 pages).
Jiang, Li "International Search Report of the China National Intellectual Property Administration", Chinese Patent Application No. 201980087348X dated May 12, 2022, Beijing China (6 pages).
Jiang, Li "Second Office Action of the China National Intellectual Property Administration", Chinese Patent Application No. 201980087348X dated Feb. 14, 2023, Beijing China (9 pages).
Jiang, Li "Supplementary International Search Report of the China National Intellectual Property Administration", Chinese Patent Application No. 201980087348X dated Feb. 9, 2023, Beijing China (6 pages).

* cited by examiner

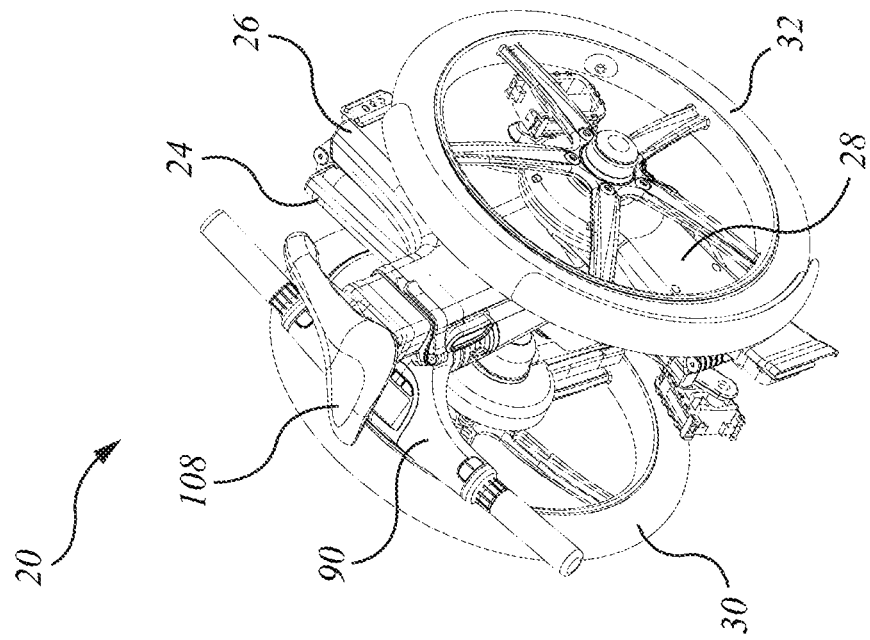
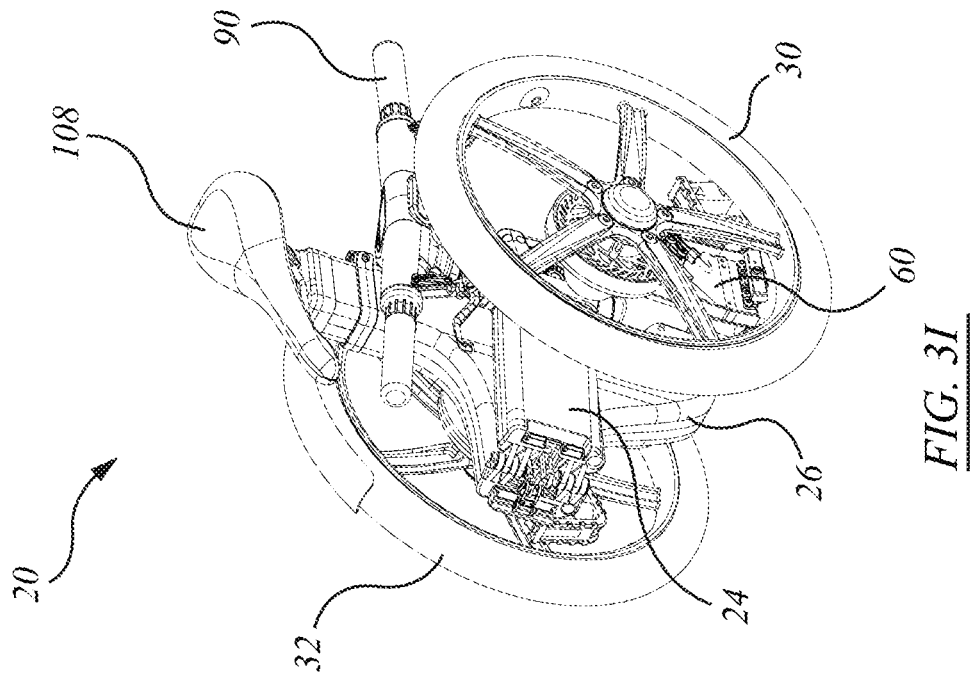
FIG. 3J
FIG. 3I

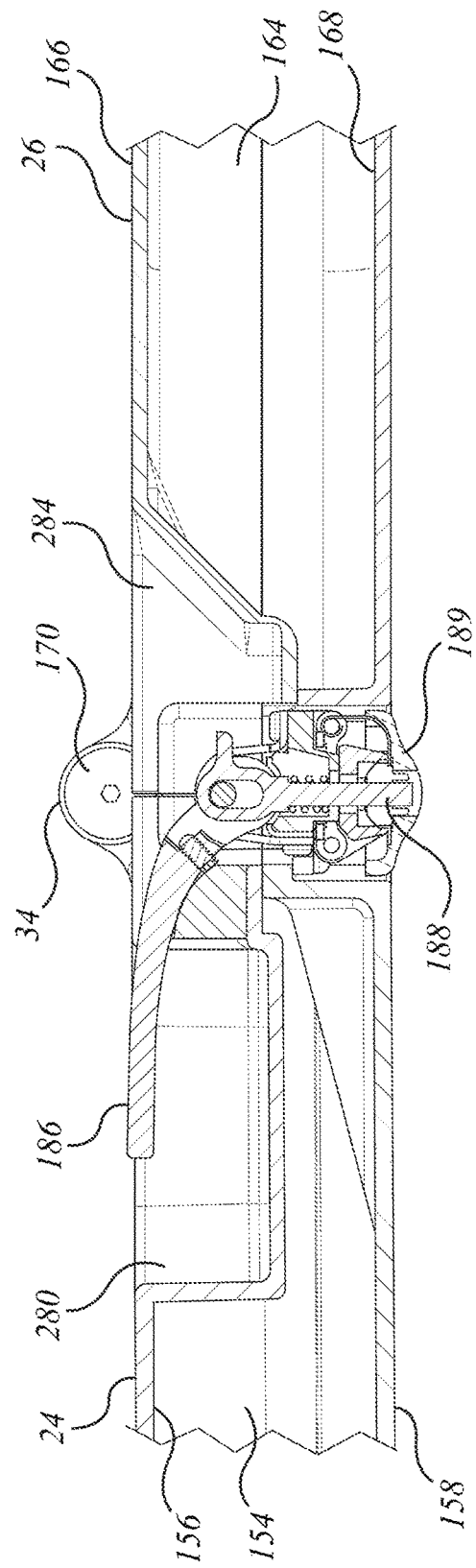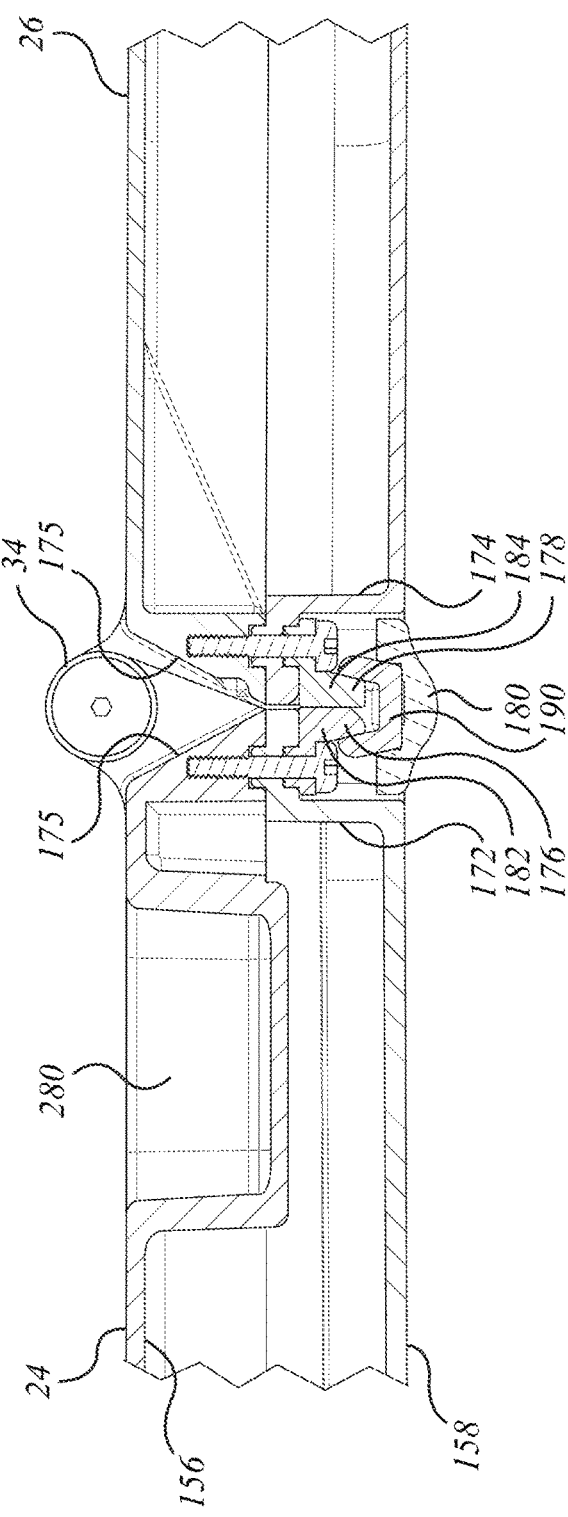

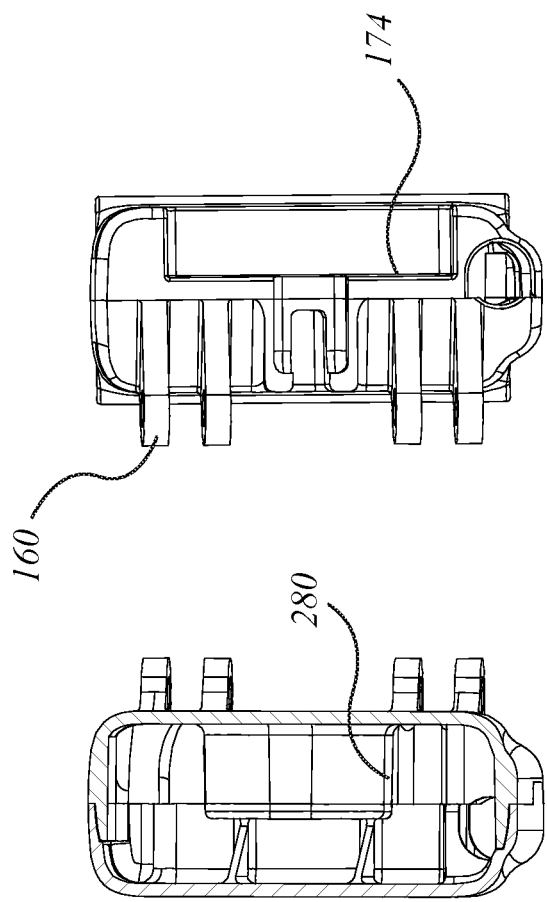
FIG. 9I
FIG. 9H
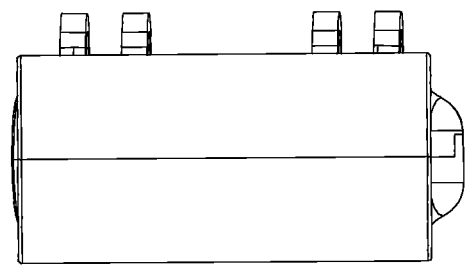
FIG. 9G

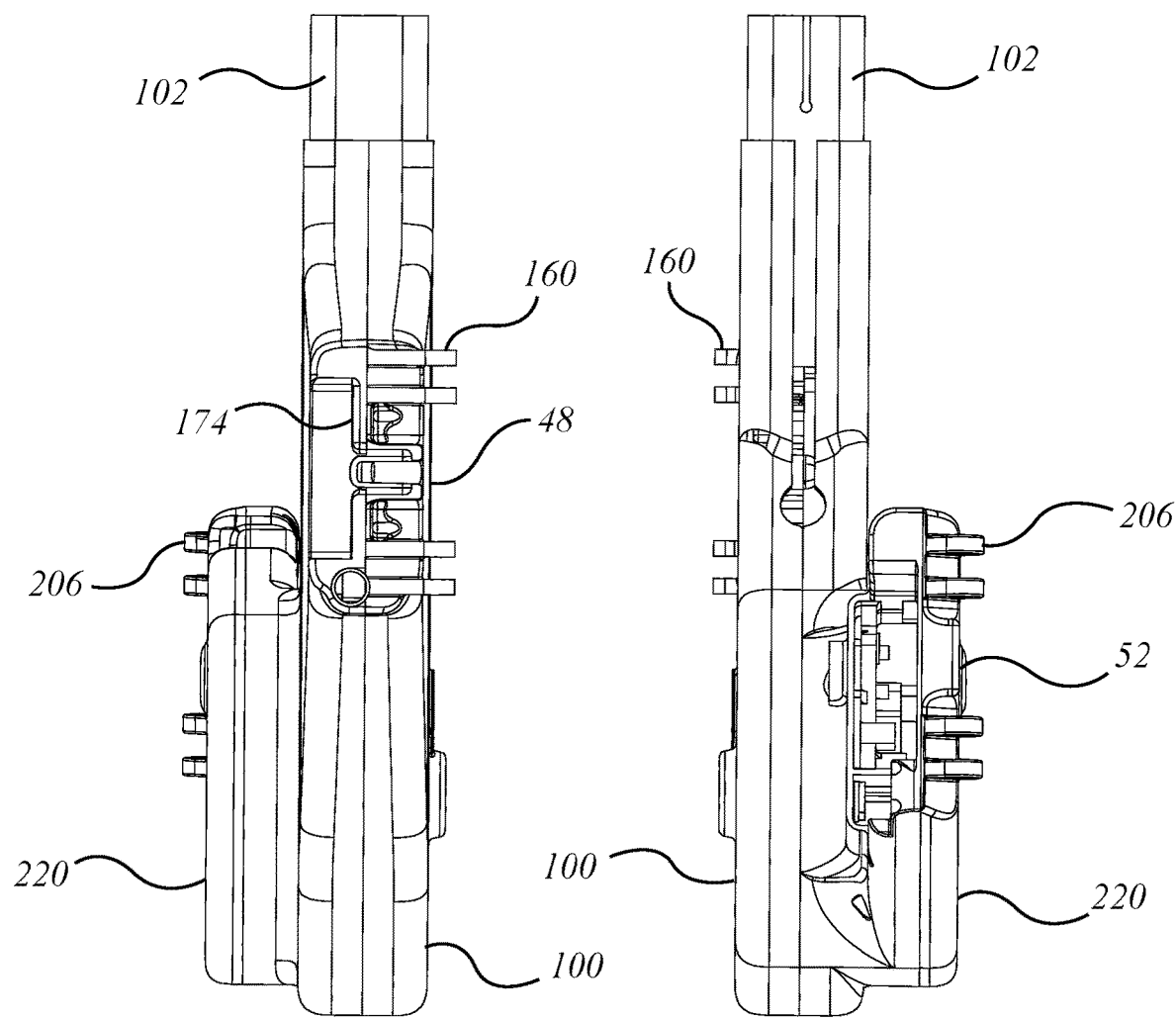
*FIG. 10E*  *FIG. 10F*

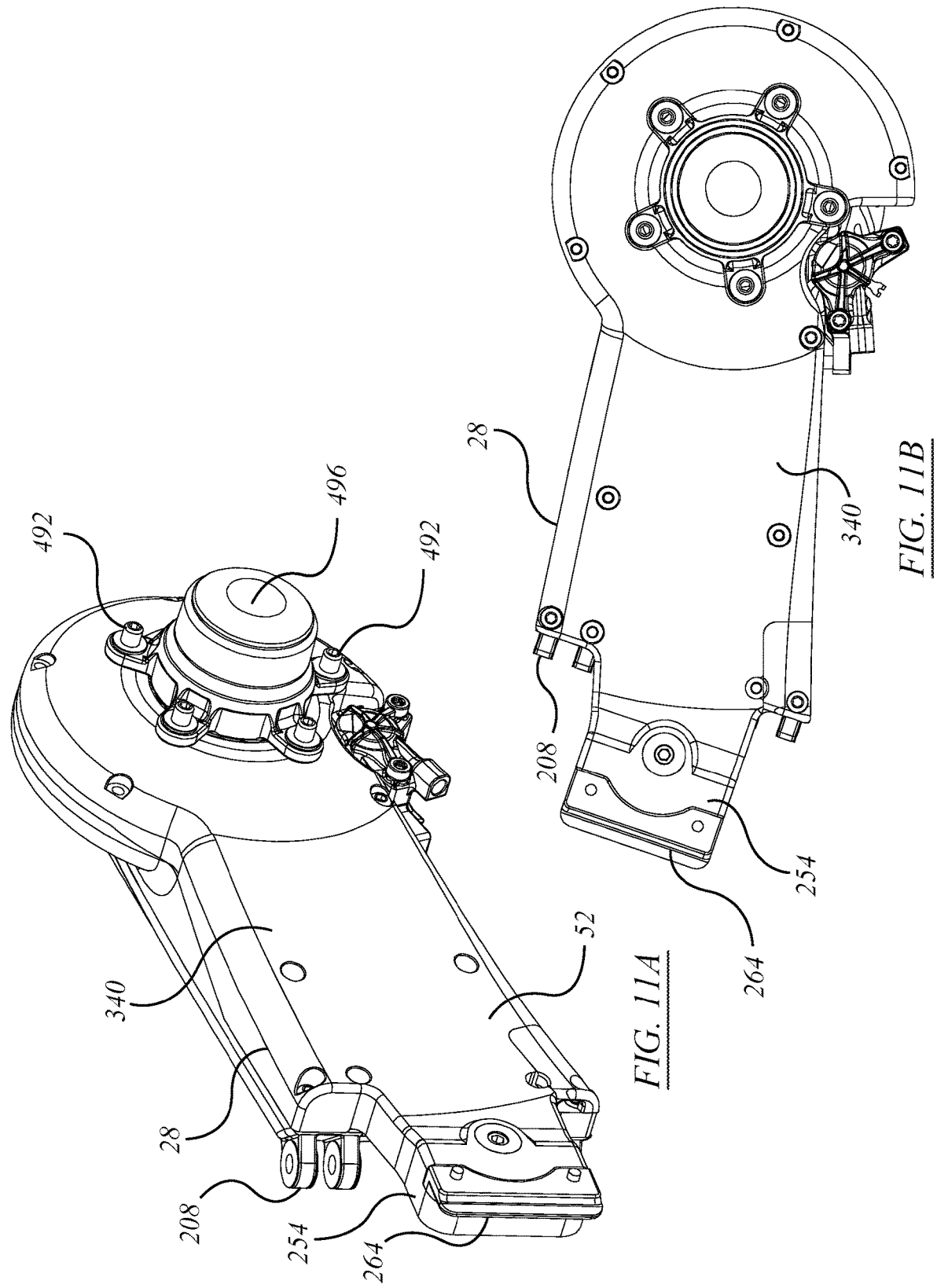

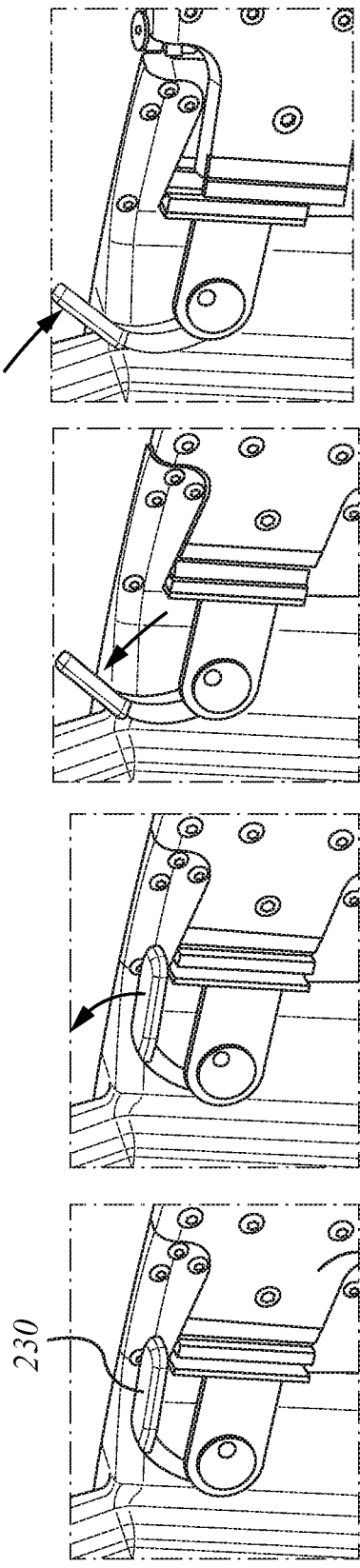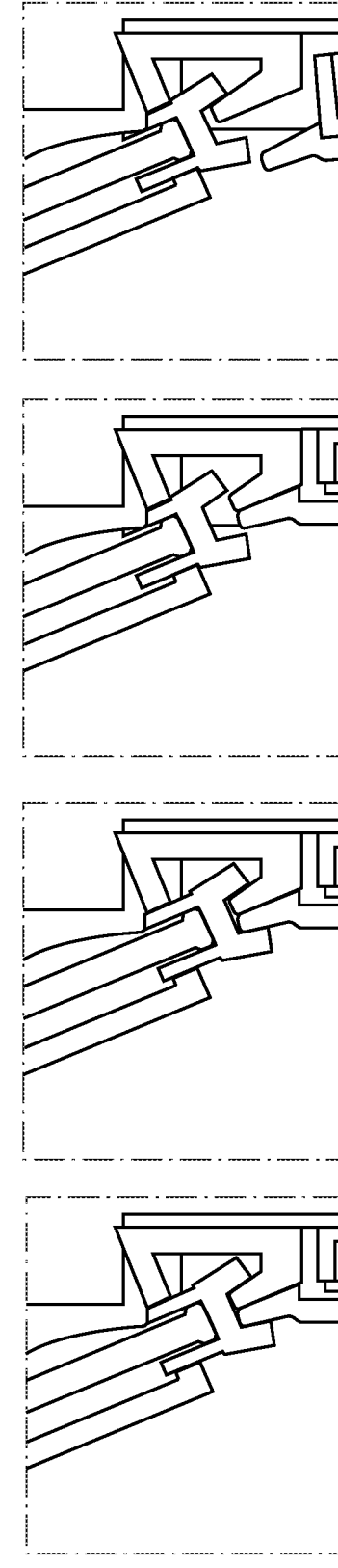

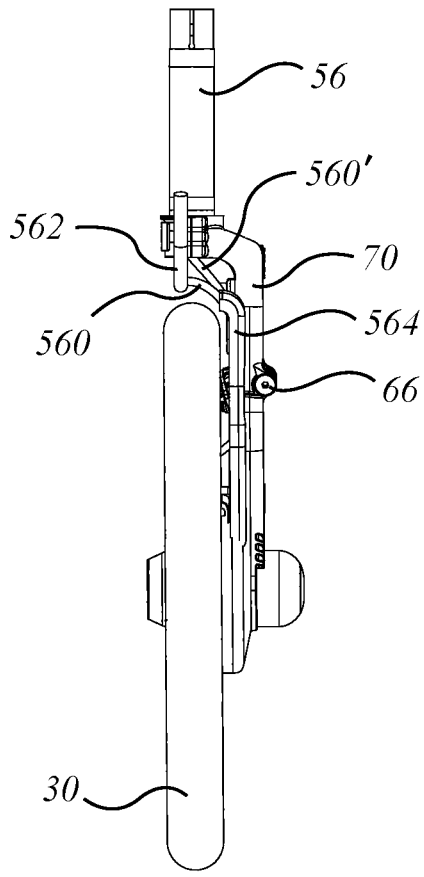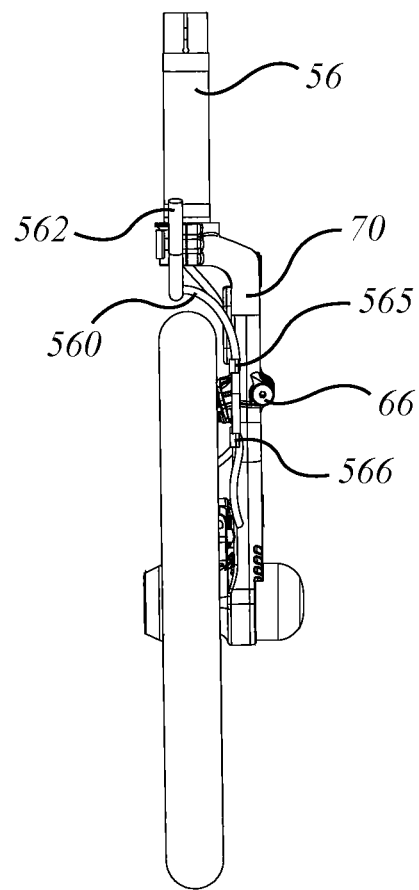
*FIG. 18A*  *FIG. 18B*
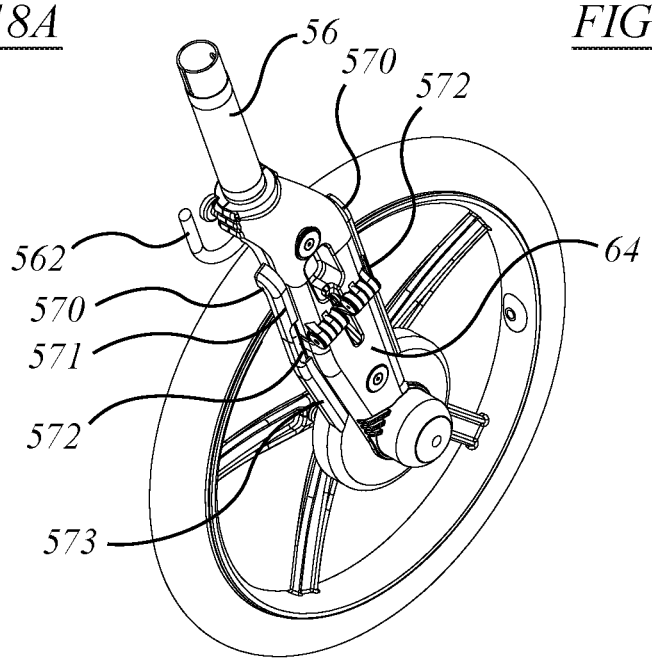
*FIG. 18C*

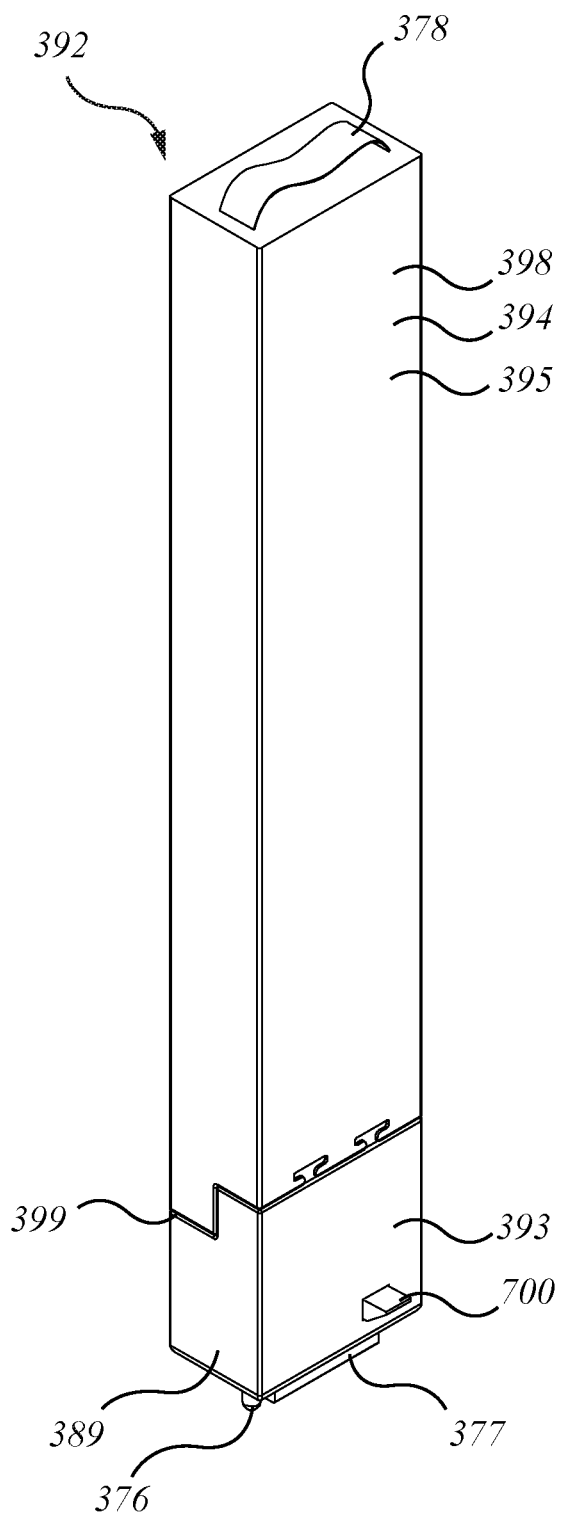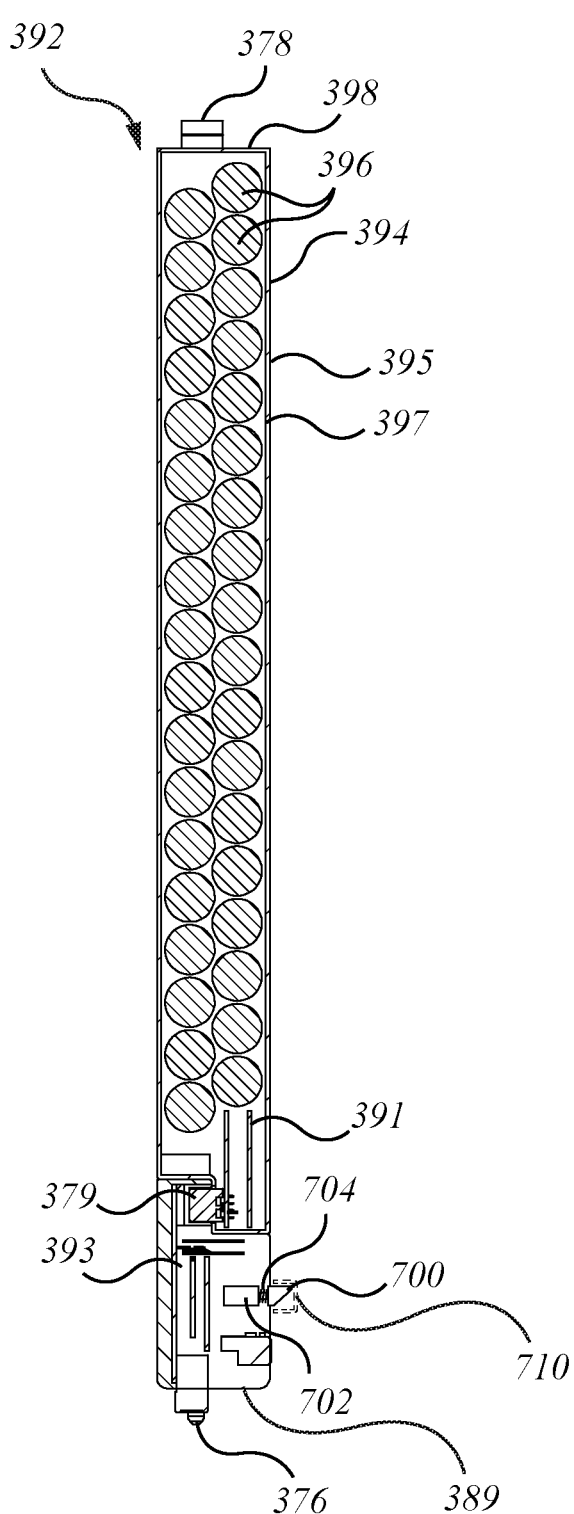
FIG. 22A
FIG. 22B

FOLDING VEHICLE

CROSS-REFERENCE TO RELATED APPLICATION

This application is a national stage application, filed under 35 U.S.C. § 371, of international Patent Application No. PCT/US2019/059097, filed on Oct. 31, 2019, which claims the benefit of the U.S. Provisional Application No. 62/755,006, filed on Nov. 2, 2018, each of which is incorporated by reference herein in its entirety.

FIELD OF THE INVENTION

This invention relates to the field of folding vehicles, and in particular folding two-wheeled vehicles.

BACKGROUND OF THE INVENTION

Folding vehicles have been known for some years. Examples of folding bicycles are found in U.S. Pat. No. 3,993,322 to Van Tijen; U.S. Pat. No. 6,702,312 to Miksik; US Patent Publication No. 2012/0169029 of Marais; and UK Patent No. 2 400 086 to Thorpe.

When the bicycle is in the folded position, compactness may be helpful. However, it is also helpful for folding to occur without the need of tools, cumbersome mechanisms, or too many complicated steps. Once the bike is folded, one may wish it not to roll away, and yet to be movable and storable relatively easily. It may also be that a powered assist can sometimes be helpful.

SUMMARY OF THE INVENTION

In accordance with a broad aspect of this disclosure, there is provided a folding bicycle structure. The structure of the folding bicycle may ensure that the cranks and most of the seat post are between the wheels in the folded position.

In some embodiments, the folding bicycle can include a foldable frame, a front wheel and a rear wheel; the foldable frame having a bottom bracket, and cranks mounted to the bottom bracket, the cranks having an axis of rotation; the foldable frame including a seat post mount; the folding bicycle being movable between a first position and a second position; the first position being an unfolded position; the second position being a folded position; in the unfolded position, the front wheel and the rear wheel being in a leading-and-trailing relationship; in the folded position, the front wheel and the rear wheel being in spaced-apart side-by-side relationship; and in the folded position, the front and rear wheels having profiles transversely projecting to include the axis of rotation of the cranks and at least a majority of the seat post mount.

In some embodiments, the bottom bracket falls within the transversely projected profiles when the folding bicycle is in the folded position.

In some embodiments, the rear wheel has an axis of rotation and the seat post mount passes through the axis of rotation of the rear wheel when the folding bicycle is in the folded position.

In some embodiments, the foldable frame includes a head tube and when the bicycle is in the folded position the head tube lies within the transversely projected profiles.

In some embodiments, the bicycle includes a stem post mounted within the head tube, and, when the bicycle is in the folded position the stem post falls within the transversely projected profile of the rear wheel.

In some embodiments, the bicycle has handle bars, and, when the bicycle is in the folded position the handle bars are turned sideways to locate between the planes of the front and rear wheels.

In some embodiments, the bicycle has an electronics module located within the seat post mount.

In some embodiments, the bicycle has an electronic control module located within the seat post mount.

In some embodiments, the front wheel is mounted on an arm, and the arm folds transversely.

In some embodiments, the front wheel is motor-powered.

In some embodiments, the rear wheel is motor-powered.

In some embodiments, a motor is mounted to the bottom bracket.

In some embodiments, the bicycle has a transmission between the cranks and the rear wheel; and the transmission folds.

In some embodiments, the bicycle has single-action self-catching latches that govern latching and release of folding elements of the bicycle.

In some embodiments, at least one of the latches is recessed in frame structure of the bicycle and is contained within the frame envelope when the bicycle is folded and when the bicycle is unfolded.

In some embodiments, the bicycle includes a pedal mounted to each of the cranks and, when the bicycle is at least partially folded, one of the pedals functions as a stand upon which to rest the bicycle in a stopped position.

In some embodiments, the foldable frame includes a steering stem shaft and an arm; the arm includes a wheel seat; the front wheel being mounted to the wheel seat; and when the bicycle is in the folded position, the steering stem shaft and the arm fall within the transversely projected profile of the rear wheel.

In some embodiments, the foldable frame has a handle-bar assembly that includes a cross-bar and a stem, and the steering stem shaft has a passageway defined therethrough, the passageway being open to permit the stem of the handle-bar assembly to protrude downwardly therefrom in a retracted position when the bicycle is in the folded position.

In some embodiments, the foldable frame has a front wheel fender mounted thereto; the foldable frame has a rear wheel fender mounted thereto; the front wheel fender is removably mounted to the foldable frame; and in the folded position, the front wheel fender is removed from the foldable frame.

In some embodiments, the front wheel fender is removably mountable to the rear wheel fender; and in the folded position, the front wheel fender is mounted on the rear wheel fender.

In some embodiments, the folding bicycle includes a seat post movably mounted within the seat post mount, the seat post being movable between a retracted position in which a majority of the seat post is nested within the seat post mount, and an extended position in which a majority of the seat post extends upwardly of the seat post mount; in the folded position, the folding bicycle is positionable in a trailable configuration in which the wheels are rotatable to allow the folding bicycle to be wheeled along the wheels; and in the trailable configuration, the seat post is positioned in the extended position.

In some embodiments, the seat post has a seat mounted thereto; and in the trailable configuration, the seat defines a handle for wheeling the bicycle.

In accordance with a broad aspect of this disclosure, there is provided a folding vehicle having three frame sections with hinged connections between the sections. A majority of the seat post can be positioned between the wheels of the vehicle when in the folded position.

In some embodiments, the folding vehicle includes a first portion, a second portion, and a third portion; the first portion having a headset and a front wheel of the vehicle mounted to a stem extending from the headset; the second portion including a seat post mount; the third portion having a rear wheel of the vehicle mounted thereto; the second portion being hingedly connected to the first portion; the third portion being hingedly connected to the second portion; the folding vehicle being movable between a first position and a second position; the first position being an unfolded position; the second position being a folded position; when unfolded, the front wheel and the rear wheel being in a leading-and-trailing relationship; when folded, the front wheel and the rear wheel being in spaced-apart side-by-side relationship; and when folded, at least a majority of the seat post mount being located within the projected transverse profile of the front and rear wheels.

In some embodiments, the second portion has a bottom bracket, and cranks mounted to the bottom bracket; and when folded, the bottom bracket is located within the projected transverse profiles.

In some embodiments, the vehicle has an electronics module located within the seat post mount.

In some embodiments, the vehicle has an electronic control module located within the seat post mount.

In some embodiments, one of the first portion, the second portion, and the third portion has a motor. In some embodiments, the front wheel has a motor. In some embodiments, the rear wheel has a motor.

In some embodiments, the vehicle has a motor control module located within the seat post mount.

In some embodiments, when the vehicle is folded the headset lies within the transversely projected profiles.

In some embodiments, the stem is mounted within the headset, and, when the vehicle is folded the stem post extends downwardly proud of the headset and the stem post falls within the transversely projected profile of the rear wheel.

In some embodiments, the vehicle has handle bars, and, when the vehicle is folded the handle bars are turned sideways to locate between the planes of the front and rear wheels.

In some embodiments, the folding vehicle includes a first portion, a second portion, and a third portion; the first portion having a headset and a front wheel of the vehicle mounted to a stem extending from the headset; the second portion including a seat post mount; the third portion having a rear wheel of the vehicle mounted thereto; at least one of the front wheel and the rear wheel is motor-powered; the second portion being hingedly connected to the first portion; the third portion being hingedly connected to the second portion; the folding vehicle being movable between a first position and a second position; the first position being an unfolded position; the second position being a folded position; when unfolded, the front wheel and the rear wheel being in a leading-and-trailing relationship; when folded, the front wheel and the rear wheel being in spaced-apart side-by-side relationship; and when folded, at least a majority of the seat post mount being located within the projected transverse profile of the front and rear wheels.

In some embodiments, the vehicle has an electronics module located within the seat post mount.

In some embodiments, the electronics module has an electronic control module.

In some embodiments, the front wheel is mounted on an arm, and the arm folds transversely.

In some embodiments, the rear wheel has an axis of rotation and the seat post mount passes through the axis of rotation of the rear wheel when the folding vehicle is folded.

In some embodiments, when the vehicle is folded the headset lies within the transversely projected profiles.

In some embodiments, the stem is mounted within the headset, and, when the vehicle is folded the stem post extends downwardly proud of the headset and the stem post falls within the transversely projected profile of the rear wheel.

In some embodiments, the vehicle has handle bars, and, when the vehicle is folded the handle bars are turned sideways to locate between the planes of the front and rear wheels.

In some embodiments, the folding vehicle is a scooter.

According to a broad aspect of this disclosure, there is provided a frame for a foldable bicycle having three sections that are accordion folded. In the folded position, the crank rotation axis can be positioned close to the rear wheel rotation axis.

In some embodiments, the frame for a folding bicycle that includes a front wheel and a rear wheel has a front portion, a middle portion, and a rear portion; the front portion including a head tube and a first portion of a cross-member; the middle portion including a bottom bracket, a seat post mount, a second portion of the cross-member, and a first portion of a rear wheel arm; the rear portion including a second portion of the rear wheel arm; the second portion of the rear wheel arm having the rear wheel mounted thereto, the rear wheel having an outside radius and an axis of rotation; the bottom bracket including a pedal-driven crank, the crank having an axis of rotation; the frame having a deployed position in which the front wheel and rear wheel are in a leading-and-trailing relationship; the frame having an accordion folded position in which the front portion folds to one side of the middle portion, and the rear portion folds to an opposite side of the middle portion; and when the frame is folded, the axis of rotation of the crank is spaced from the axis of rotation of the rear wheel by a distance less than the radius of the rear wheel.

In some embodiments, an electronics module is located within the seat post mount.

In some embodiments, a power supply is located within the seat post mount.

In some embodiments, one of the front portion, the middle portion, and the rear portion has a motor.

In some embodiments, the seat post mount passes through the axis of rotation of the rear wheel when the frame is folded.

In some embodiments, the front portion includes a steering stem shaft and an arm; the arm includes a wheel seat; the front wheel being mounted to the wheel seat; and the arm being foldable.

In some embodiments, the arm has a proximal portion attached to the steering stem shaft; the arm has a distal portion movably attached to the proximal portion; the distal portion having a the wheel seat distant from the proximal portion; the distal portion of the arm being selectively movable relative to the proximal portion between a first position and a second position; in the first position the distal portion extending from the proximal portion away from the steering stem shaft; and in the second position, the distal portion of the arm being folded back upon the proximal portion of the arm.

In some embodiments, the frame has a handle-bar assembly that includes a cross-bar and a stem, and the steering stem shaft has a passageway defined therethrough, the passageway being open to permit the stem of the handle-bar assembly to protrude downwardly therefrom in a retracted position when the distal portion is in the second position.

In some embodiments, the distal portion is magnetically secured to the proximal portion in the second position.

In some embodiments, the arm has an off-set relative to the axis of rotation, the off-set defining a wheel accommodation; in the first position, the wheel is located in the wheel accommodation.

In some embodiments, the steering stem shaft is insertable into the head tube, and when so inserted the steering stem shaft is turnable about an axis of rotation.

In accordance with a broad aspect of this disclosure, there is provided a foldable vehicle with a partially folded position where the front wheel lies on the ground.

In some embodiments, the folding vehicle includes a foldable frame, a front wheel and a rear wheel; the folding vehicle being movable to an unfolded position in which the front wheel and the rear wheel are upstanding in a rideable leading-and-trailing relationship; the folding vehicle being foldable to a partially folded position in which the front wheel lies flat upon the ground and the rear wheel remains upstanding.

In some embodiments, the front wheel has an axis of rotation, and when the front wheel lies flat upon the ground, the axis of rotation extends perpendicular to the ground.

In some embodiments, the front wheel has a motor, and when the front wheel lies flat upon the ground, the motor stands upwardly of the wheel.

In some embodiments, when the vehicle is in the partially folded position the foldable frame stands upright relative to the front wheel.

In some embodiments, the foldable frame has a bottom bracket and the frame is foldable to position the rear wheel upstanding beside the bottom bracket while the front wheel remains flat on the ground.

In some embodiments, the folding frame includes a head tube having an axis of rotation, and the front wheel has a mounting that includes (a) a steering stem shaft mounted to the head tube; and (b) an arm extending from the steering stem shaft; the arm having a lateral offset from the axis of rotation to define a clearance accommodation; the clearance accommodation being occupied by the front wheel when the front wheel is upstanding; the arm having a proximal portion and a distal portion; the proximal portion being mounted to the steering stem shaft; the distal portion being hingedly mounted to the proximal portion distant from the steering stem shaft; in the partially folded position the proximal portion extending predominantly parallel to the axis of rotation of the head tube; and in the partially folded position the distal portion of the arm extending predominantly radially away from the axis of rotation.

In some embodiments, the front wheel is mounted on an arm, the arm extending from a steering stem shaft having an axis of rotation; the arm having an offset to define a front wheel accommodation; the arm having a hinge; the hinge permitting cross-wise folding of the arm.

In some embodiments, the front wheel has a center of rotation and a radius; and the hinge is located less than the radius of the hinge distant from the center of rotation of the front wheel.

In accordance with a broad aspect of this disclosure, there is provided a foldable front wheel mounting assembly/steering stem for a vehicle.

In some embodiments, the front wheel mounting assembly for a vehicle includes a steering stem shaft and an arm; the steering stem shaft being insertable into a frame head tube, and when so inserted being turnable about an axis of rotation; the arm having a proximal portion attached to the steering stem shaft; the arm having a distal portion movably attached to the proximal portion; the distal portion having a wheel seat distant from the proximal portion; the wheel being mounted to the wheel seat; the arm having an off-set relative to the axis of rotation, the off-set defining a wheel accommodation; the distal portion of the arm being selectively movable relative to the proximal portion between a first position and a second position; in the first position the distal portion extending from the proximal portion away from the steering stem shaft and the wheel being located in the wheel accommodation; and in the second position, the distal portion of the arm being folded back upon the proximal portion of the arm.

In some embodiments, the distal portion is hingedly mounted to the proximal portion.

In some embodiments, the hinge has an axis oriented predominantly circumferentially relative to the wheel.

In some embodiments, the hinge constrains the wheel to out-of-plane folding motion.

In some embodiments, the distal portion is magnetically secured to the proximal portion in the second position.

In some embodiments, the vehicle has a handle-bar assembly that includes a cross-bar and a stem, and the steering stem shaft has a passageway defined therethrough, the passageway being open to permit the stem of the handle-bar assembly to protrude downwardly therefrom in a retracted position when the wheel is sideways folded out of the wheel accommodation.

In some embodiments, when the front wheel is folded, and the handle-bar assembly is retracted and rotated sideways, the cross-bar of the handle bars is substantially tangent to a lateral projection of the front wheel.

In some embodiments, in the folded position of the front wheel, the head tube lies within a lateral projection of the front wheel.

In some embodiments, the distal portion is hingedly mounted to the proximal portion; the hinge has an axis oriented predominantly circumferentially relative to the wheel; a cable extends from the steering stem shaft to the distal portion of the arm; where, when the distal portion is in the second position, the cable extends across the axis of the hinge.

In some embodiments, the cable is attached to the arm by a pair of fixed attachment points, the pair of fixed attachment points including a first attachment point on the proximal portion of the arm and a second attachment point on the distal portion of the arm.

In accordance with a broad aspect of this disclosure, there is provided a foldable steering assembly.

In some embodiments, a steering assembly for a foldable vehicle having a front wheel includes a head tube; a handle bar stem post; handle bars mounted to the stem post; the stem post being mounted within the head tube; the stem post being longer than the head tube; the stem post being movable within the head tube between a first position and a second position; in the first position the handle bars are raised for use; and in the second position the stem post extends downwardly proud of the head tube.

In some embodiments, the stem post has a first end and a second end; the handle bars are mounted to the first end of the stem post; the stem post has a length and the head tube has a length; the length of the stem post is at least double the length of the head tube; and in the second position the second end of the stem post extends downwardly proud of the head tube a distance greater than the length of the head tube.

In some embodiments, in the second position at least as much of the stem post extends downwardly proud of the head tube as stands upwardly proud of the head tube.

In some embodiments, the steering assembly includes a steering stem defining a front wheel accommodation of the vehicle; the steering stem mounts within the head tube; the steering stem has a passageway formed therethrough; and the stem post being movable within the passageway; in the second position the stem post protruding downwardly beyond the passageway.

In some embodiments, the steering assembly includes a steering stem defining a front wheel accommodation of the vehicle; the steering stem including an arm to which the front wheel mounts; the arm being foldable.

In some embodiments, the arm is sideways foldable.

In some embodiments, the arm is sideways foldable between a first position in which the front wheel occupies the front wheel accommodation, and a second position in which the arm has been sideways folded and the front wheel lies beside the arm outside the front wheel accommodation.

In some embodiments, the arm has an upper portion and a lower portion joined at a hinge; the wheel has a central hub, and when the arm is folded at the hinge the hub of the wheel lies beside the head tube.

In some embodiments, the wheel has an axis of rotation and an outside radius; and the hinge is located a distance within the outside radius of the axis of rotation.

In some embodiments, when the arm is folded the arm is magnetically secured in the folded position.

In some embodiments, the handle bars are selectively movable between a cross-wise position and a sideways position relative to the front wheel of the vehicle.

In some embodiments, the front wheel is limited to an angular range of motion of less than 360 degrees of steering rotation.

In some embodiments, the front wheel remains mounted to the steering assembly during folding of the vehicle.

In some embodiments, the front wheel includes a motor.

In some embodiments, a steering assembly for a foldable vehicle includes a head tube; a handle bar stem post; handle bars mounted to the stem post; a steering stem; the steering stem including a hollow shaft and an arm extending away from the shaft; the arm defining a wheel accommodation for a front wheel of the vehicle; the arm having a sideways folding hinge; the hollow shaft of the steering stem being mounted within the head tube; the handle bar stem post being mounted within the hollow shaft of the steering stem, and being axially movable relative thereto; the handle bar stem post being longer than the head tube; the handle bar stem post being movable within the head tube between a first position and a second position; in the first position the handle bars are raised for use; and in the second position the stem post extends downwardly proud of the head tube.

In accordance with a broad aspect of this disclosure, there is provided a folding vehicle where the middle section of a foldable frame has a seat post mount with a power supply module and/or an electronics module therein.

In some embodiments, a folding vehicle includes a folding frame; the folding frame including a middle portion; the middle portion including a hollow shell; the middle portion defining a seat post mount within the hollow shell; the hollow shell defining an electronics accommodation therewithin; the electronics accommodation extending inwardly of the seat post mount; and the seat post being removable to govern access to the electronics accommodation.

In some embodiments, an electronics module seats in the electronics accommodation; and when so seated, the electronics module nests with the seat post.

In some embodiments, the electronics module includes an electronic control module.

In some embodiments, the electronics module includes a power supply module.

In some embodiments, the electronics module includes an electronic control module and a power supply module; and the electronics module is contained within a housing that is receivable in the electronics accommodation.

In some embodiments, the housing includes a first housing compartment and a second housing compartment that is separate from the first housing compartment; the electronic control module is contained within the first housing compartment; and the power supply module is contained within the second housing compartment.

In some embodiments, the first housing compartment is detachably attached to the second housing compartment.

In some embodiments, the folding vehicle includes a lock unit, the lock unit being adjustable between a locked position and an unlocked position; and when the electronics module is seated in the electronics accommodation, and the lock unit is in the locked position, the lock unit prevents removal of the electronics module from the electronics accommodation.

In some embodiments, the lock unit includes a first locking member on the electronics module and a second locking member in the electronics accommodation; and the first locking member and the second locking member are lockingly engageable when the electronics module is positioned in the electronics accommodation.

In some embodiments, the first locking member is a latch member, the latch member being moveable between a latch locked position and a latch unlocked position; and the second locking member is a seat, the seat being shaped to receive the latch member and to engage the latch member when the electronics module is positioned in the electronics accommodation and the latch member is in the latch locked position to prevent removal of the electronics module from the electronics accommodation.

In some embodiments, the second locking member is a latch member, the latch member being moveable between a latch locked position and a latch unlocked position; and the first locking member is a seat, the seat being shaped to receive the latch member and to engage the latch member when the electronics module is positioned in the electronics accommodation and the latch member is in the latch locked position to prevent removal of the electronics module from the electronics module accommodation In some embodiments, the latch member is biased to the latch locked position.

In some embodiments, the lock unit includes an electronic actuator, the electronic actuator operable to adjust the lock unit between the locking position and the unlocked position.

In some embodiments, the seat post is axially adjustable relative to the seat post mount.

In some embodiments, the seat post defines a peripheral wall, and the electronics module has a cross-sectional profile conforming to the peripheral wall of the seat post.

In some embodiments, the electronics module fits within the seat post.

In some embodiments, an electronics module seats in the electronics accommodation, and when so seated, the electronics module protrudes beyond the seat post mount outside of the shell.

In some embodiments, an electronics module seats in the electronics accommodation, and when so seated, the electronics module is recessed within the seat post mount.

In some embodiments, an electronics module seats in the electronics accommodation, and when so seated, the electronics module is flush with an upper end of the hollow shell.

In some embodiments, the middle portion of the frame includes a bottom bracket mounting, the bottom bracket mounting including a crank axle.

In some embodiments, the seat post has an axial projection that does not intersect the axle.

In some embodiments, the electronics accommodation includes an electrical connector socket located downwardly of the axle, and the electrical connector socket has an axial projection that does not intersect the axle.

In some embodiments, the electrical connector socket is located forwardly of the axle.

In some embodiments, the electrical connector socket is located rearwardly of said axle.

In some embodiments, a folding vehicle includes a folding frame; the folding frame including a middle portion; the middle portion including a hollow shell; the middle portion defining a control module seat within the hollow shell; and an electronic control module is removably mountable in the control module seat.

In some embodiments, the middle portion defines a seat post mount within the hollow shell; the hollow shell defines a control module accommodation therewithin, the control module accommodation including the control module seat; the control module accommodation extending inwardly of the seat post mount; and the seat post being removable to govern access to the control module accommodation.

In some embodiments, the electronic control module seats in the control module seat; and when so seated, the electronic control module nests with the seat post.

In some embodiments, when the electronic control module is removed from the control module accommodation, the seat post is mountable in the seat post mount.

In some embodiments, the seat post is axially adjustable relative to the seat post mount.

In some embodiments, the folding vehicle includes a lock unit, the lock unit being adjustable between a locked position and an unlocked position; and when the electronic control module is seated in the control module seat, and the lock unit is in the locked position, the lock unit prevents removal of the electronic control module from the control module seat.

In some embodiments, the lock unit includes a first locking member on the electronic control module and a second locking member in the electronics accommodation; and the first locking member and the second locking member are lockingly engageable when the electronic control module is positioned in the control module seat.

In some embodiments, the first locking member is a latch member, the latch member being moveable between a latch locked position and a latch unlocked position; and the second locking member is a seat, the seat being shaped to receive the latch member and to engage the latch member when the electronic control module is positioned in the control module seat and the latch member is in the latch locked position to prevent removal of the electronic control module from the control module seat.

In some embodiments, the second locking member is a latch member, the latch member being moveable between a latch locked position and a latch unlocked position; and the first locking member is a seat, the seat being shaped to receive the latch member and to engage the latch member when the electronic control module is positioned in the control module seat and the latch member is in the latch locked position to prevent removal of the electronic control module from the control module seat.

In some embodiments, the latch member is biased to the latch locked position.

In some embodiments, the lock unit includes an electronic actuator, the electronic actuator operable to adjust the lock unit between the locking position and the unlocked position.

In some embodiments, an electronics module is receivable in the control module seat; and the electronics module includes the electronic control module and a power supply module.

In some embodiments, the electronics module is contained within a housing that is receivable in the electronics accommodation; the housing includes a first housing compartment and a second housing compartment that is separate from the first housing compartment; the electronic control module is contained within the first housing compartment; and the power supply module is contained within the second housing compartment.

In some embodiments, the first housing compartment is detachably attached to the second housing compartment.

In accordance with a broad aspect of this disclosure, there is provided a self-catching latch at the hinge between frame members of a folding vehicle.

In some embodiments, a folding vehicle includes: a folding vehicle frame having at least a first frame member and a second frame member, the first and second frame member being connected at a hinge; a releasable latch mounted to engage the first frame member and the second frame member; the latch being self-catching.

In some embodiments, the latch has a single-acting actuator.

In some embodiments, the single acting actuator is movable to a neutral position in which the latch is neither locked nor positively released.

In some embodiments, the single acting actuator is movable from the neutral position to a locked position when the second frame member is unfolded relative to the first frame member.

In some embodiments, the single-acting actuator is movable to a release position in which the latch is compelled to disengage at least one of the first frame member and the second frame member.

In some embodiments, in the release position, the latch is biased toward the neutral position.

In some embodiments, when the latch is in the neutral position and the second frame member is moved from being folded relative to the first frame member to being unfolded relative to the first frame member, the latch is resiliently deflecting upon engagement during unfolding.

In some embodiments, the latch includes an over-center mechanism, and in moving to the locked position, the actuator activates the over-center mechanism.

In some embodiments, the latch includes at least a first claw, and at least one of the first and second frame members includes a finger, the claw and the finger defining a wedging relationship upon securement of the latch.

In some embodiments, at least one of the first frame member and the second frame member includes an accommodation in which the actuator is recessed when the second frame member and the first frame member are secured in an unfolded position.

In some embodiments, when the actuator is recessed, the actuator lies one of (a) flush with; and (b) shy of, the frame member in which the accommodation is defined.

In some embodiments, the first and second frame members have respective co-operating accommodations in which the latch is at least partially recessed during operation thereof.

In some embodiments, the latch actuator is recessed in at least one of the first and second frame members when the frame members are in the unfolded position and in the folded position.

In some embodiments, the folding vehicle includes a main cross-member extending between a seat post and a steering head tube of the folding vehicle, and the hinge is located in the main cross-member.

In some embodiments, the vehicle includes a front arm, and the hinge is located in the front arm.

In some embodiments, the vehicle includes a rear arm, and the hinge is located in the rear arm.

In some embodiments, the first frame member and the second frame member, when folded, are held in the folded position magnetically.

In some embodiments, the latch has an actuator handle and a claw operated thereby; the first frame member has an accommodation formed therein in which the actuator handle is recessed when the first frame member and the second frame member are secured in an unfolded position; the second frame member has an accommodation that co-operates with the accommodation of the first frame member when the actuator handle is moved to release the latch; a first finger is mounted to the first frame member; a second finger is mounted to the second frame member; the actuator handle is movable between a locked position, a neutral position, and a release position; the latch includes an over-center mechanism, and in the locked position of the handle the over center mechanism is activated; the first finger, second finger, and the claw co-operate in a wedging arrangement when the first and second frame members are moved to the unfolded position and the actuator handle is moved to the locked position; the claw is resiliently displaceable by the second finger when the second frame member moves to the unfolded position relative to the first frame member; the claw is biased to capture the second finger after displacement when the second frame member moves to the unfolded position relative to the first frame member; and the actuator handle is accommodated in at least one of the first frame member and the second frame member when the first and second frame members are in the unfolded position and when the first and second frame members are in the folded position.

In accordance with a broad aspect of this disclosure, there is provided a folding swing arm that encloses a brake for a folding vehicle.

In some embodiments, a folding vehicle has a foldable swing arm to which a rear wheel of the folding vehicle is mounted at a hub; and the foldable swing arm including an internal disc brake.

In some embodiments, the folding swing arm includes a housing, and the disc brake is contained within the housing.

In some embodiments, the swing arm has a disc brake caliper mounted therewithin, the disc brake caliper being mounted to cooperate with the disc brake.

In some embodiments, the swing arm includes a transverse hub; the transverse hub has an input gear; the rear wheel has a center-line plane of rotation; and the disc brake is axially positioned between the plane of rotation and the input gear.

In some embodiments, the rear wheel has a center-line plane of rotation, and the rear wheel has a wheel bearing that is located in the plane.

In some embodiments, the swing arm has a transverse hub and the disc brake is mounted to a spider that is mounted to the transverse hub; and the wheel bearing is mounted to the spider.

In some embodiments, the swing arm has a motor fully enclosed therewithin.

In some embodiments, the swing arm has an endless tension element fully enclosed therewithin.

In some embodiments, the endless tension element is a belt.

In some embodiments, the endless tension element is a chain drive.

In some embodiments, the endless tension element has an output gear, the output gear of the endless tension element being the input gear of the hub.

In some embodiments, the endless tension element has a mechanical input forward of the rear wheel, and the mechanical input is an externally accessible gear mounted in a gear-surround housing.

In some embodiments, the swing arm is hingedly mounted to another portion of the vehicle, and the mechanical input of the endless tension element is located forwardly of the hinge when the swing arm is unfolded.

In some embodiments, the swing arm includes a multi-speed transverse hub and a motor mounted concentrically with the transverse hub.

In accordance with a broad aspect of this disclosure, there is provided a foldable transmission enclosed within a housing.

In some embodiments, a folding vehicle includes a folding transmission, the folding transmission has a forward portion, a rearward portion, and an intermediate releasable disconnection joint between the forward portion and the rearward portion; and the forward portion and the rearward portion are enclosed in respective forward and rearward housings.

In some embodiments, the folding transmission includes a folding chain drive.

In some embodiments, the folding transmission includes a folding belt drive.

In some embodiments, the folding transmission includes one of a planetary gear, a continuously variable transmission and a single speed hub.

In some embodiments, a disc brake is fully enclosed with the rearward portion of the transmission in a shared housing.

In some embodiments, the folding vehicle has a middle portion and a rearward portion that are joined together at a hinge; there is a gear connection between the forward portion and the rearward portion; folding the rearward portion relative to the middle portion splits the gear connection; and the gear connection is adjacent to the hinge.

In some embodiments, the releasable disconnection joint includes a hinge and a self-actuating latch.

In some embodiments, the forward portion includes an output drive coupler and the rearward portion includes an input drive coupler, the output drive coupler and the input drive coupler being mating couplers defining the intermediate releasable disconnection joint.

In some embodiments, the input drive coupler and the output drive coupler are mutually self-centering.

In some embodiments, the input coupler and the output coupler are mating gears mounted in respective enclosure surrounds.

In some embodiments, the forward portion housing and the rearward portion housing are connected by a hinge.

In some embodiments, the rear wheel remains attached to the rearward housing during folding of the rearward housing relative to the forward housing.

In some embodiments, the forward housing and the rearward housing are connected at a hinge; locking and release of the rearward portion of the transmission relative to the forward portion of the transmission is governed by a self-actuating latch; the latch is spaced from the hinge by an overlap; and when the vehicle is in an unfolded position the intermediate releasable connection is located in the overlap; the intermediate releasable connection includes an output coupler from the forward portion and an inlet coupler of the rearward portion, the respective output and input couplers being mutually self-centering, and the input and output couplers are mating gears.

In some embodiments, no part of any endless tension element of the transmission is externally exposed.

In some embodiments, a motor is fully enclosed within one of the forward housing and the rearward housing.

In accordance with a broad aspect of this disclosure, there is provided a lock for the crank of a bicycle. The crank may define a stand for the bicycle when the bicycle is folded.

In some embodiments, a folding bicycle has a crank lock.

In some embodiments, the bicycle has a first crank and a first pedal mounted thereto; and, when the crank lock is activated, the first crank and pedal define a stand of the folding bicycle.

In some embodiments, the folding bicycle has an actuator governing operation of the crank lock.

In some embodiments, the actuator also governs at least one aspect of folding of the bicycle.

In some embodiments, the actuator is operable to set the crank lock, and crank movement thereafter trips the crank lock.

In some embodiments, the actuator is operable to de-activate the crank lock.

In some embodiments, the folding bicycle includes a main sprocket driven by the first crank and by a co-operating second crank.

In some embodiments, the main sprocket has a dog mounted thereto; and a pawl; the actuator being operable to move the pawl between a first position in which to capture the dog and a second position in which the dog is free.

In some embodiments, the co-operating second crank has a second pedal mounted thereto, and the second pedal is foldable to a folded position and wherein, when the crank lock is activated, the co-operating second crank and the second pedal in the folded position is aligned to clear a rim and a tire of a rear wheel, when the rear wheel is folded.

In some embodiments, the bicycle has a first crank and a second crank, and the second crank includes a first locking member, the first locking member being engageable with a corresponding second locking member provided on a rear frame section of the folding bicycle when the rear frame section is in a folded position.

In some embodiments, the first locking member comprises a recess shaped to receive the second locking member.

In some embodiments, when the crank lock is activated, the second crank is positioned in a secured position that aligns the first locking member and the second locking member when the rear frame section is in the folded position.

In some embodiments, a folding bicycle, when folded, has one crank that defines a stand.

In some embodiments, the one crank has a pedal, and when the crank is positioned as the stand, the pedal defines a foot of the stand.

In some embodiments, the pedal is foldable relative to the crank.

In some embodiments, the folding bicycle has a crank lock, the crank lock being operable to hold the one crank in a fixed position when the crank functions as the stand.

In accordance with a broad aspect of this disclosure, cable routing for a foldable vehicle is provided.

In some embodiments, a folding vehicle includes: a first portion and a second portion; the first portion having a headset, a stem extending from the headset, and a front wheel of the vehicle mounted to the headset; the first portion including a frame member connected to the second portion and the headset; and a cable extending from an underside of the frame member to a lower end of the stem, the cable including a first cable section extending downwardly from the frame member and a second cable section extending upwardly into the lower end of the stem.

In some embodiments, the first cable section and the second cable section are substantially parallel.

In some embodiments, handle bars are mounted to the stem; the stem is insertable into the headset and is movable within the headset between a first position and a second position; in the first position the handle bars are raised for use; in the second position the stem post extends downwardly proud of the head tube; and the length of cable extending from the underside of the frame member to the lower end of the stem is different in the first position and the second position.

In some embodiments, the cable include a curved cable section connecting the first cable section and the second cable section; and the radius of curvature of the curved cable section is the same in the first position and the second position.

In some embodiments, the radius of curvature remains substantially the same as the stem is adjusted between the first position and the second position.

In some embodiments, the second portion includes a power supply connector; and the cable is connected to the power supply connector.

In some embodiments, the second portion includes a control module connector; and the cable is connected to the control module connector.

In some embodiments, the first portion and the second portion are hingedly connected; the cable extends between the first portion and the second portion; the first portion defines a first cable enclosure housing a first portion of the cable; the second portion defines a second cable enclosure housing a second portion of the cable; and the cable includes a loom segment that is extensible in response to folding of the first portion relative to the second portion at the hinged connection.

In some embodiments, one of the first cable enclosure and the second cable enclosure has an enlarged segment proximate the hinged connection between the first portion and the second portion; and the enlarged segment houses at least one fastener shaped to restrain the loom from extending beyond the enlarged segment into the one of the first cable enclosure and the second cable enclosure.

In some embodiments, the other of the first cable enclosure and the second cable enclosure permits the loom to slide freely therewithin.

In some embodiments, the folding vehicle includes a third portion; the second portion and the third portion are hingedly connected; a cable section extends between the second portion and the third portion; the second portion defines a cable section enclosure housing a first portion of the cable section; the third portion defines a second cable section enclosure housing a second portion of the cable section; and the cable section includes a section loom segment that is extensible in response to folding of the second portion relative to the third portion at the hinged connection.

In some embodiments, one of the cable section enclosure and the second cable section enclosure has an enlarged segment proximate the hinged connection between the second portion and the third portion; and the enlarged segment houses at least one fastener shaped to restrain the section loom from extending beyond the enlarged segment into the one of the cable section enclosure and the second cable section enclosure.

In some embodiments, the other of the cable section enclosure and the second cable section enclosure permits the section loom to slide freely therewithin.

In some embodiments, a frame for a folding vehicle includes a first portion and a second portion; the first portion and the second portion being hingedly connected; a cable extending between the first portion and the second portion; the first portion defining a first cable enclosure housing a first portion of the cable; the second portion defining a second cable enclosure housing a second portion of the cable; and the cable includes a loom segment that is extensible in response to folding of the first portion relative to the second portion at the hinged connection.

In some embodiments, one of the first cable enclosure and the second cable enclosure has an enlarged segment proximate the hinged connection between the first portion and the second portion; and the enlarged segment houses at least one fastener shaped to restrain the loom from extending beyond the enlarged segment into the one of the first cable enclosure and the second cable enclosure.

In some embodiments, the other of the first cable enclosure and the second cable enclosure permits the loom to slide freely therewithin.

In some embodiments, the first portion has a headset and a front wheel of the vehicle mounted to a stem extending from the headset; and the second portion includes a seat post mount.

In some embodiments, the first portion has a swing arm and a rear wheel of the vehicle mounted to the swing arm; and the second portion includes a seat post mount.

In some embodiments, the frame includes a third portion; the second portion and the third portion are hingedly connected; a cable section extends between the second portion and the third portion; the second portion defines a cable section enclosure housing a first portion of the cable section; the third portion defines a second cable section enclosure housing a second portion of the cable section; and the cable section includes a section loom segment that is extensible in response to folding of the second portion relative to the third portion at the hinged connection.

In some embodiments, a wheel mounting assembly for a foldable vehicle includes a shaft and an arm attached to the shaft; the arm having a proximal portion; the arm having a distal portion hingedly attached to the proximal portion; a wheel being mounted to the distal portion; the distal portion of the arm being selectively movable relative to the proximal portion between a first position and a second position; in the first position the distal portion extending from the proximal portion away from the shaft; and in the second position, the distal portion of the arm being folded back upon the proximal portion of the arm; a cable extending from the steering stem shaft to the distal portion of the arm; and when the distal portion is in the second position, the cable extends across the axis of the hinge.

In some embodiments, the cable is attached to the arm by a pair of fixed attachment points, the pair of fixed attachment points including a first attachment point on the proximal portion of the arm and a second attachment point on the distal portion of the arm.

In some embodiments, the distal portion has a wheel seat distant from the proximal portion; the wheel is mounted to the wheel seat; the arm has an off-set relative to the axis of rotation, the off-set defining a wheel accommodation; and in the first position the wheel is located in the wheel accommodation.

In accordance with a broad aspect of this disclosure, there is provided a rotary control ring. The rotary control ring may be used to control the operation of a vehicle.

In some embodiments, a rotary control assembly for a vehicle includes an inner member; an outer rotatable member mounted on the inner member; the inner member including a central projection member extending into a cavity of the outer rotatable member and a pair of rings mounted around the central projection; the rings being oppositely biased; and the outer rotatable member being operable to drive rotation of the rings around the central projection member.

In some embodiments, the outer rotatable member has an inner protrusion extending towards the central projection member, the inner protrusion being engageable with the rings.

In some embodiments, each of the rings includes a plurality of radial protrusions extending outwardly away from the central projection member; the radial protrusions of the rings being circumferentially offset; and the inner member includes one or more ring engagement members positioned to engage the radial protrusions and prevent further rotation of the rings.

In some embodiments, a spring is connected to the rings, the spring biasing the rings to a rest position.

In some embodiments, the inner member comprises a position sensor operable to detect a rotational position of the rotatable member.

In some embodiments, the rotatable member comprises a magnetic member; and the position sensor is operable to detect a position of the magnetic member.

In some embodiments, the vehicle includes handle bars; and the inner member is mounted to the handle bars.

In accordance with a broad aspect of this disclosure, there is provided a crank sensor for a bicycle. The crank sensor may measure the rotational speed of the cranks directly. The crank sensor may be integrated with a torque sensor for the bicycle.

In some embodiments, there is provided a crank sensor for a bicycle having a crank usable to drive an endless drive loop, the crank sensor including a tension sensor wheel that is positioned proximate to the endless drive loop, the sensor wheel being deflected in response to tension in the endless drive loop; a rotatable member that is rotatable in response to rotation of the crank; and an integrated torque and crank speed sensor that includes a deflection sensor positioned to measure deflection of the sensor wheel and a position sensor operable to detect a rotational position of the rotatable member.

In some embodiments, the rotatable member includes a magnetic member; and the integrated torque and crank speed sensor includes a magnetometer positioned to detect a rotational position of the magnetic member and to measure deflection of the sensor wheel.

In some embodiments, the magnetometer is a Hall effect sensor.

In some embodiments, the magnetic member is mounted to the crank.

In some embodiments, the magnetic member is mounted to the tension sensor wheel.

In some embodiments, the bicycle includes a main roller driven by the crank; and the rotatable member is mounted to the main roller.

In accordance with a broad aspect of this disclosure, there is described a folding vehicle with a front fender that can be removed and mounted to a rear fender to provide a compact storage position.

In some embodiments, the folding vehicle includes a foldable frame; the foldable frame having a first portion and a second portion; the first portion having a front wheel of the vehicle mounted thereto; the second portion having a rear wheel of the vehicle mounted thereto; a front fender removably mounted to the first portion adjacent to the front wheel; a rear fender mounted to the second portion adjacent to the rear wheel; the front fender being concentrically mountable on the rear fender when removed from the first portion.

In some embodiments, the foldable frame is movable between an unfolded position and a folded position; and in the folded position, the front fender is mounted on the rear fender.

In some embodiments, the front fender is magnetically mounted to the first portion.

In some embodiments, the front fender has a fender mounting assembly that includes a first pair of magnetic members; the first portion includes a second pair of magnetic members; and the front fender is mounted to the first portion by engaging the first pair of magnetic members with the second pair of magnetic members.

In some embodiments, the first pair of magnetic members includes a first magnetic member having a first polarity and a second magnetic member having a second polarity, the second polarity being different from the first polarity.

In some embodiments, the first portion includes a pair of recesses; the second pair of magnetic members are positioned in the pair of recesses; the first pair of magnetic members protrude from the fender mounting assembly; and when the first pair of magnetic members are engaged with the second pair of magnetic members, the first pair of magnetic members are receivable within the pair of recesses.

In some embodiments, the second portion includes a magnetic mounting element; and when the front fender is mounted on the rear fender, the first pair of magnetic members are engaged with the magnetic mounting element.

In some embodiments, the magnetic mounting element includes a third pair of magnetic members that are engageable with the first pair of magnetic members.

In some embodiments, the magnetic mounting element includes a ferromagnetic member.

In another aspect of the invention, there is any apparatus substantially as shown or described herein, in whole or in part.

BRIEF DESCRIPTION OF THE DRAWINGS

These aspects and other features of the invention can be understood with the aid of the following illustrations of a number of exemplary, and non-limiting, embodiments of the principles of the invention in which:

FIG. 3I shows an isometric view of a fifth stage of folding of the example bicycle of FIG. 3A with the seat post telescopically retracted and the left pedal acting as a stand;

FIG. 3J shows an opposite isometric view to that of FIG. 3I;

FIG. 6C is a section of the example latch interface between the forward and middle portions of the example bicycle of FIG. 5A looking upward on section '6c-6c' of FIG. 6A through the middle of the latch handle or actuator, in the secured and locked position;

FIG. 6D is a section of the example latch interface of FIG. 6C looking upward on section '6d-6d' of FIG. 6A below the actuator showing the clamping arrangement;

FIG. 9G is a front end view of the example forward frame portion of FIG. 9A;

FIG. 9H is a vertical transverse section of the example forward frame portion of FIG. 9A;

FIG. 9I is a rear end view of the example forward frame portion of FIG. 9A;

FIG. 10E is a front view of the example middle frame portion of FIG. 10A;

FIG. 10F is a rear view of the example middle frame portion of FIG. 10A;

FIG. 11A is an isometric view of an example rear frame portion, or swing arm portion, of the frame of the example bicycle of FIG. 1A;

FIG. 11B is a left hand view of the example swing arm of FIG. 11A;

FIGS. 13A-13H are a series of views, in section, showing an example of the progression of latching of the middle frame portion and swing arm frame portions of the bicycle of FIG. 1A;

FIG. 18A is a front view of an example front arm assembly of the bicycle of FIG. 1A;

FIG. 18B is a front view of the example front arm assembly of FIG. 18A with cable covers removed;

FIG. 18C is a perspective view from the top, right and rear of the example front arm assembly of FIG. 18A;

FIG. 21F is a perspective view of the example folding bicycle of FIG. 21E from the front and to the left;

FIG. 21G is a partial perspective view of the front mounting assembly for the front fender of the example folding bicycle of FIG. 21A from the front and to the left;

FIG. 21H is a partial perspective view of the front mounting assembly for the front fender of the example folding bicycle of FIG. 21A from the front and to the right;

FIG. 21I is a partial perspective view of the rear mounting assembly for the front fender of the example folding bicycle of FIG. 21A from the front and to the left;

FIG. 21J is a perspective view of the example folding bicycle of FIG. 21C from the front and to the right;

FIG. 22A show an isometric view of an example electronics module of the example bicycle of FIG. 1 with an electronics module locking system;

FIG. 22B shows a cross-sectional view of the example electronics module of FIG. 22A;

FIG. 22C shows the example bicycle of FIG. 5A sectioned along the vertical Center Line fore-and-aft plane with the example electronics module of FIG. 22A;

FIG. 22D shows the example bicycle of FIG. 5A sectioned along the vertical Center Line fore-and-aft plane with an alternative electronics module locking system.

DETAILED DESCRIPTION

Figure 1A:
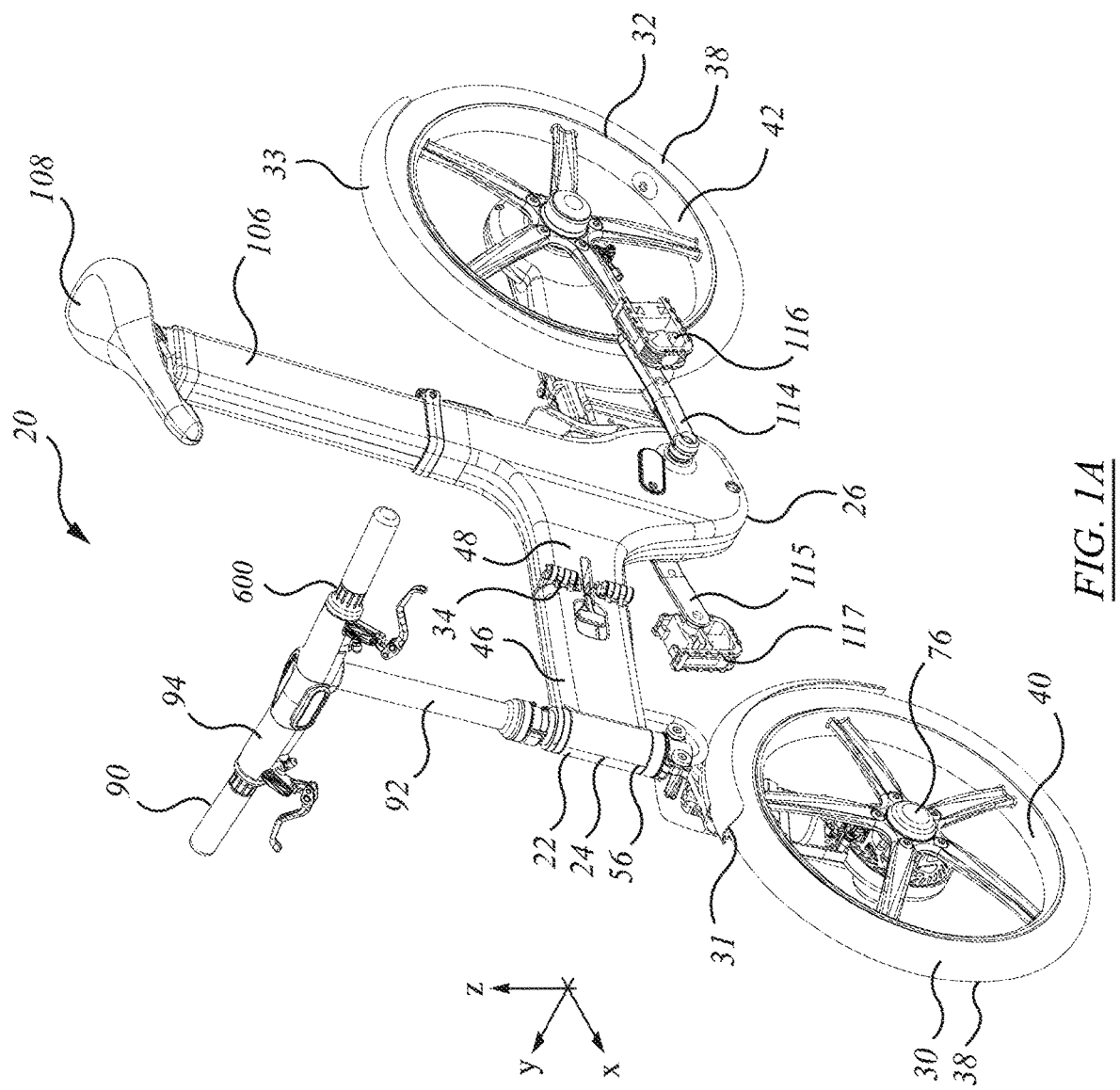
FIG. 1A shows an isometric general assembly view of an example folding bicycle in an unfolded, or deployed, position or condition.
Figure 1B:
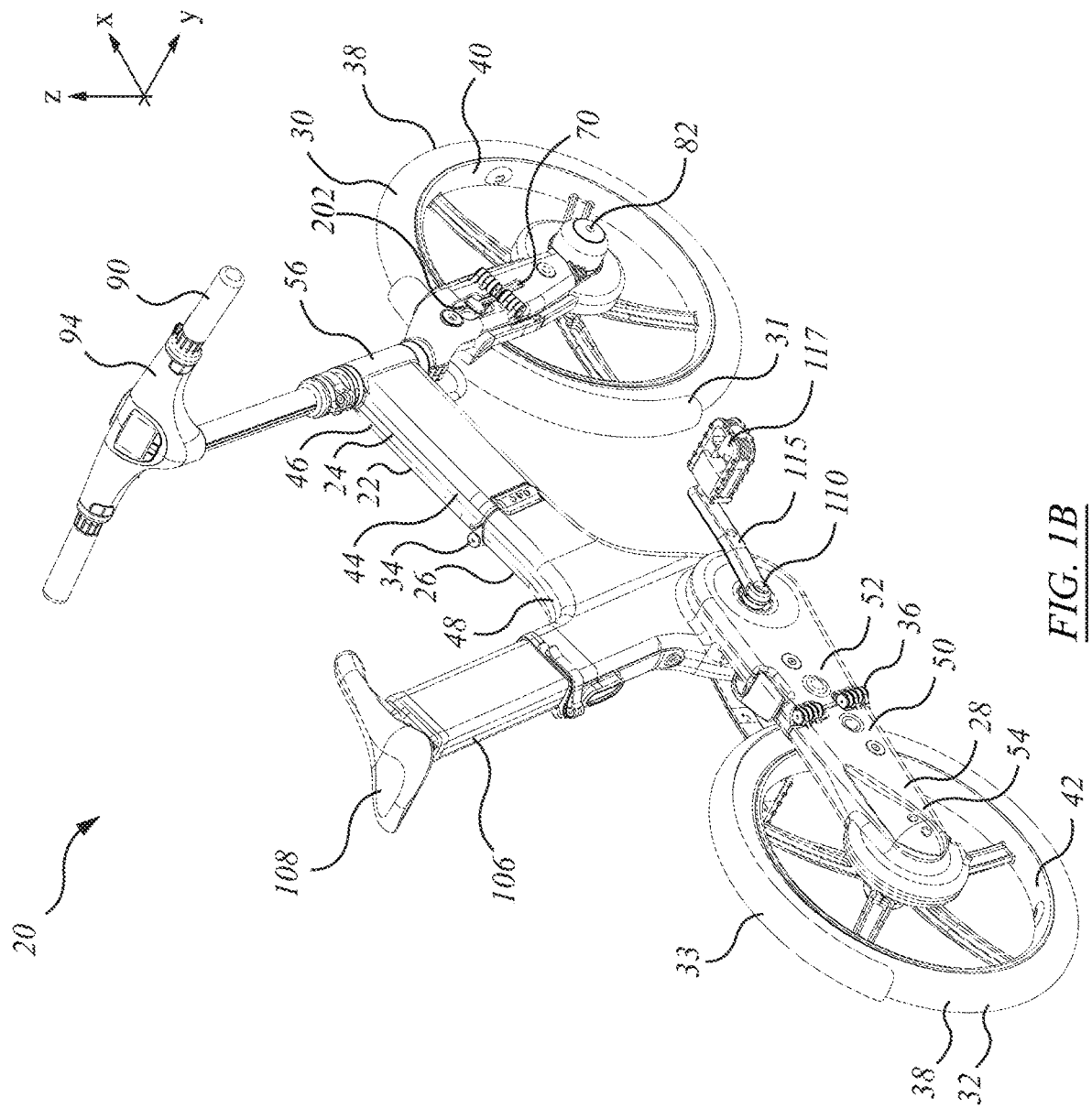
FIG. 1B shows an opposite isometric view of the example folding bicycle of FIG. 1A.
Figure 1C:
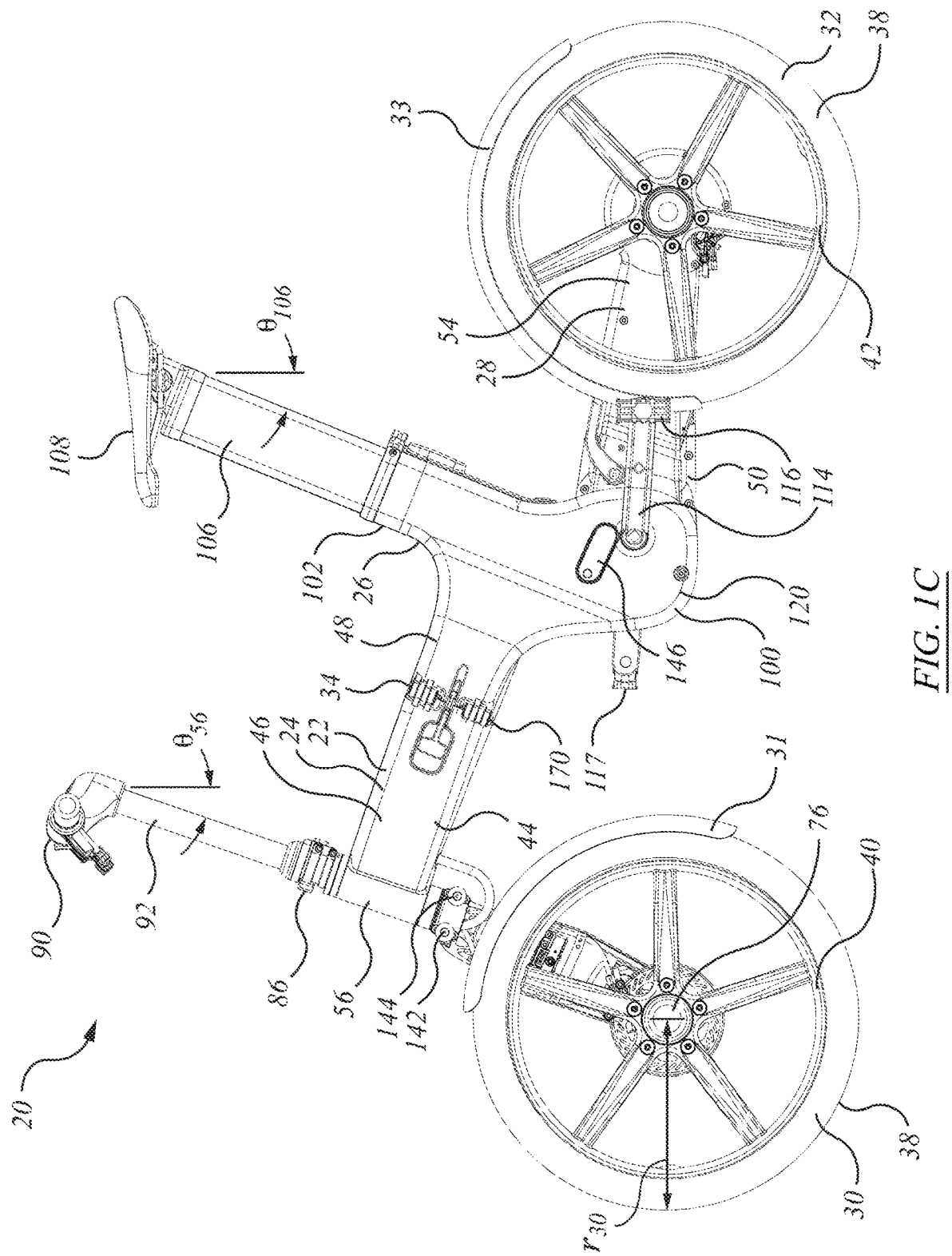
FIG. 1C shows a left hand side view of the example bicycle of FIG. 1A.
Figure 1D:
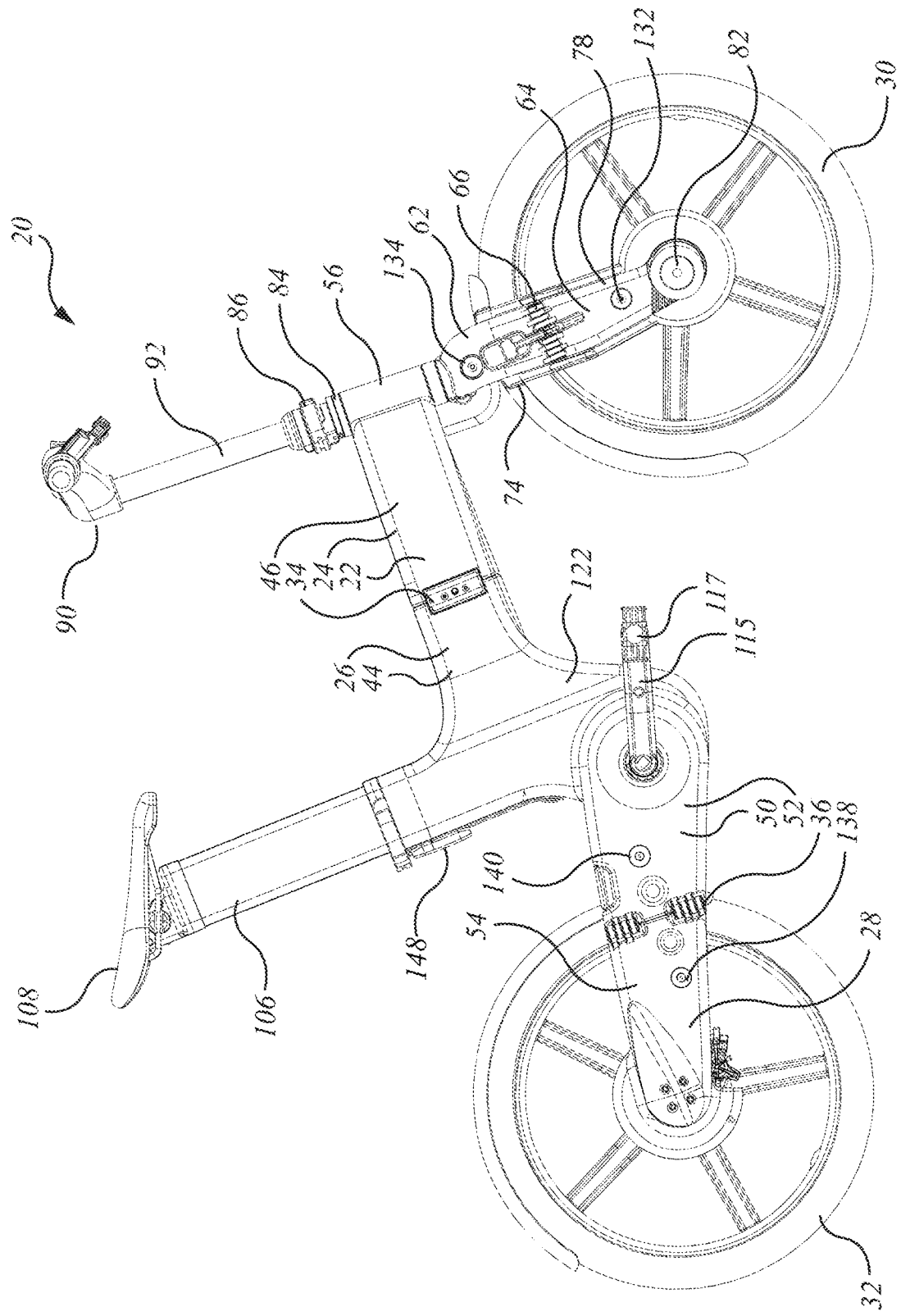
FIG. 1D shows a right hand side view of the example bicycle of FIG. 1A.
Figure 1E:
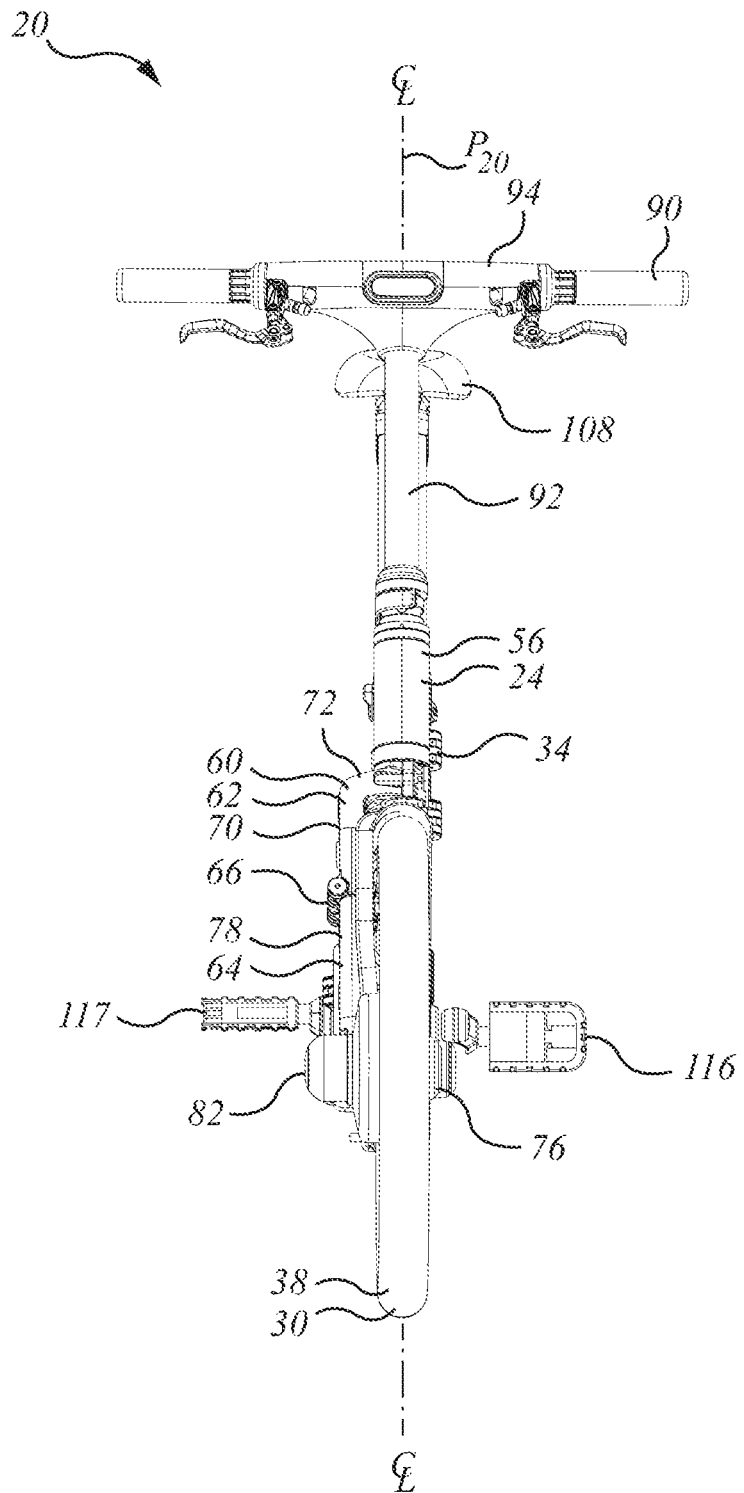
FIG. 1E shows a front view of the example bicycle of FIG. 1A.
Figure 1F:
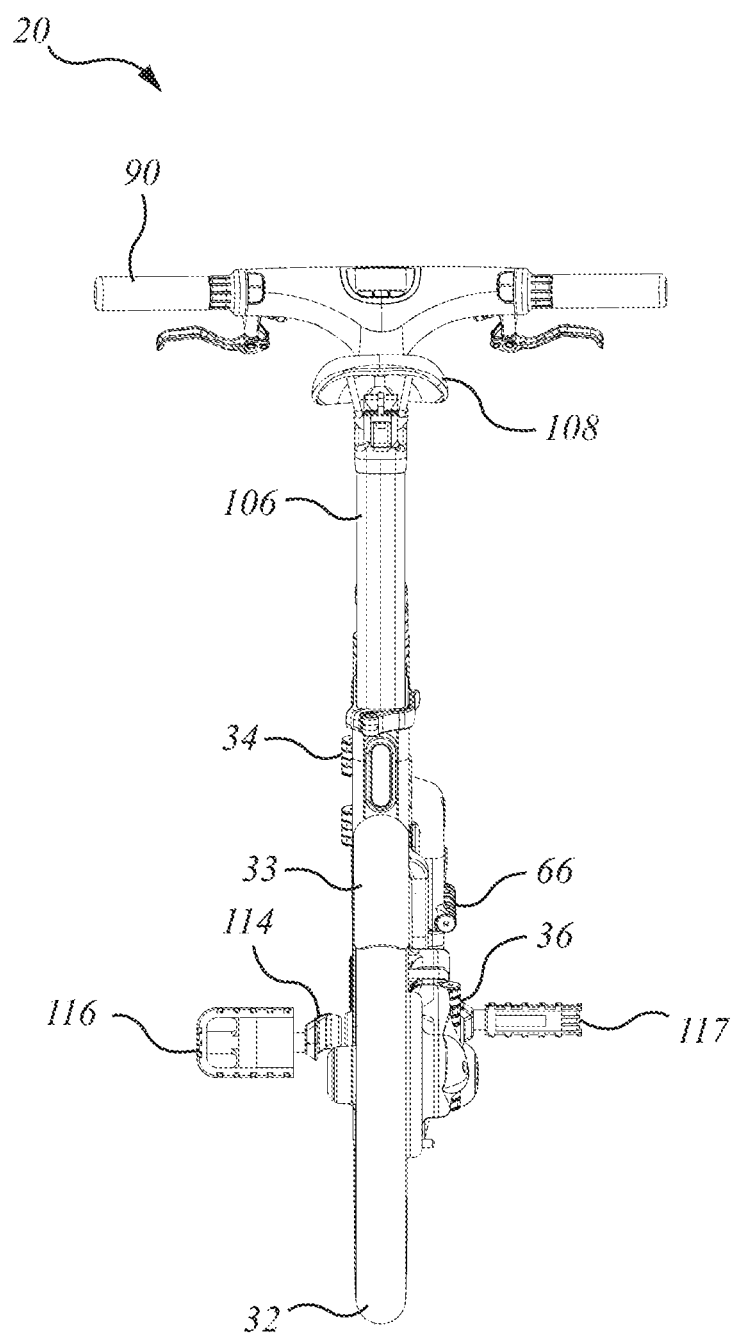
FIG. 1F shows a rear view of the example bicycle of FIG. 1A.
Figure 1G:
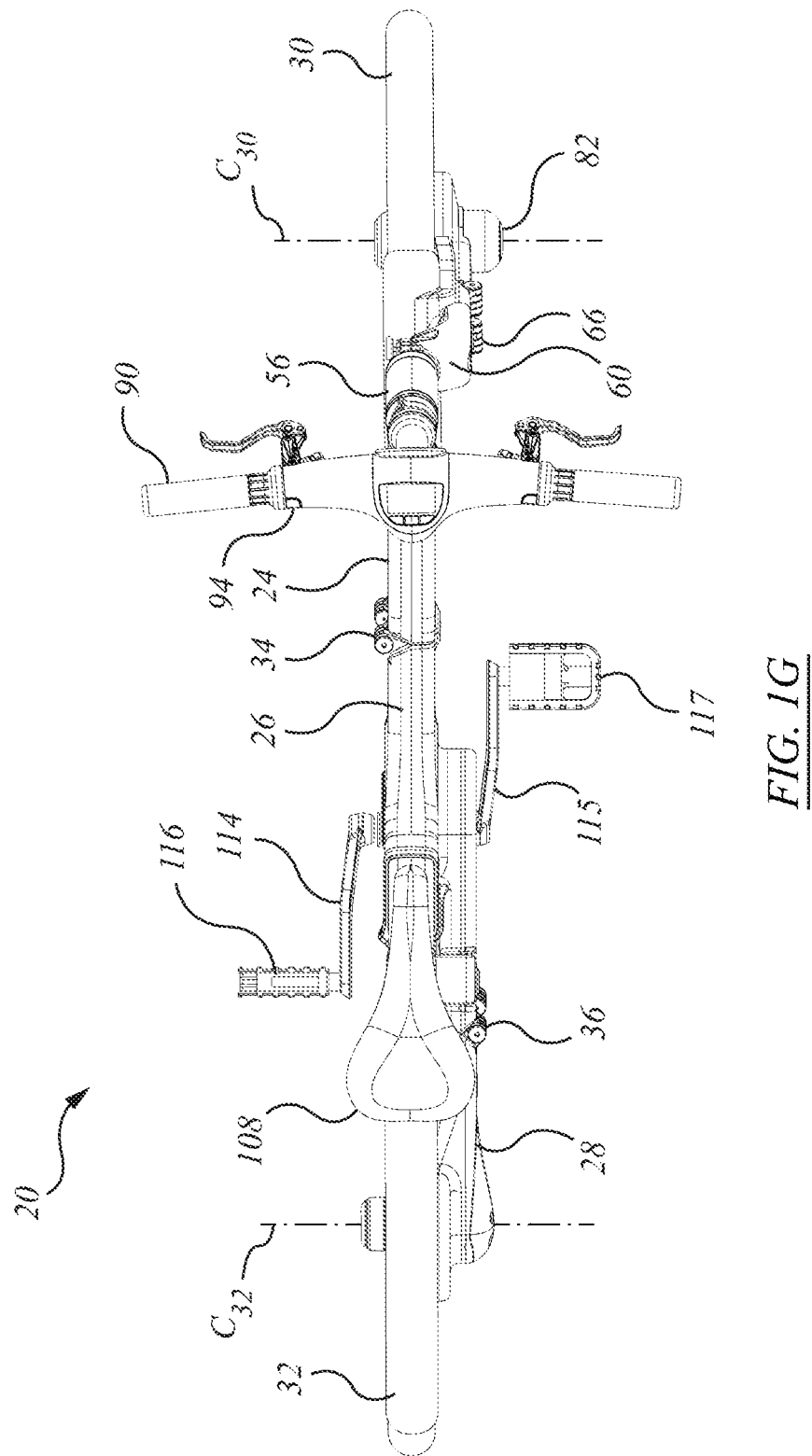
FIG. 1G shows a top view of the example bicycle of FIG. 1A.
Figure 1H:
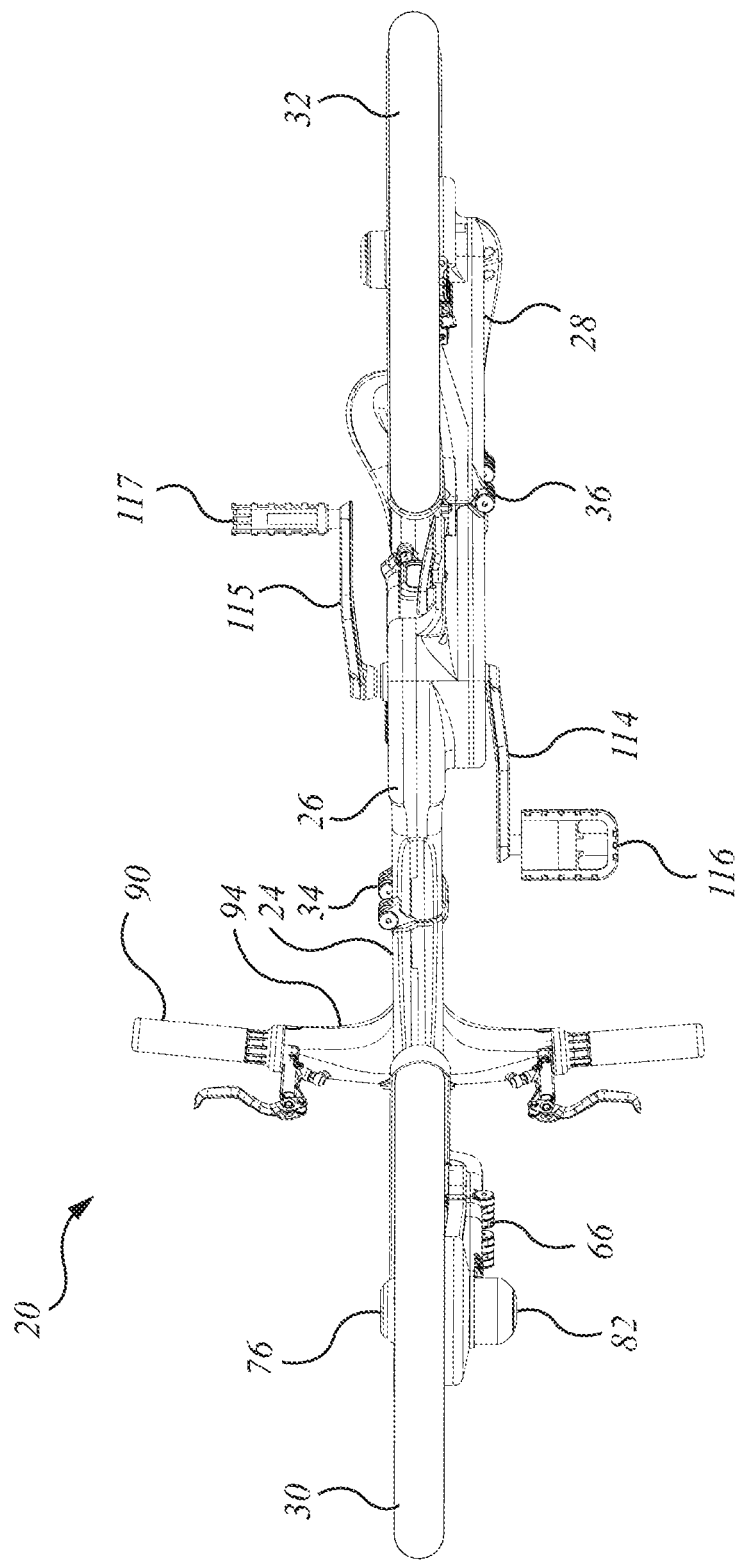
FIG. 1H shows a bottom view of the example bicycle of FIG. 1A.
Figure 2A:
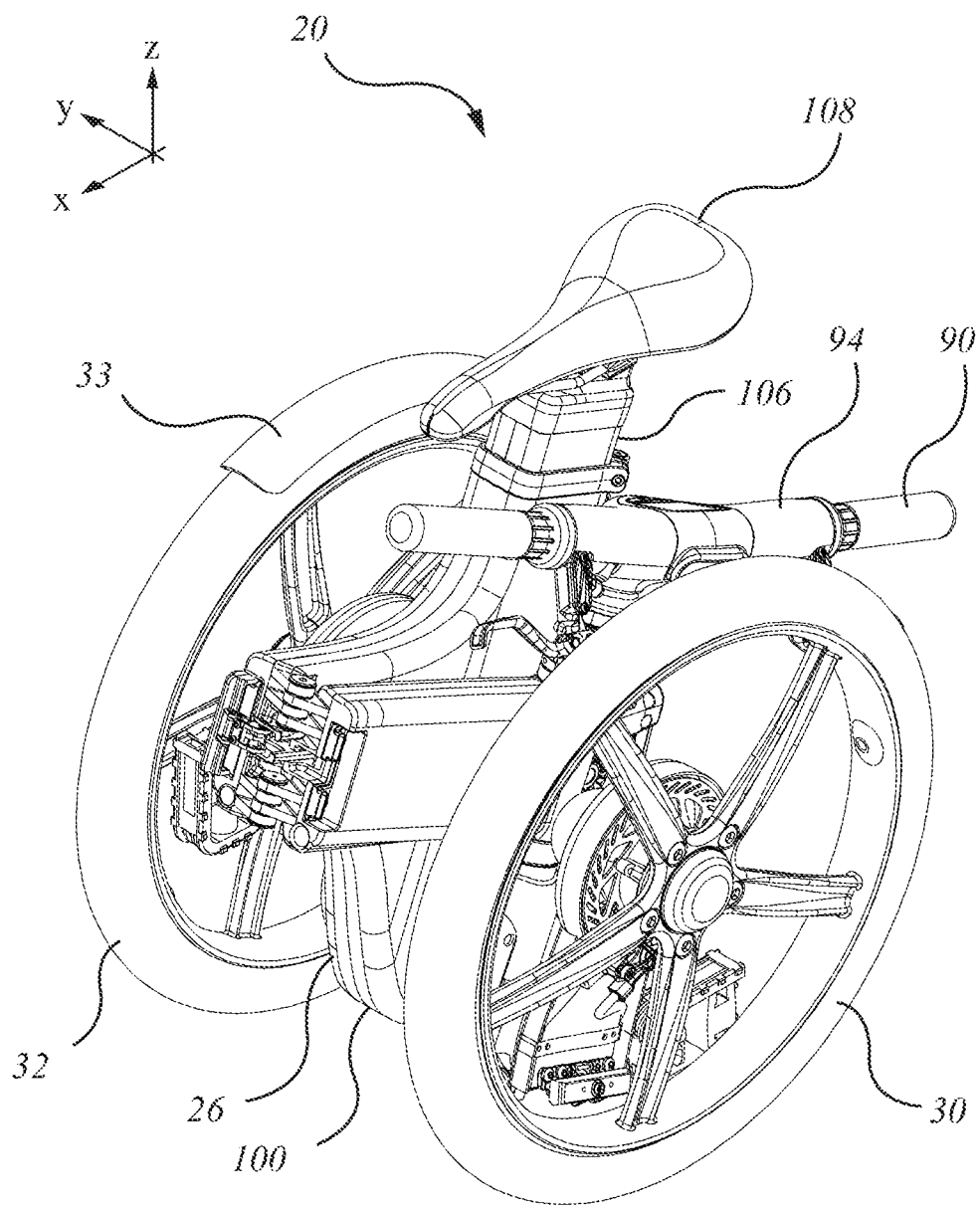
FIG. 2A shows an isometric view the example folding bicycle of FIG. 1A in a folded position or compact condition.
Figure 2B:
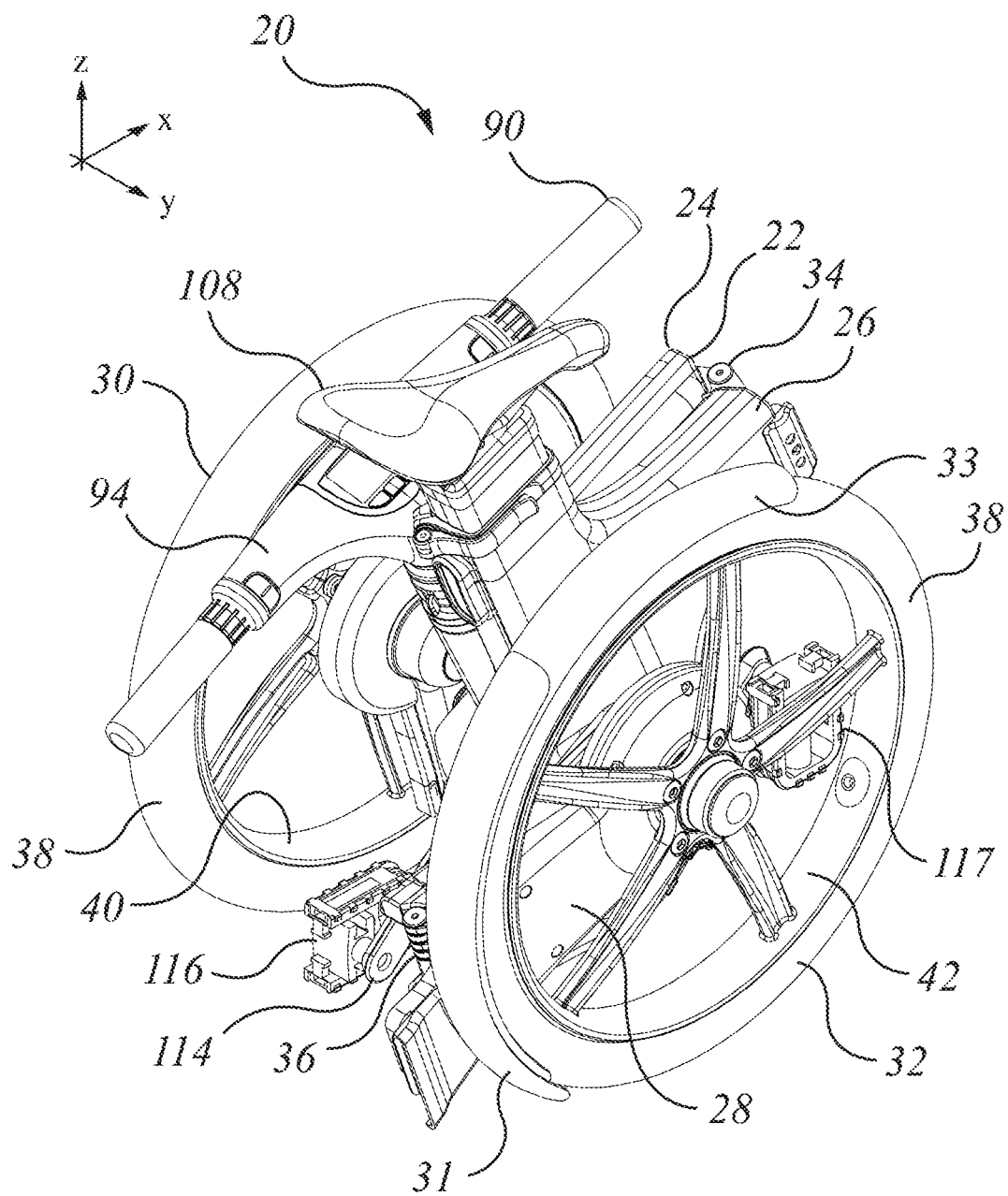
FIG. 2B shows an opposite isometric view of the example folding bicycle of FIG. 2A.
Figure 2C:
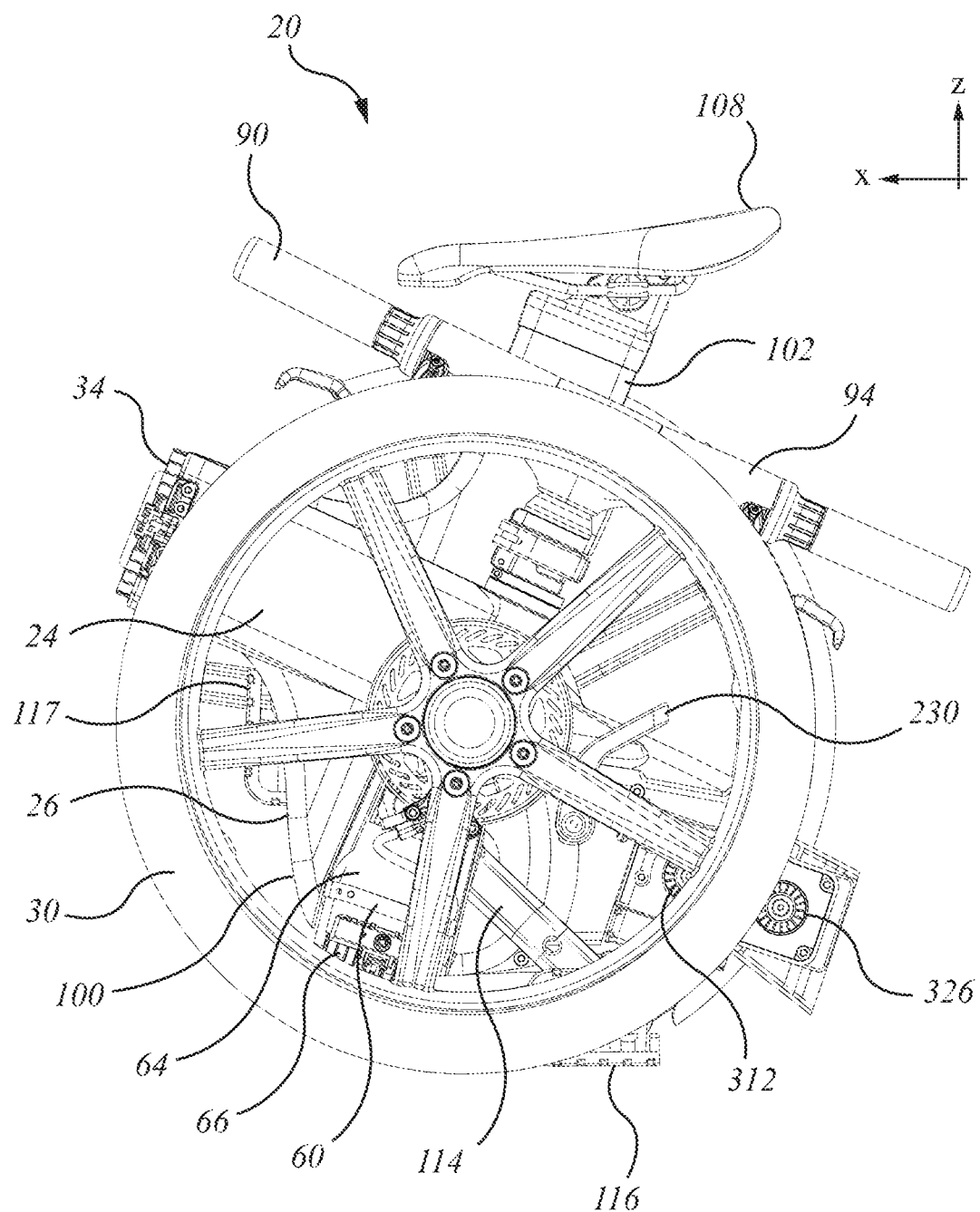
FIG. 2C shows a left hand side view of the example bicycle of FIG. 2A.
Figure 2D:
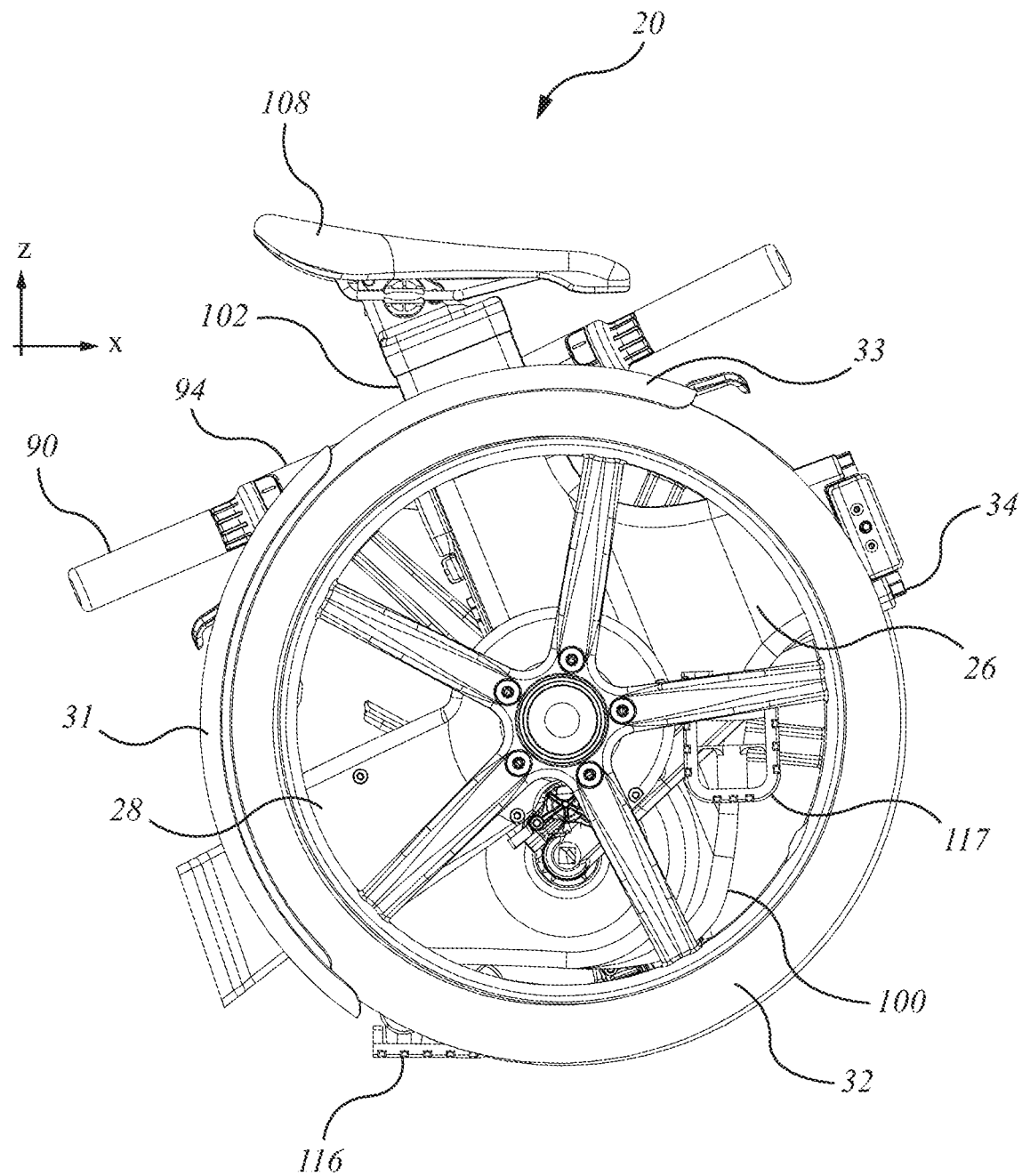
FIG. 2D shows a right hand side view of the example bicycle of FIG. 2A.
Figure 2E:
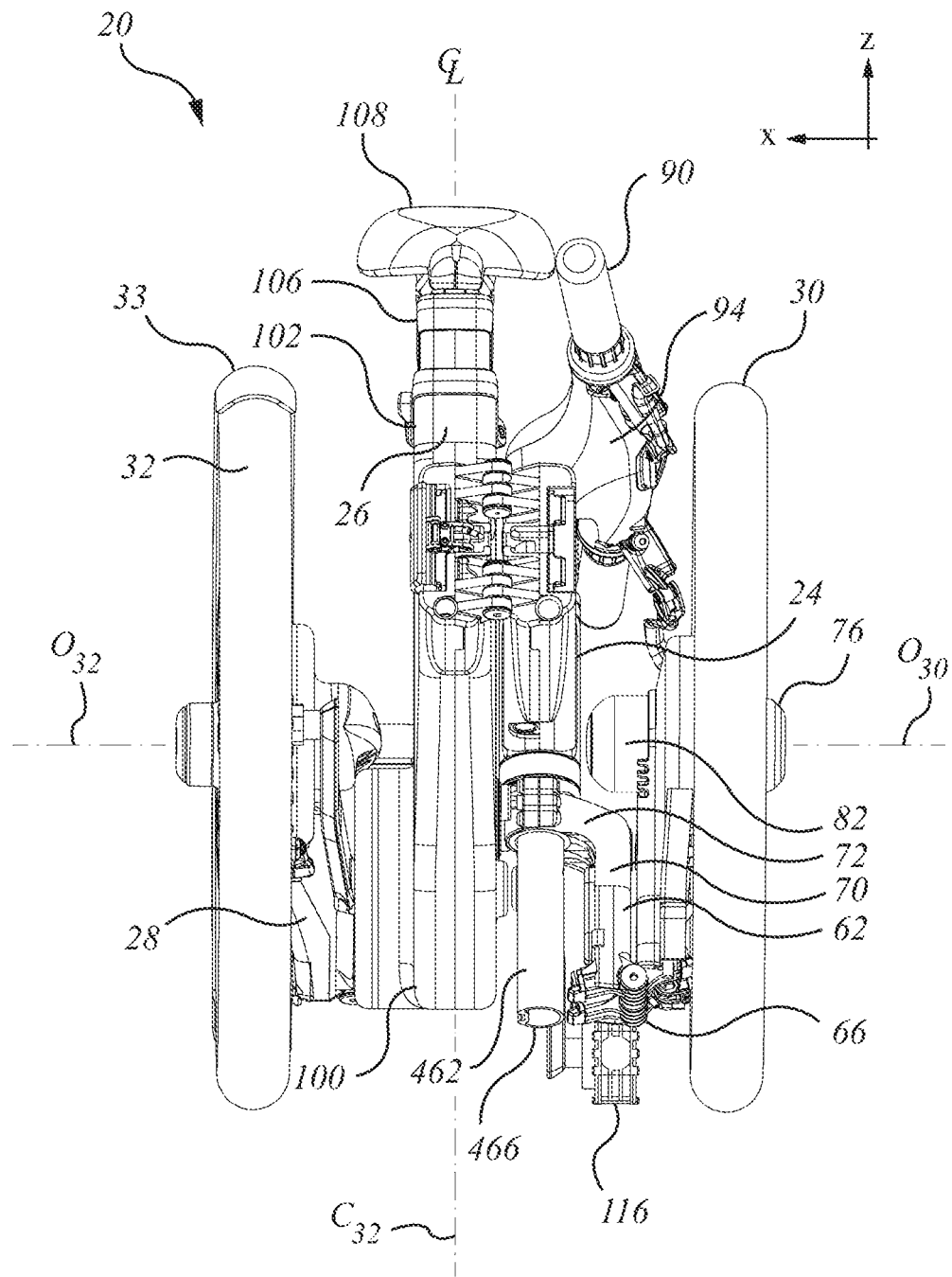
FIG. 2E shows a front view of the example bicycle of FIG. 2A.
Figure 2F:
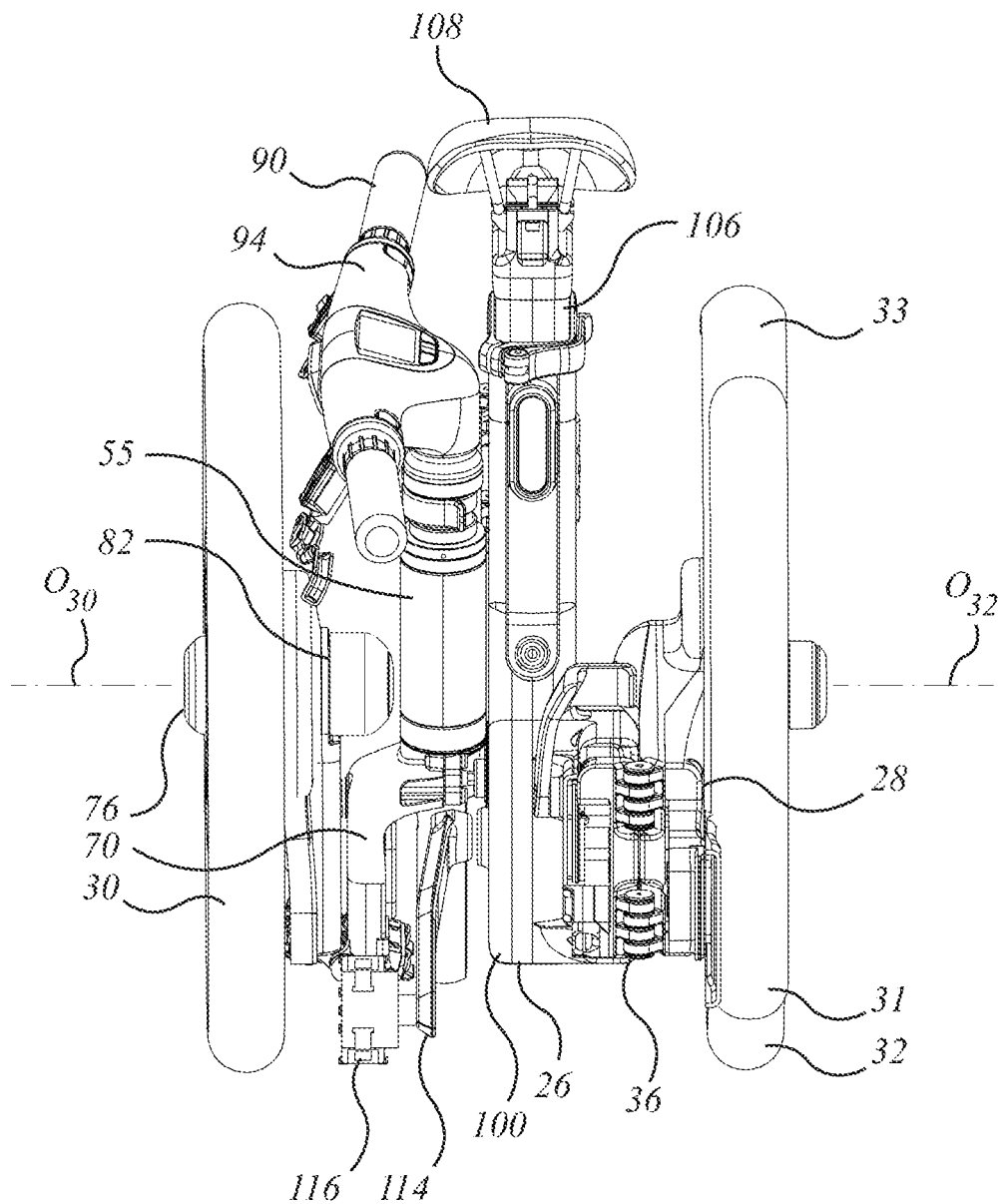
FIG. 2F shows a rear view of the example bicycle of FIG. 2A.
Figure 2G:
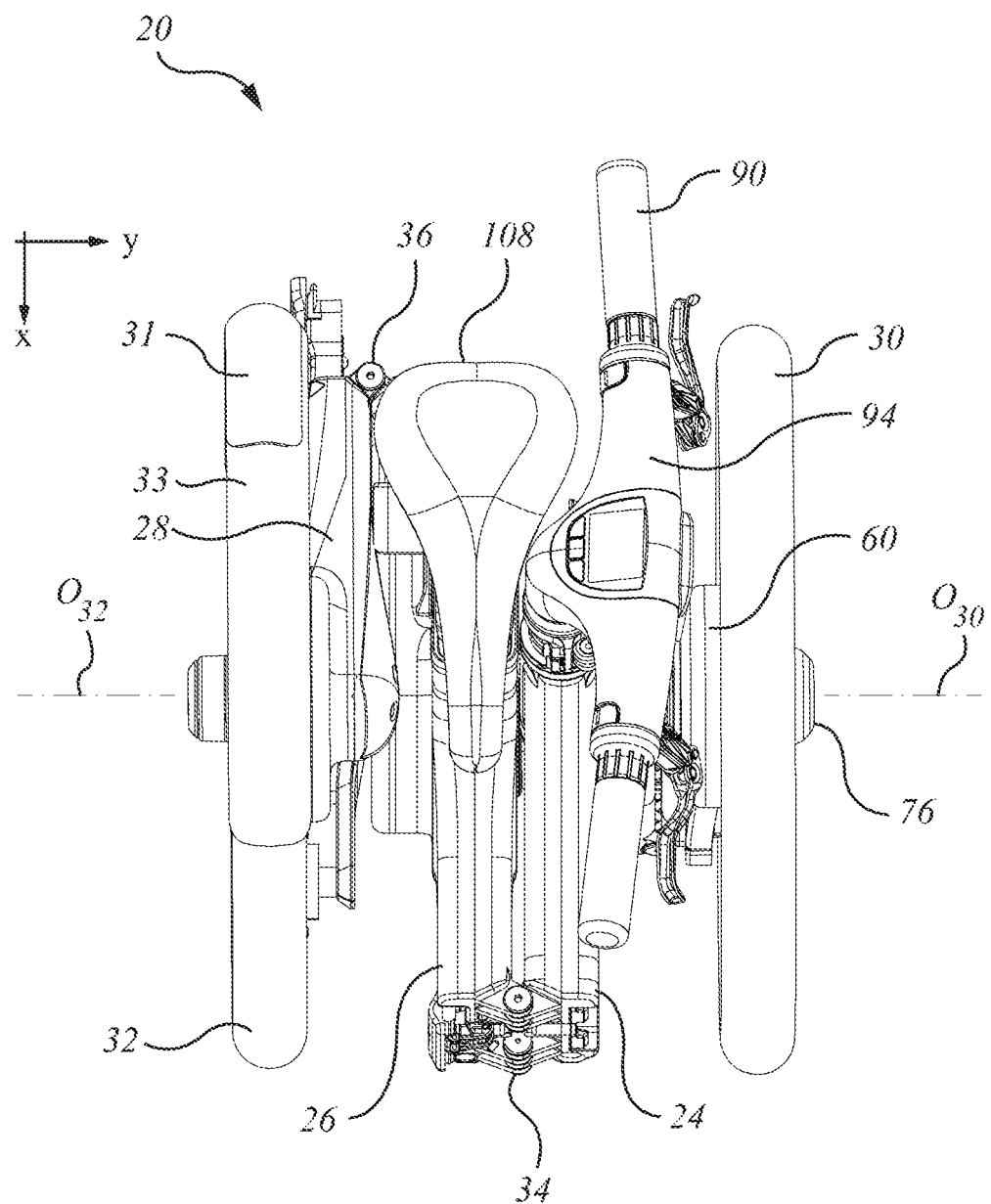
FIG. 2G shows a top view of the example bicycle of FIG. 2A.
Figure 2H:
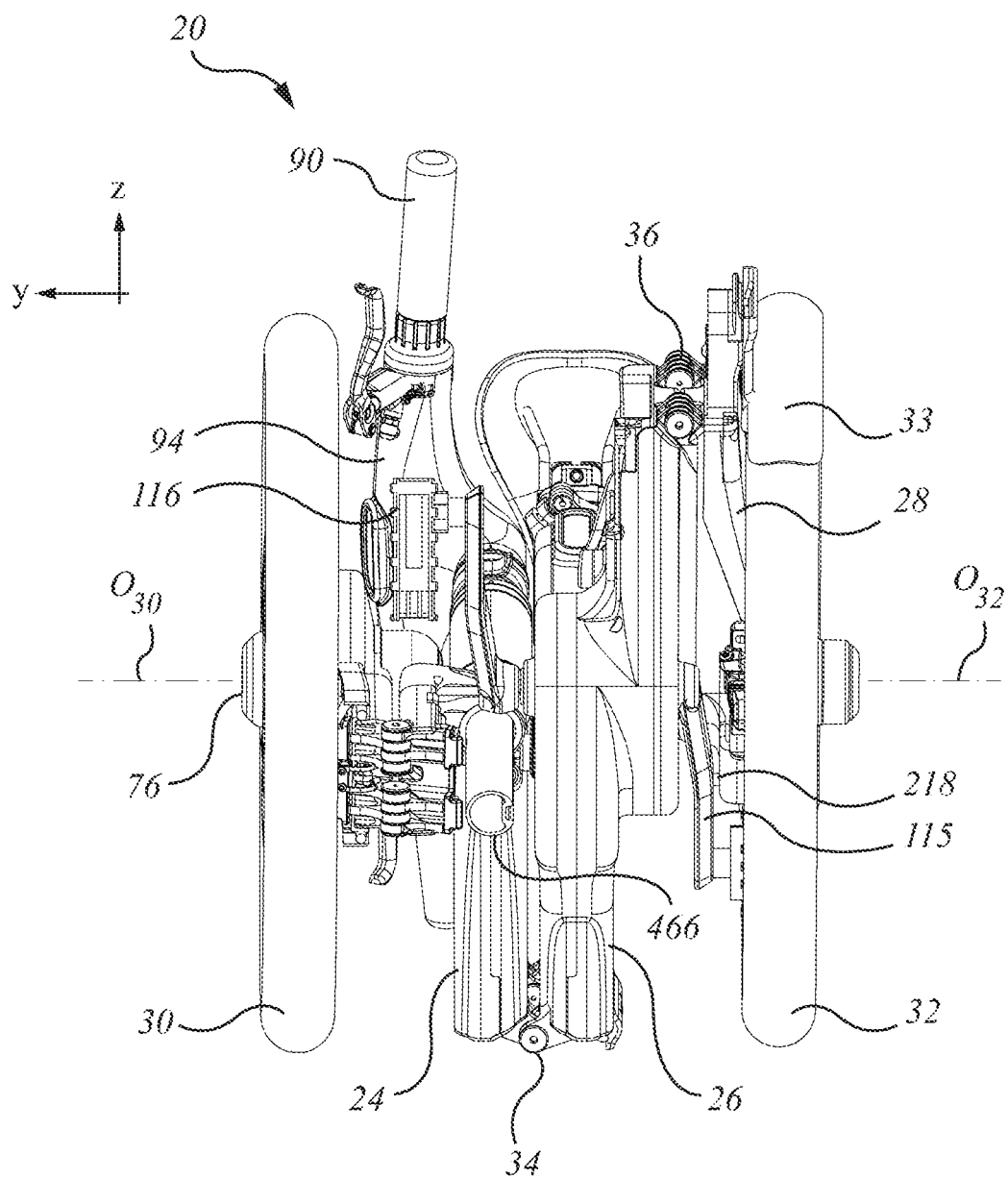
FIG. 2H shows a bottom view of the example bicycle of FIG. 2A.

The scope of the invention herein is defined by the claims. The description that follows, and the embodiments described therein, are provided by way of illustration of an example, or examples, of particular embodiments incorporating one or more of the principles, aspects and features of the present invention. These examples are provided for the purposes of explanation, and not of limitation, of those principles and of the invention. In the description, like parts are marked throughout the specification and the drawings with the same respective reference numerals. The drawings may be understood to be to scale and in proportion unless otherwise noted. The wording used herein is intended to include both singular and plural where such would be understood, and to include synonyms or analogous terminology to the terminology used, and to include equivalents thereof in English or in any language into which this specification many be translated, without being limited to specific words or phrases.

In this specification, the commonly used engineering terms "proud", "flush" and "shy" may be used to denote items that, respectively, protrude beyond an adjacent element, are level with an adjacent element, or do not extend as far as an adjacent element, the terms corresponding conceptually to the conditions of "greater than", "equal to" and "less than". In the description and drawings, the centerline of an object may be designated as CL, and of a particular object as $CL_{xx}$, where the subscript xx refers to the item annotation number. In the description, the terms sideways, cross-wise, and transverse are used in respect of various folding actions. Sideways folding, and accordion folding (i.e., repeated sideways folds) are distinct from in-plane folding. In-plane folding occurs where the pivot hinge is either perpendicular to, or predominantly perpendicular to, the plane of the unfolded frame. Expressed differently, in-plane folding occurs where the pivot hinge or pivot axis is parallel, or predominantly parallel, to one or another of the crank shaft, or the axles of the wheels. In this kind of folding, or collapsing, motion, the wheel is angularly displaced in, or very close to, the plane of the wheel. The terminology used in this specification is thought to be consistent with the customary and ordinary meanings of those terms as they would be understood by a person of ordinary skill in the art in North America. The Applicants expressly exclude all interpretations that are inconsistent with this specification.

By way of a general overview, an example of a folding vehicle in the form of a folding bicycle is shown in FIG. 1A-1H generally as 20. The same bicycle 20 is shown in a folded position or condition in FIGS. 2A-2H. Looking first at the view of bicycle 20 in a first position in FIG. 1A, which is an example of an unfolded position or condition in which bicycle 20 is ready to be ridden. There is a folding frame 22 that has a first portion 24, a second portion 26 and a third portion 28. The terminology "first", "second" and "third" is arbitrary and interchangeable. In the example, the "first portion" 24 may be the front portion of bicycle frame 22; the "second portion" 26 may be the middle portion of bicycle frame 22; and the "third portion" 28 may be the rear portion, or "swing arm" of frame 22.

In the example shown in FIG. 1A, the front and rear wheels of bicycle 20 are identified respectively as 30 and 32. Front wheel 30 is mounted to front portion 24 of frame 22. Rear wheel 32 is mounted to rear portion 28 of frame 22. When bicycle 20 is in the first, or unfolded, or deployed position, (that is, the riding position) front wheel 30 leads rear wheel 32 in the forward direction of travel. This defines a fore-and-aft, or leading-and-trailing relationship. In the example shown, both wheels are in the central plane $P_{20}$, generally, when moving straight forward. Although bicycles can operate when the wheels are in tapered planes, or when the axis of the head tube is laterally offset from the plane of rotation of the rear wheel, in the embodiment shown, front wheel 30 and rear wheel 32 rotate in respective planes of rotation that are co-planar. That is, the wheels are aligned. It is also possible that wheel 30 and wheel 32 may be of different diameters. However, for simplicity of description, in bicycle 20 wheels 30 and 32 are described as having the same diameter. In this description, the wheel diameter may be referred to as d, or in reference to one or other wheel as $d_{30}$ or $d_{32}$, as may be. Similarly, the radius may be r, or $r_{30}$ or $r_{32}$, as may be. Each of the wheels rotates about an axis or rotation, or center of rotation such as may be designated $C_{30}$ or $C_{32}$. In the example shown, the wheels have external pneumatic tires 38 mounted on respective rims 40, 42. Alternatively, other types of tires, such as solid non-inflatable tires may be used. In this description, the centerline vertical planes of rotation of the wheels may be identified respectively as $P_{30}$ and $P_{32}$, and may be understood to intersect the center of the crown of the tires. The axes of rotation, by definition, may be understood to be square to the respective plane of rotation. When bicycle 20 is unfolded for riding, in the embodiment shown, the common plane of wheels 30 and 32 may be defined as centerline plane $P_{20}$, of bicycle 20 generally, (notwithstanding that the crank driven transmission is asymmetrically mounted). As shown, $P_{20}$ may also be the central plane of cross-member or cross-bar 44, of seat post 106 and seat 108.

In terms of general layout, front portion 24 can be joined to middle portion 26 at a first folding or foldable interconnection interface such as may be a hinged connection. In the example shown, the hinge is identified as first hinge 34. Third portion 28 can be joined to middle portion 26 at a second folding or foldable interconnection interface such as may be identified as second main hinge 36. As can be seen, a main cross-member or cross-bar 44 may structurally join or connect front portion 24 to middle portion 26. First main hinge 34 can be positioned in the midst of cross-bar 44. Cross-bar 44 can be split by hinge 34 into a first portion 46 that is part of front portion 24, and a second portion 48 that is part of middle portion 26. Similarly, rear wheel 32 can be mounted on a cantilevered member or beam or arm, however it may be called, identified as 50. Second main hinge 36 can be located in the midst of cantilevered arm 50 such that cantilevered arm 50 has a first portion 52 that is part of middle portion 26 of frame 22, and a second portion 54 that is part of rear portion 28 of frame 22.

In the example shown, front portion 24 includes first portion 46 of cross-bar 44. At the first or forward end, first portion 46 can include a head tube 56. First portion 46 and head tube 56 may be made of a single formed monolith such that the cross-sectional shape of first portion 46 merges smoothly into head tube 56. Alternatively, first portion 46 and head tube 56 may be joined together.

Front wheel 30 can be mounted to front portion 24 by means of a stem assembly 60. The stem assembly 60 may generally include a steering shaft and arm assembly 61 and a stem and handle bar assembly 90. FIGS. 15A-15D illustrate components of the stem assembly 60 (except for the lower portion 64 of the steering shaft and arm assembly 61, an example of which is shown in FIGS. 8A-8D).

Figures 7A, 7B, 7C:
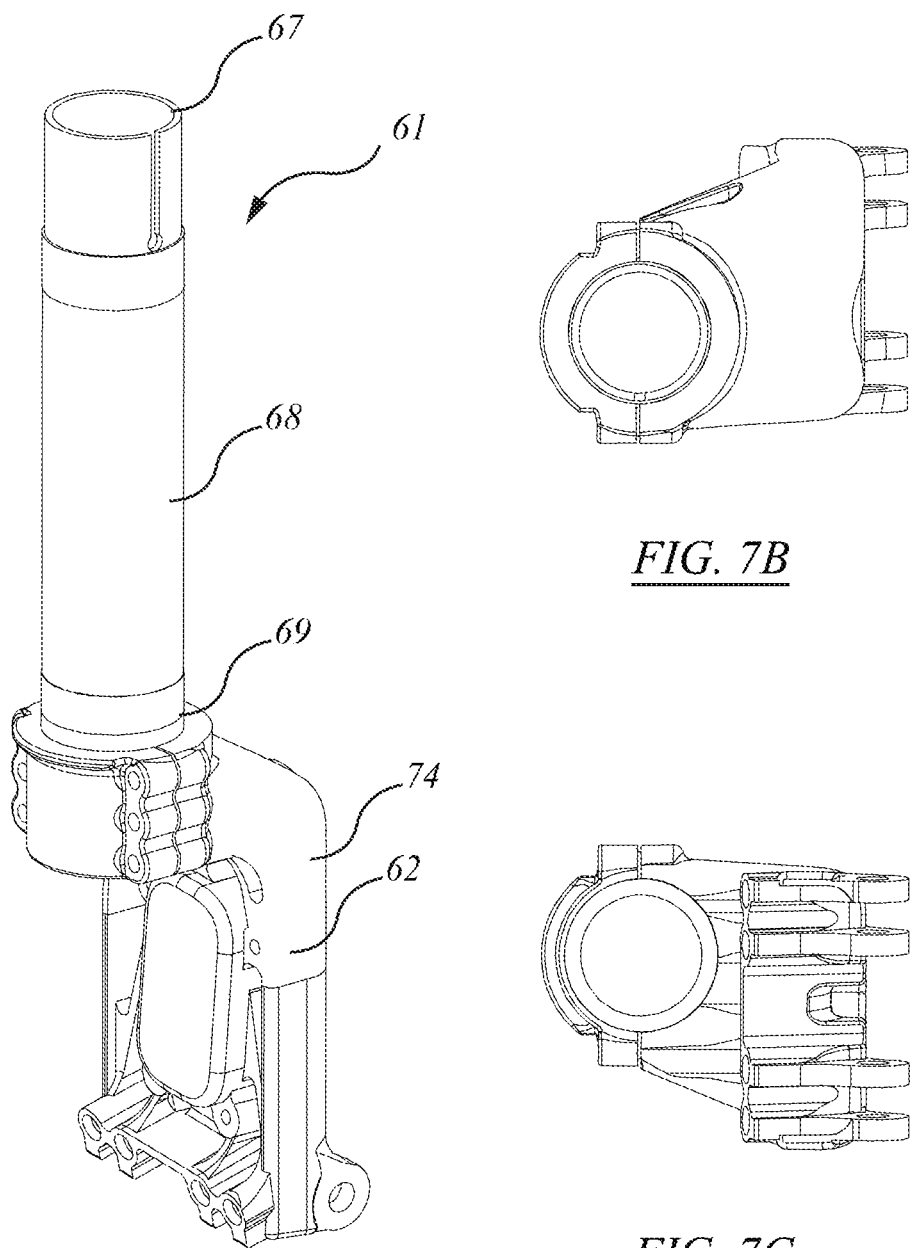
FIG. 7A is an isometric view of an example steering shaft and arm assembly of the bicycle of FIG. 1A from above, behind, and to the left.
FIG. 7B is an isometric view of the example steering shaft and arm assembly of FIG. 7A from above, behind and to the right.
FIG. 7C is a top view of the example steering shaft and arm assembly of FIG. 7A.
Figure 8B:
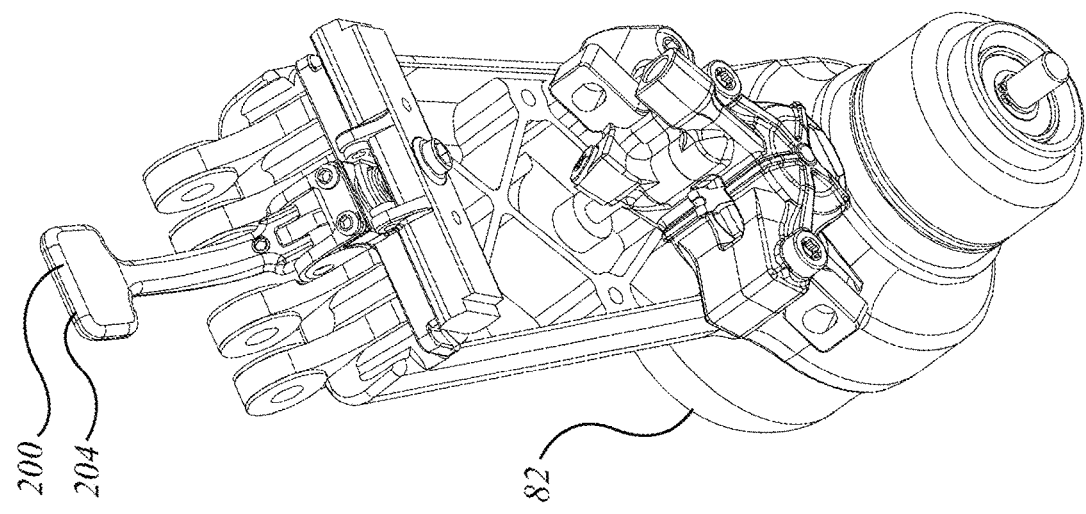
FIG. 8B is an isometric view of the example lower arm assembly of FIG. 8A from above, in front and to the left.
Figure 8A:
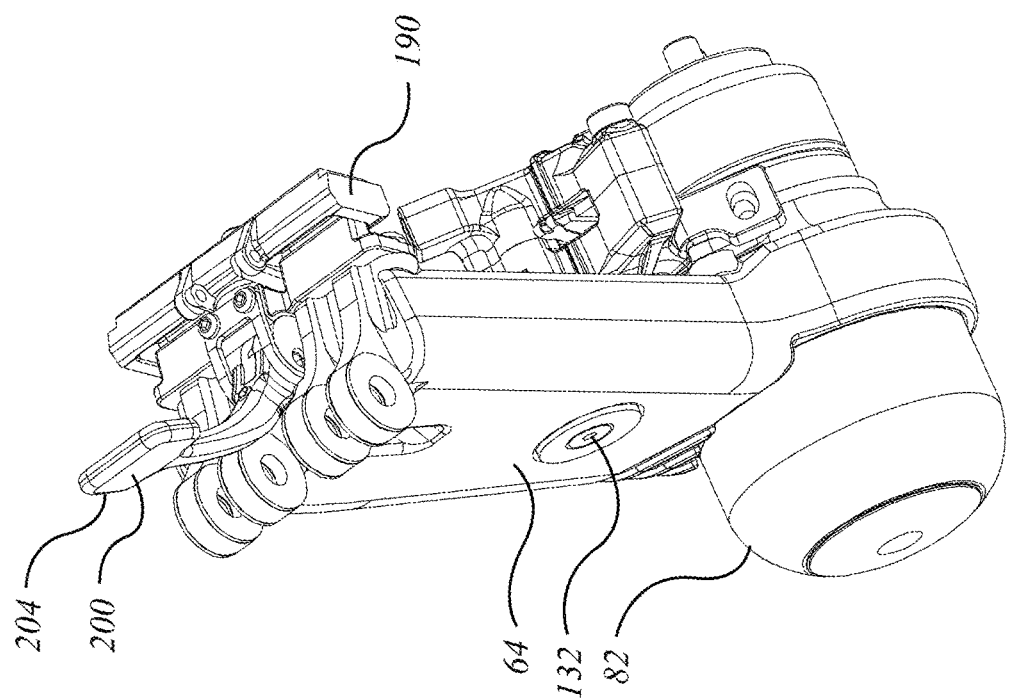
FIG. 8A is an isometric view of an example lower arm assembly of the example bicycle of FIG. 1A from in front, above, and to the right.
Figure 8D:
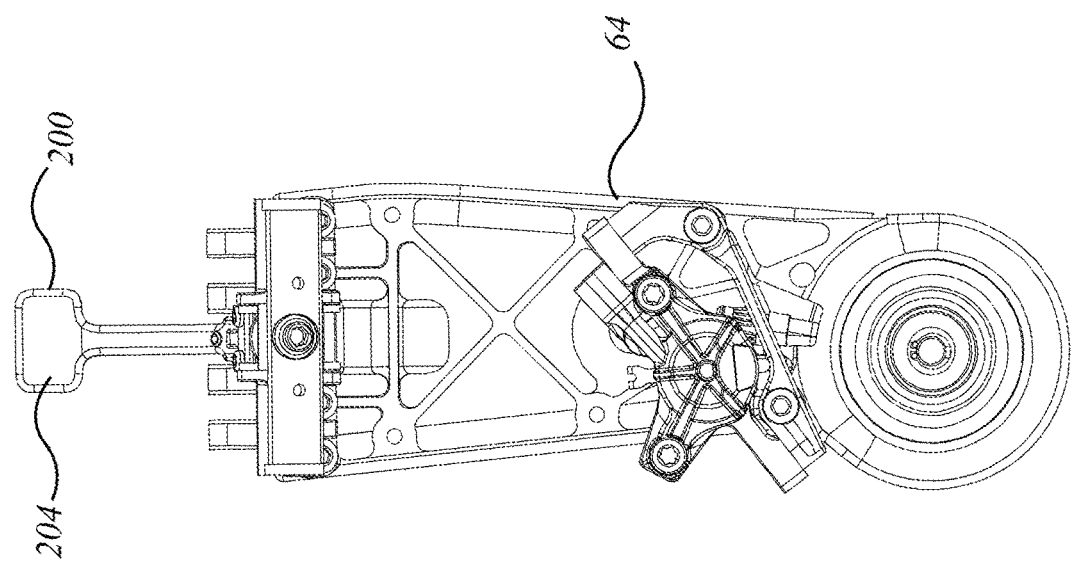
FIG. 8D is a profile view of the example lower arm assembly of FIG. 8A seen from the left.
Figure 8C:
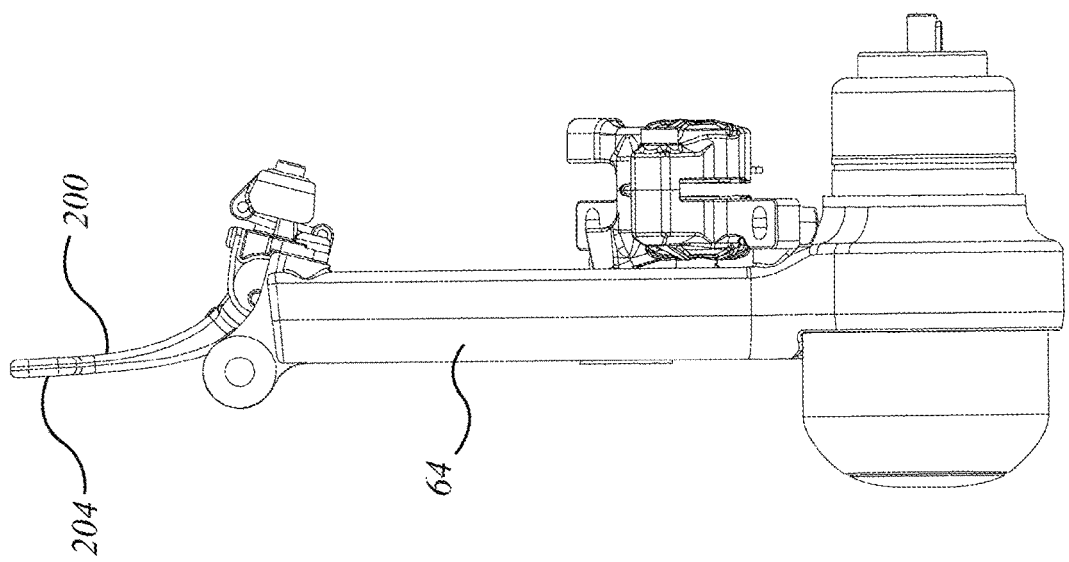
FIG. 8C is a side view of the example lower arm assembly of FIG. 8A seen from the left.
Figure 9A:
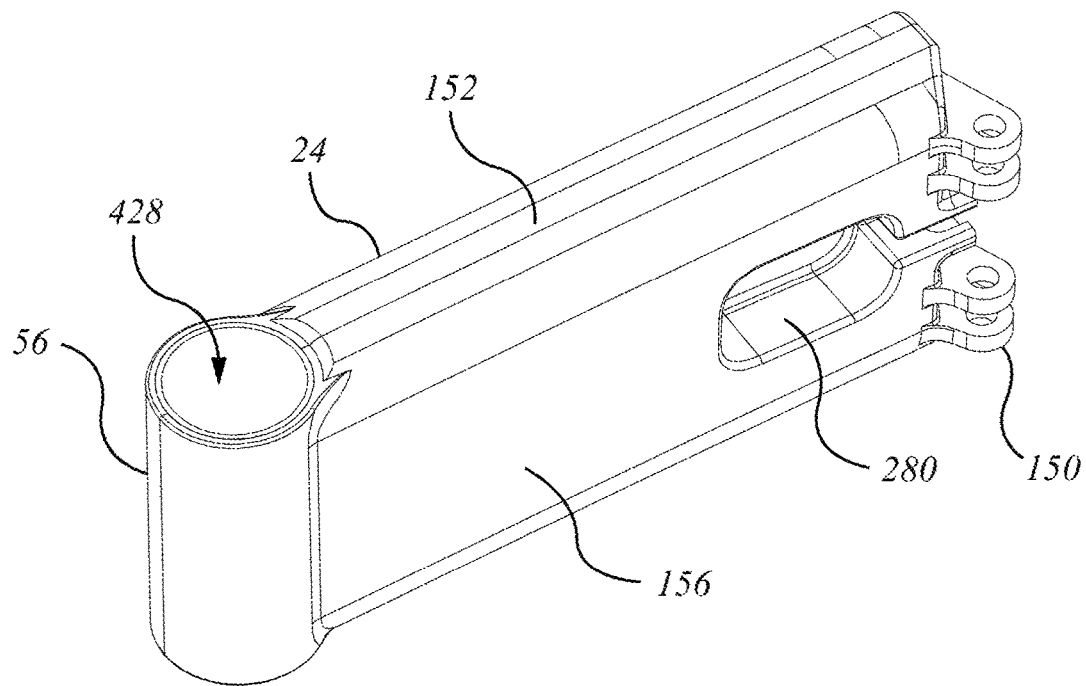
FIG. 9A is an isometric view of an example forward frame portion of the example bicycle of FIG. 1A seen from above, in front, and to the left.
Figure 9B:
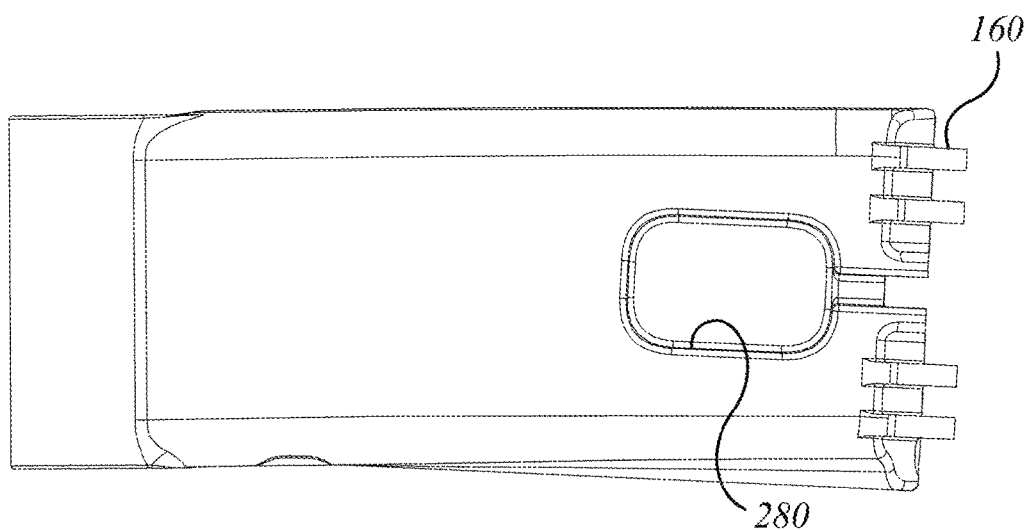
FIG. 9B is a left hand side view of the example forward frame portion of FIG. 9A.
Figure 9C:
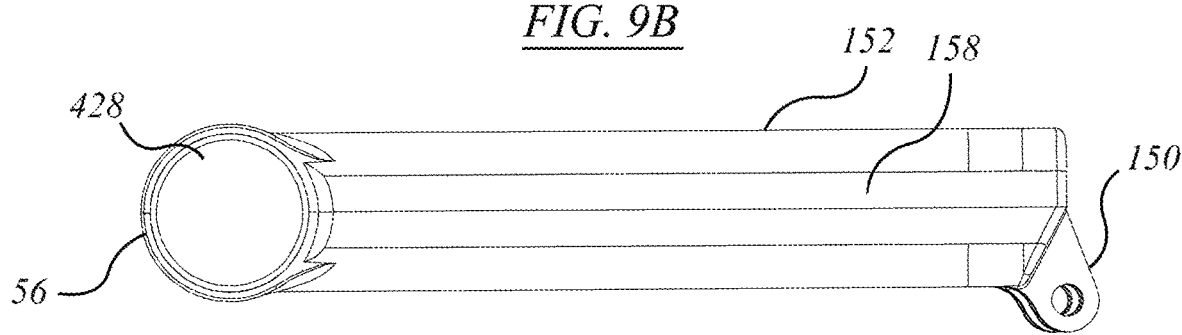
FIG. 9C is a top view of the example forward frame portion of FIG. 9A.
Figure 9D:
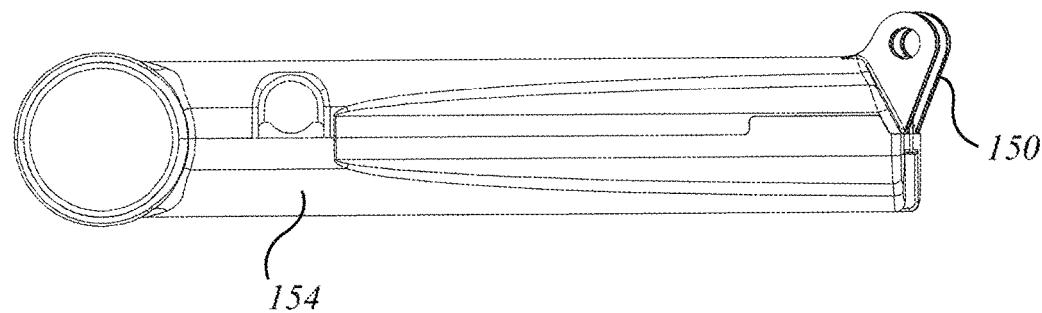
FIG. 9D is a bottom view of the example forward frame portion of FIG. 9A.
Figure 9E:
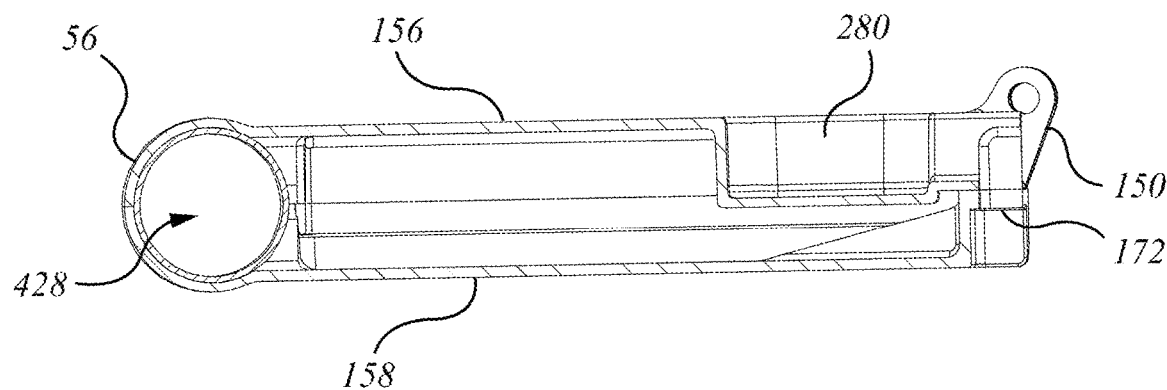
FIG. 9E is a transverse mid-sectional view of the example forward frame portion of FIG. 9A looking upward.
Figure 9F:
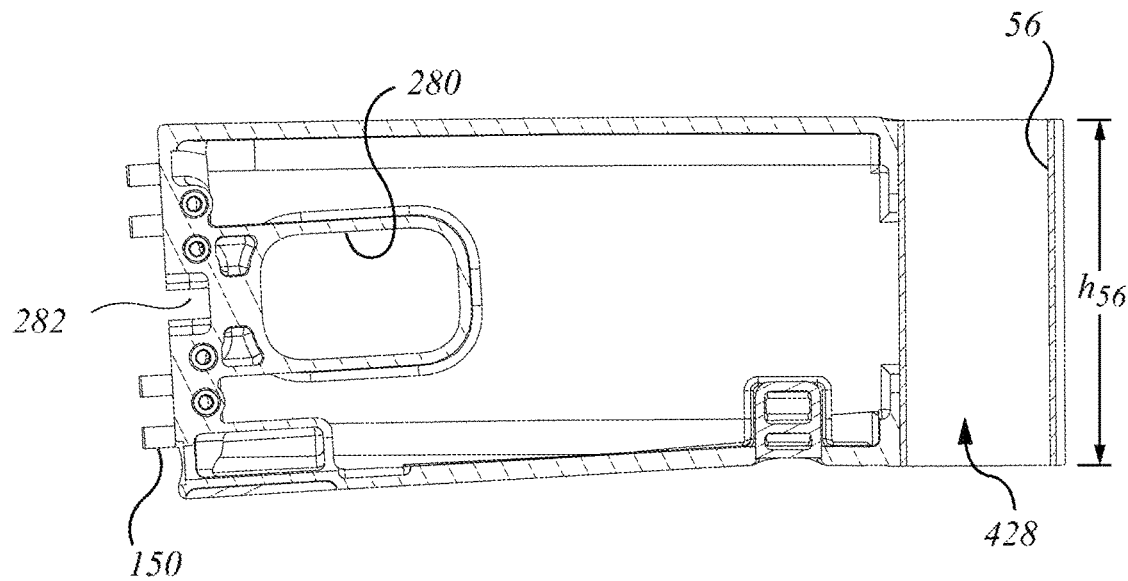
FIG. 9F is a vertical centerline section of the example forward frame portion of FIG. 9A.

In the example shown, steering shaft and arm assembly 61 includes a first or upper portion 62 (see e.g. FIG. 7A) that is foldably connected to a lower portion 64 (see e.g. FIG. 8A). Wheel 30 can be mounted to steering shaft and arm assembly 61 at the lower portion 64. Folding of the steering shaft and arm assembly 61 can occur at a third hinge 66. Steering shaft and arm assembly 61 can include a steering stem shaft 68. The steering stem shaft 68 may seat in upper and lower bearing races within head tube 56. The steering stem shaft 68 may be shaped to be movable (e.g. rotatable) within the head tube 56. In the example shown, steering stem shaft 68 is round and cylindrical.

As in the example shown, steering stem shaft 68 may be hollow. Alternatively, steering stem shaft 68 may be substantially solid. Steering stem shaft 68 has a first or an upper end 67 and a second or lower end 69. Upper end 67 can locate at the upper end of head tube 56. Second end 69 can extend downwardly from the lower end of head tube 56. Steering stem shaft 68 has an axis of rotation that is co-axial with the axis of rotation of head tube 56, such that stem shaft 68 can turn to right and left. As explained below, this turning motion may be limited by stops to prevent full 360-degree rotation.

An arm 70 can be mounted to the bottom end of steering stem shaft 68. Arm 70 can include an offset, or lateral step, or elbow, or dog-leg, or kink, or cross-piece however it may be called, to define a clearance, or accommodation 80, for front wheel 30. In a conventional bicycle, arm 70, or possibly the entirety of the steering stem assembly, would be referred to as "the forks" of the bicycle. However, in the embodiment shown, there is one arm, 70, and it has a bend in it to accommodate the wheel. It might therefore be termed a single "fork". However, a fork, by definition, requires bifurcation, i.e., at least two arms. Accordingly, the single "fork" herein will be termed an arm, 70, rather than a fork.

Arm 70 includes both the upper and lower portions 62 and 64 of steering assembly 60. In the example shown, arm 70 has a first or upper or proximal cross-piece or shoulder 72 that extends predominantly radially away from the axis or rotation of head tube 56. Arm 70 then has an upper arm 74 that extends axially away from shoulder 72 in the axial direction of the axis of head tube 56. The portion or cross-piece 72 can be joined to the bottom end of steering stem shaft 68. The connection may be a rigid connection that permits torque to pass from stem shaft 68 into arm 70.

Arm 70 also includes a lower arm 78. The lower arm 78 can be movably mounted to the upper arm 74. For instance, in the example shown, the lower arm 78 is joined to the upper arm 74 at hinge 66 (see e.g. FIG. 1D). Upper arm 74 may extend in a plane parallel to, but offset from, the axis of rotation of the steering shaft and arm assembly 61. That axis of rotation generally lies in the plane $P_{30}$ of front wheel 30. The distance of the offset is the lateral clearance distance and is greater than the lateral size of wheel 30 to that side of plane $P_{30}$. The wheel accommodation 80 may then be identified as the space that extends axially away from stem shaft 68 and cross-member or shoulder 72 next to arm 70.

Arm 70 can include a mount for front wheel 30. For example, at the distal end of arm 70 is a mounting fitting for wheel 30. The center of rotation of that fitting, or assembly, may be the centerline of the hub or axle 76 of wheel 30, identified as $C_{30}$ (see e.g. FIG. 1G). The length $L_{80}$ of accommodation 80 measured from $C_{30}$ to the near face of shoulder 72 is greater than $r_{30}$, thus permitting the wheel 30 to turn. As noted above, the third hinge, the front wheel folding hinge, 66 can be mounted at the structural interface or connection between the proximal and distal portions 74, 78 of arm 70. In some embodiments, an electric motor 82 can be mounted to drive front wheel 30 (see e.g. FIG. 1B). Motor 82 may be mounted in the hub of front wheel 30. As in the example shown, motor 82 may be co-axial with the axis of rotation of wheel 30 running through $C_{30}$. Alternatively, a motor may be mounted to the hub of rear wheel 32 or in the bottom bracket.

The components of an example stem and handle bar assembly 90 are shown in FIGS. 15A-15D. Stem and handle bar assembly 90 can be mounted within the opposite end of head tube 56. Stem and handle bar assembly 90 generally includes a handle bar stem 92 and a handle bar cross-member 94. Handle bar cross-member 94 may define the handle bars that are grasped by a user of the vehicle 20.

Handle bar stem 92 can seat within steering stem shaft 68 within head tube 56. Handle bar stem 92 may be concentrically seated within shaft 68. Handle bar stem 92 may be telescopically collapsible within shaft 68. Handle bar stem 92 may translate in linear displacement along the axis of head tube 56. Handle bar assembly 90 also includes a cross-member 94 that mounts to the top, or exposed, head end of stem 92.

Immediately above the upper margin of head tube 56, the steering assembly 60 can include a head fitting 84 can be provided as a retainer that allows the steering shaft 68 to turn relative to head tube 56. The head fitting 84 can also prevent shaft assembly 68 from falling out of head tube 56. Fitting 84 can include a circumferential groove. Fitting 84 can also include a steering assembly clamp 86. The root of the circumferential groove can include an opening at front center. As shown, shaft 68 can include a rearward upper skirt slot 88. Shaft 68 may also include a forward indexing fitting 96, such as may have the form of an aperture. Handle bar stem post 92 can include a corresponding indexing fitting 98. For instance, indexing fitting 98 may have the form of a spring-loaded detent. The detent may have the form of a knob or ball or catch that springs out to engage the aperture of indexing fitting 96 when they are aligned vertically and circumferentially. The aperture of indexing fitting 96 can be located to position the handlebars at the correct height, and square to front wheel 30. When in this position, the arcuate handle or clip of circular clamp 86 can be tightened, causing slotted skirt 88 to bind on handle bar stem 92.

Middle portion 26 includes the second, or trailing, portion 48 of cross-member 44, and the leading portion 52 of rear arm 50. It can also include the bottom bracket housing assembly 100 and the seat post mount 102. It may, internally, include an accommodation 104. In various embodiments, accommodation 104 may be referred to as an electronics accommodation, a power supply accommodation, a control module accommodation, or an electronic control module accommodation.

The seat post 106 locates within seat post mount 102. The seat 108 can be mounted to the upper end of seat post 106. The seat 108 may be movably mounted to seat post 106. This movable mount may permit seat post 106 to slide such that seat post 106 is axially telescoping and adjustable. The bottom bracket housing assembly 100 can accommodate the main shaft, or crank shaft, 110, to which the main sprocket 112, cranks 114, 115 and pedals 116, 117 are mounted. In the example illustrated, the forward portion of the crank-driven transmission is identified as the forward drive assembly 118. The center or axis of rotation of the crank shaft is identified as $C_{110}$.

Figure 10A:
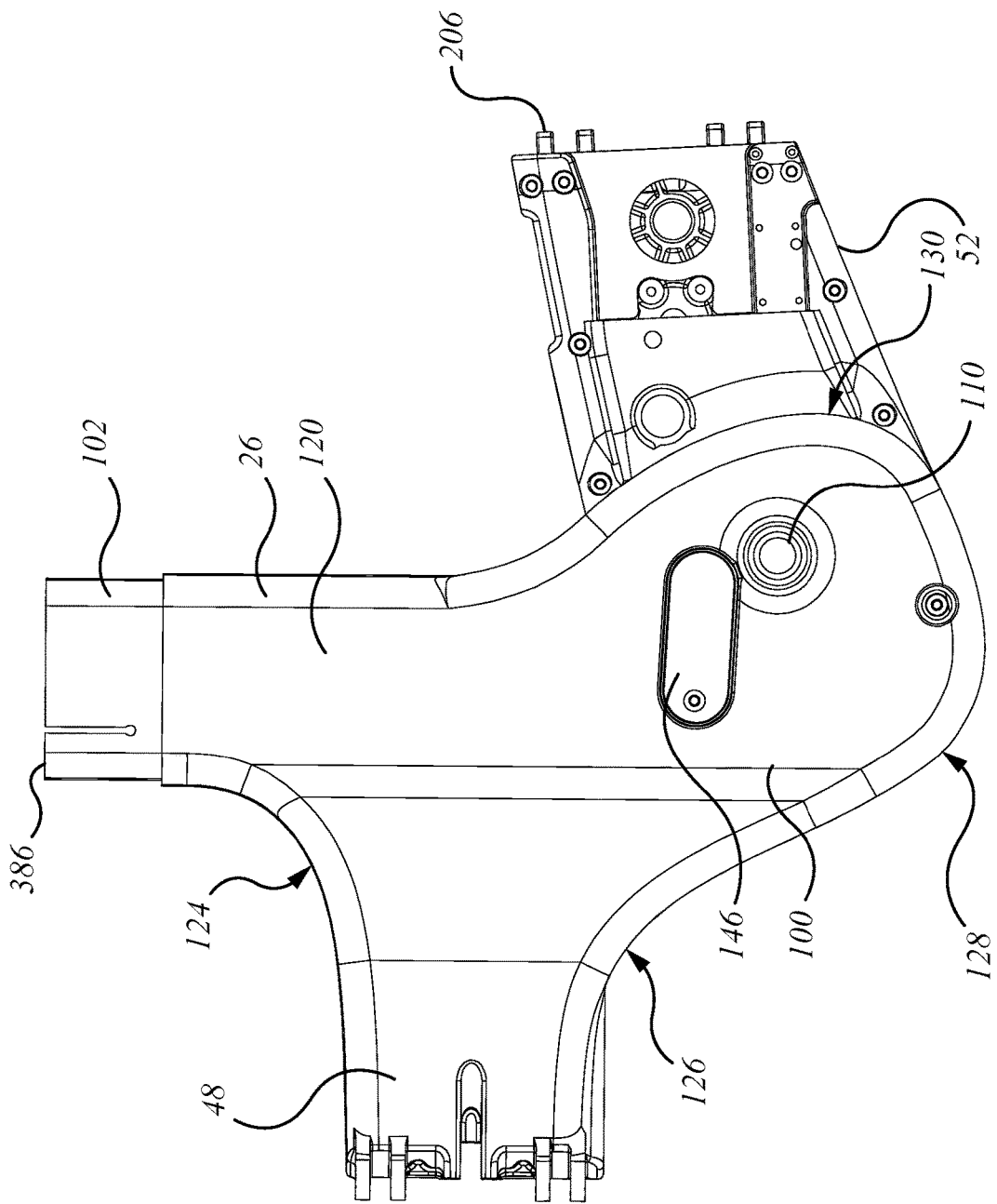
FIG. 10A is a left hand side view of an example middle portion of the frame of the example bicycle of FIG. 1A.
Figure 10B:
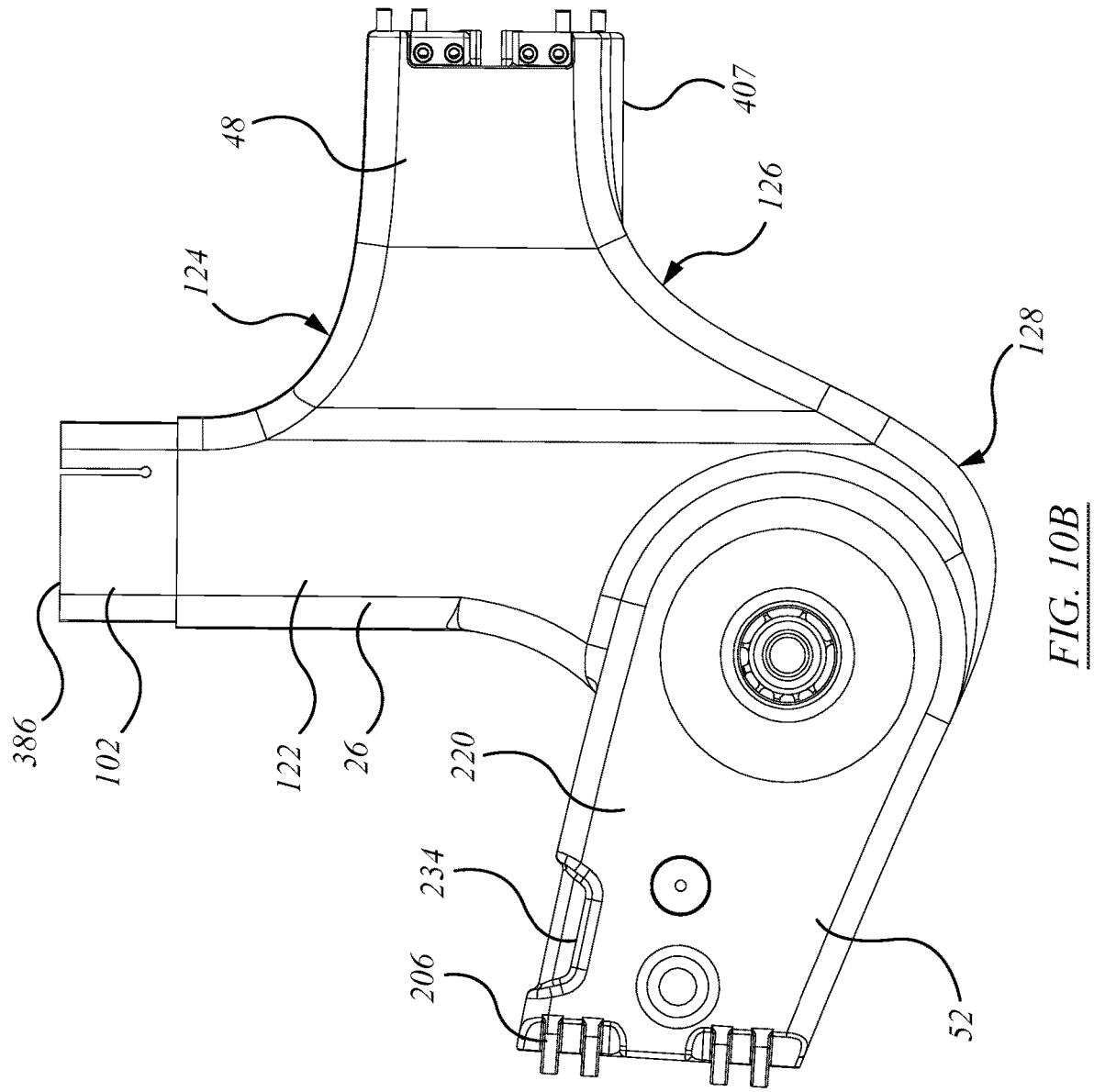
FIG. 10B is a right hand side view of the example middle frame portion of FIG. 10A.
Figure 10C:
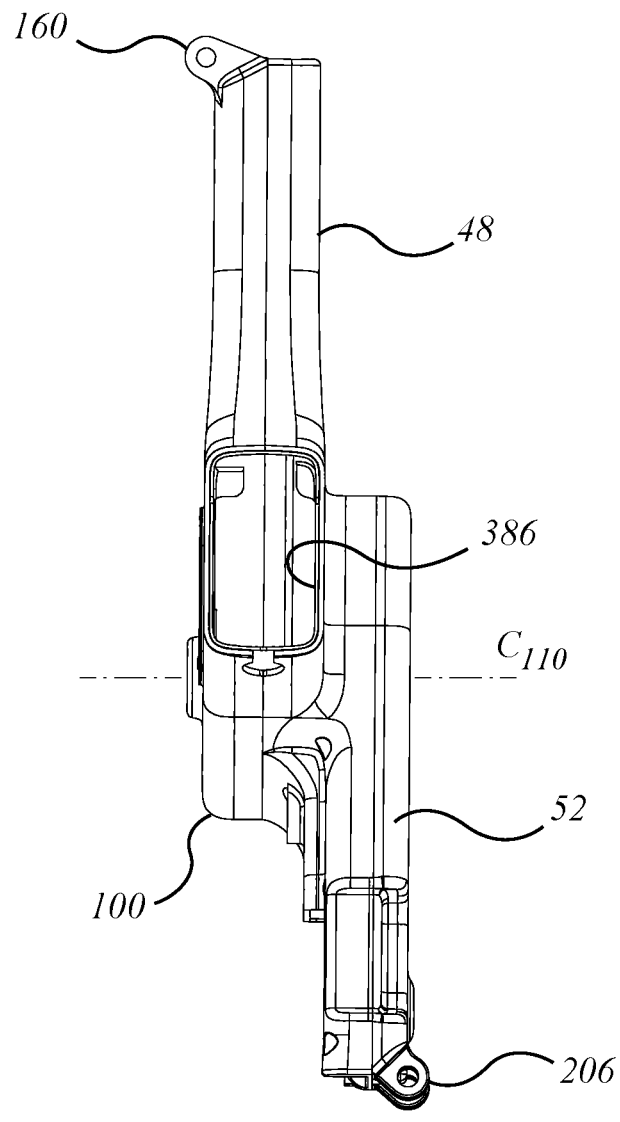
FIG. 10C is a top view of the example middle frame portion perpendicular to FIG. 10A.
Figure 10D:
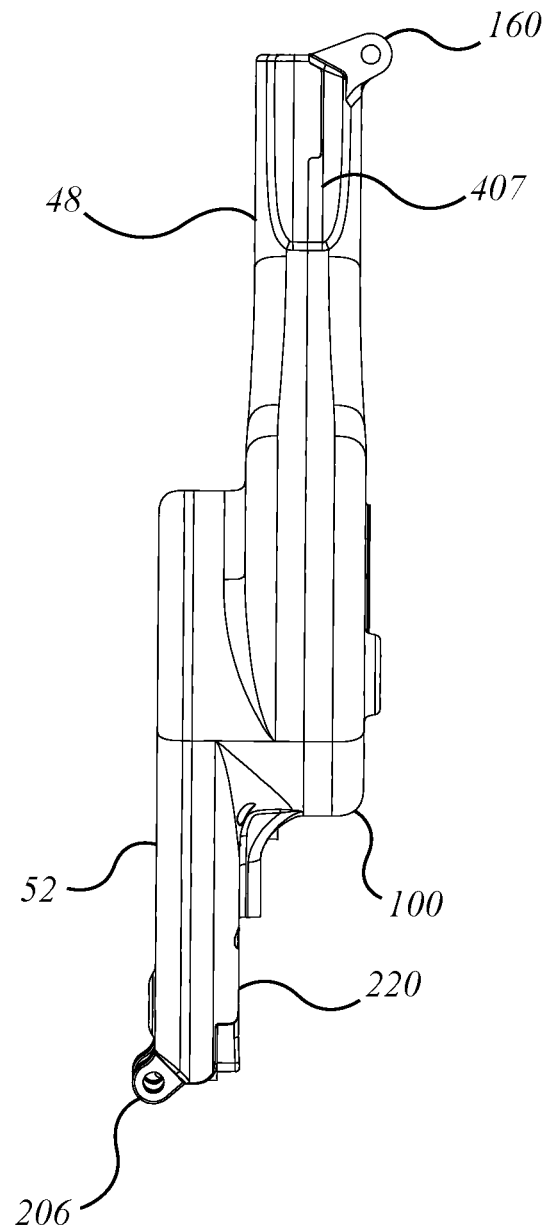
FIG. 10D is a bottom view of the example middle frame portion perpendicular to FIG. 10A.

The main or forward portion of housing assembly 100 can be formed of multiple housing portions. For example, the forward portion of housing assembly 100 may be formed of first and second, or left-hand and right-hand housing shells or halves, or covers, or portions 120 and 122 that are then joined together as in the example shown. By removing a near side cover (i.e. the externally exposed side cover), which may be identified as crank assembly housing, or crank assembly housing cover, 220, the forward elements or members or components of drive assembly 118 can be exposed. The housing shell members, or portions 120, 122 may be formed as integral units in which the several features are formed as smoothly merging elements of one part. That is, the major components or regions, or portions of middle portion 26 may merge into each other (see e.g. FIG. 10A). The cross-bar portion 48 can merge into the seat post mount portion 102 on a large smooth radius, as indicated at 124. Similarly, the cross-bar portion 48 can merge into the bottom bracket portion 100 at the point of inflection between lower cross-bar radius 126 and bottom bracket forward radius 128. Finally, as seen from the left-hand side of bicycle 20, the rearward and upward bottom bracket housing portion 130 merges into the seat post mount 102, at the point of inflection at the top of the profile of the curve of portion 130.

As may be noted, in the example shown, the rake angle $\theta_{106}$ of the seat post 106 may be approximately the same as, or similar to (+/−10 deg) the rake angle $\theta_{56}$ of the head tube 56, and therefore of the steering assembly 60. The main cross-bar 44 may be approximately square to the long axis of seat post 106. The midway distance between the centers of first hinge 34 and second hinge 36 may lie in the middle of the axial projection of seat post 106. The distance from the center of rotation of rear wheel 32 to the axis of steering of head tube 56 may be approximately equal to, and not less than, twice the diameter of rear wheel 32. The location of third hinge 66 can be less than the radius of wheel 32 from the center of rotation of wheel 32.

In the process of folding bicycle 20, the rear swing arm latch 260 can be released, and the cranks can be rotated rearwardly until they catch (at about the 2 o'clock position of the right hand crank). The pedals also can be folded flat against the cranks. Once so positioned, rear wheel 32 can be folded. Rear wheel 32 can be folded out-of-plane relative to plane $P_{20}$ (i.e., the plane in which rear wheel 32 first stood), toward the right hand side so that the side of swing arm portion 28 of frame 22 lies flat against the right side of middle portion 26 of frame 22. The hub of the rear wheel may then be positioned above crank axle 110. For example, $C_{110}$ of crank axle 110 may be located between 5:30 and 6:30 o'clock, and in the embodiment shown at, or close to, the 6' o'clock position relative to $C_{32}$ of rear wheel 32. In this position, the plane of wheel 32, $P_{32}$, has been flipped through 180 degrees to a position offset to the right of central plane $P_{20}$.

Figure 3A:
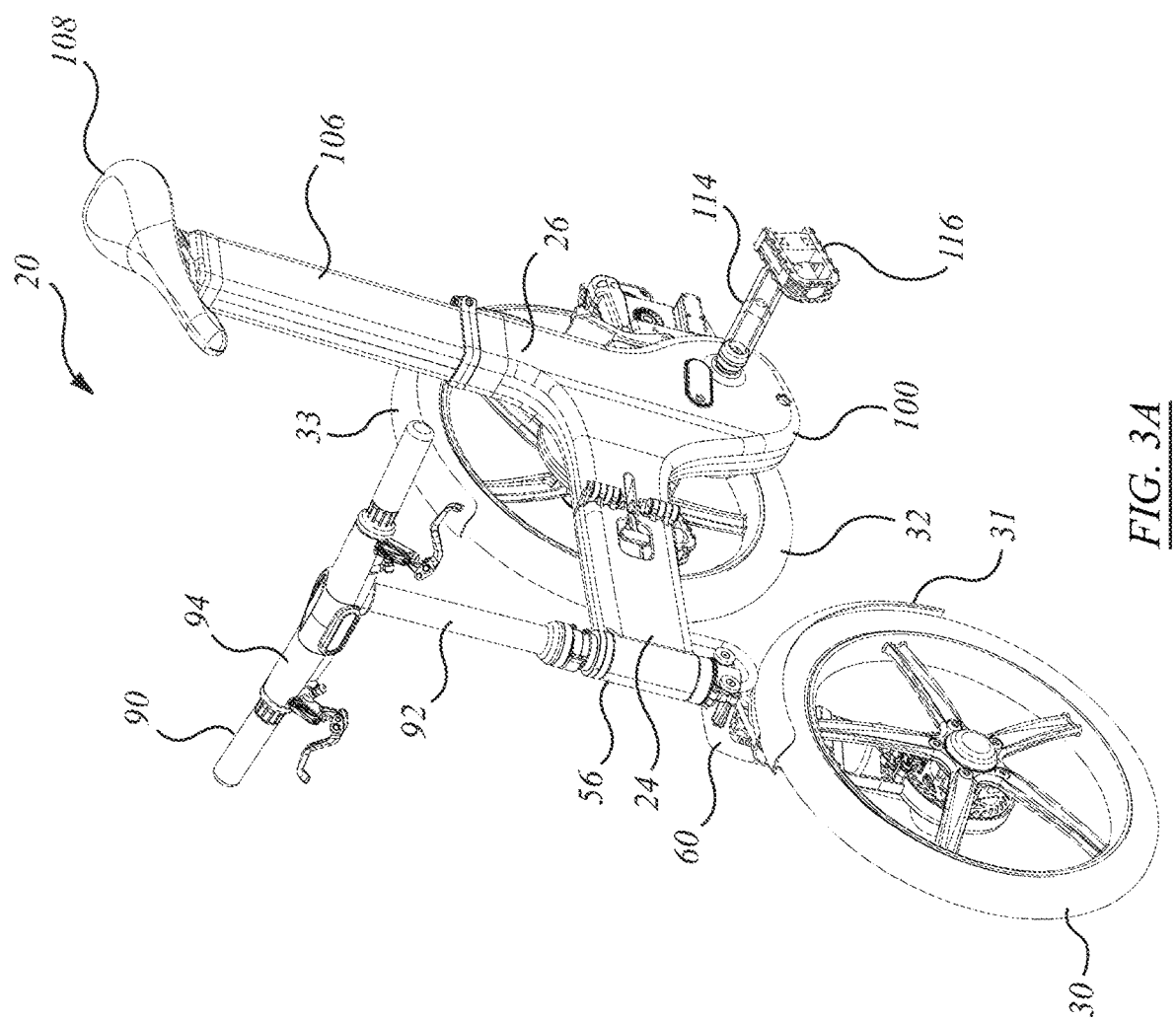
FIG. 3A shows an isometric view of a first stage of folding of the example bicycle of FIG. 1A with the rear wheel folded to lie beside the bottom bracket.
Figure 3B:
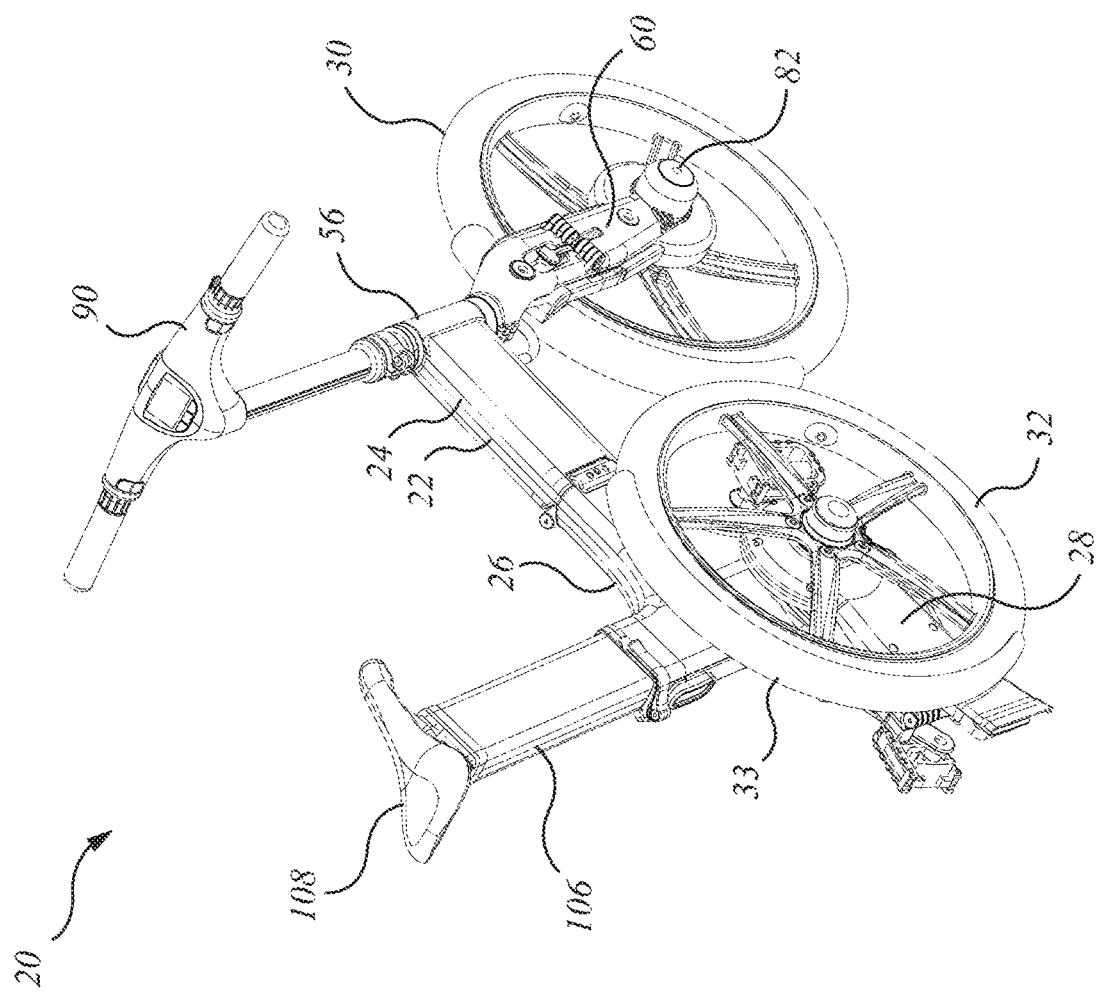
FIG. 3B shows an opposite isometric view to that of FIG. 3A.
Figure 3C:
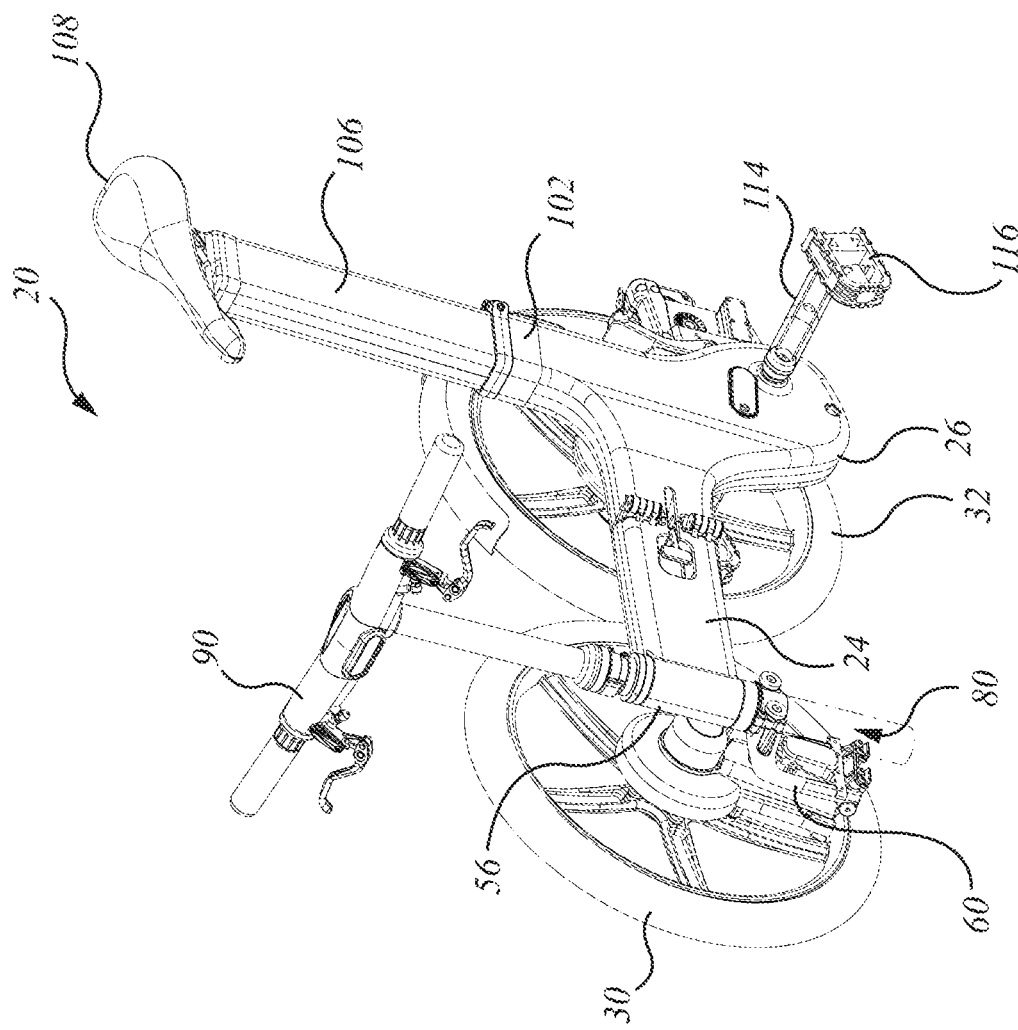
FIG. 3C shows an isometric view of a second stage of folding of the example bicycle of FIG. 3A with the front wheel folded up to lie beside the head tube.
Figure 3D:
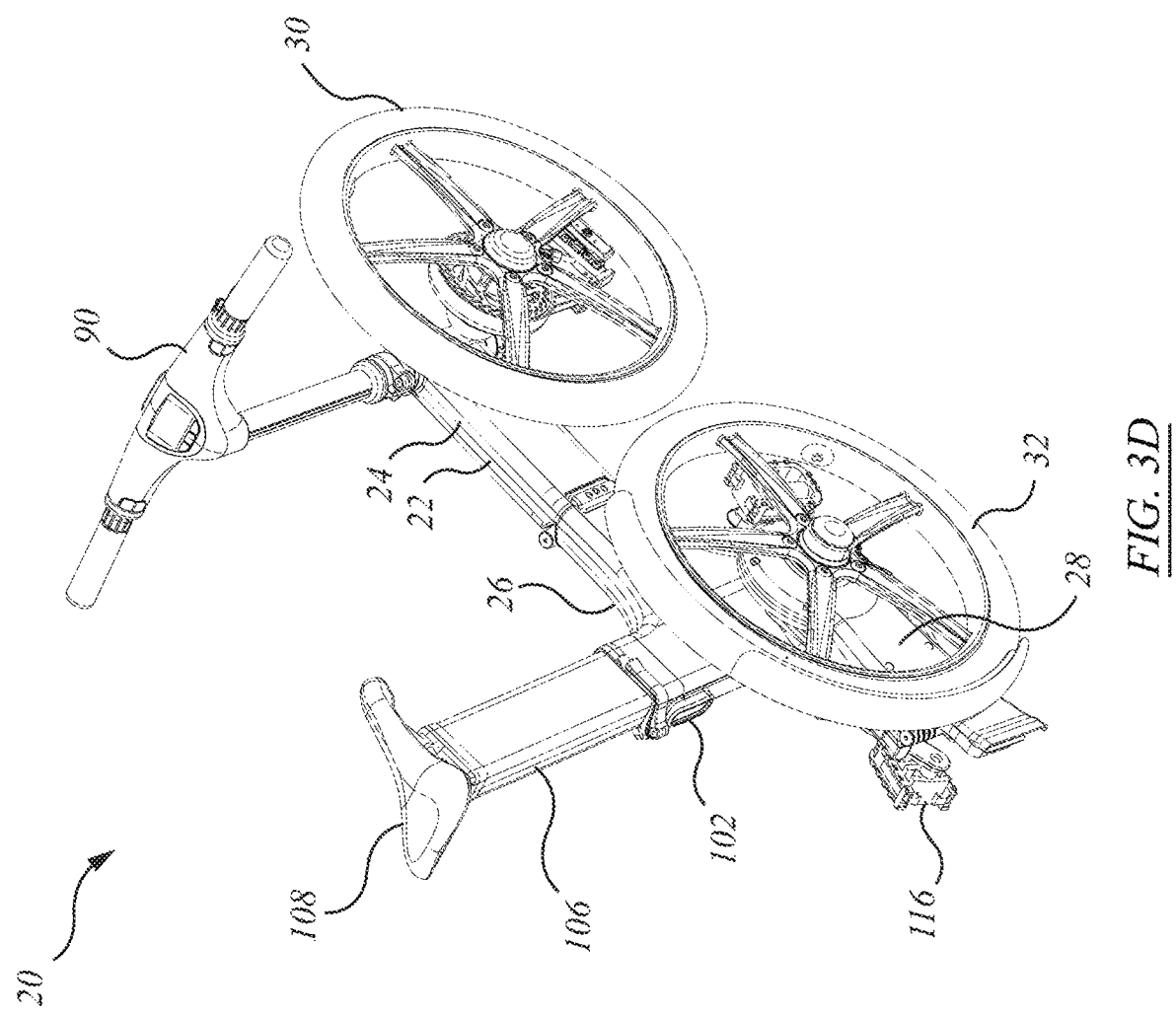
FIG. 3D shows an opposite isometric view to that of FIG. 3C.
Figure 3F:
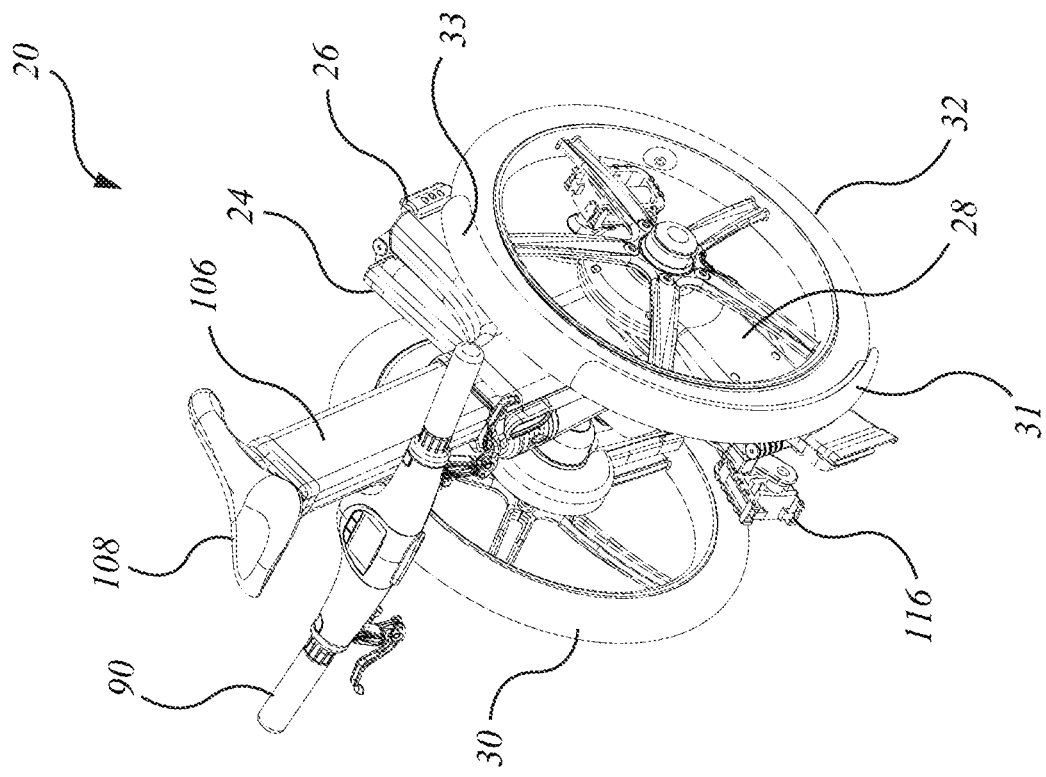
FIG. 3F shows an opposite isometric view to that of FIG. 3E.
Figure 3E:
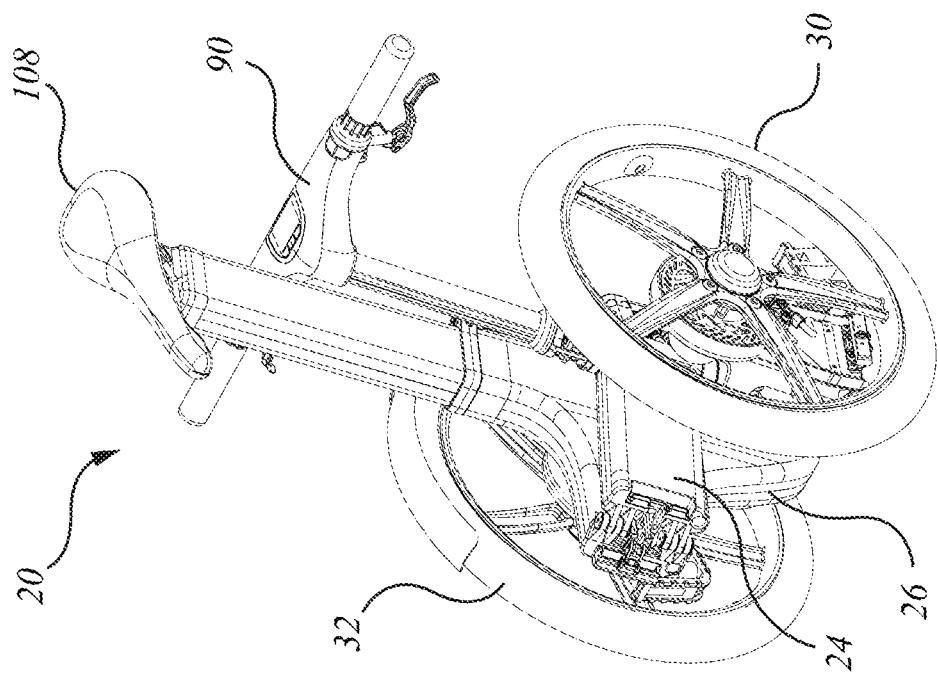
FIG. 3E shows an isometric view of a third stage of folding of the example bicycle of FIG. 3C with the cross-bar folded to place the front and rear wheels in a side-by-side relationship.
Figure 3H:
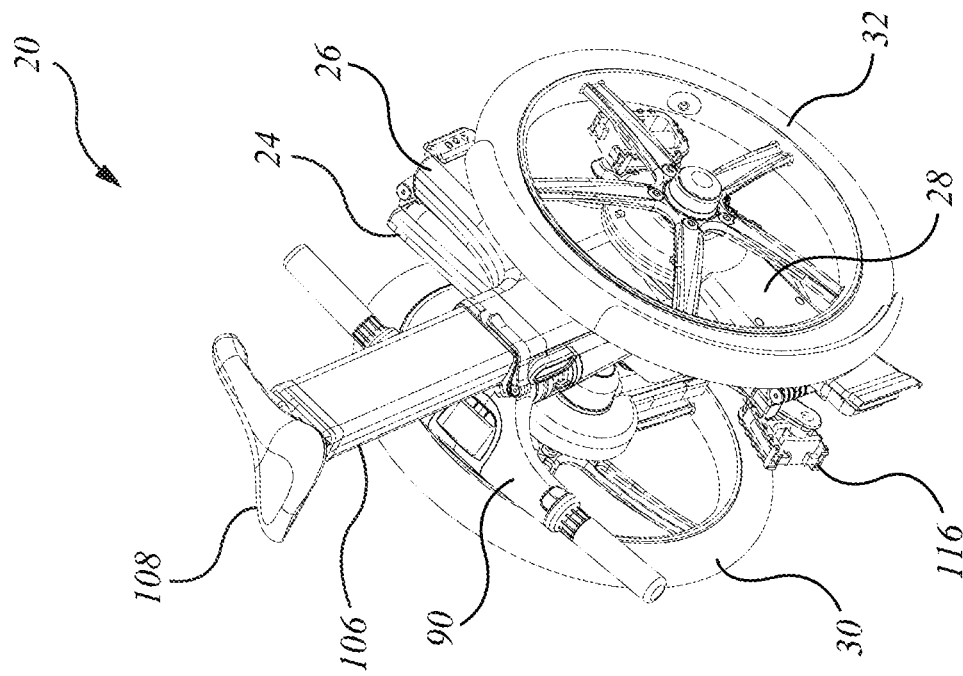
FIG. 3H shows an opposite isometric view to that of FIG. 3G.
Figure 3G:
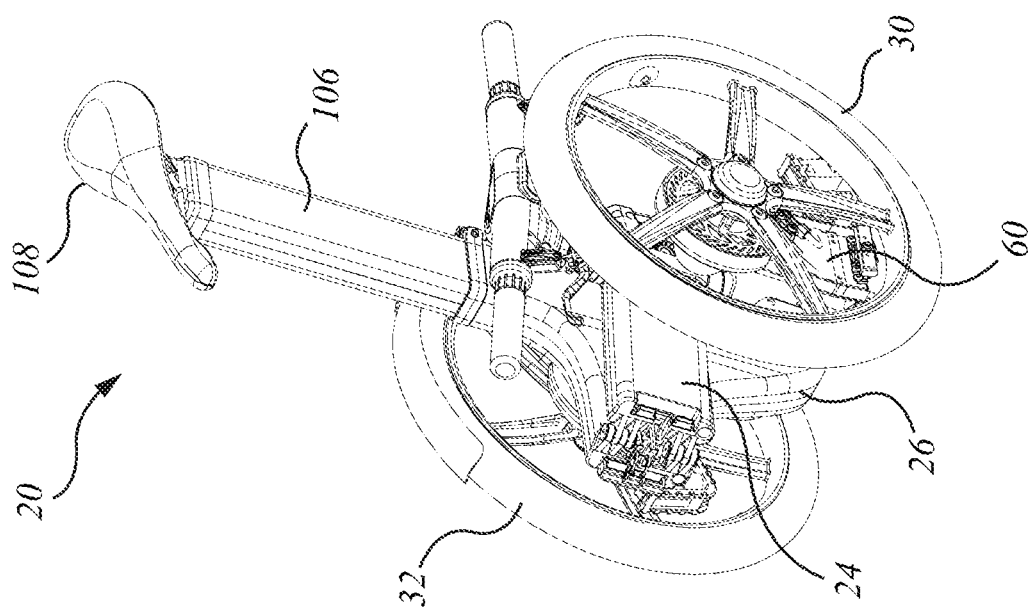
FIG. 3G is an isometric view of a fourth stage of folding of the example bicycle of FIG. 3E with the handle bars turned and telescoped into the head frame.
Figure 16A:
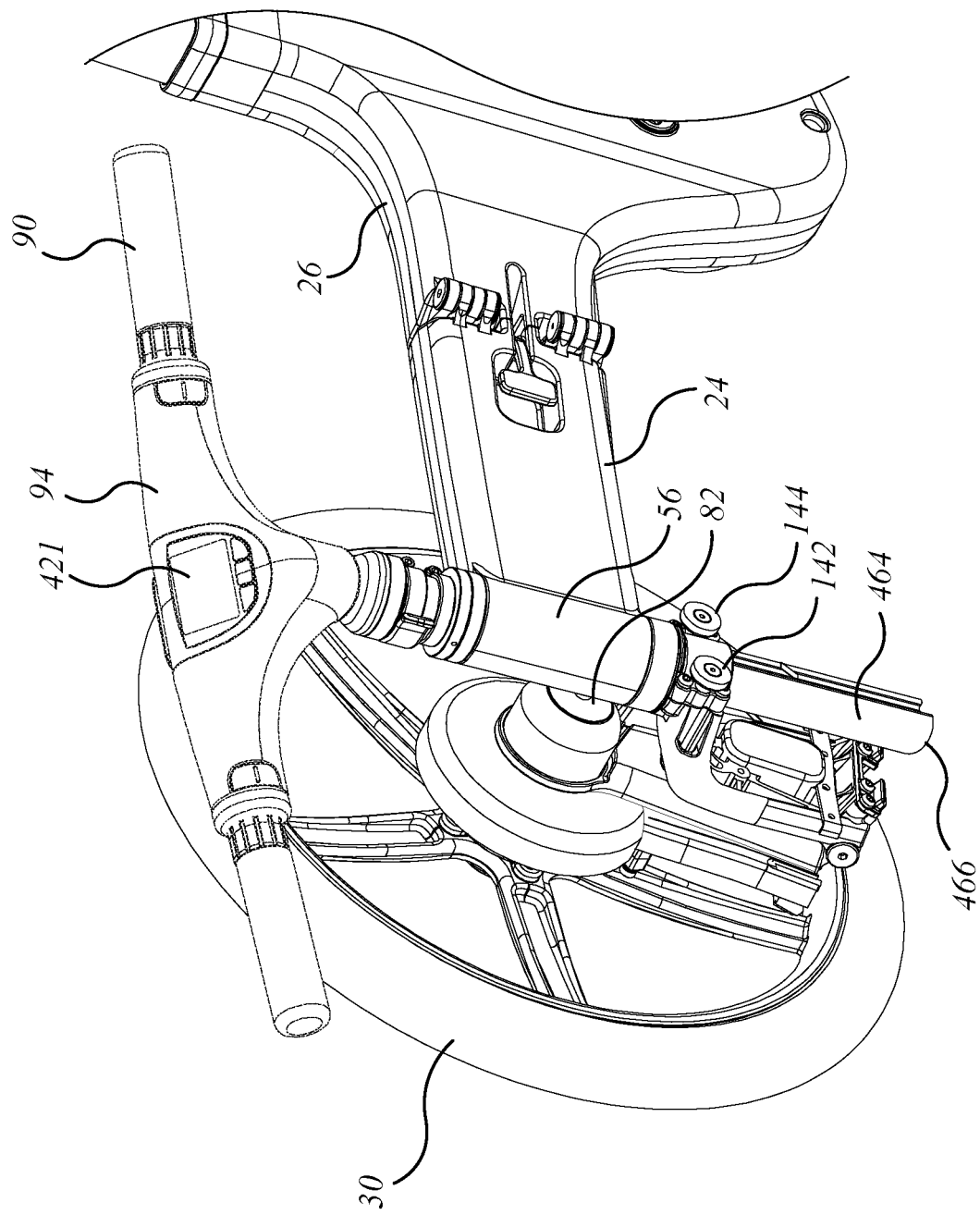
FIG. 16A is an isometric view from the front left of the example steering assembly of FIG. 15A with the front wheel folded beside the head tube.
Figure 16B:
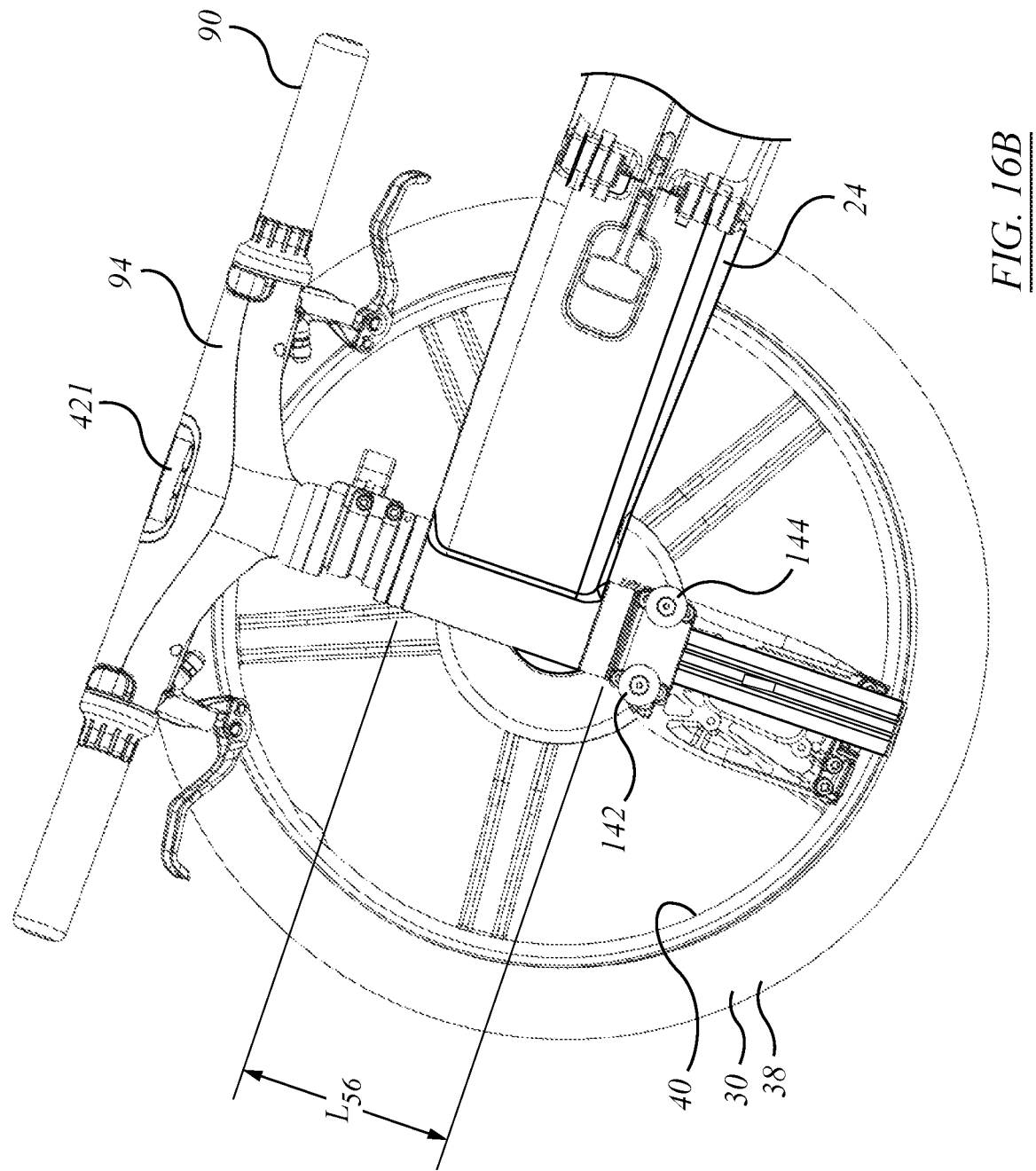
FIG. 16B is a left hand side view of the example folded steering assembly of FIG. 16A
Figure 17A:
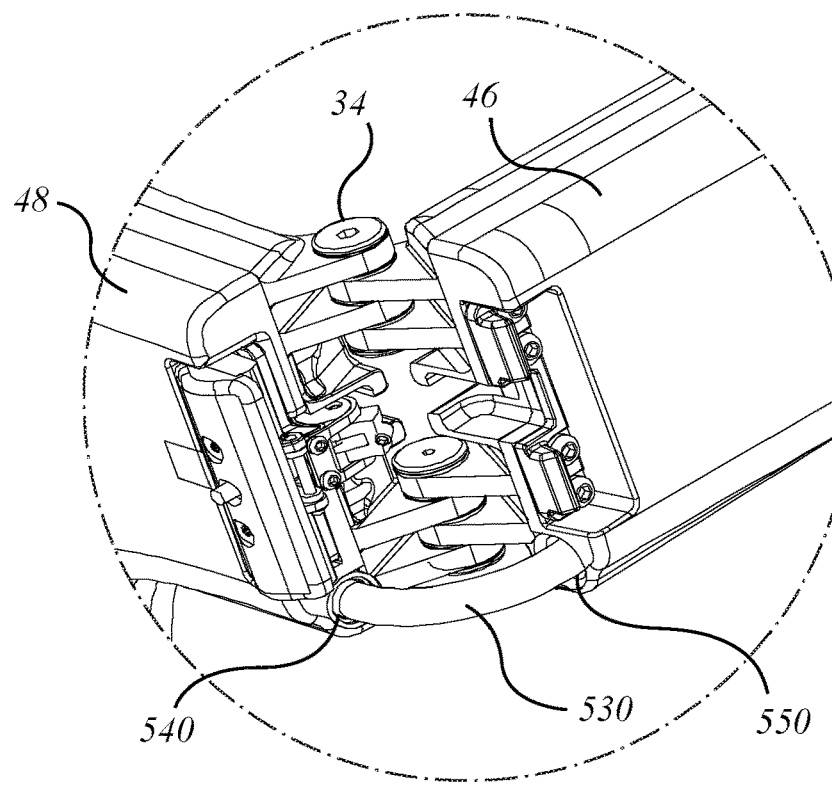
FIG. 17A is an isometric view of an example latch interface between the forward frame portion and the middle frame portion of the bicycle of FIG. 1A.
Figure 17B:
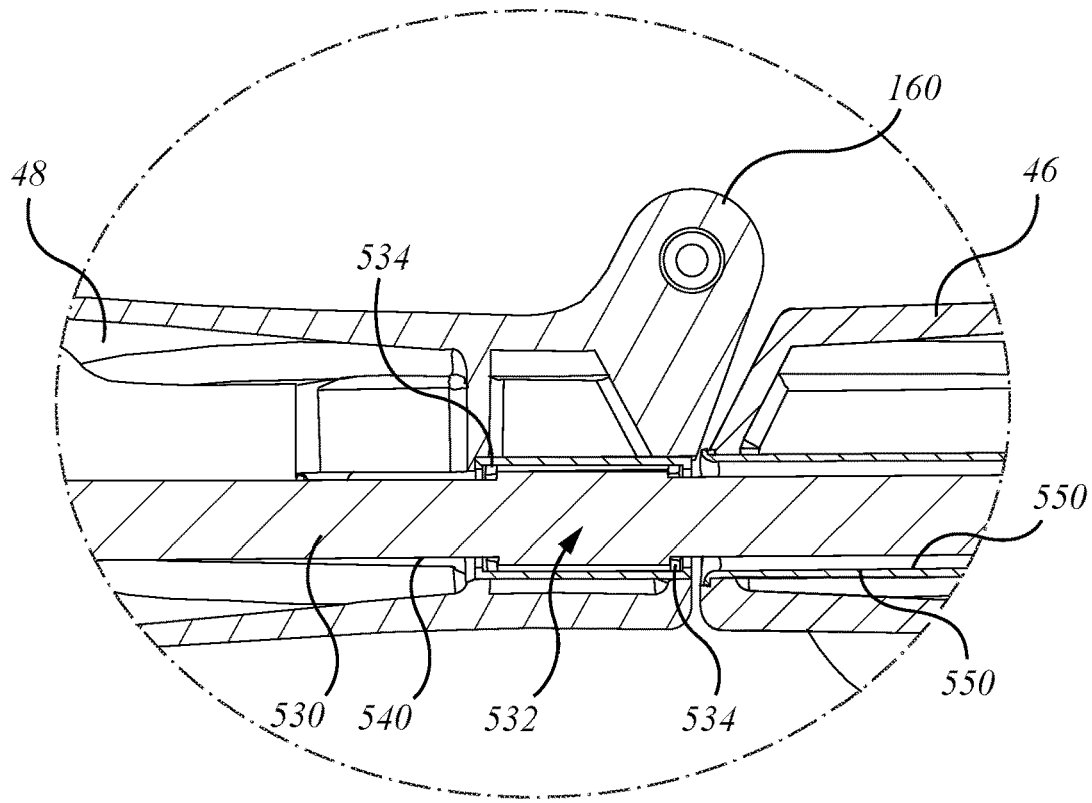
FIG. 17B is a bottom view of the example latch interface of FIG. 17A with covers removed.
Figure 17C:
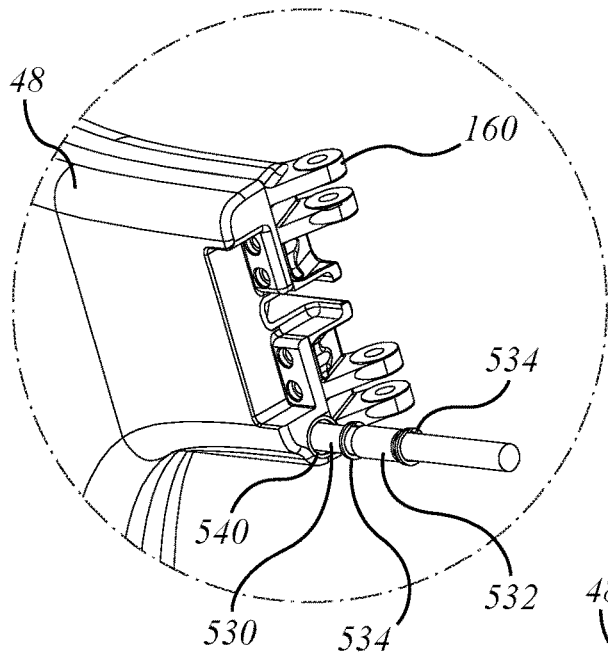
FIG. 17C is an isometric view of an example middle frame portion of the latch interface of FIG. 17A.
Figure 17D:
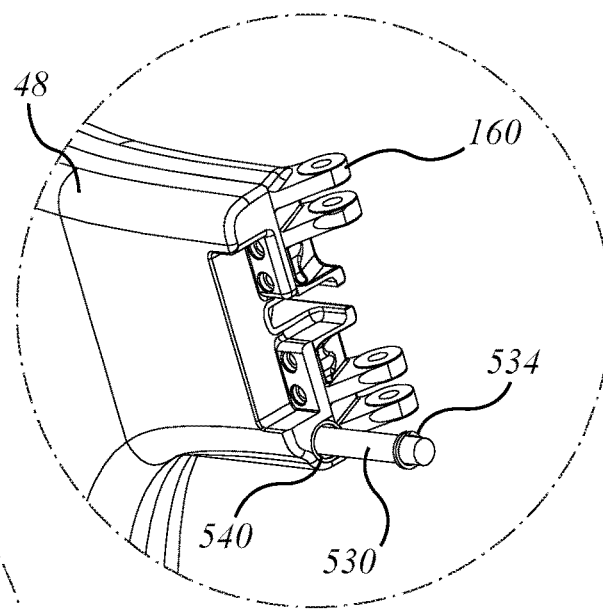
FIG. 17D is an isometric view of the example middle frame portion of the latch interface of FIG. 17A.
Figure 17E:
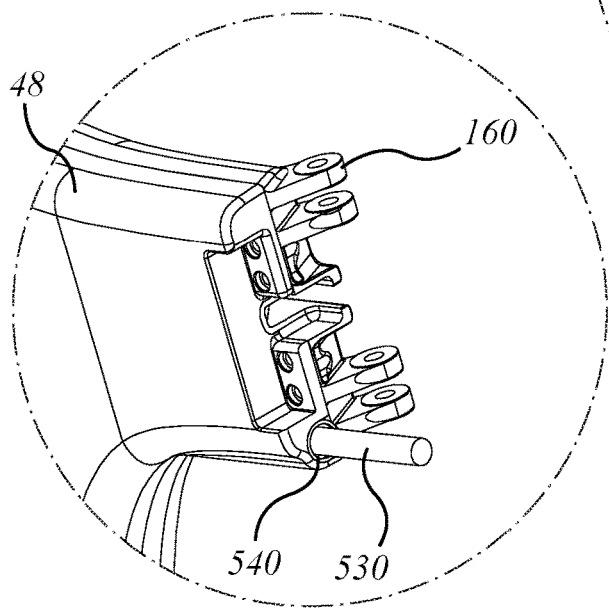
FIG. 17E is an isometric view of the example middle frame portion of the latch interface of FIG. 17A.

Optionally, the forward mud guard or fender 31 can be removed. Front mud guard 31 may then be repositioned on the rear mud guard 33 (see e.g. FIGS. 21A-21K). Then hinge 66 of arm 70 of front wheel 30 can be unlatched and folded sideways, such that the outside face of lower arm 78 is folded back against the outside face of upper arm 74, as seen in FIGS. 3C and 16A. In this folded position, the top of head tube 56 may lie within the radius of front wheel 30, as seen from the side. As shown, front wheel 30 has been folded sideways out-of-plane relative to its initial position in plane $P_{20}$. As folded, it is stepped or offset to the right of plane $P_{20}$. In this position, wheels 30 and 32 may again be co-planar, standing offset from plane $P_{20}$.

In the next step, forward main hinge 34 can be unlatched, and the entire front portion 24 of bicycle 20 can again be folded out-of-plane until the left hand side of the front portion of cross-bar 44 lies against the left side of the rearward portion. In this orientation, front wheel 30 and rear wheel 32 may be in a side-by-side relationship, laterally spaced apart, with front portion 24 and middle portion 26 located between the wheels. In this configuration, frame 22 has been folded into an S or Z shape, or may be said to be "accordion folded".

The handlebars can then be released by unclamping the clamp 86. A spring-loaded release button, such as indexing fitting or detent 98, on the stem can be pushed in to disengage from indexing fitting 96. This may permit the handlebars to be turned sideways so that the handles of handle bar assembly 90 extend fore-and-aft rather than side-to-side as when riding. Once turned sideways, stem post 92 and handle bars 94 can slide downward. When fully retracted, clamp 86 can be reset to hold the handlebar assembly 90 in place. This may provide a trailable configuration for the vehicle 20. Vehicle 20 may then be wheeled along using seat 108 as a handle.

Finally, seat post clamp 148 can be unclamped and seat post 106 can be retracted within the seat post mount 102. Seat post 106 may be moved from riding height to a telescoped position of minimum height where seat post 106 bottoms out, and re-clamped in the lowered or retracted or stored position. In some embodiments, when so folded, bicycle 20 may be wheeled along by using seat 108 as a steering handle. Alternatively, bicycle may be carried using seat 108 as a handle. When stopped, and tilted slightly backward, bicycle 20 may rest on pedal 116 or 117 which may be held in place by a crank lock.

In this example of the compact or folded position, as seen in the views of FIGS. 2A-21I, it can be seen that the axes of rotation of front wheel 30 and rear wheel 32 can be co-axial. The folding (and unfolding) can occur without removal of either front wheel 30 or rear wheel 32. If the rear wheel 32 is projected sideways, i.e., transversely, or cross-wise, in the y-direction, it can be seen that the axis of rotation $C_{110}$ of cranks 114, 115 lies within the sideways projected profile of wheel 32, and, likewise, of wheel 30. Further, all of the curve of the bottom bracket, i.e., of bottom bracket housing 100, lies within that profile. Furthermore, the majority of seat post mount 102, and also of telescoped seat post 106, can also lie within that profile. The majority of folded main cross-bar 44 is also within the profile, as is the majority of swing arm 28. The majority of the steering assembly 60 (e.g. steering shaft and arm assembly 61 and stem post 92) may also be within the profile, excepting perhaps a portion of the handle bar cross-member 94. Bicycle 20 may be returned to its deployed or in use position by reversing the steps of folding described above.

Figure 4A:
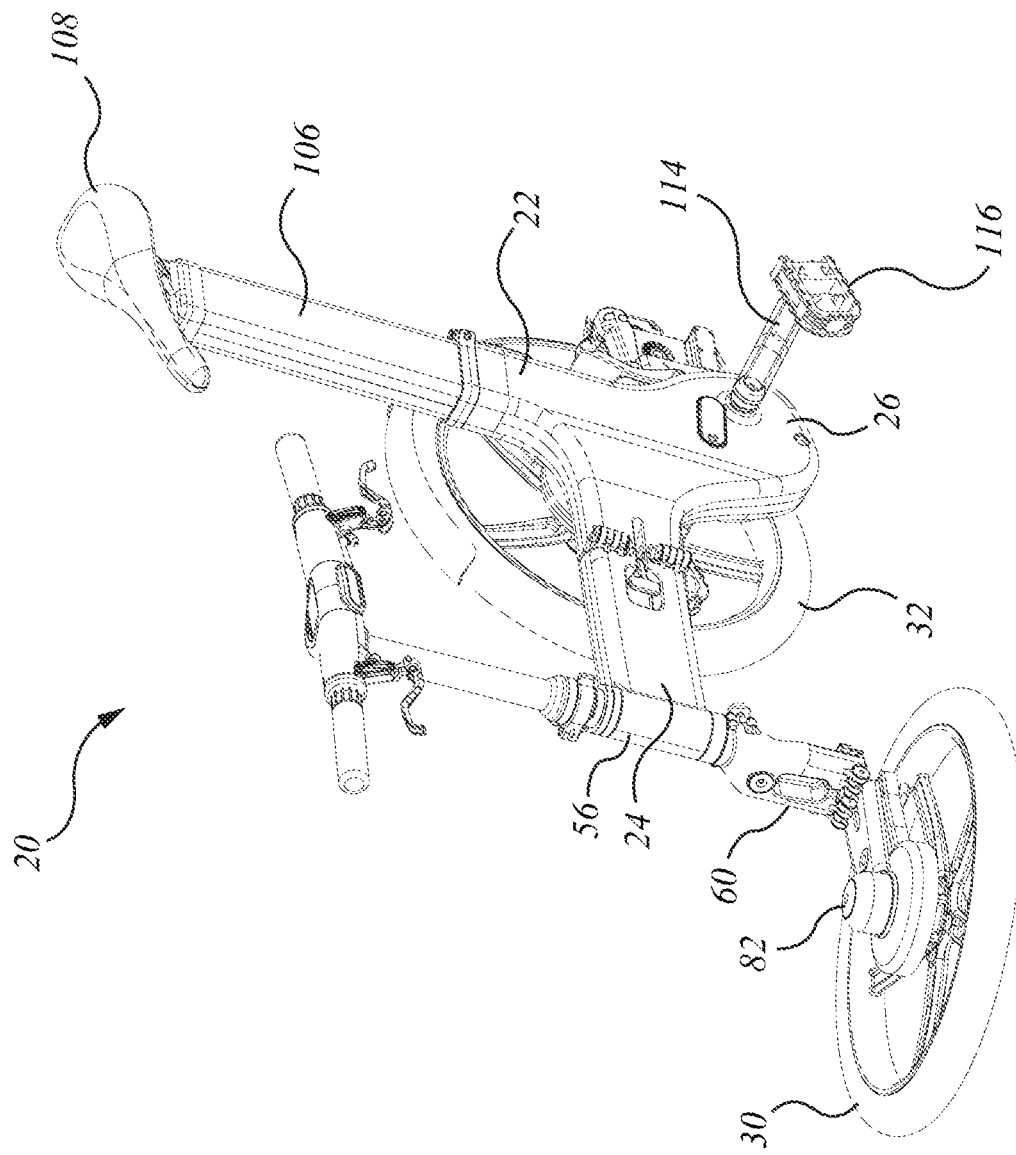
FIG. 4A shows an isometric view of an alternate form of folding of the example bicycle of FIG. 1A in which the front wheel has been half-folded sideways to lie flat on the ground, with the remainder of the bicycle standing upright.
Figure 4B:
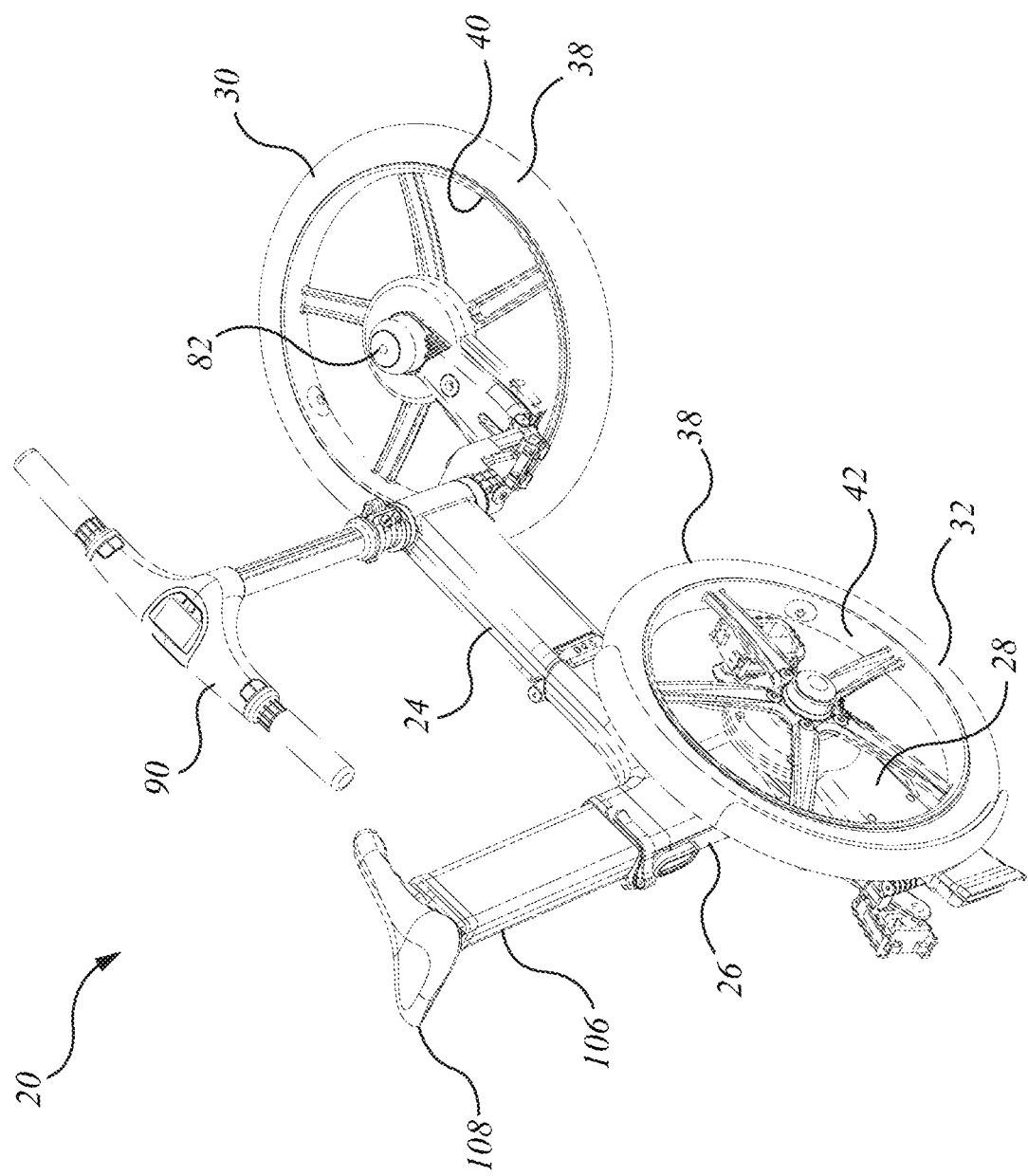
FIG. 4B is an opposite isometric view to that of FIG. 4A.

Bicycle 20 may also be folded in a different manner, as indicated in FIG. 4A and 4B. It sometimes occurs that there is no place to lean a bicycle. Yet the owner may not wish to lie the bicycle on its side, whether for fear of damage or some other reason. In those circumstances, front wheel 30 may be half-way folded out-of-plane sideways, e.g., at right angles, such that the outside (i.e., left) side of wheel 30 faces downward. Hinge 66 may then latched in this position. When bicycle 20 is placed on the ground, frame 22 remains upright. In a further variation, swing arm 28 may be folded as before, yielding a more compact configuration, yet one the still stands predominantly upright. This configuration may be referred to as a parking configuration.

In some cases, front wheel 30 may be half-way folded out-of-plane sideways, e.g., at right angles, such that the outside (i.e., left) side of wheel 30 faces downward as an intermediate folding step (e.g. between the steps shown in FIGS. 3B and 3C) described herein above.

In folding and unfolding, the major modules or components or sections of bicycle 20 can be secured and released using mating connectors, such as magnets. The mating connectors may be provided on opposing components or sections of the bicycle 20 that are brought into proximity when the bicycle 20 is folded.

For example, magnets may be arranged in pairs, each of which can include a first magnet and a second magnet. The magnets can be oriented such that they have opposite polarity, and when placed in proximity will attract each other. For example a first magnetic member, which may have the form of a first magnetic insert 132 can be mounted in lower portion 64 of front wheel arm and stem assembly 60. It has a first polarity, be it north or south. A second magnetic insert 134 can be similarly mounted to the outside or the upper arm, as indicted. It can be oriented to present the opposite polarity. When lower portion 64 is folded about third hinge 66, the two magnets, i.e., inserts 132 and 134 can be brought into proximity and even into contact, and are secured.

Similarly, on the right hand face of swing arm, or third portion 28, there can be a first magnetic member in the form of a magnetic insert 138. A corresponding second magnetic insert 140 can be mounted to middle portion 26, equidistant from second main hinge 36. When the hinge is folded, the two magnets can be brought together, as before. Finally, a pair of first magnets 142, 144 may be mounted on the outside left face of stem assembly 60 at the base of the stem. A corresponding mating second magnetic member, such as may have the form of a magnetic insert and ferromagnetic plate 146 can be mounted to the left outside face of bottom bracket housing assembly 100 above the axle penetration for the left hand crank axle end. When the first or forward frame portion 24 is folded backward on first hinge 34, the magnetic inserts can be brought together with the arm 70 lying against the bottom bracket housing forward of axle 110. In an alternate embodiment, one member of the pair may be a magnet, while the other member of the pair is a ferromagnetic plate, e.g., such as a steel or nickel alloy.

When frame 22 is moved to the unfolded position of FIG. 1A, the various components latch into place. The body of first, second, and third frame portions 24, 26, 28, and of steering assembly 60 may be made of a cast material which may be a reinforced composite, or may be a metal such as aluminum or magnesium or an alloy of either of them. For example, the material may be a magnesium alloy. In each case, the section may be hollow. Each section may be a rectangular or substantially rectangular hollow section having a set of walls that define the webs or flanges of the section. Alternatively, the sections may also include other shapes such as oval or rounded sections. The sections may match on either side of the joint or hinge.

Considering first hinge 34, the forward section may have four walls or webs or flanges such as may identified as first, second, third and fourth walls or webs, such as may be named top flange 152, bottom flange 154, left side web 156 and right side web 158. The rearward, or middle section 26 of frame 22 can include corresponding walls or webs identified as top flange 162, bottom flange 164, left side web 166 and right side web 168. At the location of the hinged joint, the margins of the corresponding sides of each of the sections cooperate to define a respective rim, or frame, or flange, or seat, or peripheral land. The two peripheral lands face each other across the joint. Along the left hand side, wall member or web 156 of forward frame member 24 has a set of hinge lugs 150, and the left side 166 of middle frame member 26 has a set of corresponding mating hinge lugs 160. The hinge lugs stand outwardly from the body of portions 24 and 26 such that the hinge line may be near, or slightly outside the plane of the adjoining wall portions. The lugs have apertures formed therethrough, and may have inserted sleeves of a harder material such as may form wear or bearing surfaces. A hinge pin 170 extends through the aligned apertures.

The assembly can include suitable washers and spacers indicated as 169.

A latch, or latch assembly, 180 can co-operate with first hinge 34. Latch assembly 180 may also be termed a release or release assembly, since it may function to latch the joint to a closed condition or position in one direction, and to release the joint to an open position or condition for folding by operation in the other direction. Latch assembly 180 can be mounted to draw together the far side web portions of the front and middle sections 24 and 26, such that, when latched, latch assembly 180 and hinge pins 170 of hinge 34 transfer loads in tension and compression across the interface, and work together as a pair to transmit bending moments, rather than individually transmitting a moment couple about the vertical axis. That is, to the extent that there is a moment couple transmitted at the latching joint where the sections meet, it is carried by a pair of forces, separated by the moment arm distance of the thickness of the section.

The trailing end of forward portion 24 and the leading end of middle portion 26 may each have a seat, or bench, or footing, for the latch fittings, shown respectively as 172 in portion 24, and 174 in portion 26. Each of footings 172, 174 can include a base wall recessed into the left side wall of the respective frame portion. The recessed base may be bordered on three sides by walls that extend outwardly toward the right, (namely toward walls 154 and 164 respectively, into which they merge), and can be open on the fourth side. The fourth side faces toward the hinge, i.e., toward the opposite part. The surface of the base wall of the bench may lie in the mid-plane of the frame member, and faces to the left. The opposite side of the end fitting, behind the respective bench, may have the form of a generally angled or chamfered (or rounded or dished) wall 175 that recedes into the opposite sidewall, be it 156 or 166, and that forms the root or base from which lugs 150, 160, are formed and extend.

A relief, socket, depression, cavity 280 can be sunk into portion 24 forward of hinge 34. This cavity may be shaped to accommodate the handle of latch assembly 180. For example, as shown the cavity may be generally rectangular and sized to accommodate the T-handle of latch assembly 180, and the end of a user's fingers. The cavity may also be provided in other, suitable shapes, and may be rounded or dished. Cavity 280 can also include another portion 282 that accommodates motion of the stem of the T-handle. As in the example shown, portion 282 may be narrower and extends in the long direction into and co-operating cavity portion 284 formed in rear portion 28. The arrangement of cavities, and latch 180, can be reversed as between front portion 24 and middle portion 26.

Latch assembly 180 has a pair of anchors, or lands, or feet, or abutments, or stops, 182, 184 that may be mounted as inserts into benches 172, 174 of front portion 24 and middle portion 26 respectively, opposite hinge 34. They may be secured with fastening hardware such as bolts. At the location of their mounting, the far walls of front portion 24 and middle portion 26 are deviated inward to a mid-section location, in the manner of a middle web to form benches 172, 174 as indicated above. Although stops 182, 184 are movable relative to each other as the front and rear sides of the joint open like jaws when the members are folded about hinge 34, they may nonetheless be thought of as being the "stationary", or passive, members of the latch. As mounted, stops 182, 184 can act as doublers, or load distributing fittings in which the high concentrated loads in the latch itself are spread into the softer structure of the respective benches, flanges and webs of portions 24 and 26. Stops 182, 184 have respective mutually engaging fingers 176 and 178 that abut each other when the hinge is closed. Latch assembly 180 also includes a moving member or moving assembly, or moving linkage that includes a first member, identified as a latch handle 186 and a second moving member, in the form of a linkage, or tension member, or pull, identified as a draw 188. Draw 188 may itself be linked to a spreader, or transport member, or plate, or carrier 189 that carries and provides backing for a claw, or closing member, or clamp or wedge, or link or retainer 190. Retainer 190 can be mounted to draw 188 through first finger 176. The hooks of fingers 176 and 178 have sides, or teeth, that engage each other back-to-back. Those parts, 176, 178 and 190 can be mutually tapered, such that the retraction of retainer 190 when the joint is closed tends to force them together, with a wedging effect that draws the mating faces of the joint tightly together. Retainer 190 can include first and second, or upper and lower capture members, or cups 191 to either side of the centerline. The inside walls of the cups are tapered to engage the tapers of the teeth in a wedging or clamping action when draw 188 is place in tension.

On the inside of the hinge fitting 182 is a cylindrical seat 192 that receives the axle or trunnions or drum or shaft 288 of handle 186, so that it may be pivoted in a rotating motion. The ends of the drum 288 are located within a harness 286 that is secured to land or abutment 182. There is slack in harness 286 such that drum 288 can move to a first position bottoming on its shoe against seat 192 in one direction, and then move away and lift way from seat 192 until stopped by harness 286 in the other direction. The harness 286 can retain the handle 186 in place permitting only axial movement of handle 186. The trunnions have, or drum or shaft or axles has, an eccentric, or a shaft, or throw, or pin 194 that is mounted eccentrically relative to the axis of rotation of the trunnions more generally. Draw 188 has a lost-motion slot 196 that seats about pin 194. As handle 186 is moved, pin 194 is displaced trough an arc that changes the distance between pin 194 and the seats or stops 182, 184. When the lever is open, that distance is shortest, releasing draw 188 from stops 182, 184. When the lever is closed, the movement of pin 194 is effectively that of a cam that forces the teeth of draw 188 to engage, and tighten, stops 182, 184. As handle 186 moves toward the closed position, pin 194 passes through an over-center locking condition, and handle 186 is then urged by the over-center to its closed position. Cavity 280 defines a storage, or resting, or closed position, accommodation for handle 186 such that its grip 198, which may be a T-grip, is either flush with, or slightly shy of, the outside face of wall 164. There is sufficient room in that accommodation for a user's fingers to pull up on the T-grip to release the over-center lock and to permit the structure to fold. Corresponding accommodation, rebate, pocket, relief or recess 280 in the adjacent right wall 164 of first portion 24 permits the handle to move to its fully rotated position.

Figure 6A:
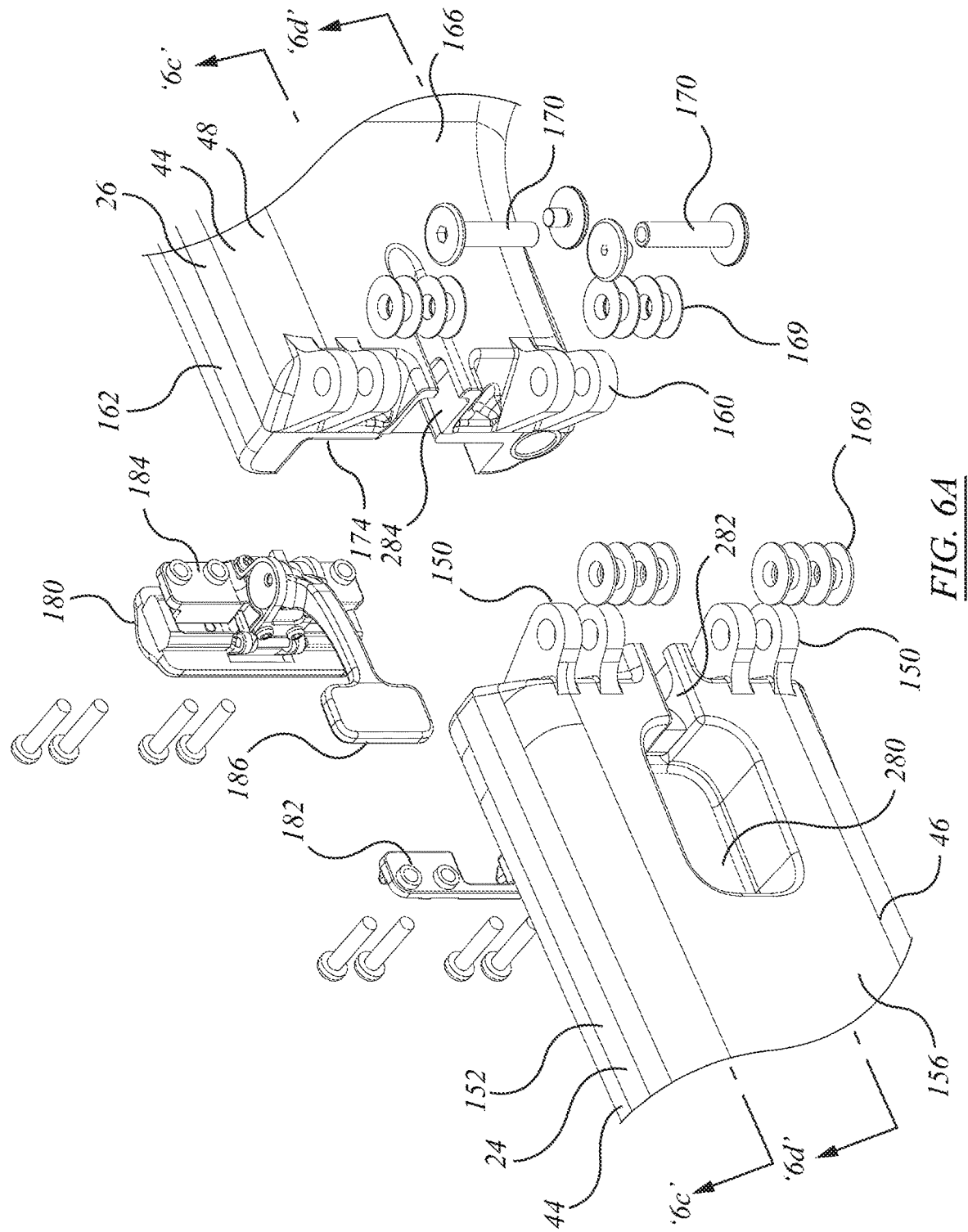
FIG. 6A is an exploded view of an example latch interface between the forward frame portion and the middle frame portion of the example bicycle of FIG. 1A.
Figure 6B:
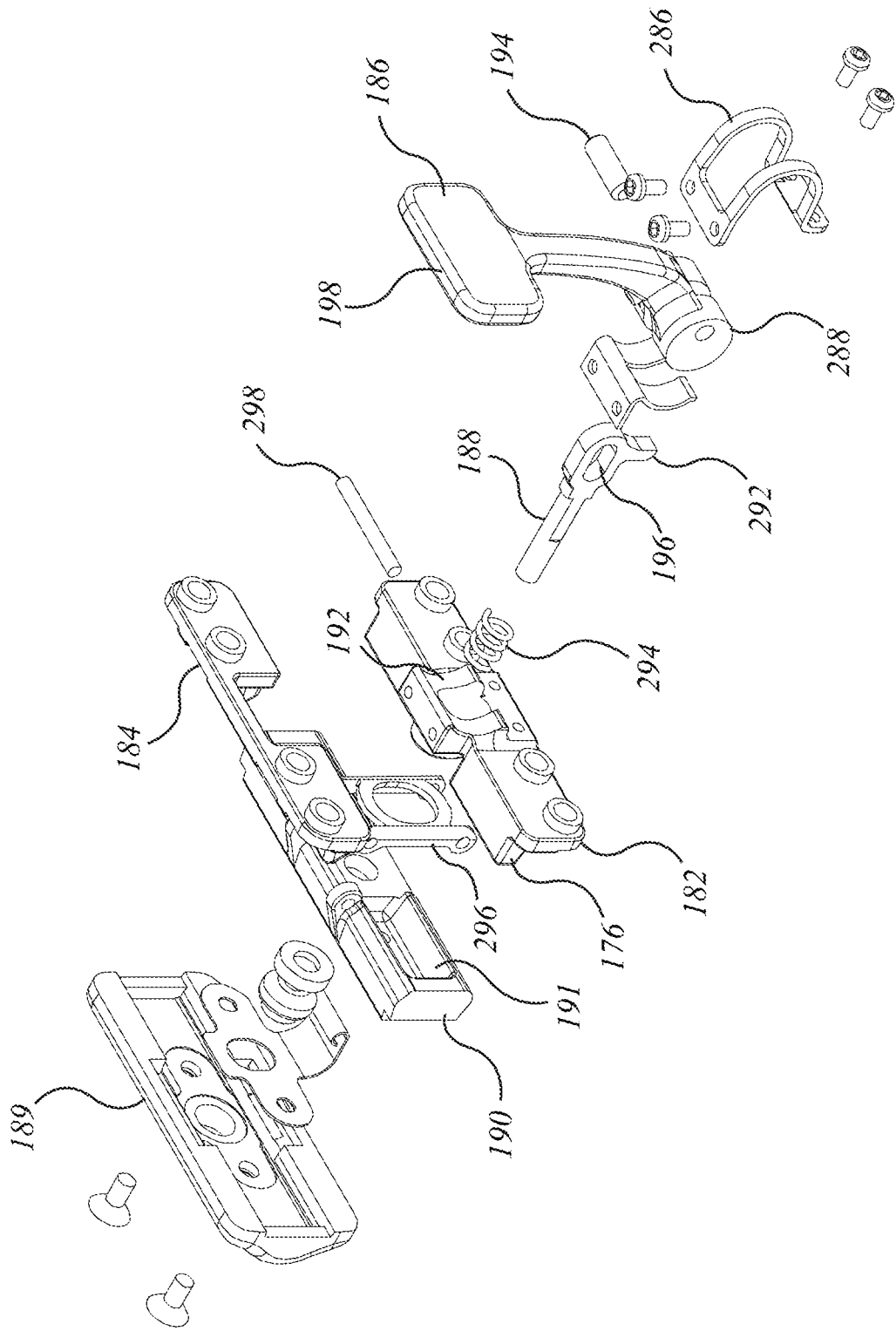
FIG. 6B is an exploded view of the latch of the example latch interface of FIG. 6A.
Figure 6E:
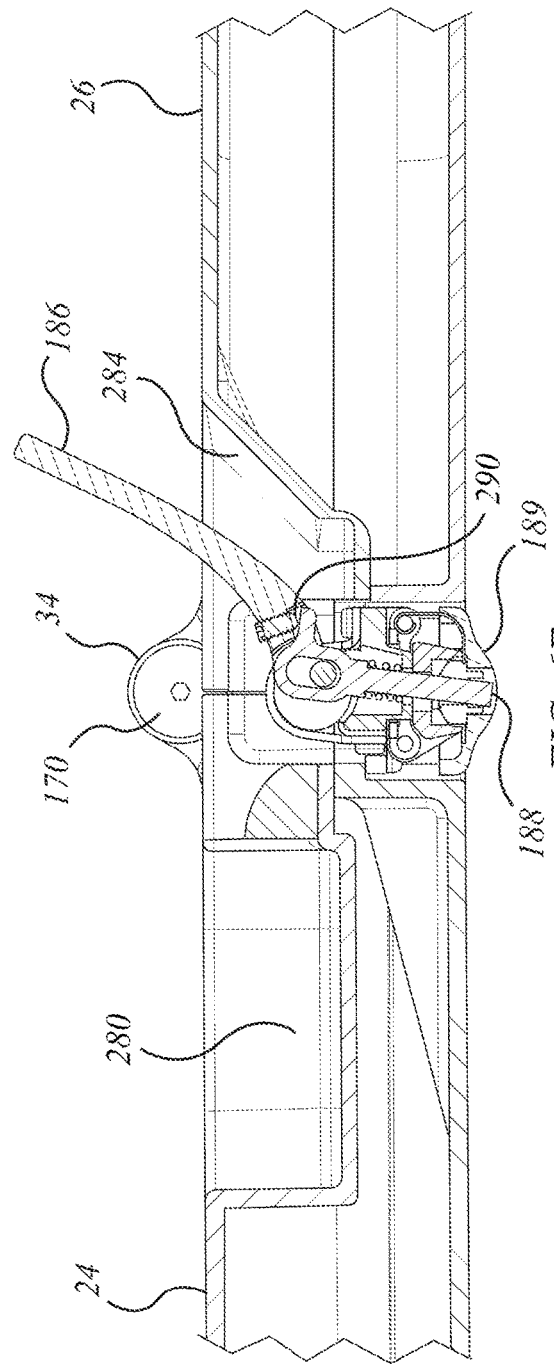
FIG. 6E is the same cross-section as FIG. 6C with the handle in a neutral position.
Figure 6F:
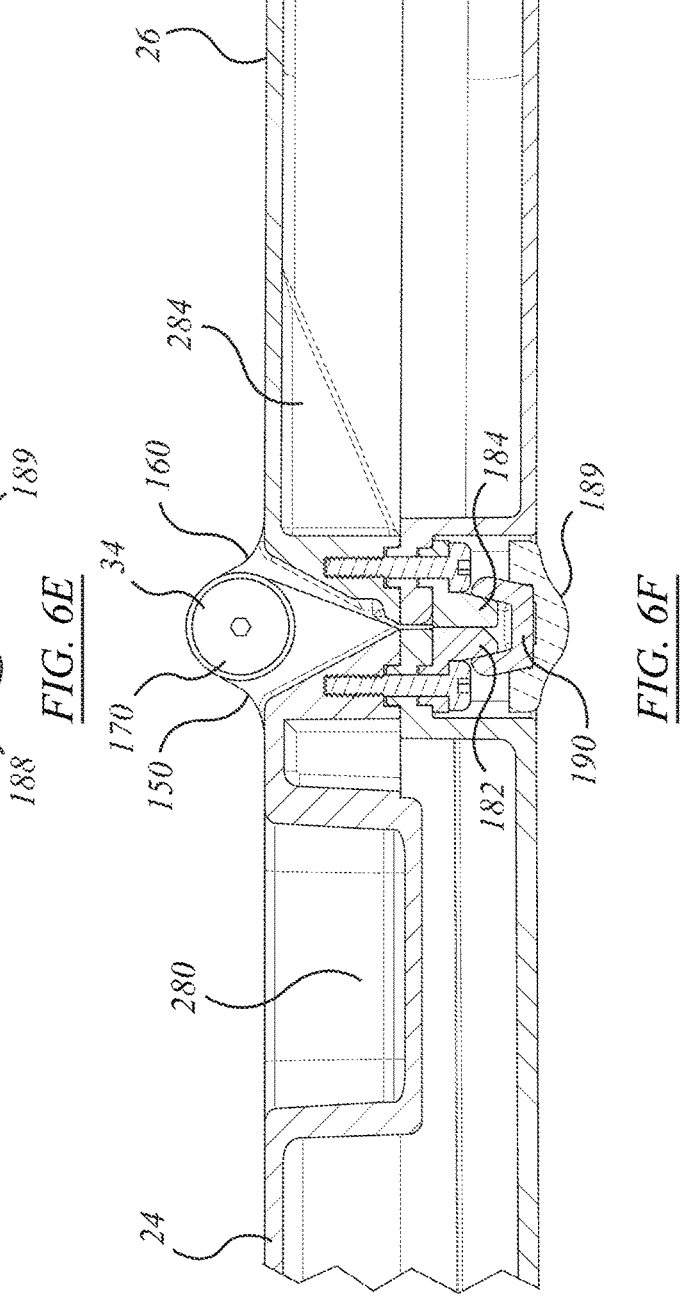
FIG. 6F is the same cross-section as FIG. 6D with the handle in the neutral position.
Figure 6G:
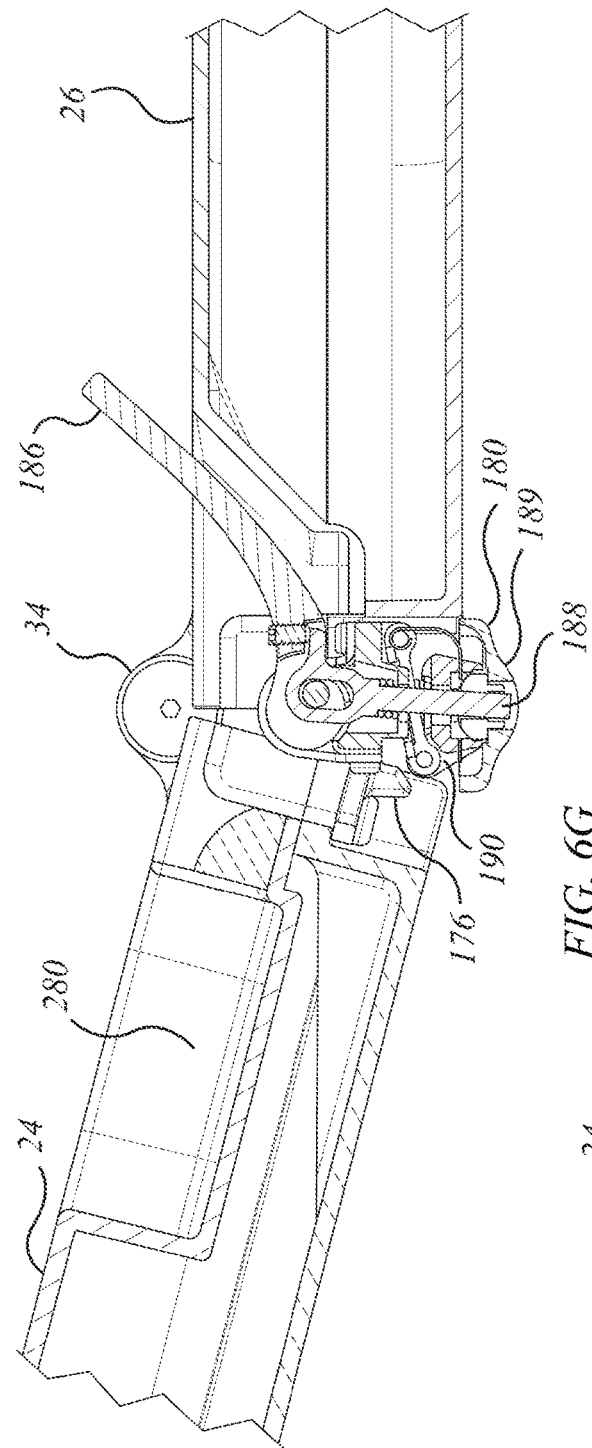
FIG. 6G is the cross-section of FIG. 6C with the handle in the fully deflected position.
Figure 6H:
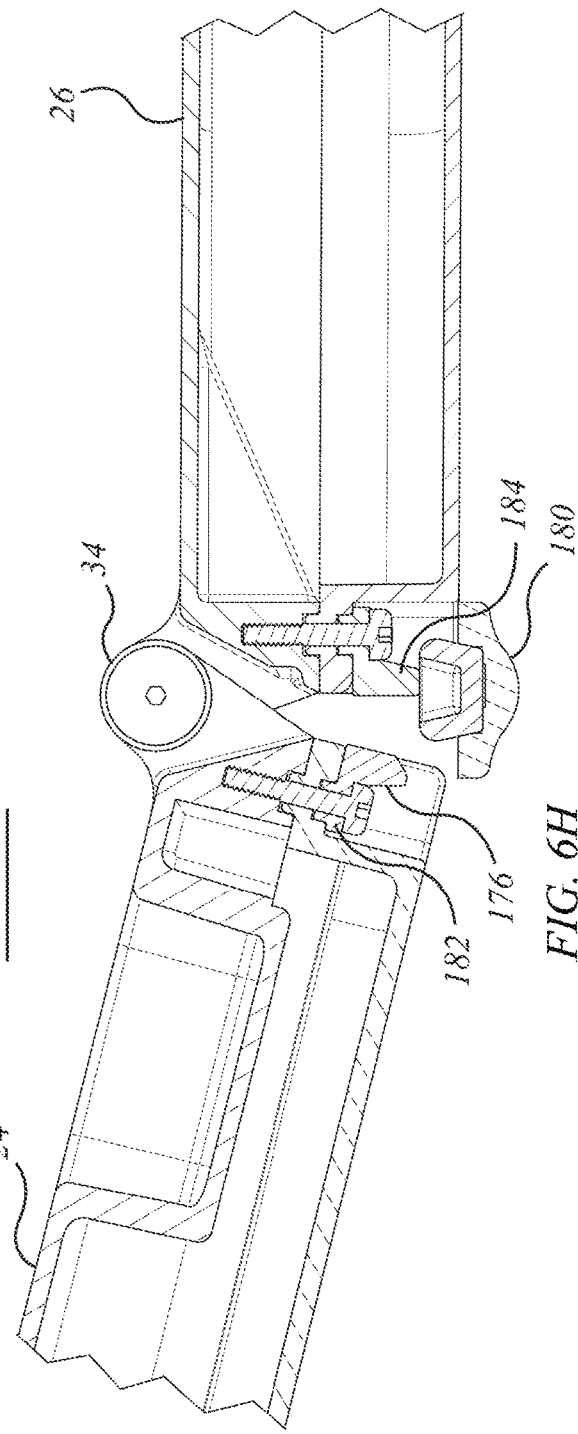
FIG. 6H is the cross-section of FIG. 6D with the handle in the fully deflected position.
Figure 6I:
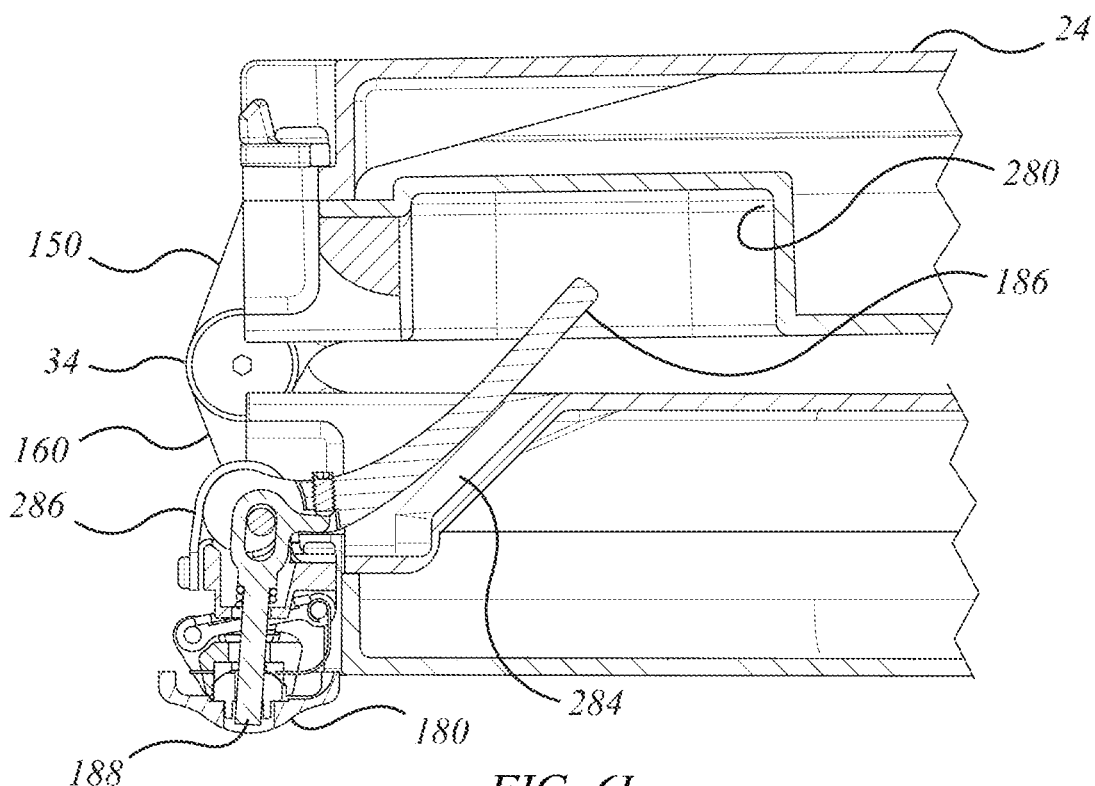
FIG. 6I is the same cross-section as in FIG. 6C with the forward portion folded.
Figure 6J:
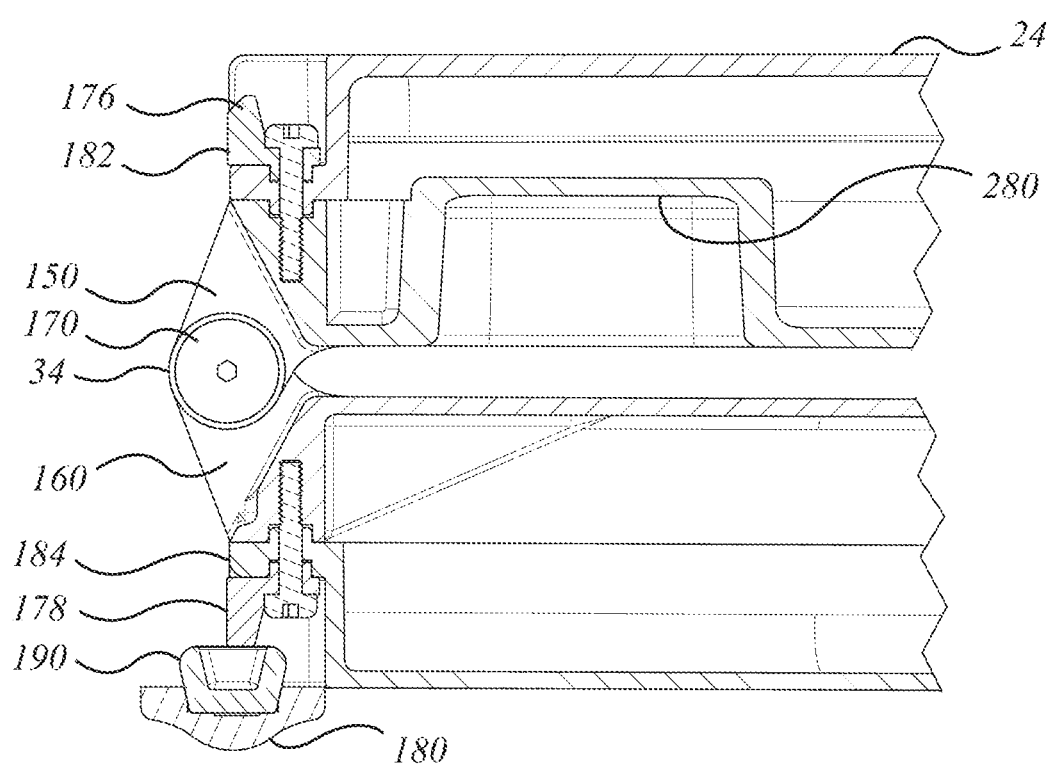
FIG. 6J is the same cross-section as in FIG. 6D as folded.

Moving in the other direction, when it is time to release latch 180 and open hinge 34, the T-handle can be lifted away from the locked position seen in FIG. 6C to the neutral, unlocked position of FIG. 6E. In this position, indexing member 290 of handle 186 is brought into contact with the mating indexing member, or finger 292 of draw 188. In this position, hinge 34 is still held latched by the friction between the tapers as draw 188 is biased to a retracted position by its return spring 294, such that the lost motion of the slot is behind pin 194. In FIG. 6G, handle 186 has been further advanced, pushing finger 292 forward, and moving draw 188 forward through the range of lost motion. When it reaches the farthest point of travel, as in FIG. 6G, draw 188 is in compression, as a push-rod, or strut, and it pops carrier 189 and claw 190 off fingers 176, 178. When thus freed, forward portion 24 is able to pivot on hinge 34 relative to middle portion 26, as seen initially in FIG. 6G, and fully pivoted to the folded position in FIG. 6I. When in the fully open position of hinge 34, the T-grip of handle 186 locates in cavity 280, which has swung into place behind it. Thus, the T-handle has an accommodation in both the open and closed positions that does not interfere with either folding or riding of bicycle 20. In this position, return spring 294 biases drum 288 to take up all of the slack in harness 286. When that is done, spring 294 continues to urge carrier 189 away. However, since abutment 182 is fixed, only abutment 184 can pivot on its arm 296 and pin 298. This causes the tilted or cocked position seen in FIG. 6I, awaiting the return of finger 178. When finger 178 returns, its chamfered end encounters the opposed engaging chamfer of claw 190, causing it momentarily to deflect to admit finger 178.

Further engagement of handle 186 draws latch 180 closed, as described above. When closing motion occurs, handle 186 moves back to the neutral position without pulling on draw 188. Thus, the parts can be swung into position, overcoming the return spring Third hinge 66 can be substantially the same as first hinge 34. The associated latch or latch assembly 200 of steering assembly 60 can be substantially the same as latch assembly 180, although it may be oriented at a different angle relative to the longitudinal axis of arm 70, and although the accommodation 202 integrally formed in upper arm portion 62 and handle 204 may be smaller than accommodation 280 and handle 186 respectively.

In the case of either first hinge 34 or third hinge 66, the motion of the pivoting hinge is controlled by a single lever, or handle. It is a quick-release lever requiring only a single motion. When the parts wing toward the unfolded position, the latch is self-latching, or self-engaging, as the parts come together, and is secured when the handle moves to the locked position, in with the mechanism is locked in the over-center condition. The latch is mounted within a recess in the frame (be it the main cross-bar in the case of cross-member and latch 180, or the upper or lower arm member in the case of latch 200). In the embodiments shown and described, the latch handle lies within the envelope of the frame (i.e., is shy, flush, or substantially smoothly flush when in the locked position) when the bicycle is unfolded, and lies within the envelope of the folded structure when the adjacent parts are folded.

As noted, rear portion 28 may also be referred to as a "swing arm". The term "swing arm" arises because it swings sideways, i.e., laterally, out of the way when folding. An example of the swing arm 28 may be understood with reference to FIGS. 11A, 11B, 11C, 12A and 12B. The swinging of swing arm 28 is sideways, or out-of-plane pivotal motion on hinge 36. To that end, a forward hinge fitting, or set of hinge fittings, or lugs 206 is formed at rearward margin of the drive housing of middle portion 26, and a rearward hinge fitting, or set of hinge fittings, or lugs 208 is formed at the forward edge of the hinge break of swing arm portion 28. The hinge fittings have may have hardened sleeve inserts as noted above. When assembled, upper and lower hinge pins 210, 212 link the upper and lower sets of lugs together.

Figure 14A:
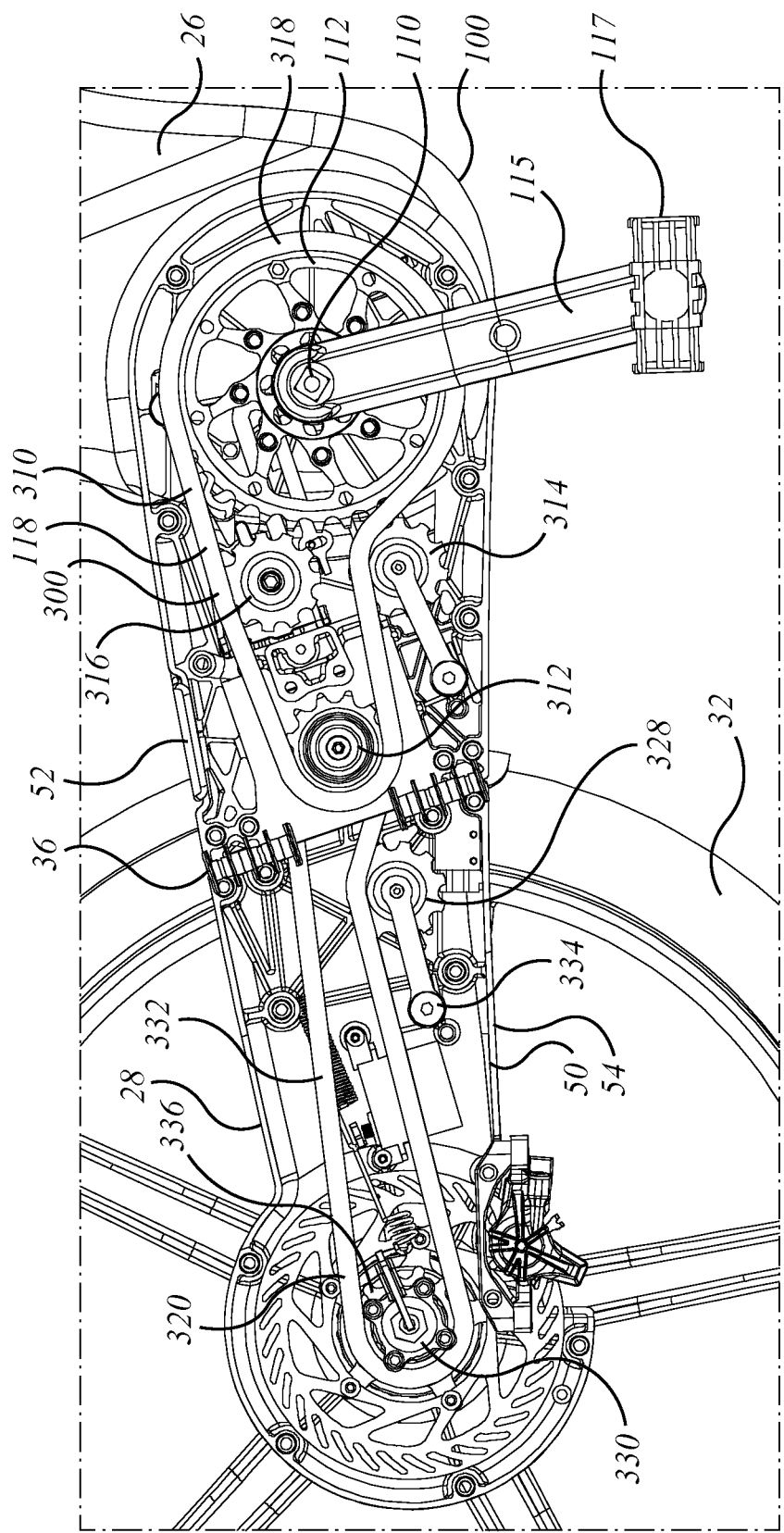
FIG. 14A is an enlarged view of an example pedal driven drive train with right hand side covers of the middle frame portion and swing arm portion of the frame removed.
Figure 14B:
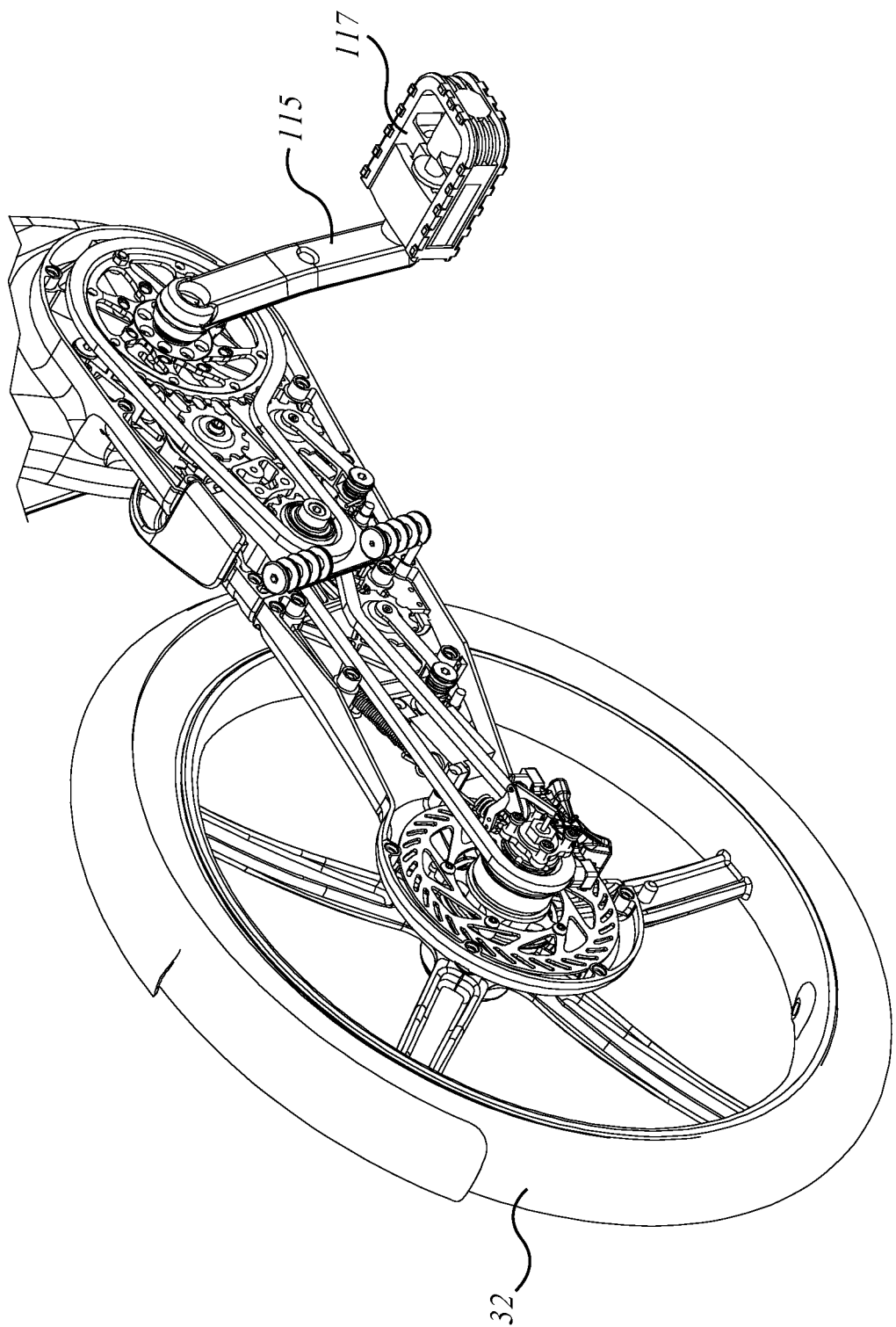
FIG. 14B is a perspective view of the example drive train of FIG. 14A from rearward.
Figure 14C:
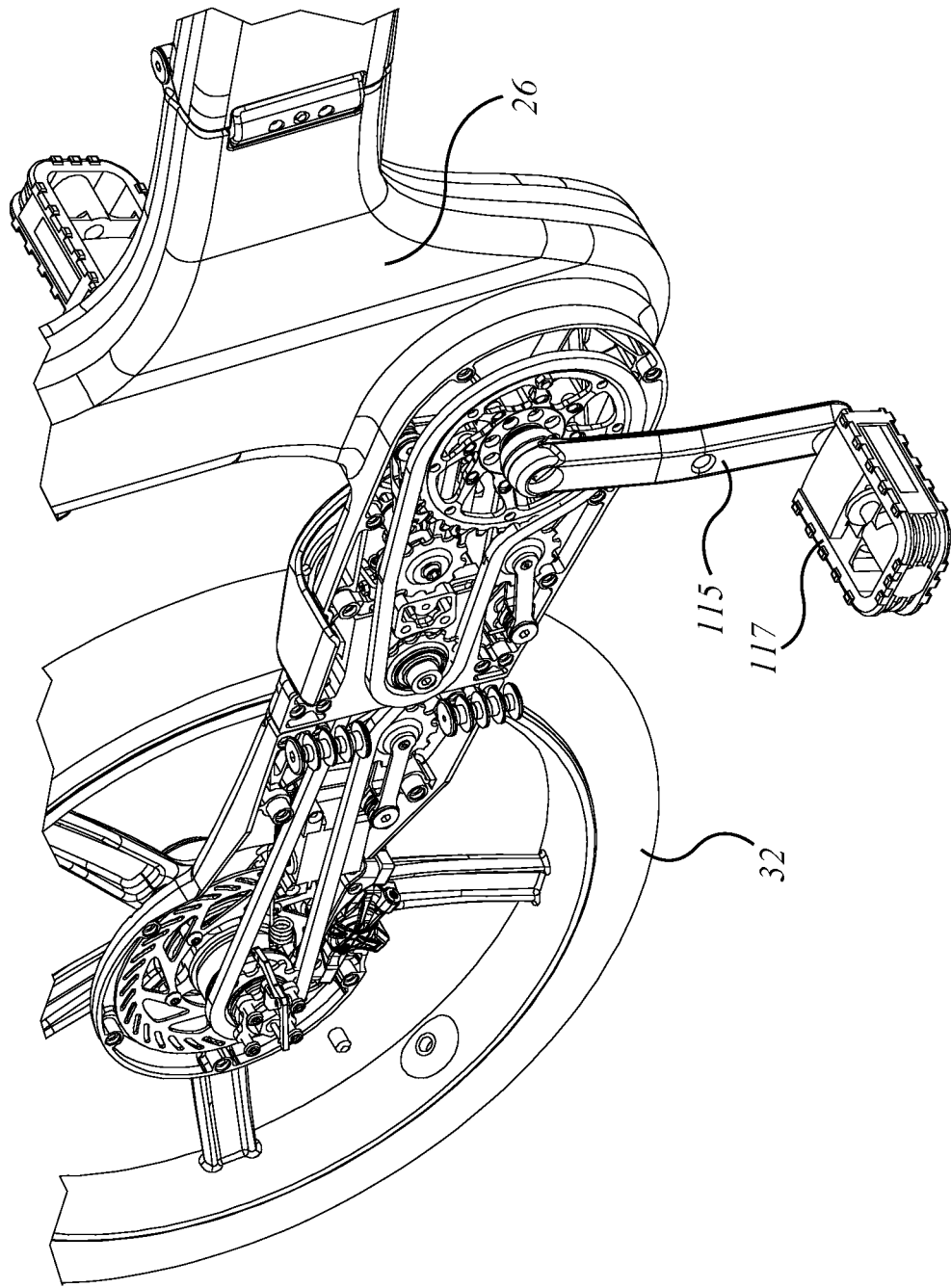
FIG. 14C is a perspective view of the example drive train of FIG. 14A from forward.

As a preliminary, middle frame portion 26 includes a crank assembly housing 220. Crank assembly housing 220 can be fastened to the main bottom bracket assembly housing 100 of middle frame portion 26, e.g. using bolts. FIGS. 14A, 14B and 14C show this portion with the external housing removed, looking from the left hand side outward to the right. Crank axle 110 is mounted in housing 220. Crank axle 110 carries main sprocket 112. There is a pawl 226 mounted above main sprocket 112. It has a catch 224 that can be used to engage a stop 228 mounted on main sprocket 112. As explained below, this may allow the cranks to be locked for various functions, such as providing a rest or stop for a folded bicycle, to provide a stand for a deployed or partially folded bicycle, and to secure pedals in position for compact storage. A pawl spring wound around pivot 222 of pawl 226 biases pawl 226 toward engagement of catch 224.

A latch actuator or lever or handle is identified as 230. It is mounted on a pivot 231. In the example shown, pivot 231 is located at about the 2 o'clock position relative to main sprocket 112. Handle 230 has a grip 232. There is a pocket, rebate, recess, relief or accommodation 234 formed in the top of the housing 220 into which grip 232 lodges in a flush or shy condition when not in use. This is the "locked"

position when bicycle 20 is ready for riding. Handle 230 also includes a pawl release, which may have the form or a cam or arm 236 that extends radially to intercept the pointed distal end of pawl 226. When handle 230 is rotated counter clockwise, it releases pawl 226, such that motion of the cranks may cause catch 224 to capture stop 228.

Another feature of this crank lock position is that while locked in this position, the left hand crank 114 and pedal 116 can be extended downward and rearward to act as a stand, or support for bicycle 20 in the folded position, or an intermediate position preceding the folded position. When folded, a person may grasp the rear of saddle 108 to use it as a steering arm (e.g., when the bicycle is in a trailable configuration) to wheel folded bicycle 20 around. When the motion is stopped, bicycle 20 can be tilted back on pedal 116, and it will stay in position. The right hand crank and right hand pedal are shown as 115 and 117 respectively. The cranks are cotterless cranks that have tapered square pyramidal torque transmitting bores that are mounted on the matching tapered square pyramidal left hand and right hand ends of crank axle 110. In the customary manner, the rider pushes on the pedals to turn the crank axle.

Returning to the description of swing arm latch assembly 260, handle 230 also has a generally rearwardly protruding arm 246 that is joined to a connecting link, or slave link, or connecting rod 248 at a pivot pin joint 252. The far end of the connecting rod interacts with a closure or latch, a releasable securement, or lock, or clamp, or clamp assembly 260. The combination of handle 230, arm 246 and slave link 248 can be thought of as an actuator assembly that is mounted to control or govern operation of swing arm clamp assembly 260.

However it may be called, clamp assembly 260 has three main components. The first component is a first plate or stationary land, or striker, or sole plate, or stationary plate 262 that is mounted to the swing arm root portion 270 of middle body portion 26 of frame 22. In this terminology the middle body portion 26 is taken as being the datum, and therefore conceptually as being the stationary member. This first plate is an insert, such as a steel insert, or steel facing, or wear plate, that is mounted to the trailing region of swing arm root portion 270 that protrudes to form a rigidly mounted catch. The second component is a second plate, or moving land or striker, or moving plate 264. Moving plate 264 is also a hard insert or wear plate, such as may be made of steel. It is mounted as a forwardmost nosing of swing arm 28. That nosing may be of the same profile as stationary plate 262, such that, when the swing arm is positioned in the unfolded position, plates 262 and 264 meet each other in opposed engagement. While it is not necessary that plates 262 and 264 be planar—they could be curved, or could have mating labyrinth grooving or splines, or indexing features, as may be—it is convenient that they be flat so that they form mating planar surfaces suitable for abutting contact.

The third component of clamp assembly 260 is a retainer, or securement, or vise, or wedge, or clamp, or shoe, 266. As can be seen, in cross-section shoe 266 has a channel shape in cross-section. The channel shape has a back and a pair of opposed toes. The inside faces of the toes are splayed outward relative to each other at a tapered angle. It is possible that only one of the toes be tapered. It may however be convenient that both be tapered. The taper angle may be quite small. The taper of the toes matches with corresponding tapers, or chamfers, on the outside faces of the opposed margins of first and second plates 262, 264. As may be understood, when plates 262, 264 are side-by-side and shoe 266 is driven rearwardly, the forward margins of plates 262, 264 are captured between the legs of the channel section of shoe 266, and as shoe 266 moves rearwardly, it tightens on those margins, clamping them together. As can be understood, as handle 230 is rotated rearwardly to its closed and locked position, input arm 246 drives the output arm, namely slave link 248, rearwardly. During this motion arms 246, 248 pass through a top dead center, or linearly aligned position to a slightly over-center position. As they approach the aligned position, the motion has high mechanical advantage over the clamp as it tightens shoe 266.

The output end or pivot or wrist or pin 258 of slave link 248 is captured by a retainer 268. There is lost motion between output pin 258 of slave link 248 and the space between retainer 268 and driving socket 272 of the back of shoe 266. That is, the output pin 258 has a diameter that is smaller than the space in the longitudinal gap. During the release of latch assembly 260, when handle 230 is lifted from its locked position to a mid-travel position or neutral position seen in FIG. 14E, output pin 258 moves away from socket 272 toward retainer 268. However, in that neutral range of lost motion, it neither pulls on retainer 268 nor pushes on socket 272. As such, shoe 266 remains tightly engaged to plates 262 and 264. The friction of the wedging on the taper remains tight.

As with first hinge 34 or third hinge 66, the motion of the swing arm hinge 36 can be controlled by a single lever, or handle. It is a quick-release lever requiring only a single motion. When the parts wing toward the unfolded position, the latch is self-latching, or self-engaging, as the parts come together, and is secured when the handle moves to the locked position, in with the mechanism is locked in the over-center condition. The latch is mounted within a recess in the frame, in the case of the rear handle 230, the recess 234 is provided in the rear arm 50. In the embodiments shown and described, the latch handle lies within the envelope of the frame (i.e., is shy, flush, or substantially smoothly flush when in the locked position) when the bicycle is unfolded, and lies within the envelope of the folded structure when the adjacent parts are folded.

Either pedal may be used to turn crank axle 110 until it locks. Once the crank is locked, when handle 230 is moved further forward (FIG. 14F) it causes pin 258 to pull on retainer 268. Retainer 268 then is, or functions as, a yoke, which draws shoe 266 away from the striker plates 262, 264, thereby releasing them, and allowing swing arm portion 28 to swing out of plane on hinge 36. There is a spring wound about the pivot pin joint 252, tending to bias that joint to rotate slave link 248 clockwise relative to input arm 246. This biases handle 230 counter clockwise (as viewed from the left) but not strongly enough to turn arm 236 away from the tip of pawl 226. Handle 230 is thus biased to the neutral position. The bias of the springs is not strong enough to overcome the over-center clamping force when handle 230 is moved to the locked and retracted position.

Figure 14D:
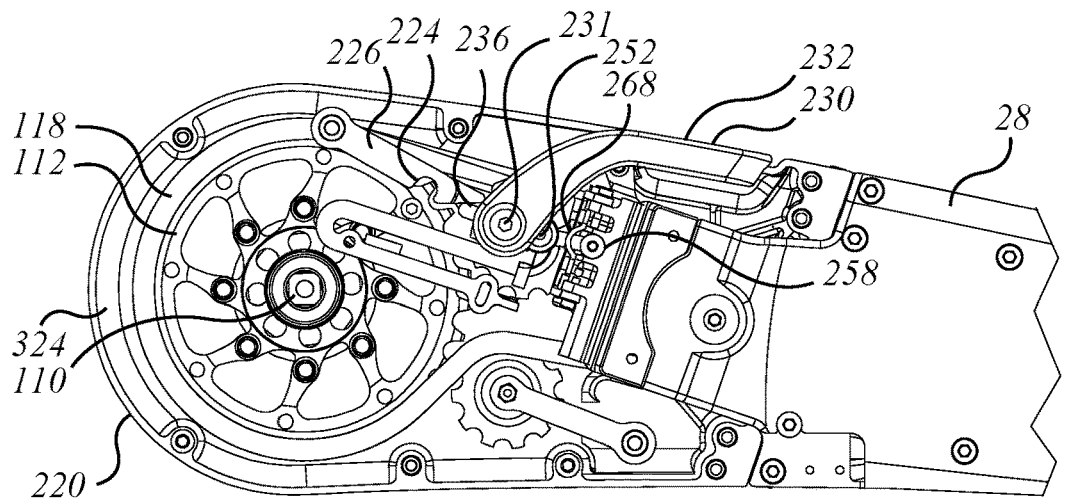
FIG. 14D is a view of example latching positions of the middle frame portion to the rear frame portion with the actuator, or handle in the stowed and locked position.
Figure 14E:
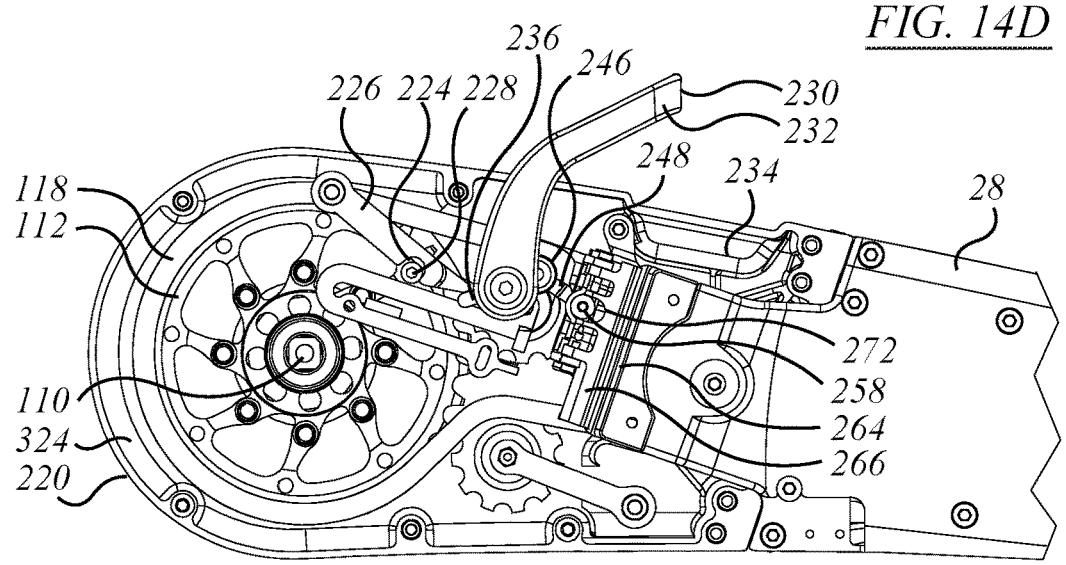
FIG. 14E shows the example actuator of FIG. 14D in a neutral position.
Figure 14F:
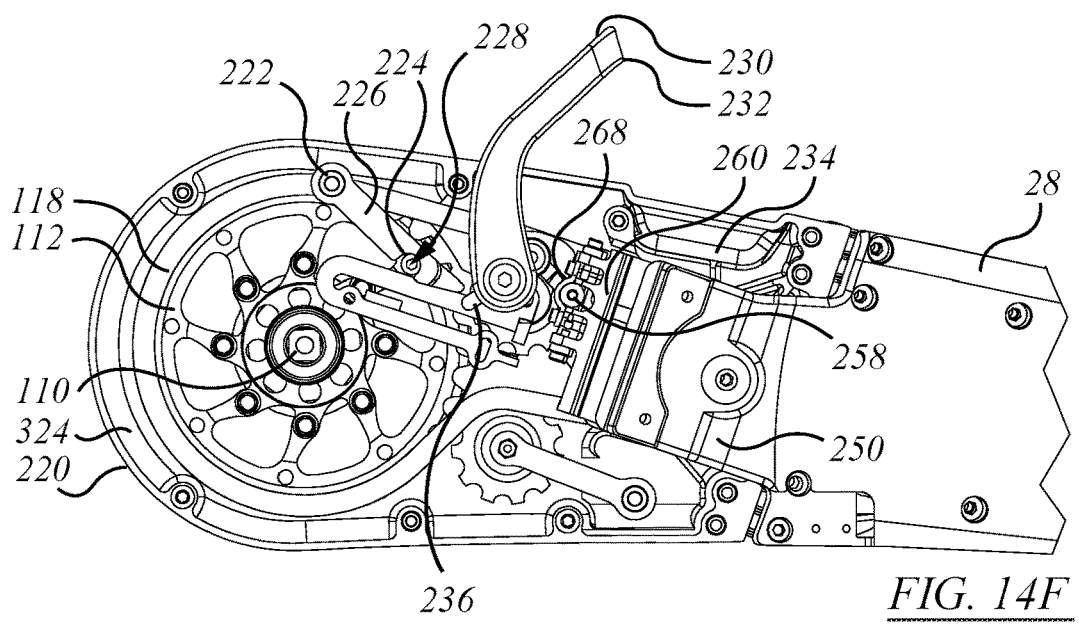
FIG. 14F shows the example actuator of FIG. 14D in a fully deflected or active, position.

In summary, initially the rear latch is locked, clamped firmly in the deployed position with the crank lock disabled (FIG. 14D). In the second position (FIG. 14F), which is the neutral position of the latch, it is not clamped. However, it is kept in the deployed position by spring force. The crank lock is active so when the user rotates the cranks into the correct collapsed alignment they will become locked. The locked crank allows for the alignment of a dowel 218 on the rear swing arm and hole 216 in the RH crank arm, securely locking the cranks in place. Mating of the dowel 218 and hole 216 may provide a secondary crank lock. This may allow the left hand pedal to be used as a stand throughout the folding process. When collapsed and moving to the deployed position, the striker of latch 260 can automatically latch and be secured. The crank lock remains engaged. In the third position (FIG. 14F), the handle 230 is pushed farthest forward, and the rear latch striker is released, permitting hinge 36 to fold. That is, in the embodiment shown and described, the main frame latching mechanism, e.g., latch assembly 260 governing hinge 36, is interlinked with a crank lock; or, expressed differently the crank-lock is interlinked with the latch assembly. The crank lock can become active upon release of latch handle 230 from the locked position, and when the latch handle is unlocked, the crank lock can become active as soon as the crank turns to present the stop to the locking notch or abutment.

The trailing portion of the swing arm root or stem of rear portion 28 has a socket, or shelf, or land, or accommodation 250 formed therein adjacent to hinge 36. The leading portion of rear portion 28 has a forwardly extending protrusion or arm, or protruding nose or tongue, 254, however it may be called. Tongue 254 and socket 250 are mutually engaging and disengaging as rear portion 28 engages and disengages middle portion 26 during folding motion about hinge 36. Socket 250 can be seen in FIGS. 12A, 12B and 10F. As shown, socket 250 is generally three sided and largely square or rectangular in plan form, with the fourth side being rearwardly open toward hinge 36. It has a depth in the lateral direction equal to half, or roughly half, the through-thickness depth of swing arm root portion 270. Accommodation 250 has the same length as tongue 254, the two being of corresponding length, depth and width and mating plan form shape such that they co-operate. The components of latch assembly 260 locates at the crotch, or furthest inwardly forward end of accommodation 250, and at the forwardmost tip of tongue 254.

In some embodiments, a feature of latch assembly, or clamp assembly, 260, is that its operation can connect and disconnect the manual force transmission of bicycle 20. That is, bicycle 20 can include an endless loop drive transmission, indicated generally as 300. In the example shown, it may be referred to a pedal-driven drive, or pedal driven transmission. In other embodiments of the folding vehicles described herein, the transmission may be driven instead by a motor such as motor 82. In still other embodiments, a motor may be used to augment the pedal-driven drive, providing a power assist. In yet other embodiments, a motor may be provided in the front or rear, or both, wheel hubs. In the embodiment shown, transmission 300 may be an endless tension element such as a chain drive, although a belt or other positive displacement linear drive could be used. In other embodiments, alternative drive mechanisms may be used. For simplicity of description, drive transmission 300 may be taken to be a chain drive. Transmission 300 can be thought of as having first and second portions 310 and 320. First portion 310 is mounted to middle portion 26 of frame 22. Second portion 320 is mounted to swing arm portion 28 of frame 22. In transmission 300, the input is provided at the pedals, 116, 117, that drive cranks 114, 115, that turn crank axle 110, to which main sprocket 112 is rigidly mounted.

Figure 14G:
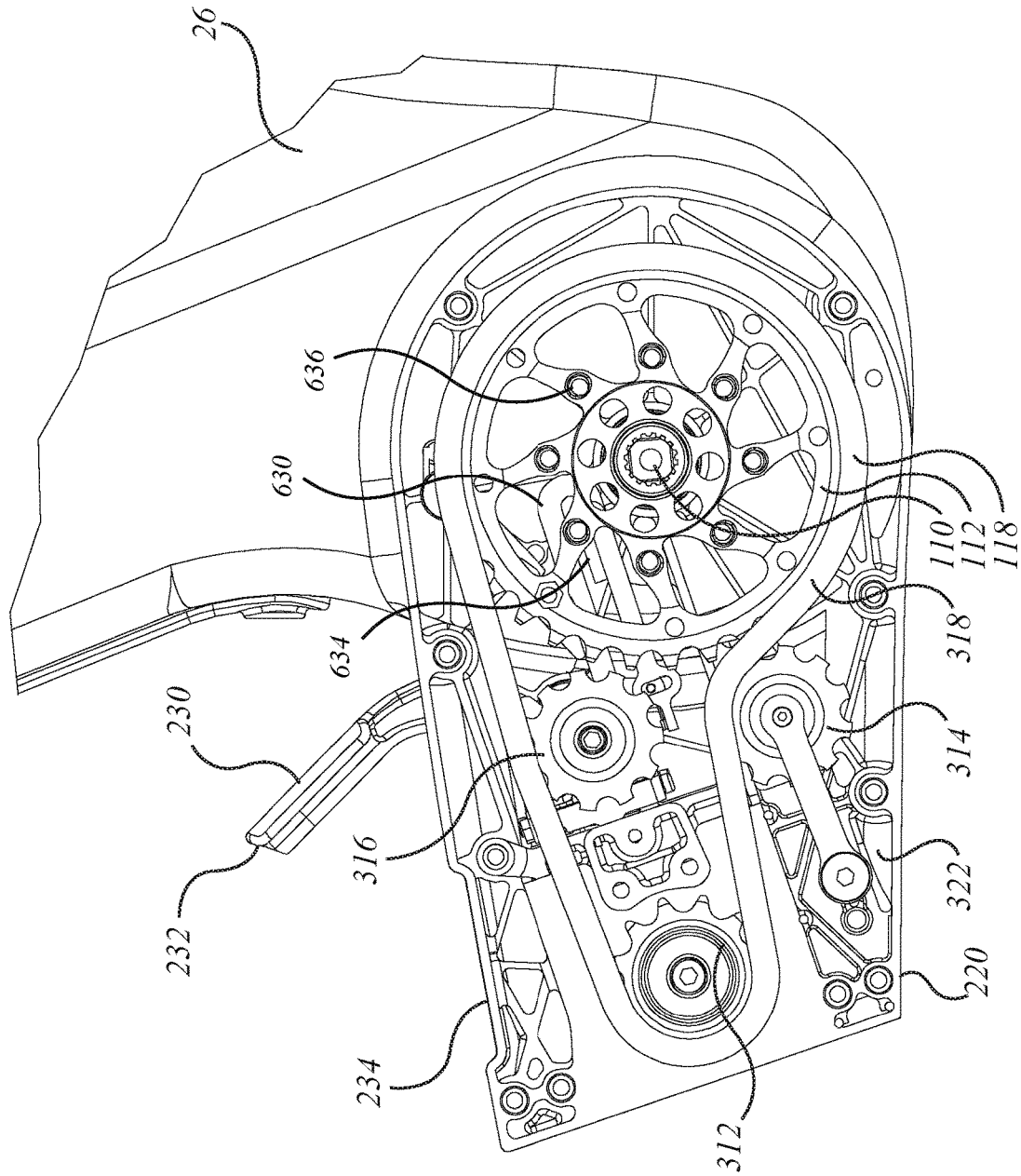
FIG. 14G shows an enlarged right hand side view of the forward portion of the example pedal-driven drive train of FIG. 14A.
Figure 14H:
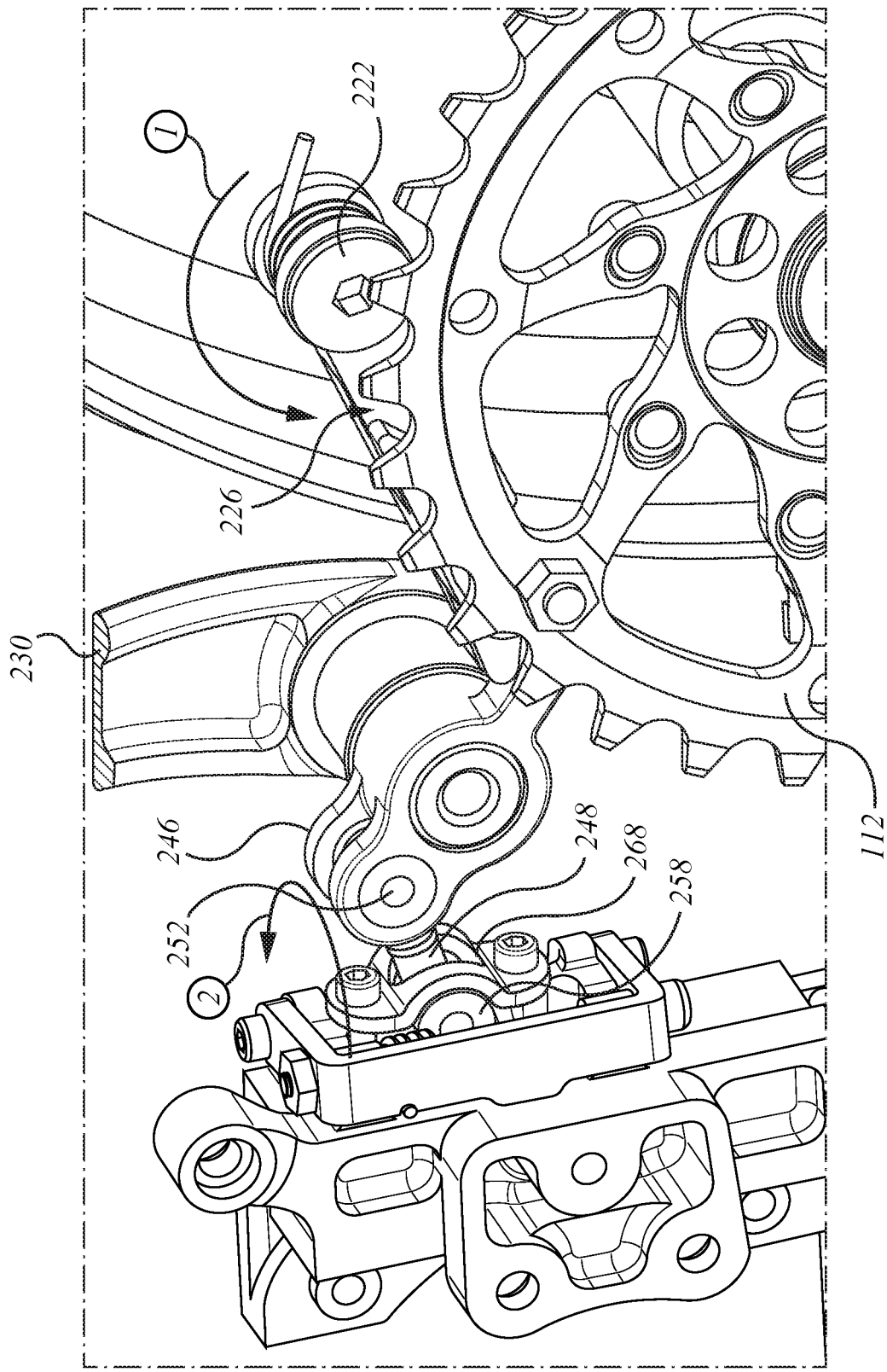
FIG. 14H shows an enlarged detail, with covers removed, of the example latching mechanism of the latch of the actuator of FIGS. 13 and 14D to 14F.
Figure 15A:
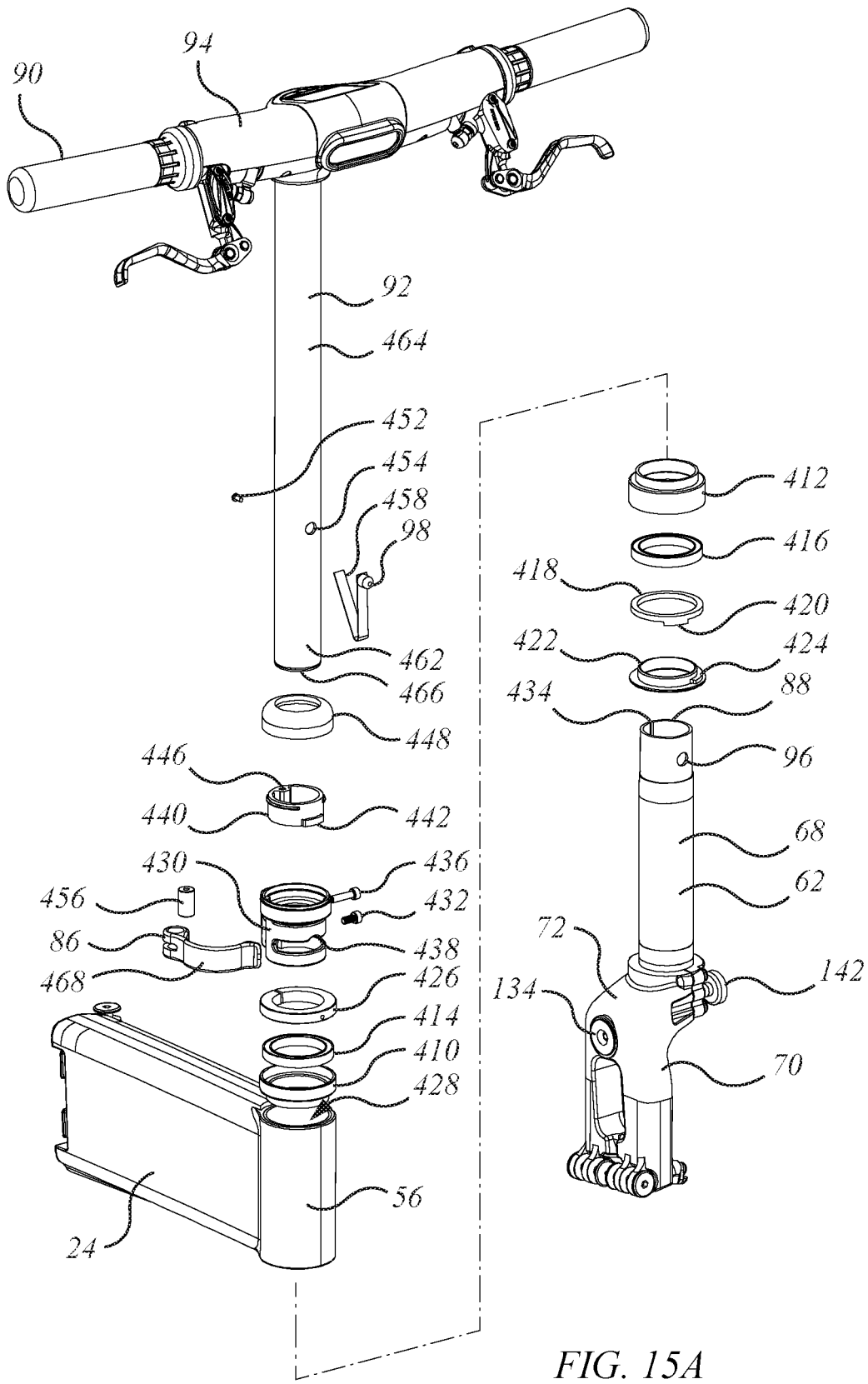
FIG. 15A is an exploded perspective view from in front and to the right of an example steering assembly of the example bicycle of FIG. 1A.
Figure 15B:
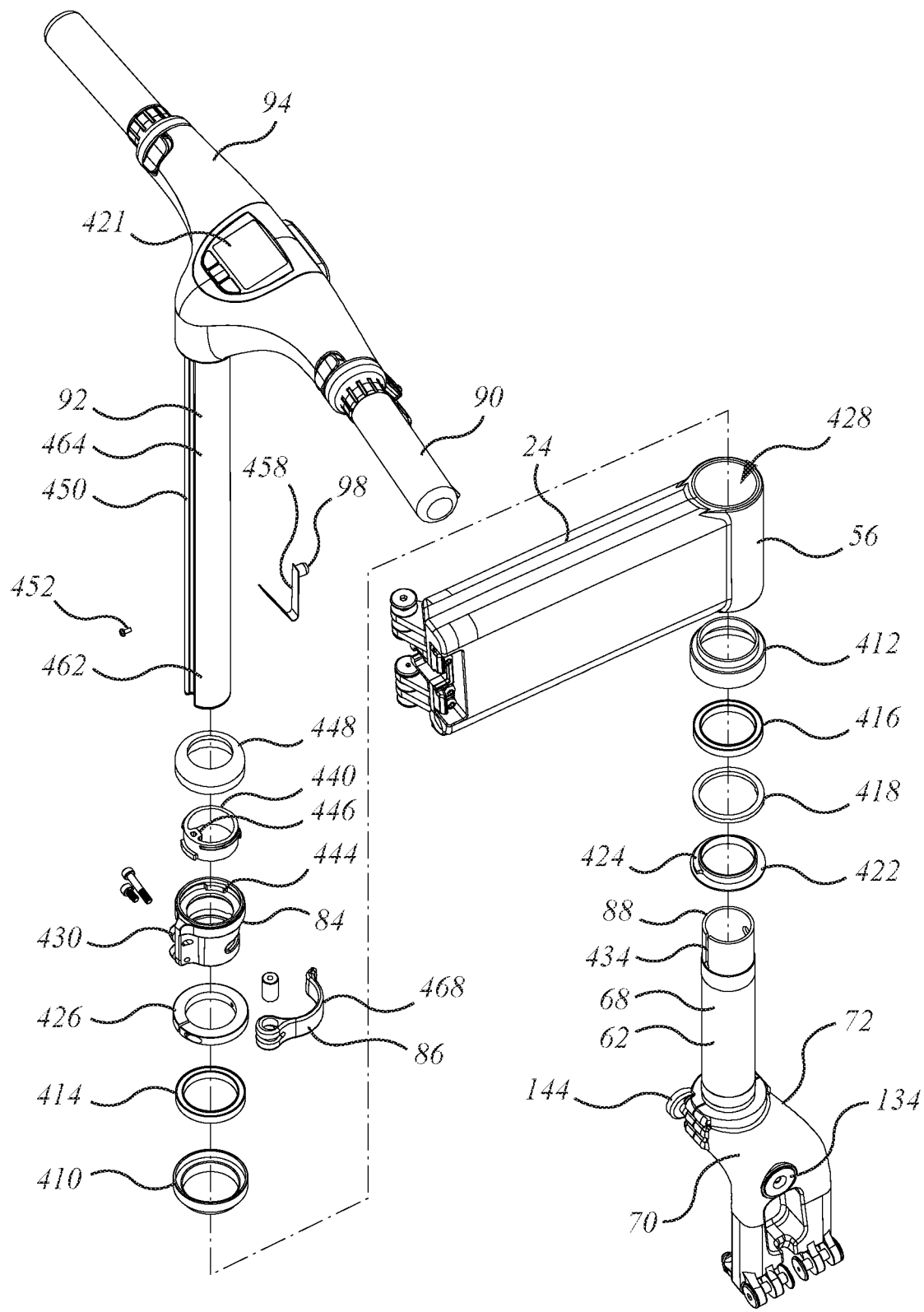
FIG. 15B is an opposite exploded perspective view of the example steering assembly of FIG. 15A.
Figure 15C:
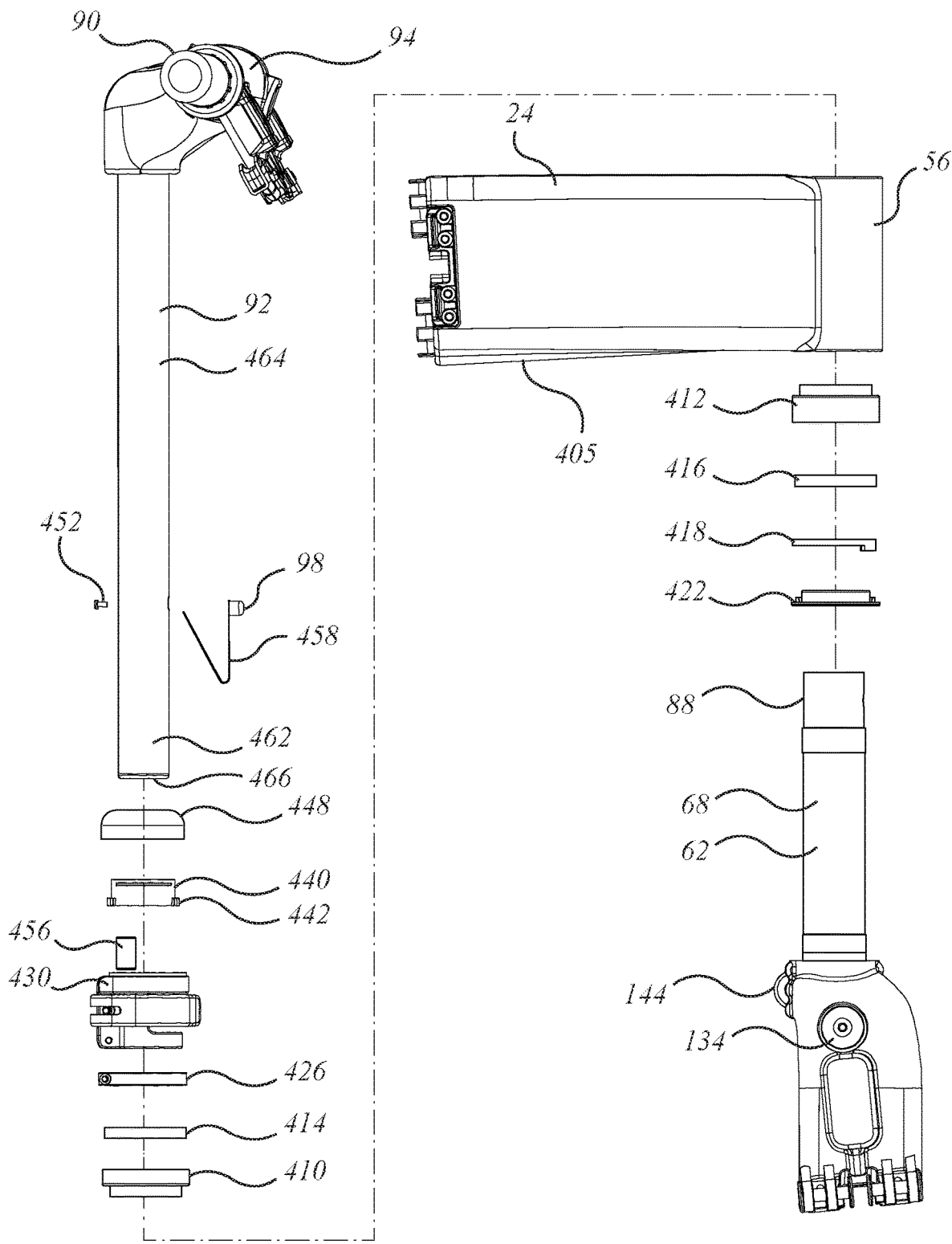
FIG. 15C is a right hand side exploded view of the example steering assembly of FIG. 15A.
Figure 15D:
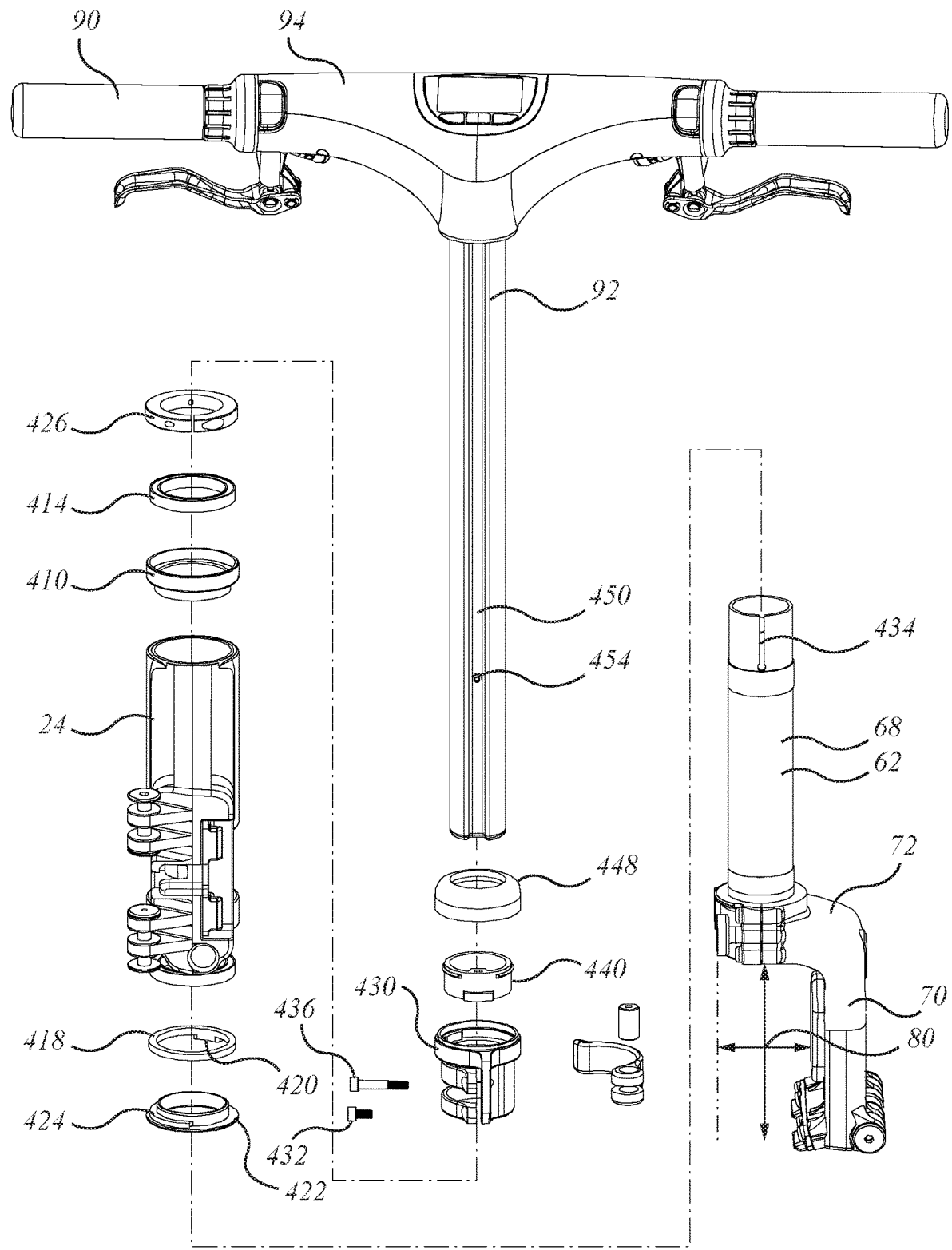
FIG. 15D is a rear exploded view of the example steering assembly of FIG. 15A.
Figure 15E:
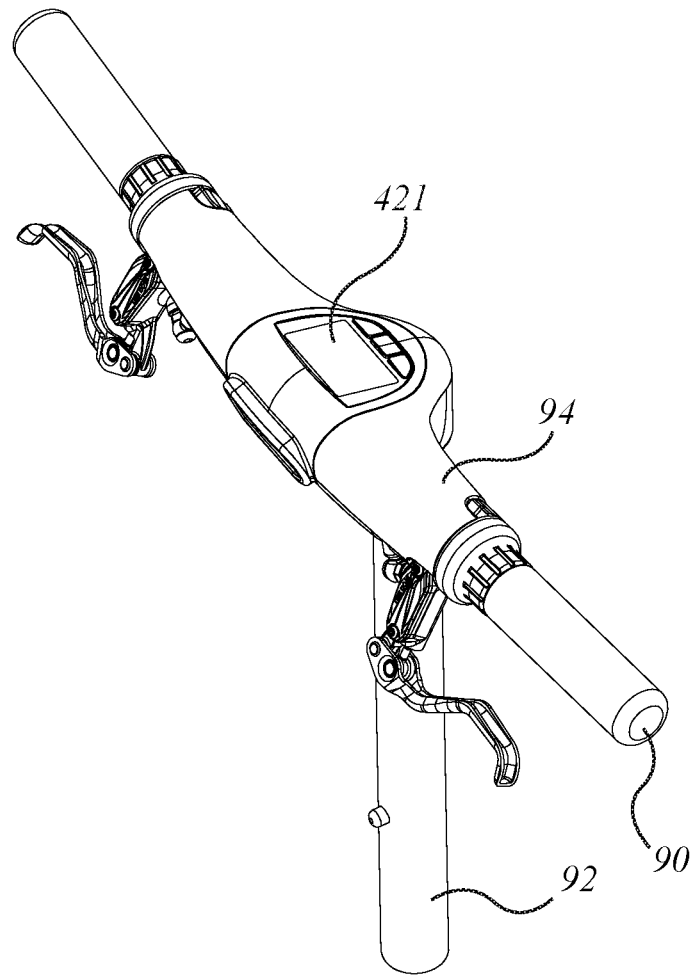
FIG. 15E is a partial perspective view from in front and to the left of the example steering assembly of FIG. 15A.
Figure 15F:
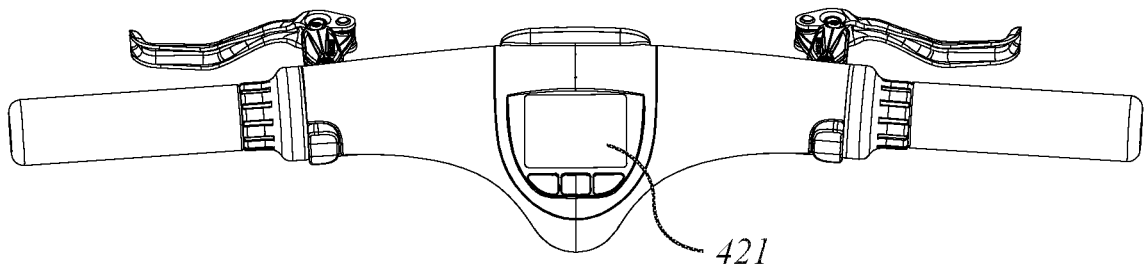
FIG. 15F is a top view of the example steering assembly of FIG. 15A.

First portion 310, viewed in FIG. 14G, also has an output gear or pinion 312, a take-up idler 314, and a tension sensor wheel 316. There is a first endless loop transmission member, which may be a chain (although alternative endless tension elements may be used in other embodiments), and which may be identified as 318. The output gear 312 is located at the rearward end of the front portion of the swing arm. Take up idler 314 is mounted below and behind the main sprocket on the return side. It is spring biased upward to engage chain 318 as it comes off main sprocket 112. The tension sensor wheel 316 is set on the tension side between the output gear and the main sprocket. As tension increases in endless tension element 318 it causes axial deflection of wheel 316 cross-wise to the direction of motion of the endless tension element 318. That deflection moves a Hall-effect sensor, the deflection being proportional to chain tension, and therefore to output torque.

In the example shown, a torque sensor 630 can be deflected by the wheel 316 in response to the tension in chain 318. The torque sensor 630, may be formed of a Hall-effect sensor and magnet that can measure the amount of deflection. The sensor 630 can output a voltage variance reflective of the output torque. Alternatively, a torque sensor may be mounted to the bottom bracket assembly 100. Alternatively, the torque sensor 630 may include a magnetic deflection sensor, a Wheatstone bridge deflection sensor, or an optical deflection sensor.

A crank cadence or velocity sensor 634 may also be provided to measure the rotational speed of the cranks 114, 115 or of the pulley wheel 316. The crank velocity sensor 634 may be provided as a magnetic sensor, such as a reed switch. The magnetic sensor can measure the rotational speed of magnets 636 positioned on the pulley wheel 316, as shown. Alternatively, magnets may be positioned on one of the cranks 114, 115 or on main sprocket 112. The crank speed sensor 634 may alternatively include an optical sensor that detects a rotational position of a rotatable element (e.g. magnets 636) mounted on the cranks 114, 115 or on a roller such as sprocket 112.

The crank velocity sensor 634 may also be integrated with the torque sensor 630 to provide a combined torque and cadence sensing assembly. Additionally, or alternatively, a wheel speed sensor may be provided to measure the rotational speed of wheels 30, 32. For instance, a wheel speed sensor may be mounted to measure the rotational speed of one or both of the wheels 30, 32. The wheel speed sensor may include, for example, a magnet mounted on a rotational component of the rear hub such as the disc brake rotor and a corresponding sensor positioned on a stationary component of the rear hub. Alternatively, a similar magnet and sensor configuration may be mounted to measure the rotational speed of the front wheel 30. In some cases, the electronic control module may compare the crank rotation speed with wheel speed measured directly using the wheel speed sensor to determine whether the correct gear has been engaged.

As may be noted, first portion 310 of transmission 300 can be contained within between two housing halves, or portions, shells, the left half being identified as 322 and the right half, or portion being identified as 324. The first housing portion 322 can be fastened to the bottom bracket portion and the second housing portion 324 can be fastened 322 (e.g. using bolts or bonds). When the two half shells are fastened together the sprocket-chain-and-driven gear assembly (or more generally, the endless tension element-roller-driven gear assembly) can be enclosed, as is the torque sensor (and crank velocity sensor), and the pedal latching and release system, other than the actuator handle 230. The enclosed unit is then protected from dirt, grit and moisture. The housing portions 322 and 324 can be fastened using mechanical fasteners, such as bolts, which may allow housing portions 322 and 324 to be disassembled for service or replacement.

Second portion 320 of transmission 300, viewed in FIGS. 14A, and 12A to 12G, includes an input gear 326, a take-up idler 328, a rear hub-and gear assembly 330, and an endless drive loop 332, which, as above, may be an endless tension element such as a chain or belt, or other positive displacement flexible linear member. In other embodiments, alternative drive mechanisms may be used. For the purposes of this description, endless tension element 332 may also be referred to as a chain 332. As before, the take-up idler is spring biased, as by a coil spring wound around the idler mounting arm pivot 334, to take up slack in chain 332. It is wound around the output gear 336 on hub assembly 330. Rear hub assembly 330 may also include a disc brake, and internal gearing. Optionally, rear hub assembly 330 may also include an integrated motor (see e.g. FIG. 11E described herein below).

Rear wheel 32 mounts on rear hub assembly 330. In the example shown, it is an asymmetric mount: the swing arm extends only on the right hand side of wheel 32, it is not bifurcated to extend arms on both sides. As with first portion 310, second portion 320 is contained within an enclosure, or housing, formed by the left-hand and right hand swing arm covers or shells 340 and 342, which can be fastened together, e.g. using bolts. When shells 340 and 342 are positioned together, the rear chain drive assembly is enclosed and protected from dirt, grist, moisture, and so on.

FIGS. 12C to 12G show exploded and assembled views of the respective output gear 312 of first portion 310 and input gear 326 of second portion 320. As can be seen, output gear 312 is mounted on a stub shaft, or bobbin, 344 that is mounted in a bearing insert fitting 346 of shell half 322. On the left end of bobbin 344 there is an output interface, or output surface, or clutch face, or gear, or releasable coupling member 350 that has teeth that only face in one direction, the back or trailing sides of the teeth being sloped.

Similarly, input gear 326 is mounted on a stub shaft, or bobbin, 352 that has a bearing insert that is identified as bearing 354 that mounts in right side shell 342, and that carries on its right end an input interface, or input clutch face, or gear or releasable coupling member 360 that also has one-way teeth, i.e., teeth that form an abutment on one side, and a sloped cam on the other. When latch 260 is closed, the male chamfer of the protruding end of bobbin 352 encounters the female socket of bobbin 344, the tapers on the chamfers being self-centering when they encounter each other. When latch 260 is closed and locked, bobbins 344 and 352 are aligned, i.e., are co-axial, such that the gears, or releasable coupling members 350 and 360, are also co-axial. The abutment faces of gears 350 and 360 face each other, such that when gear 350 is turning clockwise (when viewed from the right hand side of bicycle 20), the abutment faces of gear 350 and 360 mutually engage and transmit torque to drive element 332, hub assembly 330, and thereby to rear wheel 32, to turn it in the forward direction. However, other orientations are possible. The spring may keep the faces running in contact against each other during axial deflection. In effect, the mutually engaging coupling members 350 and 360 combine to form a one-way clutch and a releasable coupling. In other embodiments, there is no spring, and the closure of the latch secures the input and output halves once the male and female ends engage and mutually center on each other. In this instance, the freewheeling function (i.e., the ability of the endless tension element drive to remain stationary while the rear-wheel continues spinning, typically as the rider is gliding) is provided at the rear hub. Those gears or coupling members fit closely in respective apertures 338 and 358 of their respective mounting plates 362, 364. Each of the mounting plates may be provided in a pre-assembled state with the bobbin, gear, and bearing pre-assembled on each side. The mounting plate is then a motion transfer module, or pinion or gear module, that is bolted to the corresponding cover or housing shell half, as by recessed cap screws. The mounting plate or module may be made of steel, and as mounted, spread the concentrated loads of the stub shafts into the respective housing shells more generally. The two halves form a matched pair. They are opposed. They define a mechanical transmitter and receiver. Various types of gearing transmission arrangements may be used to provide the final output ratio, including planetary gear, single speed hub and continuously variable transmission (CVT) assemblies.

When the swing arm is actuated, by using handle 230 to release latch 260, the swinging action axially separates gear 350 from gear 360. Another way of saying this is that mutually engaging input and output interface members 350 and 360 define a releasable coupling, that coupling, when engaged, forming a one-way, or one direction, torque transfer interface, or drive interface, at which in use, motion and force are transmitted from the leading portion 310 of drive transmission 300 to the trailing portion of drive transmission 300. That is, the first portion of the manual transmission is de-coupled from the second portion of the manual drive transmission. The endless tension element drives are not bent out of plane, or otherwise bent from the paths that they normally follow. They retain their geometry in the respective first and second, or leading and trailing, drive portions. To the extent that those chains (or belts etc.) move in paths in their respective planes, they remain in those planar paths as the planes swing relative to each other about hinge 36. Since the units are contained within the covers or shells, and the only exposed parts are the faces of gears 350 and 360, the swing arm portions form enclosed units with a sealed exterior. The exterior is washable and presentable. When the bike is folded, and wheeled to a storage position there is no greasy or dirty exposed part likely to soil walls, furniture, or clothing. The mating of the forward and rearward drive portions occurs at a single interface, namely that of gears 350 and 360. Securement of that interface, or clutch, in its operating position is governed by a single manually operated release, namely latch assembly 260.

When latch 260 is released, there is a non-trivial radius of rotation from the centerline of the pins 210, 212 of hinge 36 on the right hand outer face of middle portion 26 and swing arm portion 28, to the axial centerline of bobbins 344 and 352, which is the normal axis of rotation of the force or motion or torque transfer interface. The plane of engagement of the flat faces of the transmitting and receiving modules (i.e., of plates 362, 364) is a plane that is leftwardly offset from the line of hinge 36 by, roughly, half the thickness of leading portion 310. That is, the double thickness, namely the thickness of the two transfer modules taken together, when seated in their shells or housings is the same as the overall thickness of the assembled housings of the leading and trailing portions such that the overall assembly has size and slope continuity of profile when viewed either horizontally or vertically. The leftward offset means that the transmitting and receiving interface is formed on a step that is mid-way through the section when seen vertically. The nose of the rear portion then protrudes forwardly of the axis of hinge 36 by the size of the interface module, so that the gears or engagement plates 350 and 360 are forward of the hinge when the latch 260 is closed. The leftward offset also means that when the latch is released the dominant component of motion of the receiving interface is axially away from the transmitting portion, so that the parts lift away and separate cleanly. It may also be noted that hinge 36 lies within the projected lateral profile of rear wheel 32, both when vehicle 20 is folded and when it is unfolded. The tip of the transfer module (i.e., the receiving module) extends beyond the lateral profile of rear wheel 32.

The leading portion of the manual (i.e., pedal driven) assembly, forms the right hand side of middle portion 26. Laterally inboard is the bottom bracket housing and the seat post mount 102. Considering FIGS. 5A and 5B, the upper end of middle portion 26 terminates in an accommodation 104 in which to install seat post assembly 401. Accommodation 104 may be formed integrally as part of middle portion 26. It may have the form of a hollow sleeve or tube 382. That sleeve or tube may be cylindrical, for example, to permit telescoping entry and engagement of seat post 106. Seat post 106 may itself be hollow as well. The cross-sectional shape of seat post 106 matches, and locates within, the corresponding cross-sectional shape of sleeve 382. A releasable clamp 384 is mounted to sleeve 382 near its entry, or mouth or opening 386. Clamp 384 may extend around the periphery or rim of opening 386. When clamp 384 is loosened, or released, seat post 106 can move telescopically and axially relative to sleeve 382. When clamp 384 is tightened, seat post 106 is prevented from moving, i.e., is held in a fixed position. In the embodiment shown both seat post 106 and sleeve 382 are of non-circular section, and may be rectangular in cross section. In other embodiments, the seat post 106 and sleeve 382 may have other cross-sectional shapes, e.g. oval or rounded sections. Saddle 108 is mounted to seat post cap 388 at the top end of seat post 106. When bicycle 20 is folded, seat post 106 may be moved to from a first position, for riding or trailing, to a second position for compactness.

Figure 5A:
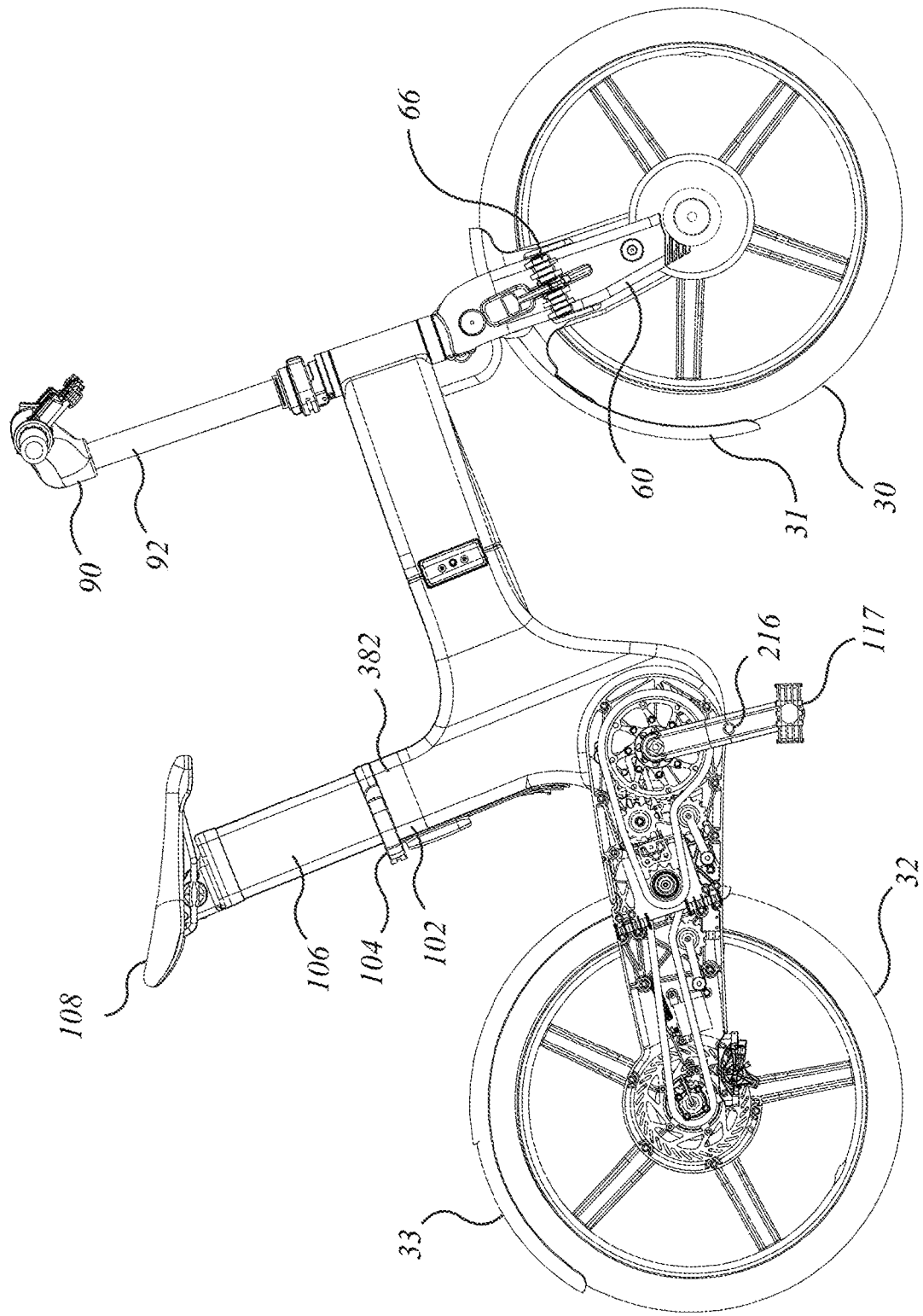
FIG. 5A is a right hand side view of the example bicycle of FIG. 1A with right side covers removed to show an example pedal driven drive transmission.
Figure 5B:
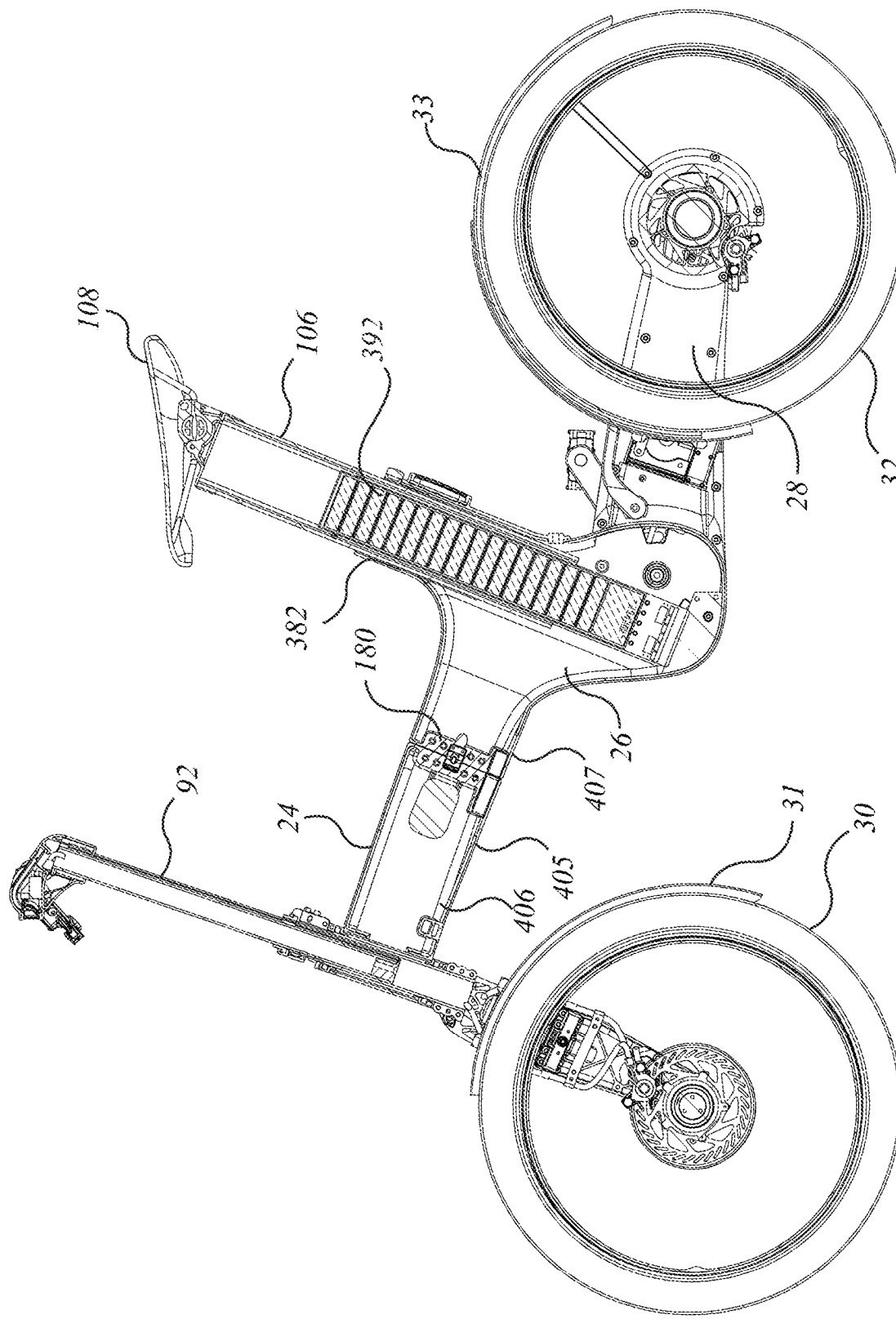
FIG. 5B shows the example bicycle of FIG. 5A sectioned along the vertical Center Line fore-and-aft plane, showing an example electronics installation and seat post in section.
Figure 5C:
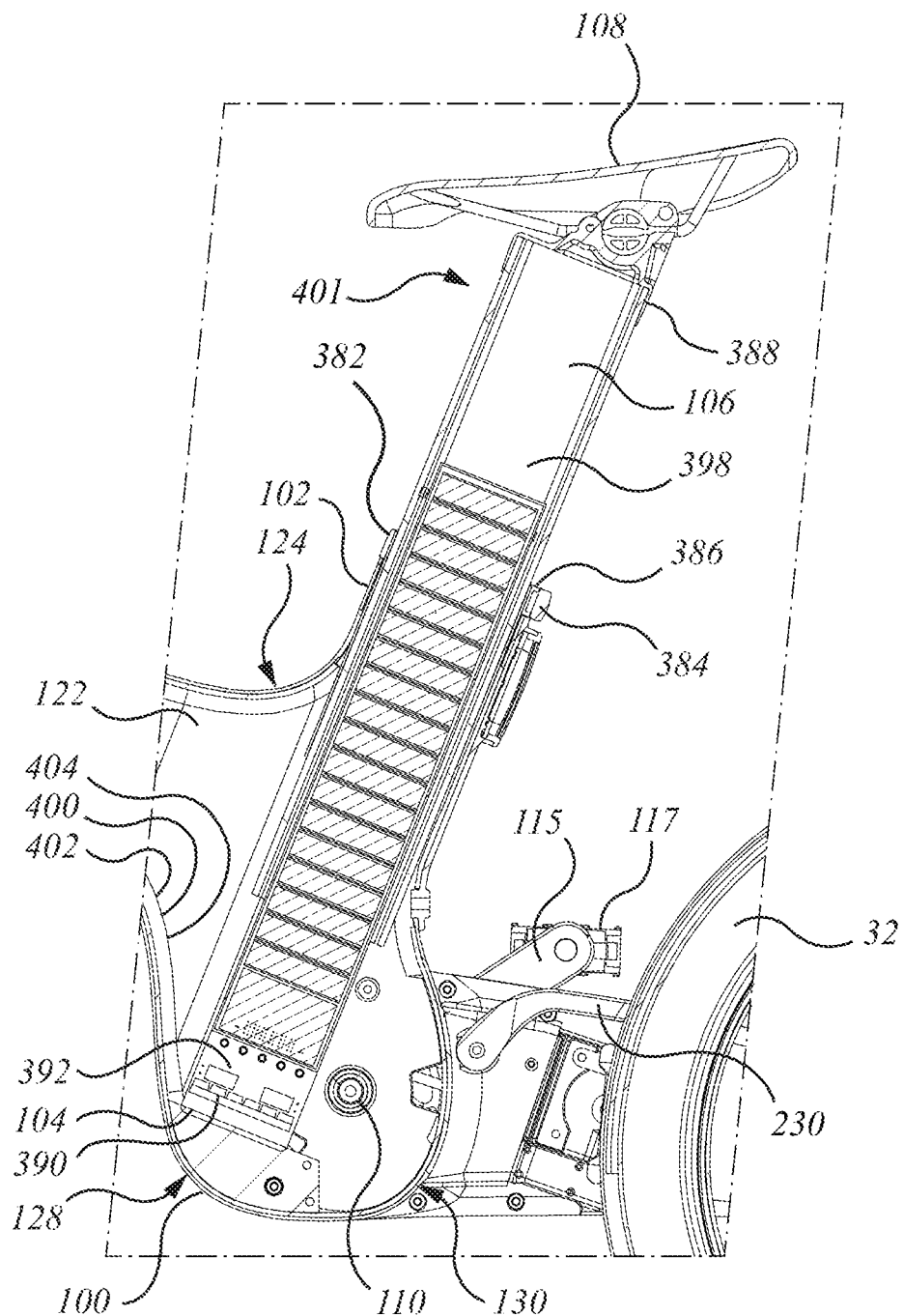
FIG. 5C shows an enlarged detail of the example bicycle of FIG. 5B.

The cross-section of bicycle 20 taken on plane $P_{20}$ is shown in FIG. 5B. In the enlarged detail of central portion 26 seen in FIG. 5C, at the base of the bottom bracket housing there is an accommodation 104 that may be in the form of a seat, or socket 390. The accommodation 104 may house various components of the bicycle 20, such as a power supply and/or an electronic control module. In some embodiments, one or both of the power supply and the electronic control module may be removably mounted within the socket 390.

In the example shown, socket 390 receives an electronics module 392. Electronics modules 392 may contain electronic components and systems of the vehicle 20. Electronics module 392 can be removably mounted within socket 390.

In some embodiments, module 392 may include both a power supply module 394 and an electronic control module 393. The power supply module 394 may contain an energy storage element that is usable to power various systems of vehicle 20. The power supply module 394 can also contain various power supply electronics that manage the operation of the energy storage element in power supply module 394. The electronic control module 393 can contain control circuitry usable to control and manage the operation of the various systems of vehicle 20. The electronic control module 393 may also provide various power regulation, and voltage regulation functions, to enable the distribution of power from power supply module 394.

The electronics module 392 can be contained in a housing, or sleeve, or casing 398. The components of the electronics module 392, such as power supply module 394 and control module 393, can be contained within the casing 398.

In some embodiments, electronics module 392 may be separated or divided into two or more components or sub modules. These sub-modules may include the power supply module 394, which may include energy storage element 397 such as a battery or battery pack, and an electronic control module 393. The energy storage element may include a set of batteries 396 such as may be rechargeable. Power supply module 394 can also include a power supply management system 391. The power supply management system 391 may monitor the status of batteries 396 or other energy storage components.

Figures 5D, 5E:
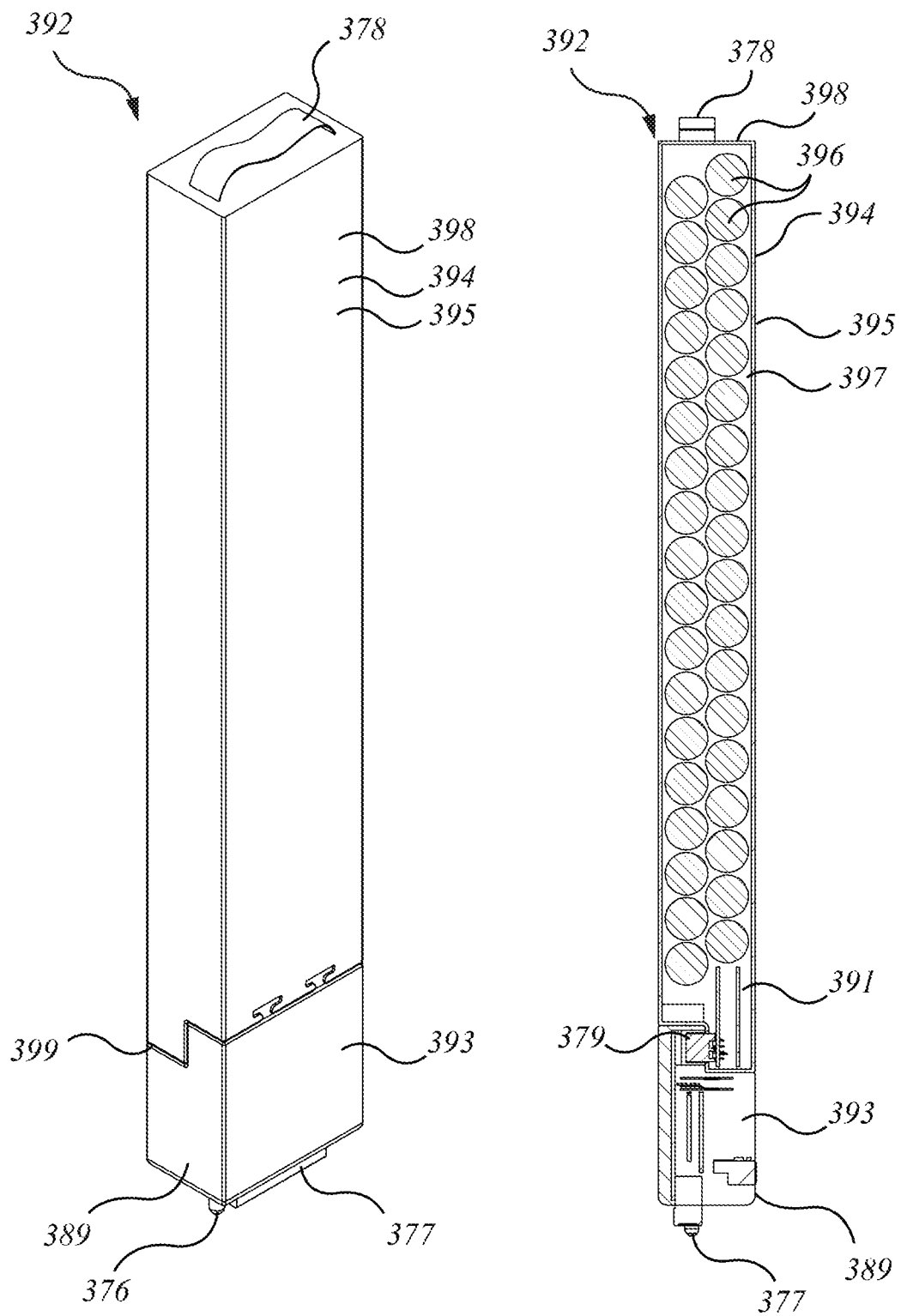
FIG. 5D show an isometric view of an example electronics module of the example bicycle of FIG. 5C.
FIG. 5E shows a cross-sectional view of the example electronics module of FIG. 5D.

In some embodiments, the power supply module 394 and control module 393 may be entirely contained within a single housing compartment. Alternatively, casing 398 may be separated into different compartments for the different components of the electronics module 392. For example, as shown in FIG. 5E an upper portion or section 395 of casing 398 can be shaped to carry batteries 396, in this case in a nested double row arrangement. Similarly, a lower portion or section 389 of the casing 398 can be shaped to enclose various circuitry and electronic components of the electronic control module 393. The upper section 395 and lower section 389 may be provided as separately enclosed compartments. Optionally, the upper section 395 and lower section 389 may be detachably connected to one another. For example, the upper section 395 and lower section 389 may include respective engagement members that engage one another in an interference fit to attach the upper section 395 to the lower section 389. In some cases, the upper section 395 and lower section 389 can be connected using fasteners such as screws or bolts. In some cases, the upper section 395 and lower section 389 may be detachable from one another to allow the power supply module 394 and electronic control module 393 to be separately accessed, e.g. for updating, repair, and/or replacement.

As shown in FIGS. 5D and 5E, the casing 398 can include a footing 376 usable to install the electronics module 392 into the base of socket 390. The casing 398 may also include an electrical connector 377 that mates with a corresponding connector at the base of socket 390. The base of socket 390 may include a dock or docking station that includes connectors mateable with the electronics module 392. The dock can include an electronics bus that can connect module 392 to a loom of cables that are routed through vehicle 20 to the electronic components throughout vehicle 20. In the example shown, the electronic connector 377 and footing 376 are integrated. That is to say, the casing 398 may not require any additional mechanical connectors beyond the structure of the electrical connector 377.

Casing 398 can be opened to provide access to the power supply module 394 and/or control module 393. In the example shown, the power supply module 394 contains a battery pack 397 with batteries 396, along with a battery management system 391, loaded in the long distal section or magazine of casing section 395. The power supply module 394 may be removed and casing section 395 opened for service, to allow for component replacement or replacement of the entire module 394.

The base portion 389 may include an automated control module and processor 393. In the example shown, to access the control module 393, the base section 389 can be opened. The control module 393 may be accessed for servicing, e.g. to update or replace hardware components. The control module 393 may also be accessed for repairs and/or wholesale replacement. Software or firmware updates may be provided via connector 377 or wirelessly over the air.

In the example shown, the upper section 395 and lower section 389 of casing 398 can be separated from one another at the section break 399. Separating casing 398 at section break 399 may provide access to both the control module 393 and power supply module 394 at the same time. When casing 398 is separated, the power supply module 394 and control module 393 may remain separately enclosed within the upper portion 395 and lower portion 389 respectively. The upper portion 395 and lower portion 389 may then be individually opened to provide access to the power supply module 394 and control module 393 respectively.

The electronics module 392 can also include an internal connector 379 between the control module 393 and power supply module 394. The connector 379 may be disengaged when casing 398 is opened at section break 399. The connector 379 may then re-connect the control module 393 and power supply module 394 when casing 398 is subsequently closed.

In some embodiments, module 392 may include electronic control components for vehicle 20. The electronic control module 393 may be connectable to an electronic bus provided in vehicle 20 when module 392 is seated in socket 390. The connector 376 can include a plurality of separate electrical and signal connections between the module 392 and the other systems of vehicle 20. For example, control module 393 may be programmed to operate a motor of the bicycle 20, such as motor 82 of front wheel 30 (or any other motor), and to monitor the various sensors in bicycle 20 as part of that operation. For example, the processor can be connected to drive the rider's display 421, such as may show speed, direction, a map, status of the latches, status of the power supply module 394, the gear shifting controls for and so on.

The display 421 may form part of an interface module that includes both output components, such as display 421, and input components such as buttons and/or a touch screen. In some cases, the interface module may include additional processing electronics. The interface module and control module 393 may be communicatively connected, either through a wired connection or wirelessly. Updates to the software and/or firmware components of the vehicle 20, such as those included in the interface module and control module 393 may be updated wirelessly, e.g. through over-the-air updating, that may be controlled using the interface module and/or a mobile application communicating with vehicle 20. The interface module may also include control inputs for various components of the vehicle 20 such as lighting units or a horn, as well as inputs usable to adjust user settings and/or control updates to the various systems of vehicle 20. In some cases, the lighting unit and/or horn may be integrated into the interface module.

The electronic control module 393 can include control components for a wide variety of functions on vehicle 20, for instance motor control electronics and embedded software, power supply hardware, electronic shifting control, lighting control, communication networking electronics and embedded software, sensor signal processing electronics and embedded software, an alarm system, electronic locking mechanisms, audio systems, battery management system, one or more battery cells, sensors such as accelerometers, diagnostic electronics and embedded software, location tracking sensors such as GPS sensors, wireless transmission and reception components such as cellular data, Bluetooth, and other ancillary electronic components. The control module 393 can also be configured to regulate voltage levels to be supplied to the various different components and systems throughout vehicle 20. The connector 377 can include various different electrical and signal lines corresponding to the various systems of the vehicle 20.

The upper end of casing 398 can include a handle 378. The length of casing 398, and of electronics module 392 more generally, is such that when seat post 106 is removed, the top end of power supply module 394 (i.e. the upper end of electronics module 392) is accessible. Handle 378 may then be grasped to permit module 392 to be extracted. In the embodiment shown, casing 398 extends proud of (i.e., axially beyond) opening 386. Alternatively, the casing 398 may be flush with opening 386 or recessed within the accommodation 104.

As explained above, module 392 may be extracted from the accommodation, e.g. using handle 378. This may allow the components of module 392, such as the power supply module 394 and/or control module 393 to be accessed or removed, and optionally replaced, for maintenance and/or upgrades. This may also enable the module 392 to be replaced in cases of component failure, or to provide an updated electronic control module 393 and/or power supply module 394. When module 392 is removed from vehicle 20, seat post 106 can still be mounted in seat post mount 102. In embodiments in which the vehicle 20 can be pedal-driven, this may allow a user to continue to operate the vehicle 20 as a bicycle even while control module 393 is removed.

In some embodiments, the vehicle 20 may include a locking system for the electronics module 392. The locking system may secure the electronics module 392 within the accommodation 104. When the electronics module 392 is installed within the accommodation 104 and the locking system is engaged or in a locking position, the locking system can prevent removal of the electronics module 392. This may prevent theft of, or unwanted tampering with, the electronics module 392.

The electronics module locking system may include locking members positioned on the electronics module 392 and within the body of vehicle 20, such as in the accommodation 104 or socket 390. The locking members may engage one another when the electronics module 392 is installed in the accommodation 104. The locking system may be controllably adjusted between a locked or engaged or activated position and an unlocked or disengaged or deactivated position. In some cases, the locking system may include an electronic actuator that can control engagement and disengagement of the locking system. The electronic actuator may be controlled using an electronic input system, such as a wireless device such as a key fob, or through an application on a user's computing device (e.g. smartphone or tablet) that is connected to the control module 393 through a wired or wireless connection. Additionally or alternatively, the vehicle 20 may include a mechanical lock actuator that can be operated using a key to lock or unlock the locking system. The mechanical lock actuator may provide an alternative to the electronic locking system, e.g. in the event of a power failure.

Figure 22C:
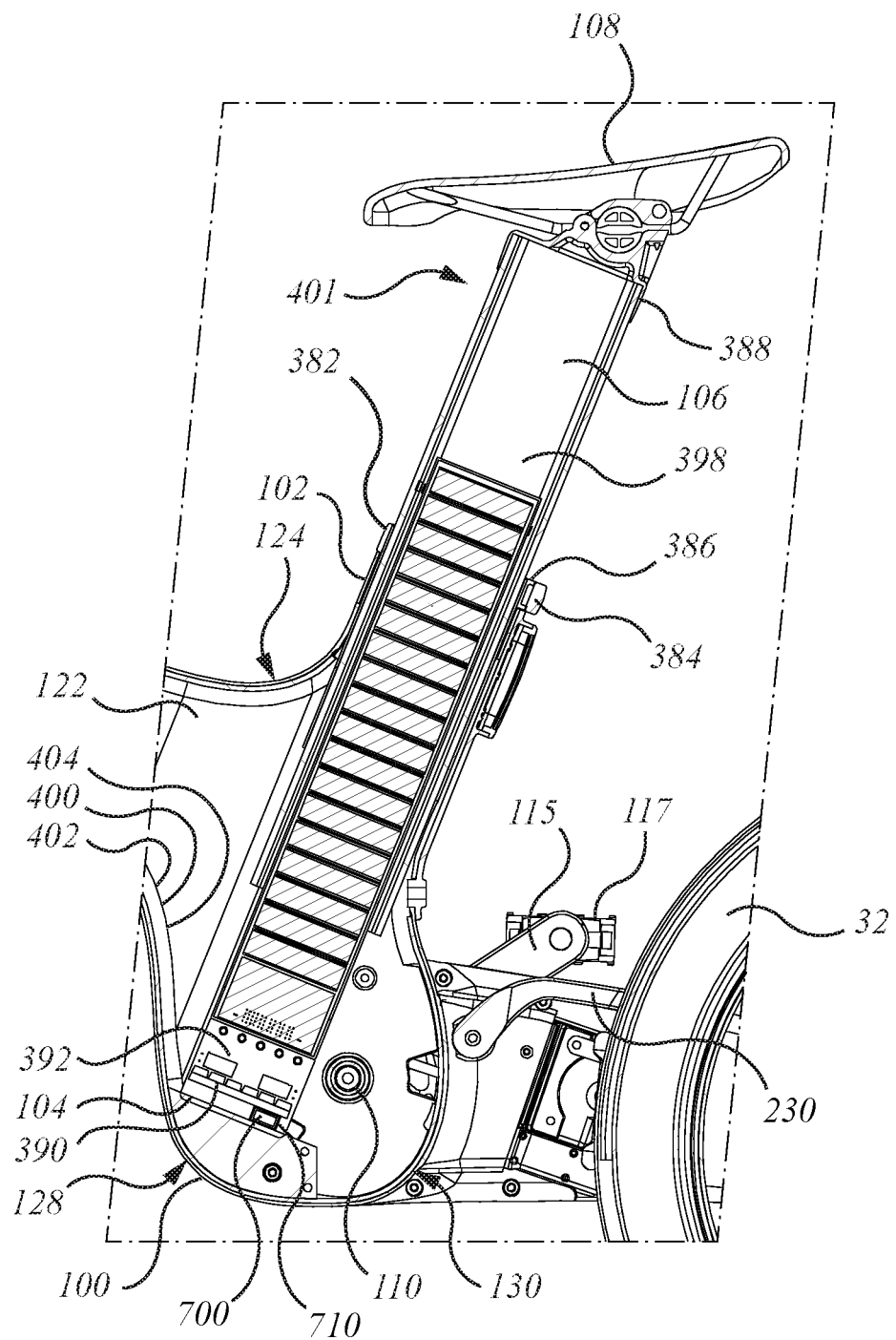

FIGS. 22A-22C illustrate an example of a locking system that may be used with the vehicle 20. A first locking member 700 may be provided on the electronics module 392. As in the example shown, the locking member 700 may be a latch that can protrude through the casing 398, in this case the lower portion 389. The latch 700 may be movable between a locked or extended position in which the latch extends outwardly from the casing 398 and an unlocked or retracted position in which the latch 700 is partially, or completely, recessed within the casing 398. The latch 700 can be connected to a latch actuator 702. Actuator 702 may operate to control the position of latch 700 in response to mechanical and/or electronic control signals. In some examples, as shown here, the latch 700 may be biased to the extended position. For example, the latch 700 may be attached to actuator 702 by a biasing spring 704.

A second locking member 710 may be provided on the frame of vehicle 20. For example, the second locking member 710 may be a seat or recess or retainer positioned within accommodation 104. The second locking member 710 may be shaped to engage the latch 700 when the electronics module 392 is installed in accommodation 104 and the latch 700 is in the extended position. When the locking system is active, the inner wall of the second locking member 710 may engage the upper surface of the latch 700 and prevent the removal of the electronics module 392 from the accommodation 104.

Figure 22D:
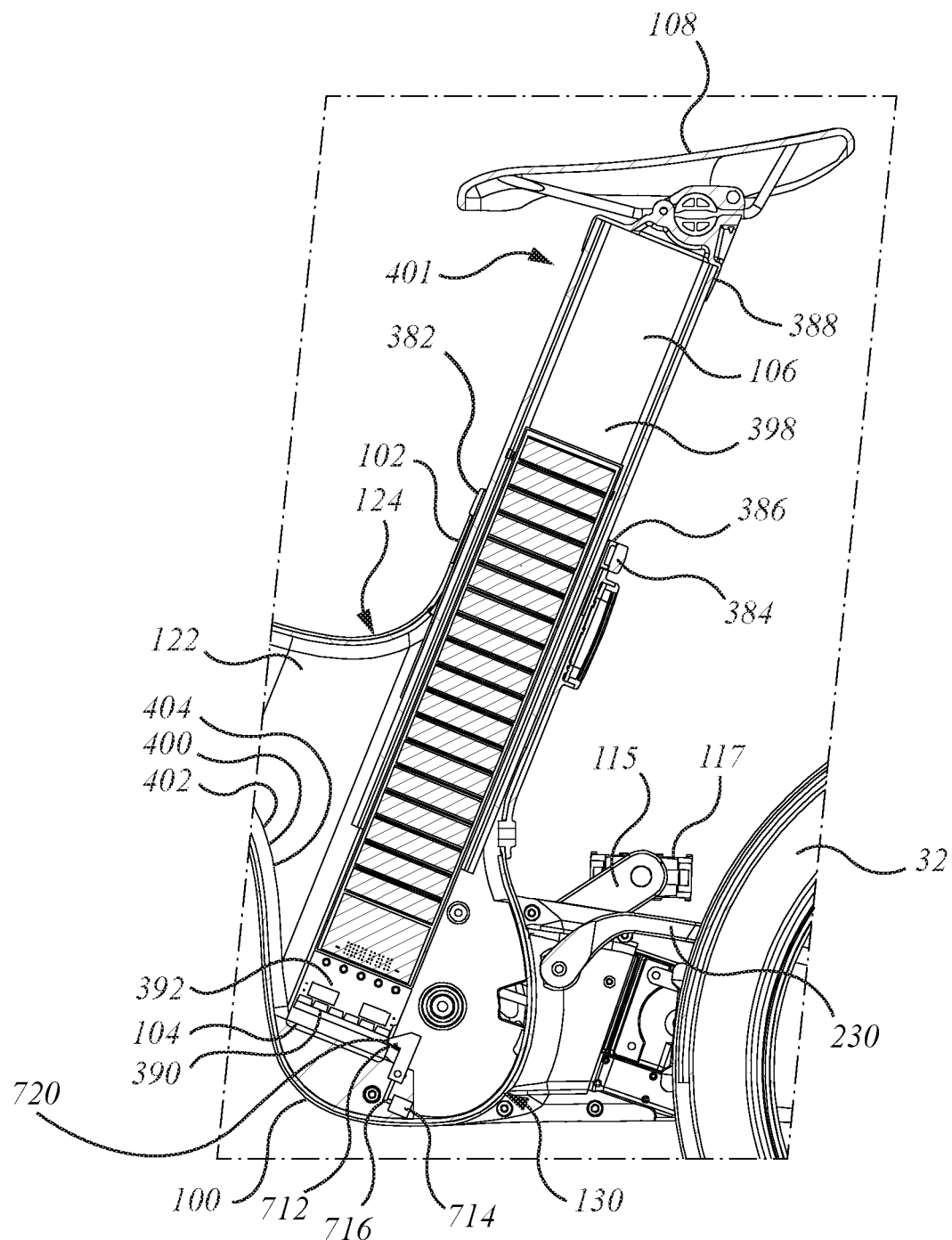

In an alternative configuration of the locking system, a latch 720 may be provided within the accommodation 104. Similar to latch 700, the latch 720 may be adjustable between a locked position (shown in FIG. 22D) and an unlocked position (not shown). In the locked position, the latch 720 may extend into the accommodation 104. In the unlocked position, the latch 720 can be recessed within the walls of the accommodation 104. The position of the latch 720 may be controlled by an actuator 714 and drive member 716 in response to electronic and/or mechanical control signals in a manner analogous to latch 700. The electronics module 392 may then have a locking member 720 in the form of a recess shaped to receive, and engage, the latch 720.

The automated control module 393 may use measurements from sensors such as 630 and 634, and a wheel speed sensor, to control operation of motor 82. For instance, the processor may use the voltage variance from torque sensor 630 to determine a rider's torque exertion. The motor controller may also determine the measured speed of the crank from the crank velocity sensor 634 or determine wheel speed directly from a wheel speed sensor. The motor control module may then activate motor 82 to adjust the speed of the wheels 30, 32 to match the rider's intended speed or torque or cadence.

The shape of casing 398 in cross-section corresponds to the inside clearance of seat post 106. The casing 398 may take on various shapes (e.g. rectangular, oval, round, square) to correspond to the inside clearance of seat post 106. This permits the shank of seat post 106 to travel in the space, or passageway, or well, between seat post sleeve 382 and module 392. The collapsed or retracted position, i.e., the limit of the second position, occurs when seat post is maximally retracted into that accommodation or chamber or well defined between sleeve 382 and the module 392. The electronics module installation may include a footing 376 that is mounted to the very bottom of the bottom bracket housing portion of middle portion 26 of frame 22. Footing 376 can be received by the socket 390. As explained above, footing 376 may be provided by the electrical and signal connector 377. When module 392 is installed in accommodation 104, footing 376 is located below the centerline $CL_{110}$ of axle 110. The shaft or well, of the accommodation 104 is such that, when installed electronics module 392 is forwardly clear of, and slides downwardly past, centerline $CL_{110}$. Alternatively, accommodation 104 can be positioned such that electronics module 392 is rearwardly clear of the centerline.

The power output from power supply module 394 (and related control signals from control module 393) can be conducted by a power circuit 400 to motor 82. The power circuit 400 may include a plurality of power and signal wires usable to rout power and control signals to and from various components on vehicle 20, such as vehicle sensors, user displays, lighting components, shifting components, and so forth. The circuit includes a main cable, or main cable harness 402. The main cable harness 402 may include the plurality of wires and cables that are routed throughout vehicle 20. It has a first portion 404 installed in middle portion 26 of frame 22; a second portion 406 installed in forward portion 24 of frame 22. Cable harness 402 is carried in a cable harness passageway formed in a respective bulge 405, 407 formed in the lower webs or flanges of portions 24 and 26. Cable harness 402 ends at a connector in the lower wall of front portion 24 near head tube 56. One or more brake cable may also be routed together with, or as part of, cable harness 402.

The cables on vehicle 20 can be routed to accommodate the various folds of the vehicle 20. The cables may be routed while contained predominantly within the frame of vehicle 20. FIGS. 17A-17E illustrate an example of a cable harness used to route cables over hinge 34 between the first portion 46 of the cross-bar 44 that is part of front portion 24, and a second portion 48 of the cross-bar 44, that is part of middle portion 26. A corresponding assembly may be provided for the rear hinge 36. Cables 530 (which may include multiple cables for control signals, power, mechanical cables such as hydraulic brake cables and shifting cables) may traverse the hinge 34 between the front portion 24 and middle portion 26. The cable harness can include a cavity on both the front portion 24 and middle portion 26, in the form of tubes 540 and 550. One of tubes 540 and 550 can include an enlarged portion 532 proximate the hinge 34. The enlarged portion 532 can house a loom usable to allow cable 530 to extend and retract as the hinge 34 is opened and closed. The enlarged diameter of the portion 532 may accommodate circlip fasteners 534 that may constrain the enlarged diameter of the loom within the enlarged portion 532. The other of 540 and 550 may omit restraining features, such as the circlip fasteners 534, to allow the loom to slide freely within that tube. This may allow the loom to retract or extend around the axis of hinge 34, as the hinge 34 is operated.

Figure 19A:
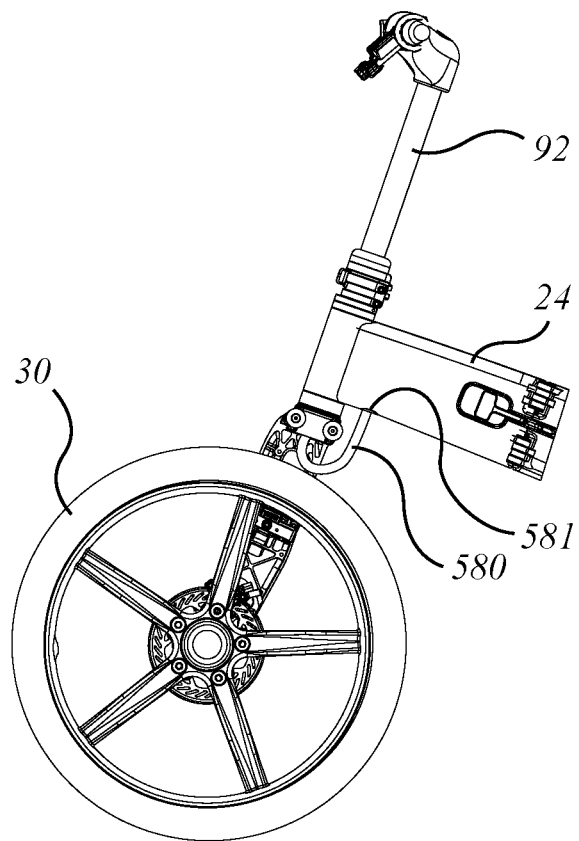
FIG. 19A is a left side view of an example steering shaft and arm assembly of the bicycle of FIG. 1A in an unfolded position.
Figure 19B:
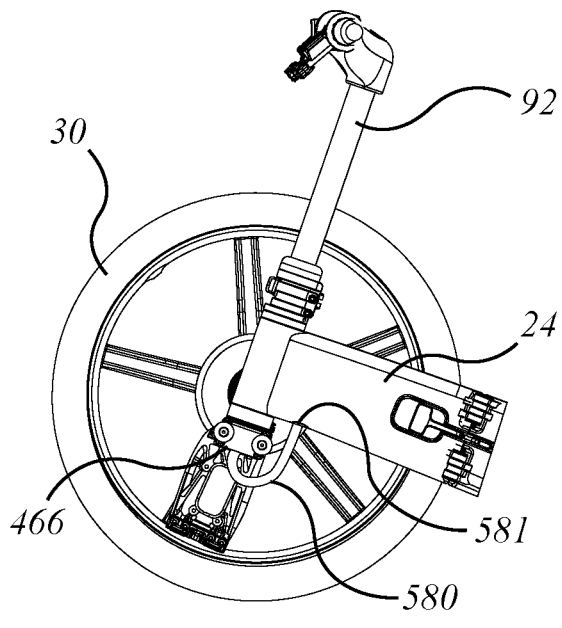
FIG. 19B is a left side view of the example steering shaft and arm of FIG. 19A with the front wheel folded up to lie beside the head tube.
Figure 19C:
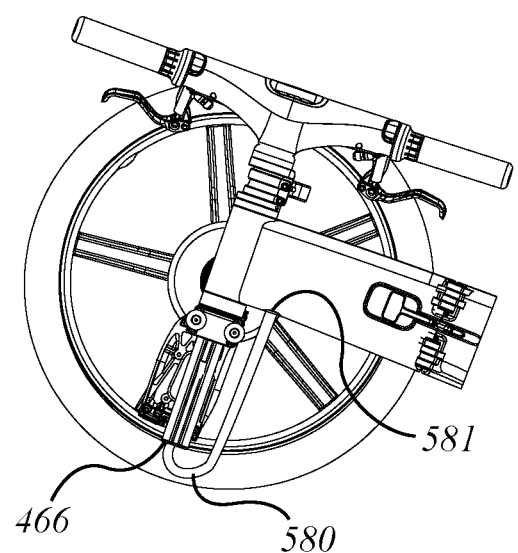
FIG. 19C is a left side view of the example steering shaft and arm of FIG. 19A with the handle bars turned and telescoped into the head frame.
Figures 20A, 20B:
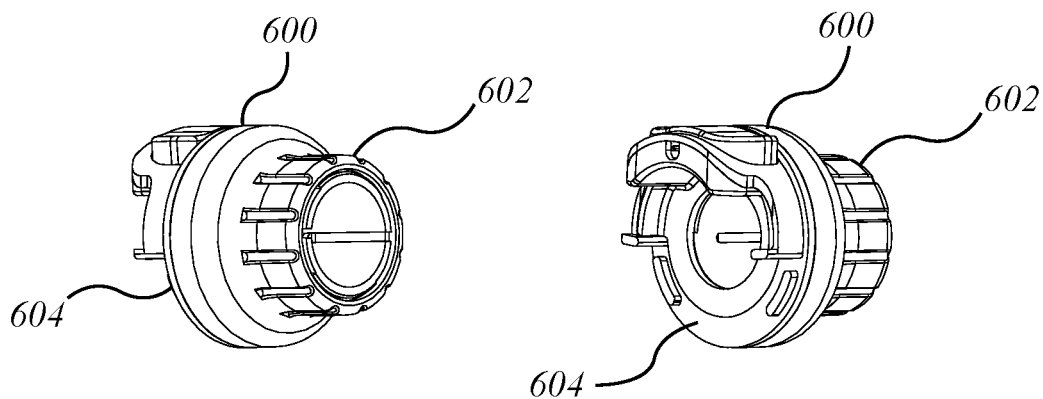
FIG. 20A is a perspective view of an example rotary control module of the bicycle of FIG. 1A.
FIG. 20B is an opposite isometric view to that of FIG. 20A.
Figure 20C:
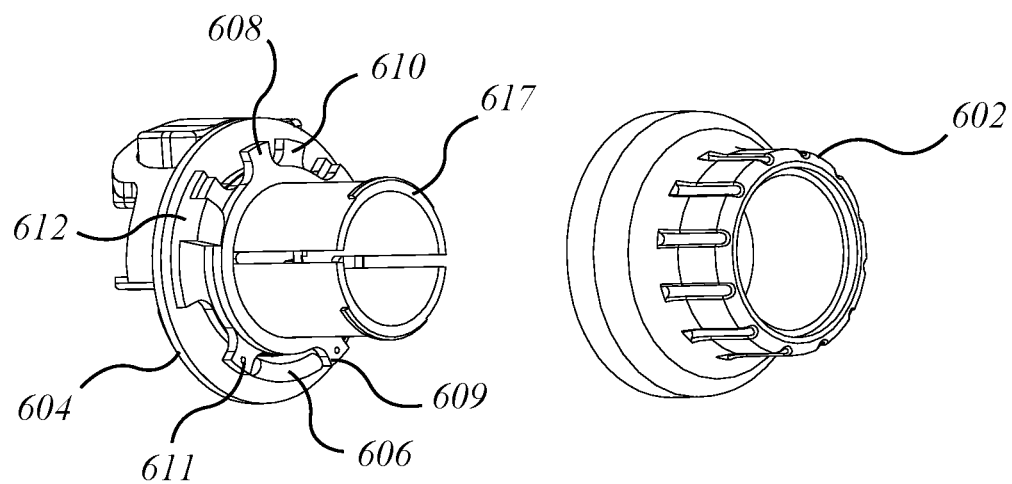
FIG. 20C is a perspective exploded view of the example rotary control module of FIG. 20A.
Figure 20D:
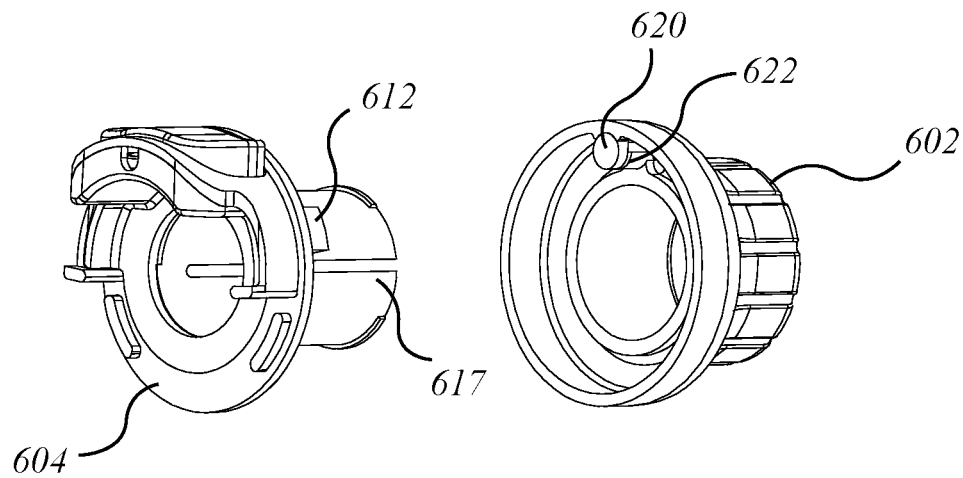
FIG. 20D is an opposite isometric view to that of FIG. 20C.
Figure 20E:
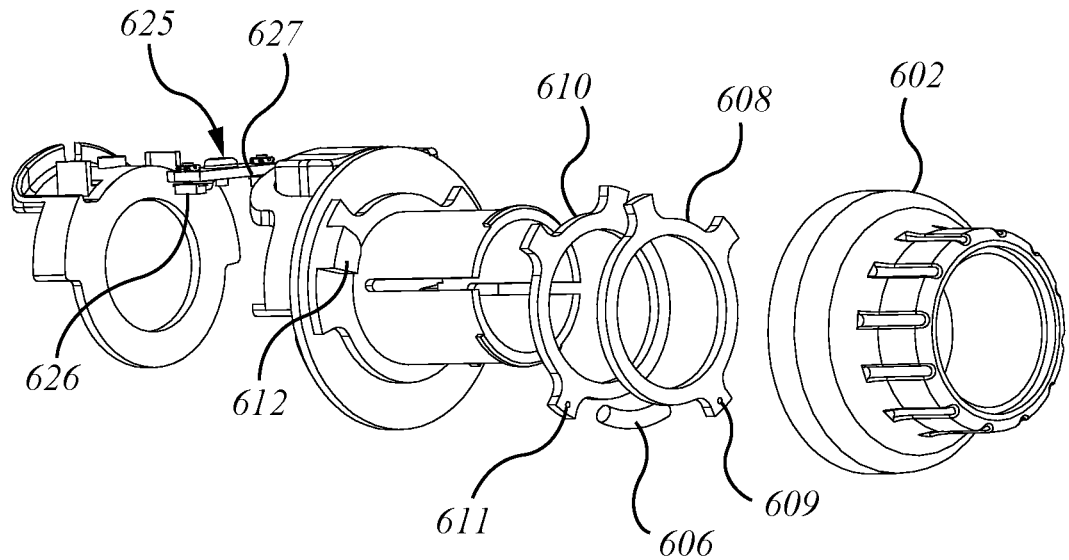
FIG. 20E is a perspective exploded view of the example rotary control module of FIG. 20A.
Figure 20F:
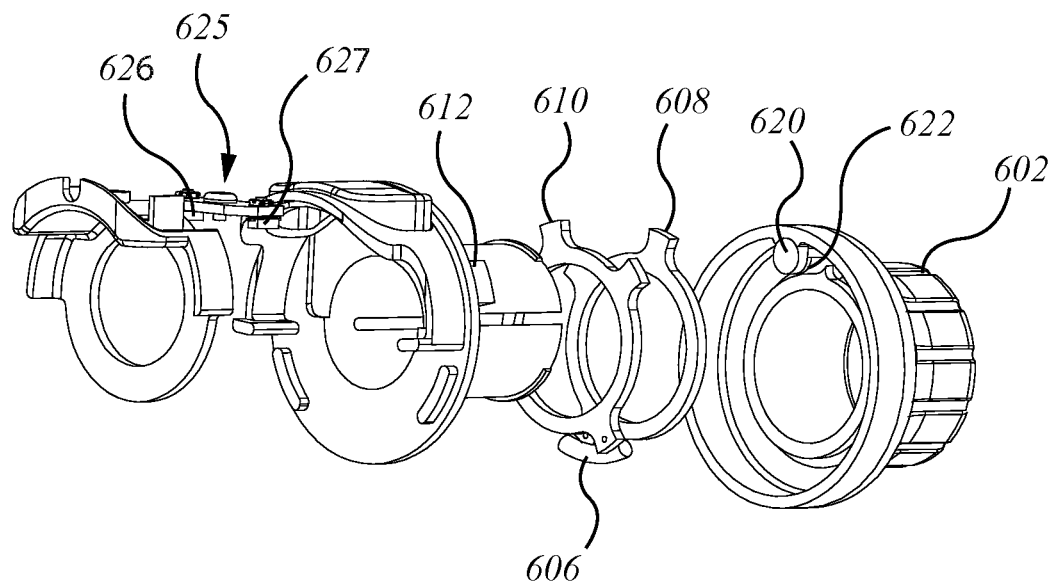
FIG. 20F is an opposite isometric view to that of FIG. 20E

Another cable harness extends downwardly from power circuit portion 406 and enters steering or stem assembly 60 running upward through cross-piece or shoulder 72. An example of the cable routing from the front portion 24 to head tube 56 is illustrated in FIGS. 19A-19C. The cable routing from the stem assembly 60 may be predominantly internal (and concealed with covers or conduits) except for cable portion 580. Cable portion 580 extends downward from a hole or opening 581 on the underside of the forward region of front portion 24. The cable portion 580 extends downward and is then looped into the underside of the steering stem shaft 68, e.g. into lower end 466 of handle bar stem 92. The cable portion 580 can include a complete reverse of direction (approximately 180 degrees) so that the ends of cable portion extend in opposite, but parallel, directions. This may facilitate 180 degree turning of the handle bar stem 92 without cable portion 580 interfering with arm 70 and minimizing twisting of cable portion 580. The cable portion 580 can be positioned on the opposite side of front wheel 30 from arm 70 to avoid interfering with arm 70 during operation, or folding, of bicycle 20.

Figure 18D:
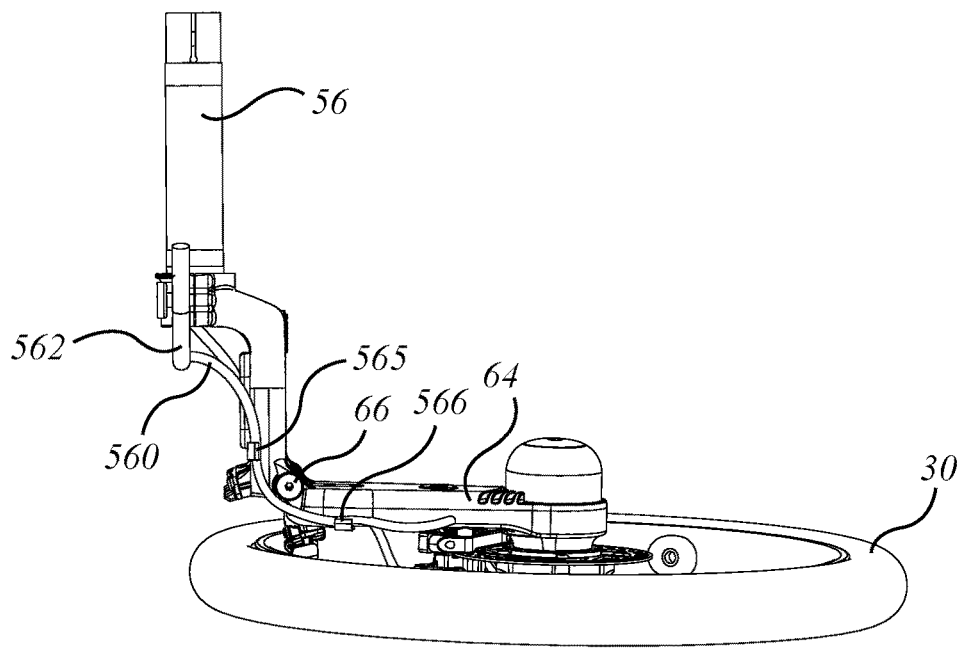
FIG. 18D is a front view of the example front arm assembly of FIG. 18A with the front wheel half-folded sideways to lie flat on the ground.
Figures 18E, 18F:
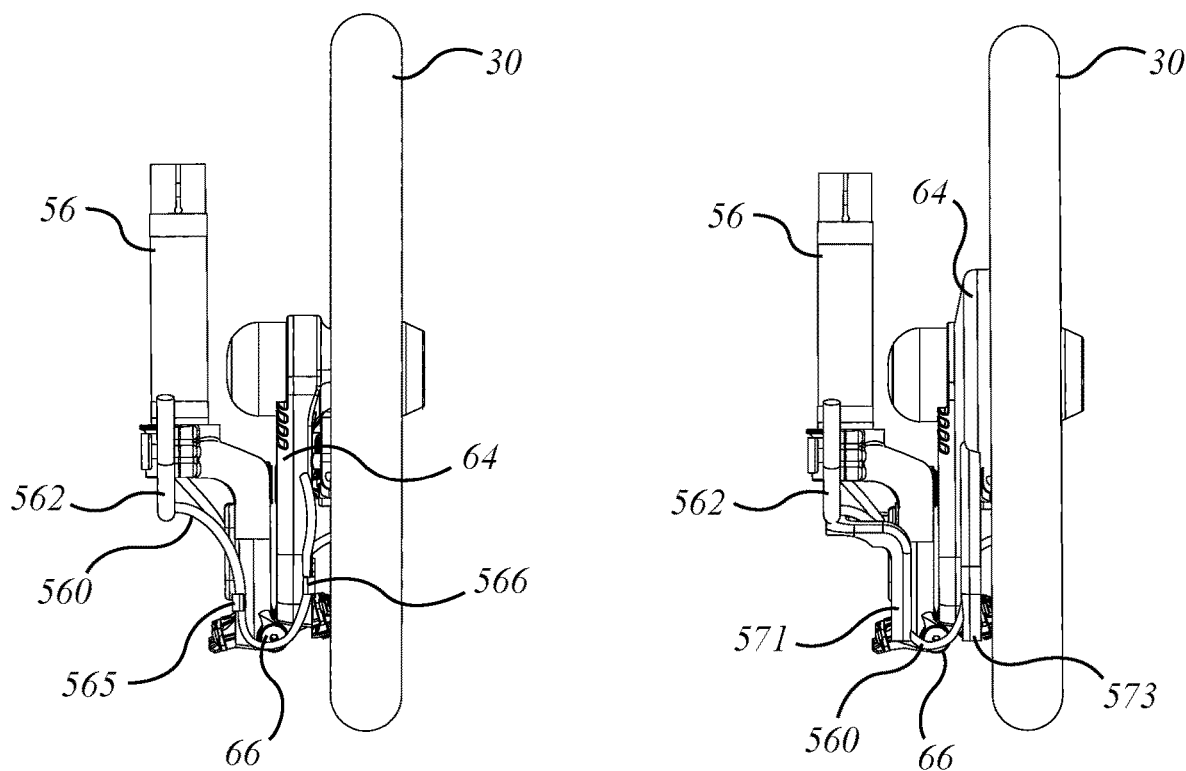
FIG. 18E is a front view of the example front arm assembly of FIG. 18A with the front wheel folded up to lie beside the head tube and with the cable covers removed.
FIG. 18F is a front view of the example front arm assembly of FIG. 18A with the front wheel folded up to lie beside the head tube.

The depth of insertion between the steering stem shaft 68 and the handle bar stem 92 may be approximately 2.5 times the diameter of the steering stem shaft 68. The length of the cable portion 580 that extends between the opening 581 in front portion 24 and the handle bar stem 92, and the length of the handle bar stem 92, can be controlled to prevent excess exposed cable upon folding of the bicycle 20. The total length of the handle bar stem 92 can be selected so that the telescoping function of handle bar stem 92, and the downward extension of the lower end 466 below the opening 581 are matched. Thus, as the handle bar stem 92 telescopes into the head tube 56 and the lower end 466 is moved downward, the amount of cable that is pushed out of the lower end 466 is substantially equal to the extent of the downward movement of lower end 466 relative to the opening 581. As a result, cable portion 580 can maintain a consistent bend radius throughout the folding and unfolding of bicycle 20, which may prevent damage to the cable A portion of the wires of the harness extends upwardly through stem assembly 60 to the central display 421 in the middle of handle bar assembly 90. The remainder of the cable, or cables, can be clipped to the sides of upper arm 74 and lower arm 78, whence it is directed to motor 82. In other embodiments, the cable or cables may be concealed with conduits or covers, or at least partially contained within the arm structure. As shown in FIGS. 18A-18F, the cable 560 can be attached to upper arm 74 at an attachment location 565 on a first side of hinge 66 and to lower arm 78 at a second attachment location 566 on the other side of hinge 66. As shown in FIG. 18A, a secondary cable 560' may also be positioned on the opposite side of arm 70. When arm 70 is folded, the cables 560, 560' can traverse the fold axis of hinge 66, rather than extend around hinge 66. This may allow the length of cable 560 between the attachment locations 565 and 566 to remain substantially constant as the hinge 66 is folded and unfolded. The cable 560 can be substantially fixed to first attachment location 565 and second attachment location 566.

The cable 560 may be substantially enclosed within covers 562 and 564. The arm cover 564 can include an upper portion 570 on the side of upper arm 74 and a lower cover portion 572 on the side of lower arm 78. An accommodation 571 in cover 564 allows cable 560 to fold through hinge 66 when the arm 70 is folded. The cable 560 may extend into the void space provided by accommodation 571 to traverse the folding axis of hinge 66.

Looking in closer detail at steering shaft and arm assembly 61 and handle bar assembly 90, as shown in the examples of FIGS. 15A-15F, a first or top head tube cup 410 is press fit into the upper opening of head tube 56, and a second of lower head tube cup 412 is press fit into the lower opening of head tube 56. The length of the head tube is then defined as length $L_{56}$ measured over the upper and lower head cups. First and second or upper and lower bearings 414, 416 seat in cups 410 and 412 respectively. A retainer 418 is fixedly mounted inside bottom cup 412. Retainer 418 includes an indexing member, such as may be identified as lug 420 that extends axially downward. Lug 420 is a stationary (i.e., fixed position) indexing member. It extends in a partial circumferential arc. A crown race 422 threads onto the base of the steering stem shaft 68. Crown race 422 also has an indexing member 424. Indexing member 424 also extends in a partial circumferential arc and stands upwardly of the bottom or outside flange of crown race 422. At the opposite end of head tube 56, a compression ring 426 is threaded to engage the stem shaft 68 distantly from crown race 422. When compression ring 426 is tightened, and locked in place, it pre-loads the upper and lower bearings. In this condition stem shaft 68 extends through the internal passageway 428 of head tube 56, such that the upper end of stem shaft 68 protrudes upwardly beyond the upper end of head tube 56.

The relationship of indexing members 420 and 424 is such as to establish opposite ends of a range of angular motion of stem shaft 68 relative to head tube 56. That is, head tube 56 defines an open-ended internal accommodation or passageway 428 between cups 410 and 412. Stern shaft 68 seats within that passageway. In the embodiment shown, stem shaft 68 is co-axial with head tube 56. They need not be co-axial. It is convenient that they are co-axial. The axial degree of freedom of stem shaft 68 is constrained by the bearing fittings at each end of head tube 56 such that stem shaft 68 has only a single degree of freedom of motion, namely angular rotation about the axis of rotation $CL_{68}$. This motion is also limited to less than 360 degrees (i.e., it cannot spin around), by the first and second abutments, or abutment relationships, of either ends of indexing members 420 and 424 with each other. In the embodiment shown, the sum of the arcs of indexing members 420 and 424 is about, or slightly less than, 180 degrees. Accordingly, the total of the unfilled gap is 180 degrees, or slightly more than 180 degrees, such that the steering can turn fully right and fully left. Indexing members 420 and 424 are fixed in position such that this range of motion is equal to left and right, i.e., 90 degrees either way. By being limited in this way, the inability to over-turn or fully spin stem shaft 68 may tend to reduce the likelihood of cable harness 402 being damaged.

A handle bar shaft retainer, or handle bar stem clamp is indicated as 430. It may have the general shape of a cylindrical C-clip with bent out end flanges. A partial circumferential aperture or slot 438 is formed in the middle of the wall of the cylinder, leaving an upper circumferential band and a lower circumferential band. In the lower portion of the flanges, a mechanical fastener in the form of a short screw 432 tightens, or clamps, the lower band, and therefore clamp 430 more generally, to stem shaft 68 above compression ring 426, but below compression slot 434. An upper mechanical fastener, such as longer cap screw 436 passes through the upper hole in the flanges, level with slot 438, and into a cylindrical pin 456. An actuator, in the form of a tightener or clamp handle 468 has an eccentric cam base mounted about pin 456, and, when closed, squeezes the upper portion (i.e., slotted skirt 88) of stem shaft 68 to tighten on handle bar stem 92. A retainer or guide or indexing fitting 440 seats inside the upper ring of stem clamp 430, seated on a radially inwardly protruding flange or shoulder, or shelf. The bottom edge of the outside of fitting 440, and the corresponding portion of clamp 430 include respective indexing members 442, 444 that correspond to indexing member 420 and 424 in nature and function. In this case, the mating function is to limit rotation fitting 440 relative to clamp 430, and therefore relative to stem shaft 68.

Fitting 440 has the general form of a ring or hollow cylinder, with indexing member 442 protruding from the outside wall, and another indexing fitting, or lug, or finger, 446 protruding radially inwardly. A dust cover 448 seats onto the top of clamp 430 such that fitting 440 is axially retained, i.e., is has only a single degree of freedom of motion, that motion being limited by indexing fittings 442, 444 to a limited range of motion. In the example shown the range of motion of fitting 440 is roughly 90 degrees allowing stem post 92 to turn only 90 degrees clockwise relative to the stem shaft 68. In the example shown, post 92 may be turned 90 degrees to the right-hand side to allow handle bar assembly 90 to fit between the wheels when retracted.

Handle bar stem 92 has the form of a hollow cylindrical shaft. That shaft is generally circular in section, other than that the rear of the shaft has an axially extending indexing fitting in the form of a groove or spline 450. Spline 450 could possibly be curved or helical. It is convenient that it extends axially parallel to $CL_{68}$. Spline 450 defines an accommodation in which to receive lug or finger 446. When so engaged, indexing fitting 440 is constrained to have the same angular displacement and orientation as stem 92. Conversely, the angular rotation of stem 92 is then subject to the limited range of angular motion in a first rotational degree of freedom permitted by indexing members 442, 444. At the same time, stem 92 has an axial degree of freedom permitting it to translate along the inside of stem shaft 68. A retainer, such as may be in the form of a screw 452 is located in a lower portion of spline 450. Screw 452 prevents upward movement of handlebar stem 92 past a defined range, e.g., such as to be lifted out of engagement with stem shaft 68. Opposite groove or spline 450 handlebar stem 92 has an opening or aperture 454. Another indexing member, this time in the form of a ball, or spud, or detent 98 is of a size to co-operate with opening 454. A spring 458 seats inside stem 92 and biases detent 98 to the radially outward position. Although it need not necessarily be so, detent 98 may be located at the same, or substantially the same, height as screw 452. At the base of upper slotted skirt 88 or stem shaft 68, opposite the slot 434, in the 12 o'clock position there is an indexing fitting or detent aperture 96.

In use, as stem and handle bar assembly 90 is being drawn upward, screw 452 of handlebar stem 92 will encounter finger 446, thus establishing the upward end of the range of motion of stem 92 when this happens, detent 98 pops radially outwardly through apertures 454 and 96, which fixes them both axially and angularly together. At the same time, detent 98 pops radially outwardly into slot 438 of 430. When so located, handle 468 of clamp 430 is closed, squeezing skirt 88 to clamp onto handlebar stem 92. This is the first or upright, or extended or deployed, or in use position. In this position, the lower portion 462 of stem 92 below detent 98 and screw 452 is of a length that corresponds to the length of head tube 56. That is, when in position, lower portion 462 overlaps more than half of, and in the embodiment shown all or substantially all, of the length of passageway 428 from upper cup 410 to lower cup 412. The longer portion 464 above detent 98 and screw 452 may be in the range of 3/2 to 5/2 times that length, and, in the embodiment shown, the exposed portion of stem 92 is double, or roughly double, the enclosed length, that is, portion 464 is roughly double the length of portion 462, and therefore double, or approximately double, the length of head tube 56.

The handlebars can be collapsed by reversing the process. That is, clamp 430 can be opened, and detent 98 pushed radially inward to overcome the bias of spring 458. This permits stem 92 to slide axially downward as spline 450 runs past finger 446. Inasmuch as the bottom end of stem shaft 68 is open-ended at the bottom, as is cross-piece 72, the bottom end of stem 92 can pass downwardly proud of head tube 56, stem shaft 68 and cross-piece 72, and, to the extent that front wheel 30 is not present (as when having been folded to one side) stem shaft can extend into the accommodation otherwise occupied by front wheel 30. In the embodiment shown, assuming handlebar cross-member 94 to have been rotated sideways, when handlebar assembly cross-member 94 bottoms on dust cover 448 of clamp 430, the bottom end of stem 92 may be flush with, or approximately flush with, or slightly beyond, the height of hinge 66. In that second or collapsed or folded or lowered position, the lower end 466 of stem 92 and hinge 66 both lie within the lateral projection of wheel 30 and are less than the radius of wheel 30 from the axis of rotation $O_{30}$ of the hub of wheel 30. Handlebar cross-member 94 is then positioned in a tangent or substantially tangent position relative to wheel 30. In this folded position, the hub of wheel 30 lies beside head tube 56, with the centerline axis $O_{30}$ intersecting passageway 428.

In summary then, there is a steering assembly 60 for a foldable bicycle 20. In the example shown, it has a head tube 56; a stem shaft and arm assembly 61 including a stem shaft 68 and an arm 70; a handle bar assembly including a stem post 92 and handle bar cross-member 94 mounted to said stem post 92. The stem post 92 is mounted within head tube 56. Stem post being 92 is longer than head tube 56. Stem post 92 is movable within head tube 56 between a first position and a second position. In the first position, the handle bars are raised for use. In the second position stem post 92 extends downwardly proud of head tube 56.

As seen, stem post 92 has a first end and a second end. Handle bars 94 are mounted to the first end of stem post 92. Stem post has a length and head tube 56 has a length. The length of the stem post is at least double the length of the head tube. In the second position the second end of the stem post extends downwardly proud of the head tube a distance greater than the length of the head tube. In the second position at least as much of the stem post extends downwardly proud of the head tube as stands upwardly proud of the head tube.

Steering assembly 60 includes a steering stem and arm assembly 61 defining a front wheel accommodation 80 the bicycle 20. The assembly 61 includes a steering stem shaft 68 that mounts within the head tube 56. Head tube 56 has a passageway 428 formed therethrough. Stem shaft 68 is movable within the passageway 428. The assembly 61 includes an arm 70 to which the front wheel 30 mounts. Arm 70 is sideways foldable between a first position in which the front wheel occupies front wheel accommodation 80, and a second position in which arm 70 has been sideways-folded and front wheel 30 lies beside arm 70 outside front wheel accommodation 80. Arm 70 has an upper portion 62 and a lower portion 64 joined at hinge 66. The arm 70 is sideways foldable; the wheel has a central hub, and when the arm is folded at the hinge the hub of the wheel lies beside the head tube. Arm 70 has an upper portion and a lower portion joined at a hinge; the wheel has an axis or rotation and an outside radius; and the hinge is located a distance within the outside radius of the axis of rotation. When folded, the arm 70 is secured in the folded position magnetically. The handle bars 94 are selectively movable between a cross-wise position and a sideways position relative to the front wheel 30 of the bicycle. Front wheel 30 is limited to an angular range of motion of less than 360 degrees of steering rotation.

Figure 11C:
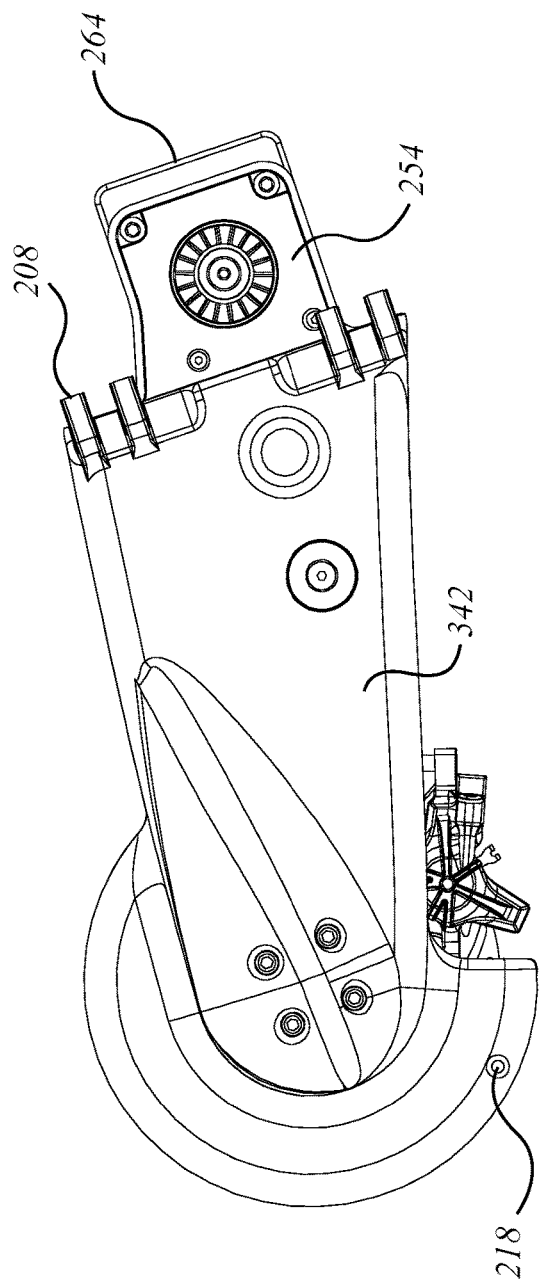
FIG. 11C is a right hand view of the example swing arm of FIG. 11A.
Figure 11D:
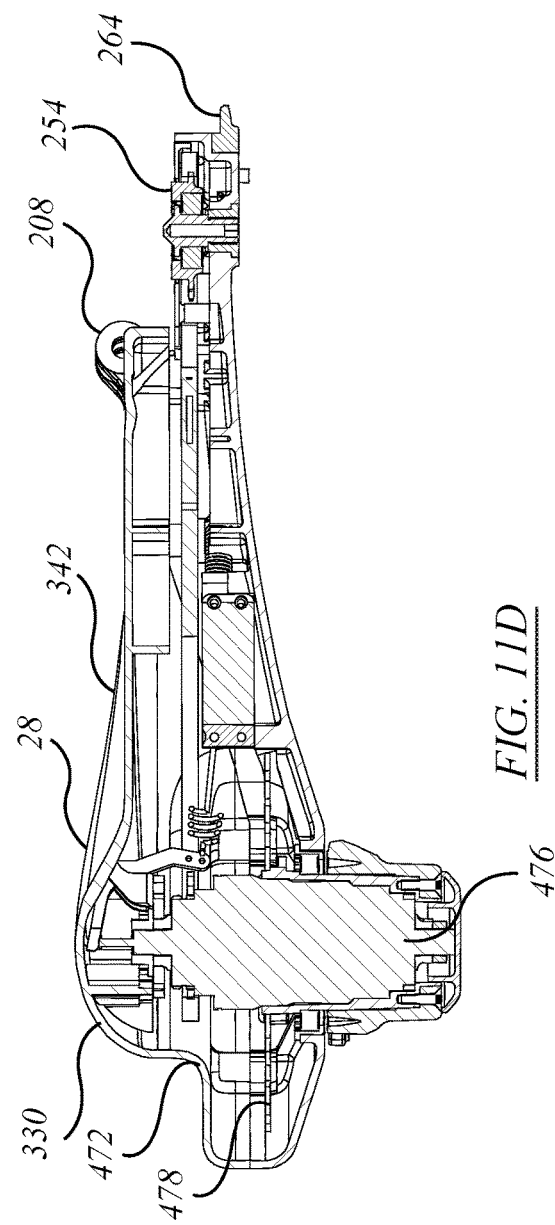
FIG. 11D is a transverse section of the example swing arm of FIG. 11A.
Figure 11E:
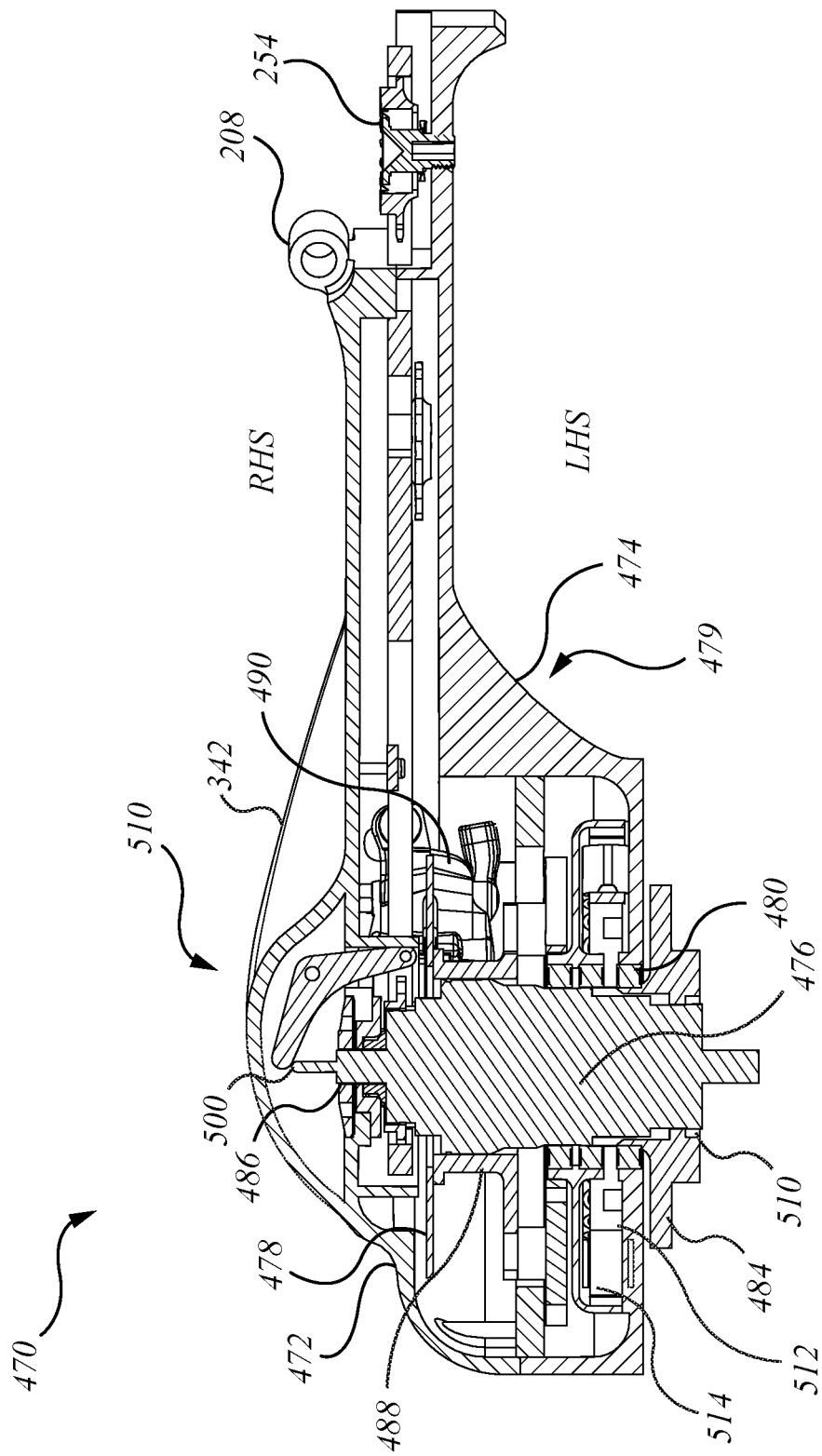
FIG. 11E is comparable to FIG. 11D, but shows an embodiment that includes an example motor in the rear hub.
Figure 12A:
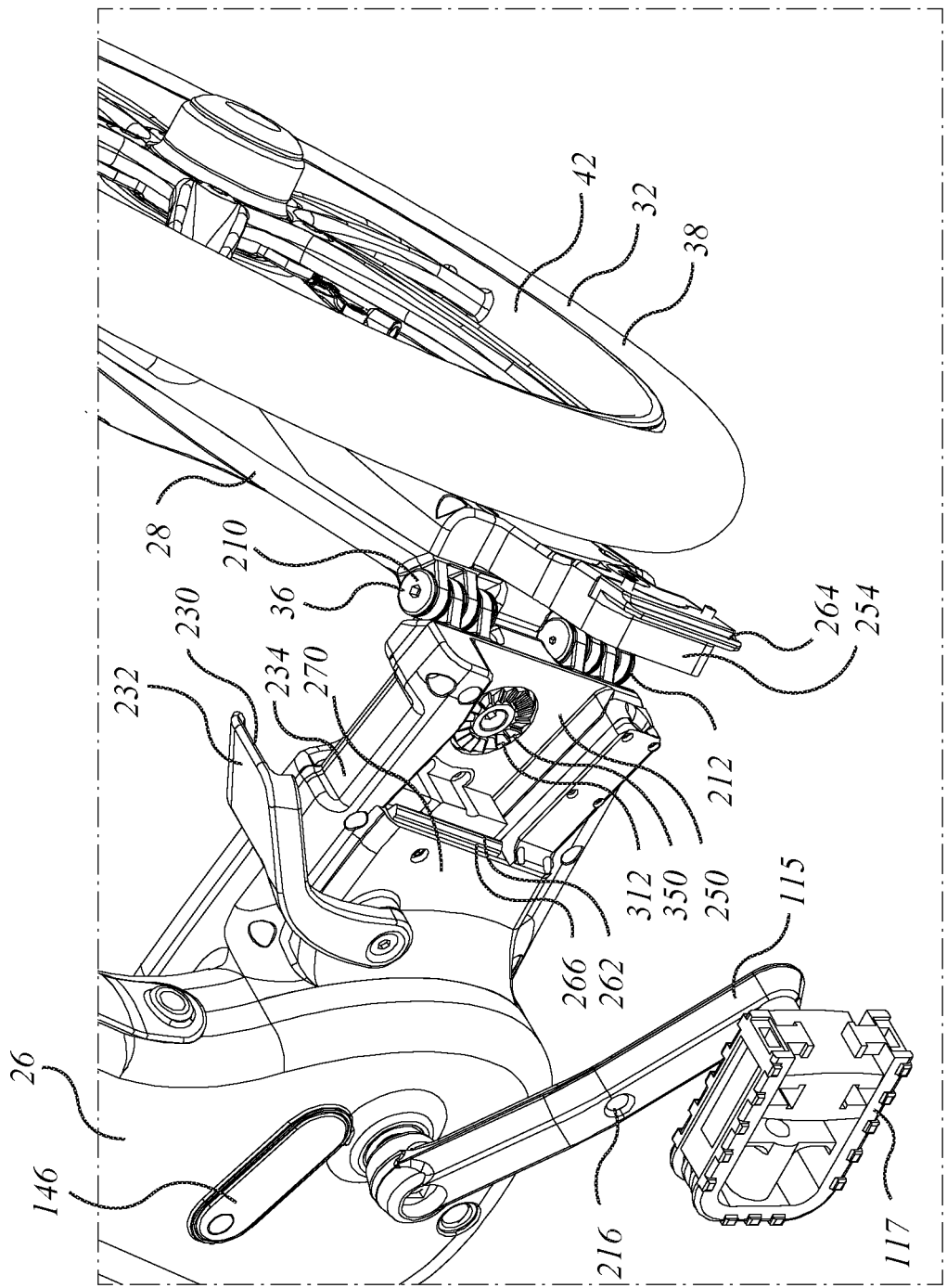
FIG. 12A is a partial isometric view showing an example hinge between the middle portion and swing arm portion of the example bicycle of FIG. 1A in a half folded position showing an example mid drive transmission interface installation as split open.
Figure 12B:
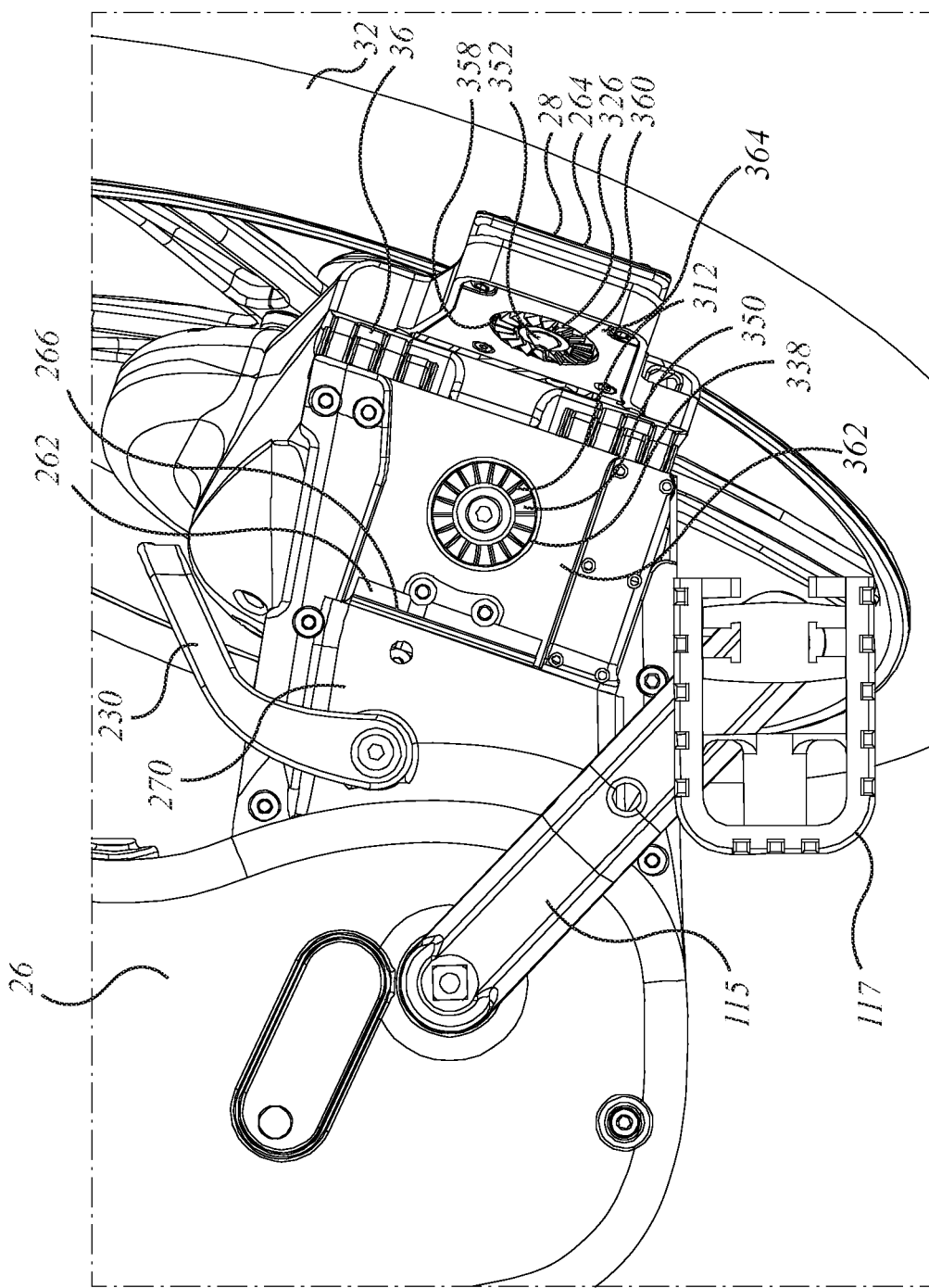
FIG. 12B is an alternative, left hand side view taken orthogonally to the middle portion of the frame, and enlarged, of the example hinge as half open in FIG. 12A.
Figures 12C, 12D:
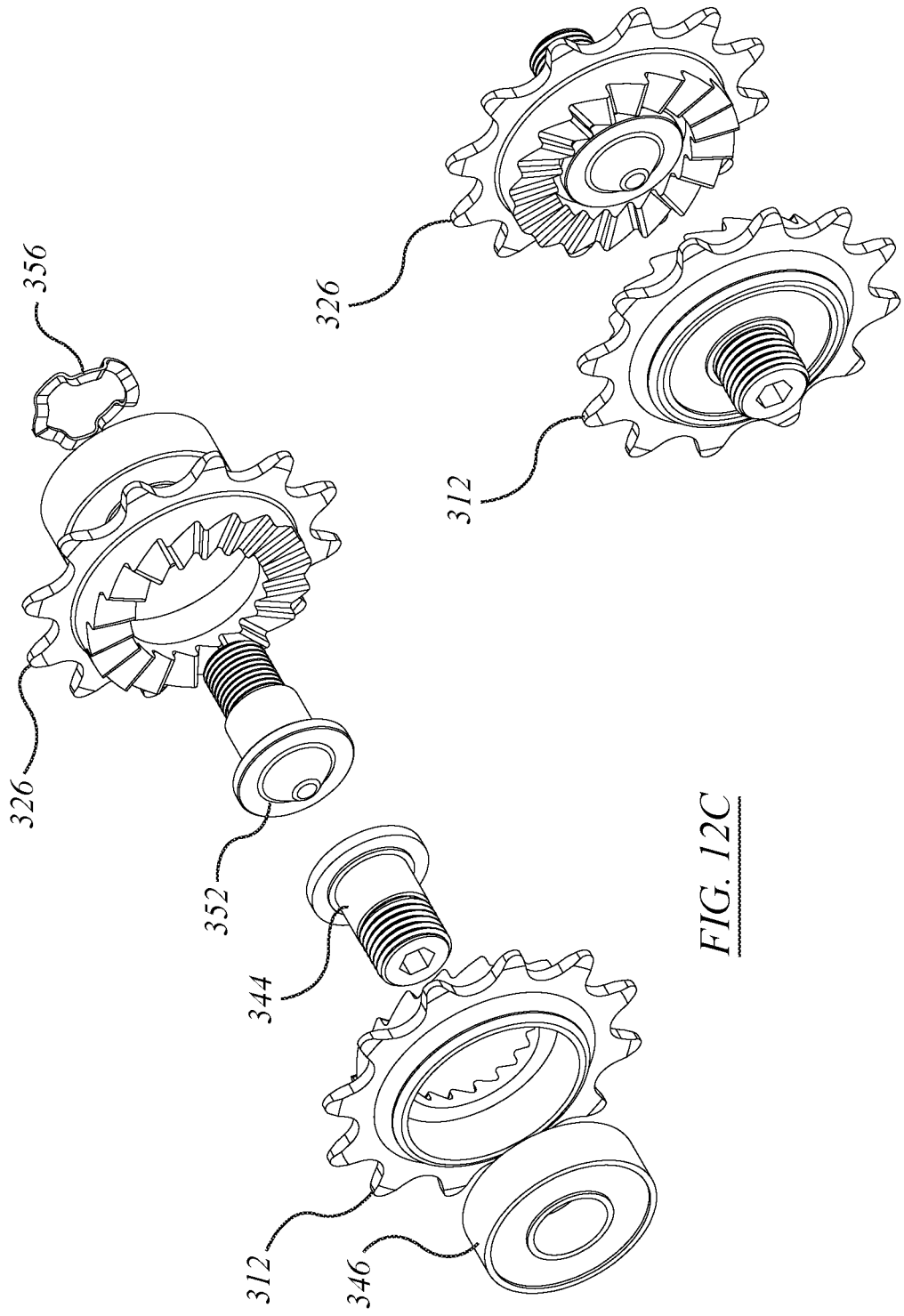
FIG. 12C is an exploded isometric view of the example disengageable drive transmission interface assembly of FIG. 12A.
FIG. 12D is a view of the example drive transmission interface of FIG. 12C as assembled.
Figure 12E:
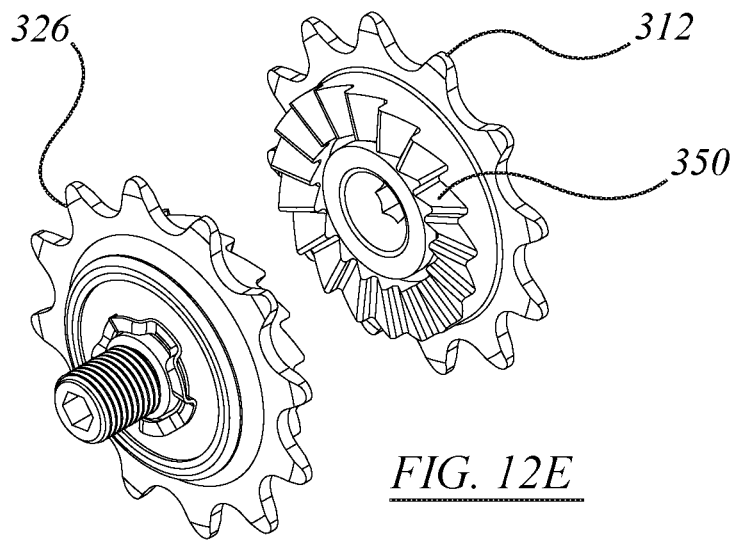
FIG. 12E is the reverse view to that of FIG. 12D.
Figure 12F:
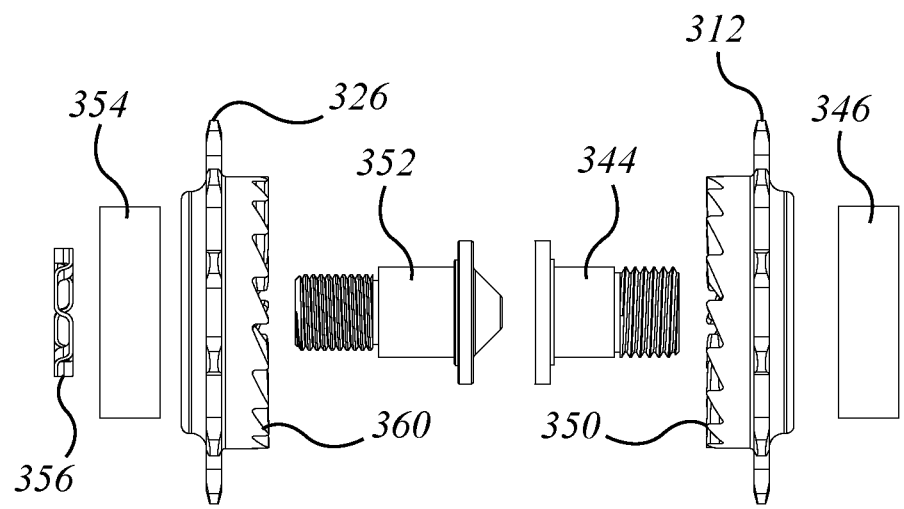
FIG. 12F is an exploded side view of the example assembly of FIG. 12C.
Figure 12G:
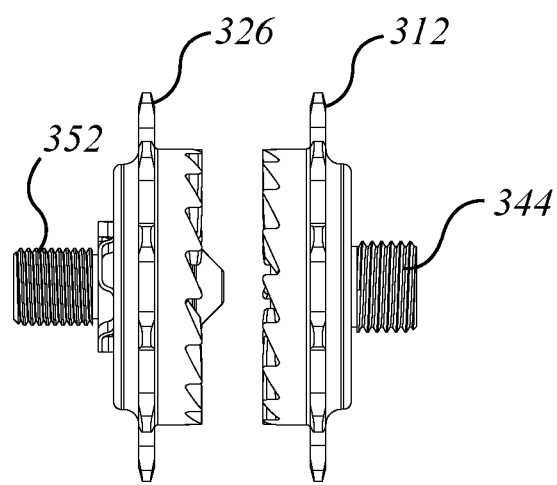
FIG. 12G is an assembled view of the example assembly of FIG. 12F.

Returning again to FIGS. 11D and 11E, and the mounting of rear wheel 32 on rear hub assembly 330 of FIG. 11D and hub assembly 470 of FIG. 11E. As noted above, it is an asymmetric mount: the swing arm extends only on one side (e.g., on the right hand side) of wheel 32, it is not bifurcated to extend arms on both sides. Also as noted, the left-hand and right hand swing arm covers or shells 340 and 342, bolt together. Left hand shell 340 has a curved, frustoconical shape somewhat like a volcanic island. If the parting line of left hand shell 340 with right hand shell 342 is thought of as sea level, at the rearmost end of left hand shell 340 may be a generally conical mound, somewhat resembling a volcano in shape. From roughly the 6 o'clock position to the 12 o'clock position (when viewed from the right hand side) the rearward end of shells 340 and 342 are generally circular and have a rounded, enclosed form as if the side of the volcano extended steeply into the sea. On the forward side, of the "volcano", the fowl of left hand shell 340 resembles the shape of a longer, forwardly extending lava plain and includes a decreasingly curved arc that becomes shallower as it extends toward its forward end at latch 260. The rearward portion is rounded in the manner described to accommodate the rotating elements—the main output gear 336, the multiple speed hub and shaft module 476, the disc brake 478, and main bearing 480, and their supporting structure (see e.g. FIG. 11E). In the embodiment shown, these rotating elements are mounted co-axially. Curve 474 of the forward end of left hand shell 340 is formed to enclose the running gear of the rearward elements of the endless tension element drive, while also leaving an accommodation or space, or allowance, shown generally or notionally as 479, that defines a clearance envelope for rear wheel 32. Left hand shell 340 has an aperture 482, and a peripheral flange 484 formed at the lip of the volcano, i.e., at the apex, or frustum, of the truncated cone. Flange 484 defines the bearing seat into which main bearing 480 locates. In the embodiment shown, bearing 480 is mounted at, or near to, the central plane of rotation $P_{32}$ of wheel 32, and therefore in the central plane $P_{20}$ of bicycle 20 more generally, such that the eccentricity of the wheel loads on bearing 480 is minimized, or made zero. In U.S. Pat. No. 8,540,322 to Thorpe, a horizontally extending cantilevered cylindrical stub shaft is employed. In the embodiments of FIGS. 11D and 11E herein, there is an eccentricity (i.e., a moment arm) for vertical forces between the center of reaction of the swing arm (carried through hinge 36) to the center of bearing 480, i.e., in plane $P_{20}$. However, rather than being resolved into a relatively small diameter stub shaft, it is resolved into the conical section of conical mound 472. This may tend to reduce or minimize the length of the cantilever in the axial direction of the hub, and greatly increases the depth of section of the cantilever as the conical section rapidly diverges from the bearing mount. The resultant effective aspect ratio of length to depth in resistance to vertical deflection of the cantilever, is much less than 1:1. In the embodiment shown, the depth is more or less the full height of shells 340, 342 from bottom to top. Further, the twisting, i.e., torsional, moment carried in swing arm 28 is carried by the entire closed-periphery structural section defined when the shell halves are secured together. This shell has a comparatively high polar moment of area, or polar moment of inertia about the x-axis of swing arm 28. The chain gear drive, or right-hand, stationary, non-rotating end of the multiple-speed hub and shaft module 476 is held in right hand shell 342 at a threaded rod, spacer and threaded fastener, or nut 486. This nut is contained within the enclosure envelope of right hand shell 342.

In the embodiment illustrated, disc brake 478 is mounted to the rotor body of hub and shaft module 476 on the inside of the swing arm housing, rather than on the outside. That is, it is mounted between bearing 480 and output gear 336. This may be seen in distinction to being mounted to the output cap or hub termination shaft immediately at or near the output lugs to which the wheel is mounted. In terms of the path of transmission of forces, disc brake 478 is between bearing 480 and gear 336, rather than being mounted along the load path between the main bearing 480 and wheel 32. To that end, disc brake 478 is mounted on a spider or carrier 488 that mounts to the outside of the body of shaft module 476, and forms the cylindrical surface that passes through bearing 480, and to which bearing 480 is mated. The brake caliper 490 is then also mounted within the housing, rather than outside. The hub spindle 500 with the lugs 492 is mounted to the left end of carrier 488, and thereby to the rotor body as well. A hub cap or cover is seen at 496. Wheel 32 is mounted to hub spindle 500. When shell halves 340 and 342 are bolted together, the rear chain drive assembly and the disc brake assembly are enclosed and protected from dirt, grit, moisture, and so on. The only moving part that remains exposed is spindle 500, which may tend to be robust. In the embodiment of FIG. 11E, the layout is substantially similar to that of FIG. 11D. However, in addition to the pedal driven mechanical input, hub and shaft module 510 also includes the rotor 512 of an electrical motor roughly at the location indicated. The stator 514 of rotor 512 is located in the same axial plane and extends around the rotor. In a further embodiment, main bearing 480 may be off-set to the left of plane P2o. In a still further embodiment, main bearing 480 may be replaced by a pair of axially-spaced apart bearings, the spacing of the bearings tending to provide a moment arm such that the pair of bearings may address eccentric loads. Although the description refers to multi-speed or multi-gear rear wheel hubs, a single speed or single gear hub, or continuously variable transmission could also be provided.

The handle bar assembly 90 can include a number of control components, such as brake levers and gear shifters. For example, the handle bar assembly 90 may include a rotary control ring module 600. An example of a rotary control ring module 600 is shown in FIGS. 20A-20F. The rotary control ring module 600 may have an outer, rotatable member 602 mounted to an inner control body 604. The rotatable member 602 may be adjustable by a rider of vehicle 20 to adjust various control functions of the vehicle. For instance, the rotary control ring module 600 may be used to provide various electronic control functions such as electronic gear shifting, throttle boosting, engaging/disengaging cruise control and other functionality. In some cases, the settings configurable by the rotary control ring module 600 may be customizable using an electronic control module provided with vehicle 20.

The inner body 604 can include a cylindrical projection member 617 that extends centrally within the rotatable member 602. A pair of rings 608, 610 can be mounted on the projection member 617. The rings 608, 610 may rotate about the projection member 617. The rings 608 and 610 may each include a plurality of lateral protrusions 609, 611. The projection member 617 has stops 612 that engage the protrusions 609, 611 and prevent further rotation of rings 608, 610. The projections 609, 611 on the rings 608 and 610 can be circumferentially offset so that the rings 608 and 610 are rotatable in different directions about the projection member 617. A spring 606 may be positioned between, and attached to, protrusions on the respective rings 608 and 610. The tension of spring 606 may act to pull the rings 608 and 610 together around the body of the projection member 617. The inner surface of the rotatable member 602 can include a protrusion or pin 622 that can engage the protrusions 609, 611 on rings 608 and 610 independently. The tension of spring 606 may bias the rings 608 and 610 to a resting position. A rider can turn the rotatable member 602 to rotate one of the rings 608 and 610, overcoming the biasing of spring 606. The inner control member 604 can include a sensor 625 that is configured to measure the rotational position of the rotatable member 602. For example, the rotatable member 602 can include a magnetic member 620. The magnetic member 620 may be aligned with the control pin 622. Magnetic sensors 626, 627 can be provided on the inner control member 604 to measure the position of the magnetic member 620. The measured position of the magnetic member 620 may be used by the automated control module to adjust the speed of the vehicle 20.

Figure 21A:
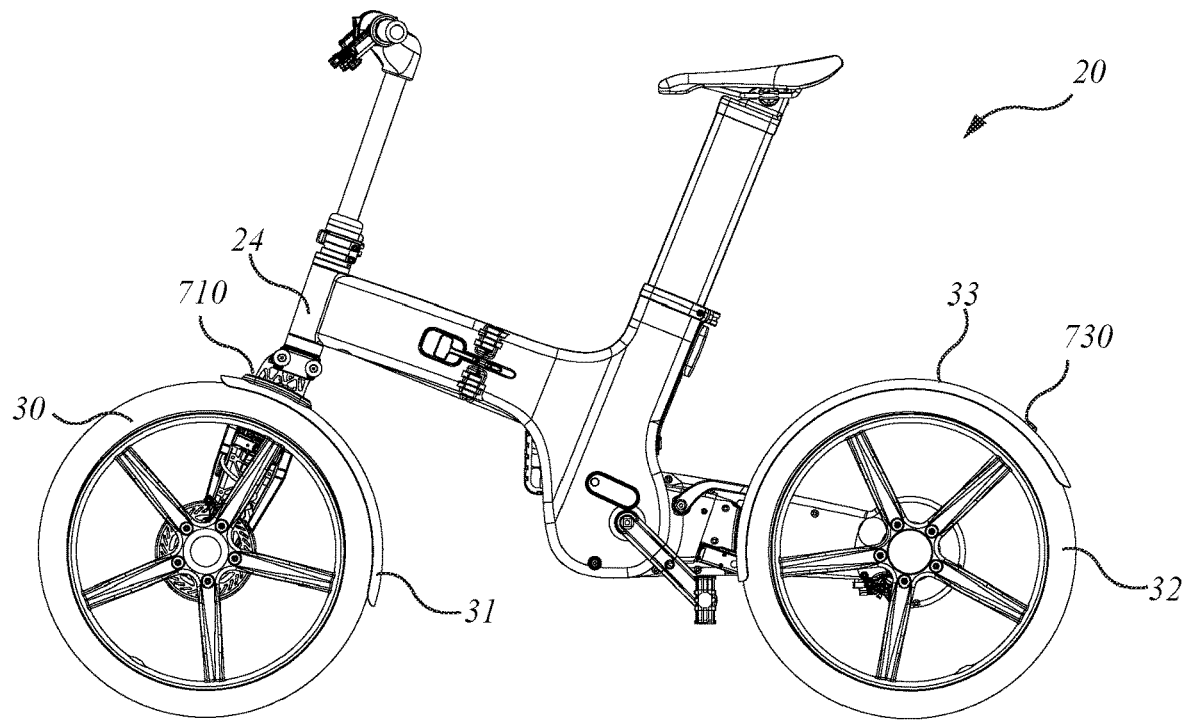
FIG. 21A is side view of another example folding bicycle showing mounting components for front and rear fenders.
Figure 21B:
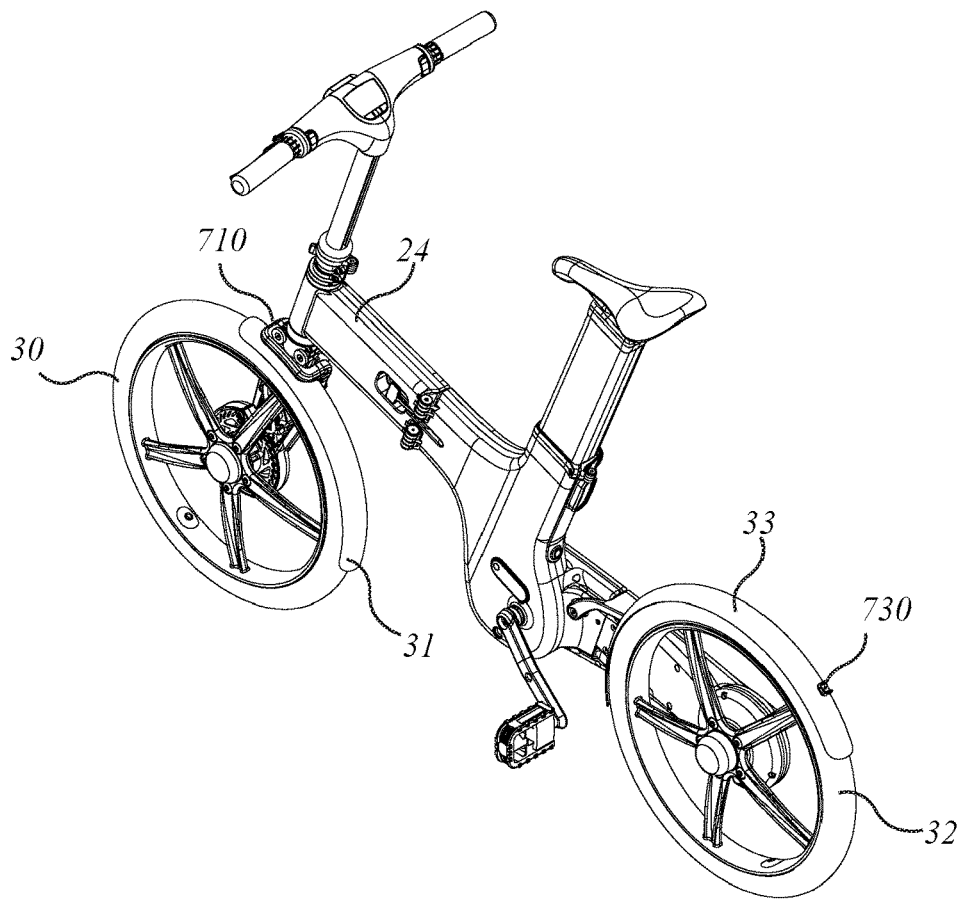
FIG. 21B is a perspective view of the example folding bicycle of FIG. 21A from the rear and to the left.

As mentioned above, the forward mud guard or fender 31 may optionally be mounted on the rear fender 33 for storage. As shown in FIGS. 21A and 21B, the bicycle 20 can include a front fender mounting assembly 710. The front fender mounting assembly 710 can be used to mount the front fender 31 to the front portion 24 of bicycle 20. In the example shown, the front fender 31 is mounted to the upper arm 74, although in alternative embodiments the front fender 31 may be mounted to other components of the steering assembly 60 and/or directly to the front portion 24 of the bicycle frame 22.

Figure 21C:
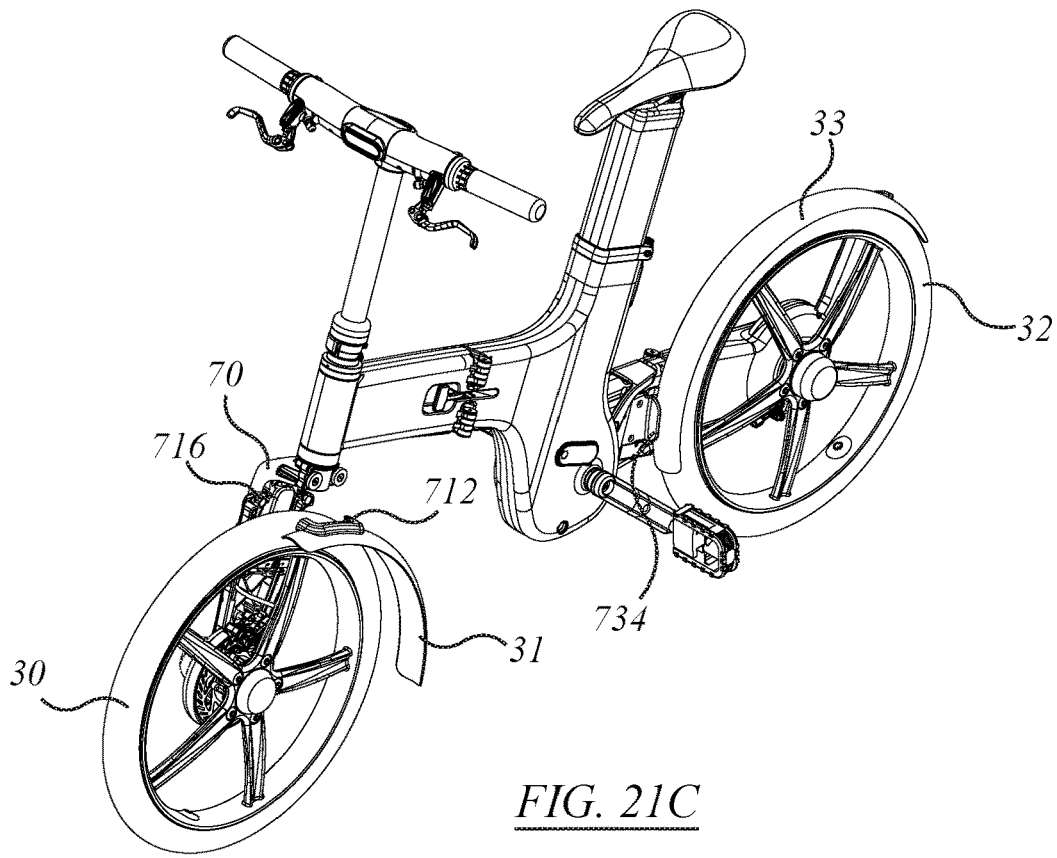
FIG. 21C is a perspective view of the example folding bicycle of FIG. 21A from the front and to the left with the front fender removed from the folding bicycle.
Figure 21D:
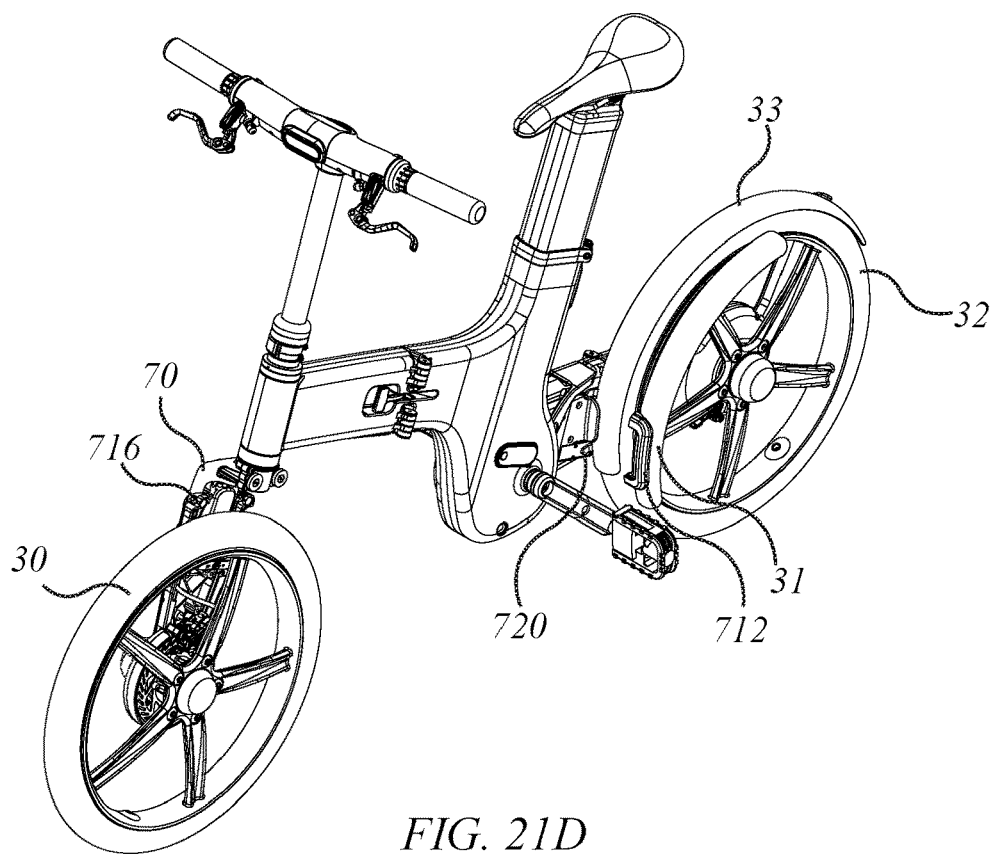
FIG. 21D is a perspective view of the example folding bicycle of FIG. 21A from the front and to the left with the front fender positioned to be mounted on the rear fender.
Figure 21E:
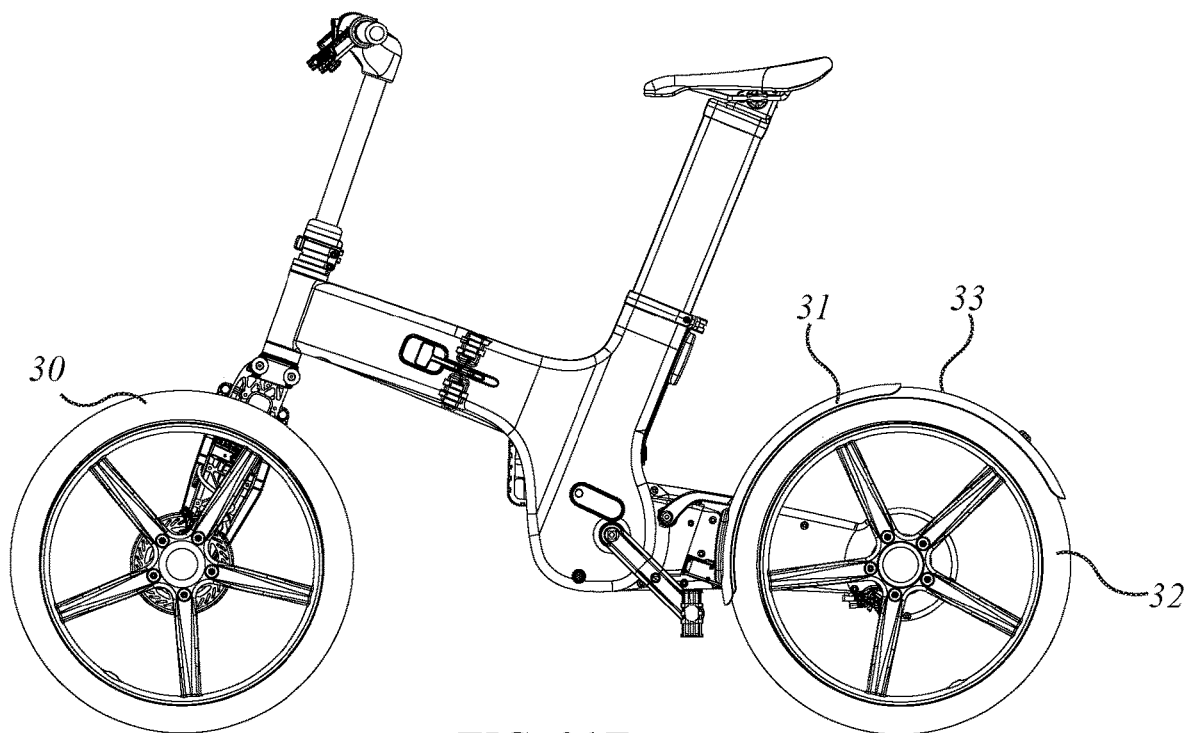
FIG. 21E is a side view of the example folding bicycle of FIG. 21A with the front fender mounted on the rear fender.
Figure 21F:
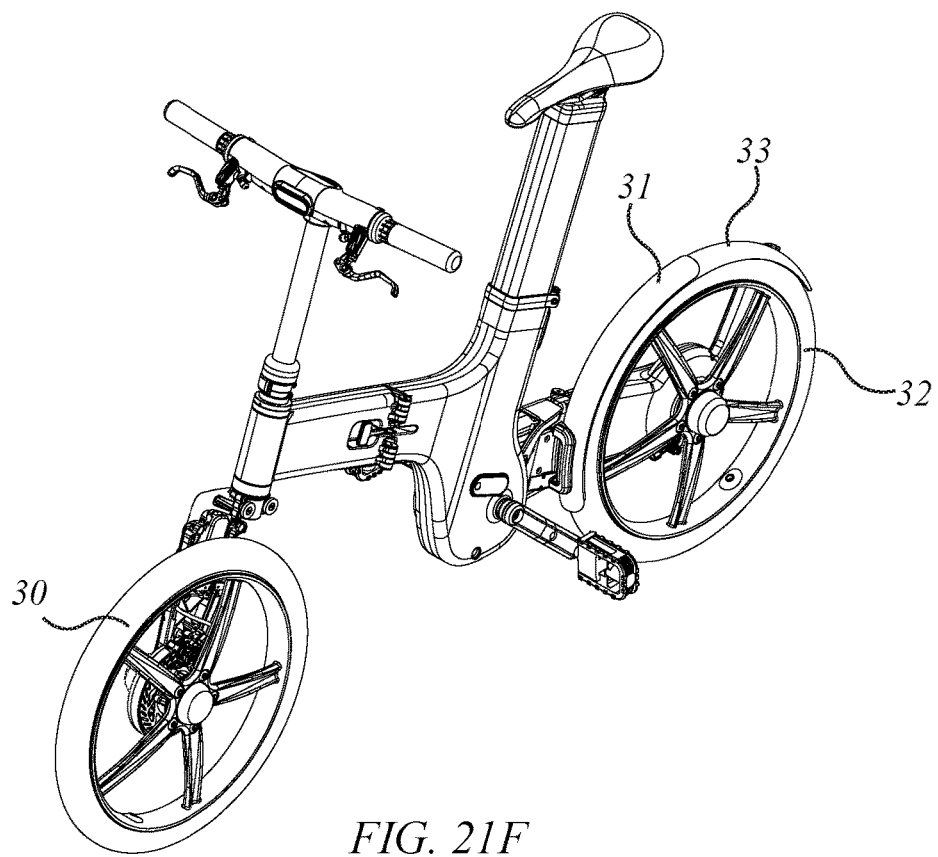

As shown in FIG. 21C, the front fender 31 can be removed from its mounting on the front portion 24. The front fender 31 may then be re-positioned to be mounted on the rear fender 33, as shown in FIG. 21D (and also shown in respect of front fender 31' in FIG. 21J). FIGS. 21E and 21F illustrate the front fender 33 mounted on the rear fender 33. The front fender 31 may extend partially around the circumference of the rear fender 33, and may even extend beyond the rear fender 33 to a small extent. The front fender 31 can be mounted concentrically on the rear fender 33. This outer diameter of the rear fender 33 and the inner diameter of the front fender 31 may engage with an interference fit partially securing the front fender 31 to rear fender 33. Additionally or alternatively, the front fender 31 may be further secured to a rear portion of the bicycle frame when mounted on rear fender 33, for instance using a magnetic mounting assembly.

As shown, the front fender mounting assembly 710 can include a front fender mounting unit 712 and a front frame mounting unit 716. The front fender mounting unit 712 and front frame mounting unit 716 may be matingly engaged to secure the front fender 31 to the bicycle 20, with the front fender 31 adjacent to the front wheel 30. The front fender mounting assembly 710 may provide the sole support for the fender 31 when mounted to the front portion 24 of frame 22. When mounted to the front frame portion 24, the front fender 31 can extend around a portion of the circumference of front wheel 30.

The front fender mounting assembly 710 may include magnetic mounting elements that allow the front fender 31 to be magnetically mounted to the frame. The front fender mounting unit 712 can include one or more magnetic members 714. In the example shown, the front fender mounting unit 712 includes a pair of magnetic members 714. The front frame mounting unit 716 may include one or more corresponding mating magnetic members 718. In the example shown, the front frame mounting unit 716 includes a second, corresponding pair of magnetic members 718. The magnetic members 714 and 718 can be matingly engaged to secure the front fender 31 to the arm 70.

Alignment of the magnetic members 714 and 718 when fender 31 is mounted to the arm 70 may also ensure that the fender 31 is in position to extend around the appropriate portion of the circumference of wheel 30 to protect a user of bicycle 20 from debris thrown by wheel 30. In some cases, the first pair of magnetic members 714 can include a first magnetic member having a first polarity and a second magnetic member having a different polarity. The pairs of magnetic members 714 and 718 may have opposing polarity front to rear so that fender 31 can be secured to the front portion 24 in the correctly deployed position only.

Figures 21G, 21H, 21I:
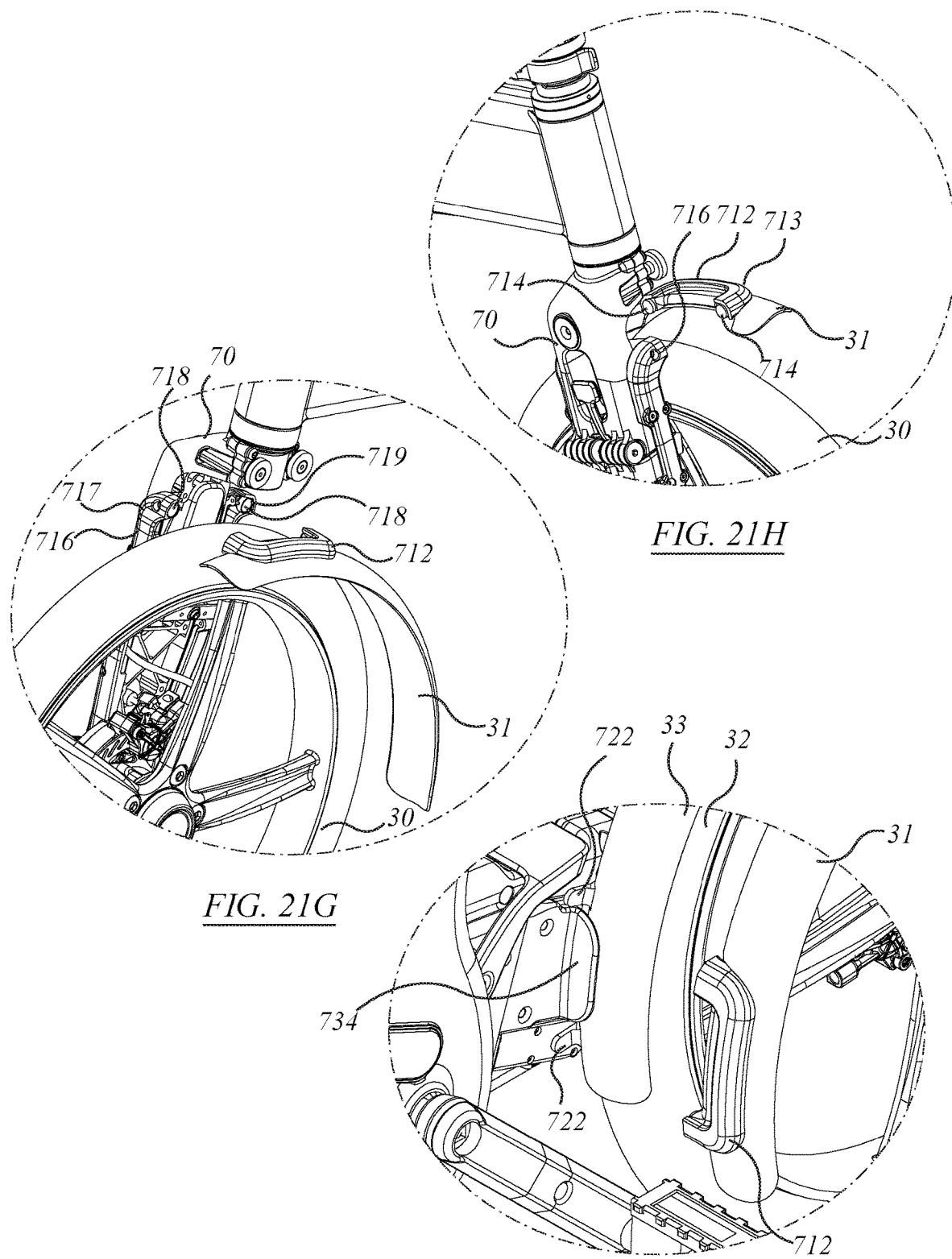
Figure 21J:
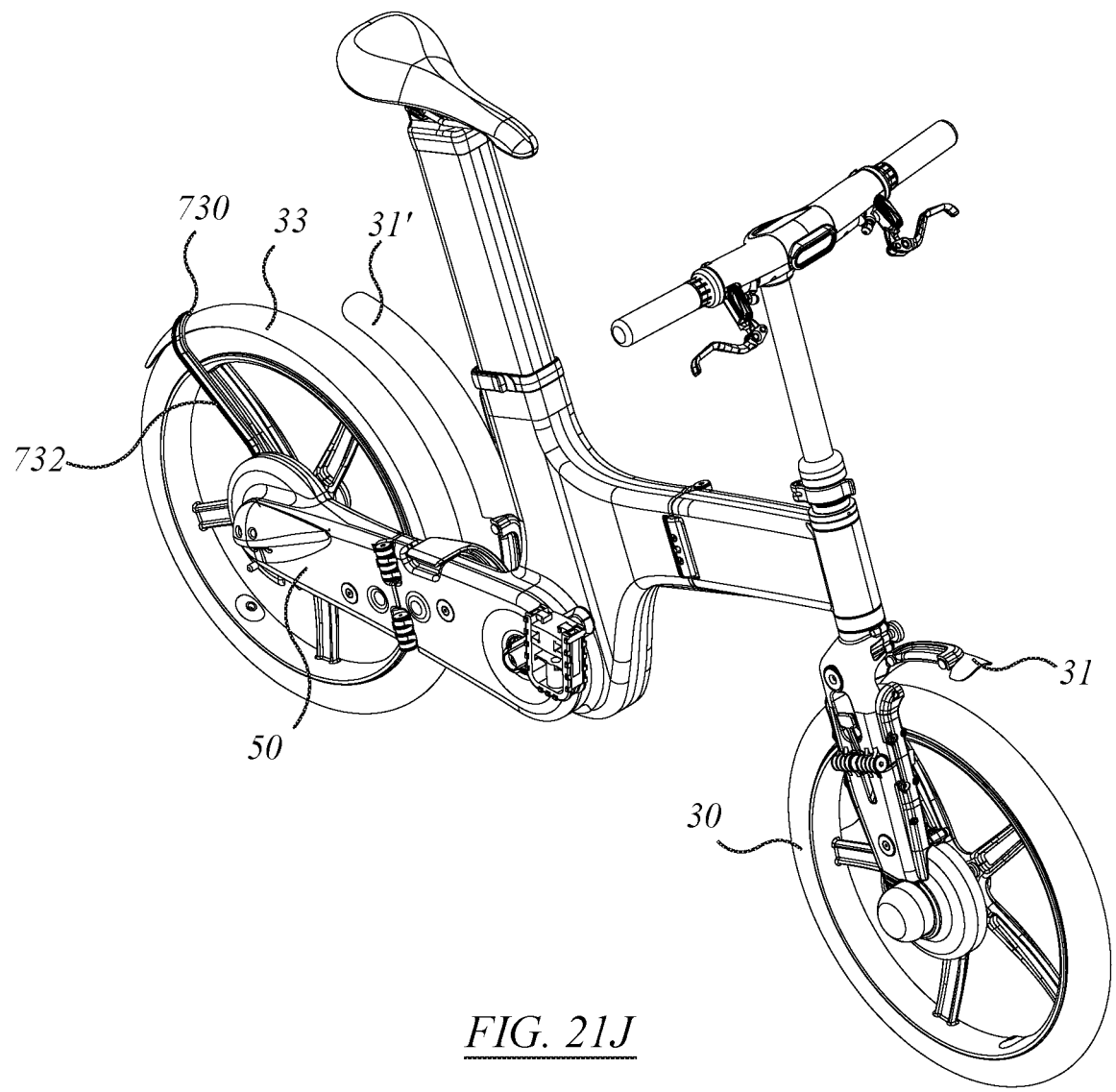

The front fender mounting assembly 710 may also include alignment members to ensure that the fender 31 is aligned properly with the frame of bicycle 20. For example, one pair of magnetic members 714 or 718 may be recessed while the other pair protrudes. The protruding magnetic members may then be received within the recess of the other corresponding magnetic member to further secure the fender 31 in place. As shown in FIGS. 21G and 21H, the magnetic members 714 can protrude from a housing 713 of the front fender mounting unit 712 while the magnetic members 718 are recessed within the housing 717 of the frame mounting unit 716. The magnetic members 714 may be received by, and positioned concentrically within, the recesses 719 when the fender is mounted to the arm 70.

The front fender mounting assembly 710 may also provide a quick-release mounting for the front fender 31. For example, if a user forgets to remove the fender 31 before folding the arm 70, the fender 31 can be released without causing any damage.

Optionally, the front fender 31 may be secured to the rear fender 33 by a magnetic mounting unit 720 on swing arm 50. The magnetic mounting unit 720 may matingly engage the magnetic members 714 to secure the front fender 31 in the storage position. In the example shown in FIG. 21I, the magnetic mounting unit 720 includes a ferromagnetic mount 722. The ferromagnetic mount 722 includes a ferromagnetic mounting plate with a pair of mounting elements positioned to correspond to magnetic members 714 when front fender 31 is mounted concentrically on the rear fender 33. Alternatively, the magnetic mounting unit 720 may include a pair of magnetic elements similar to the frame mounting unit 716.

The rear fender 33 can be fixedly secured to the swing arm 50 of frame 22. That is, the rear fender 33 may not have a quick-release mechanism to be released from the frame 22 in the same manner as front fender 31. The rear fender 33 can be mechanically secured to the frame 22. In the example shown (see e.g. FIGS. 21I and 21J) rear fender 33 may be mounted using a first securement member 730, in the form of a strut 732. The strut 732 can be secured to a rearward portion of the swing arm 50 using a fastener such as a screw. As shown, the strut 732 can be fastened to the wheel-side of rear portion 28 near the rear axle. The rear fender 33 may also be mounted using a second securement member 734. The second securement member 734 may be fastened to a forward section of the swing arm 50, e.g. using a screw or bolt. The securement member 734 may be substantially adjacent to magnetic mounting unit 720 used to secure the front fender 31 when mounted on rear fender 33. Alternatively, the rear fender 31 may be magnetically mounted to the frame 22.

Optionally, the hinge and latch mechanisms used with cross-bar 44 and arm 50 (i.e. hinges 34 and 36 and the associated latch assemblies) may be manufactured in a modular fashion and then mounted to the cross-bar 44 and arm 50, respectively. For instance, the hinge and latch mechanisms may be fastened or bonded to cross-bar 44 and arm 50. This may facilitate independent manufacturing of the bicycle frame and hinge/latch mechanisms.

In an alternate embodiment of a folding vehicle, the bicycle drive train may be omitted. For example, a folding electric scooter may be provided that omits the bicycle drive train components. The folding electric scooter may be generally similar to bicycle 20 shown and described herein, although the drive train, gears, pedals, cranks and related components may be omitted. In some cases, the scooter may include foot stands on either side of middle portion 26 in place of cranks 114, 115 to allow a user to rest their feet while seated on the electric scooter.

In embodiments of a folding electric scooter, a motor may be provided to drive front and/or rear wheels 30, 32 of the folding vehicle. For example, as in the embodiment shown, an electric motor 82 may be mounted in the hub of front wheel 30 to drive front wheel 30. Additionally or alternatively, a motor 82 may be mounted to drive rear wheel 32. For example, the motor 82 may be mounted in the hub of the rear wheel 32 as shown in the example of FIG. 11E.

In some embodiments of a folding vehicle, a motor 82 may be mounted in the middle portion 26 of the vehicle frame, for instance in a bottom bracket housing 100. In such cases, the folding vehicle can include transmission components coupling the motor 82 to one or both of the front wheel 30 and the rear wheel 32. This configuration may be used primarily in embodiments in which vehicle 20 can also be pedal-driven.

Optionally, the motor 82 can be provided without a clutch. This may allow motor 82 to operate in reverse polarity to enable power regeneration and/or electronic braking. The motor 82 may be allowed to freewheel overcoming its resistance by being minimally powered by motor control that may be provided by electronics module 392 to simulate a clutch. The electronics module 392 may include a power regeneration unit to allow energy to be re-captured from the motor 82 operating in reverse polarity. This re-captured energy may be used to charge energy storage element provided in vehicle 20. This may provide sufficient energy to maintain the energy storage element in a low state of charge sufficient to power various operations of vehicle 20, such as electronic shifting, lighting and other auxiliary systems.

The bicycle 20 may also include a servomotor used to provide electronic gear shifting. For example, a servomotor may be enclosed with motor 82 in a rear hub such as that shown in FIG. 11E.

Although the various embodiments have been illustrated and described herein, the principles of the present invention are not limited to these specific examples which are given by way of illustration, but only by a purposive reading of the claims.

We claim:

1. A folding bicycle comprising:
   a foldable frame, a front wheel and a rear wheel;
   said foldable frame having a bottom bracket, and cranks mounted to said bottom bracket, said cranks having an axis of rotation;
   said foldable frame including a seat post mount;
   said foldable frame including a head tube;
   said folding bicycle being movable between a first position and a second position;
   said first position being an unfolded position;
   said second position being a folded position;
   in said unfolded position, said front wheel and said rear wheel being in a leading-and-trailing relationship;
   in said folded position, said front wheel and said rear wheel being in spaced-apart side-by-side relationship;
   in said folded position, said front and rear wheels having profiles transversely projecting to include said axis of rotation of said cranks and at least a majority of said seat post mount; and
   in said folded position, said head tube lies within said transversely projected profiles.

2. The folding bicycle of claim 1 wherein said bottom bracket falls within said transversely projected profiles when said folding bicycle is in said folded position.

3. The folding bicycle of claim 1 wherein said rear wheel has an axis of rotation and said seat post mount passes through said axis of rotation of said rear wheel when said folding bicycle is in said folded position.

4. The folding bicycle of claim 1 wherein said bicycle comprises a stem post mounted within said head tube, and, when said bicycle is in said folded position said stem post falls within the transversely projected profile of said rear wheel.

5. The folding bicycle of claim 1 wherein said bicycle has handle bars, and, when said bicycle is in said folded position said handle bars are turned sideways to locate between the planes of the front and rear wheels.

6. The folding bicycle of claim 1 wherein said bicycle has an electronics module located within said seat post mount.

7. The folding bicycle of claim 1 wherein said front wheel is mounted on an arm, and said arm folds transversely.

8. The folding bicycle of claim 1 wherein at least one of said front wheel or said rear wheel is motor-powered.

9. The folding bicycle of claim 1 further comprising a motor mounted to said bottom bracket.

10. The folding bicycle of claim 1 wherein said bicycle has a transmission between said cranks and said rear wheel; and said transmission folds.

11. The folding bicycle of claim 1 wherein said bicycle has single-action self-catching latches that govern latching and release of folding elements of said bicycle.

12. The folding bicycle of claim 11 wherein at least one of said latches is recessed in frame structure of said bicycle and is contained within the frame envelope when said bicycle is folded and when said bicycle is unfolded.

13. The folding bicycle of claim 1 wherein said bicycle includes a pedal mounted to each of said cranks and, when said bicycle is at least partially folded, one of said pedals functions as a stand upon which to rest said bicycle in a stopped position.

14. The folding bicycle of claim 1 wherein:
    said foldable frame includes a steering stem shaft and an arm;
    said arm includes a wheel seat;
    said front wheel being mounted to said wheel seat; and
    when said bicycle is in said folded position said steering stem shaft and said arm fall within the transversely projected profile of said rear wheel.

15. The folding bicycle of claim 14 wherein:
    said foldable frame has a handle-bar assembly that includes a cross-bar and a stem, and said steering stem shaft has a passageway defined therethrough, said passageway being open to permit said stem of said handle-bar assembly to protrude downwardly therefrom in a retracted position when said bicycle is in said folded position.

16. The folding bicycle of claim 1 wherein:
    said folding bicycle includes a seat post movable mounted within said seat post mount, said seat post being movable between a retracted position in which a majority of said seat post is nested within said seat post mount, and an extended position in which a majority of said seat post extends upwardly of said seat post mount;
    in said folded position, said folding bicycle is positionable in a trailable configuration in which said wheels are rotatable to allow said folding bicycle to be wheeled along said wheels; and
    in said trailable configuration, said seat post is positioned in said extended position.

17. The folding bicycle of claim 16 wherein:
    said seat post has a seat mounted thereto; and
    in said trailable configuration, said seat defines a handle for wheeling said bicycle.

\* \* \* \* \*